United States Patent
Himizu et al.

(10) Patent No.: US 11,352,511 B2
(45) Date of Patent: Jun. 7, 2022

(54) DISPERSANT, DISPERSANT COMPOSITION, DISPERSION COMPOSITION FOR BATTERIES, ELECTRODE AND BATTERY

(71) Applicants: TOYO INK SC HOLDINGS CO., LTD., Tokyo (JP); TOYOCOLOR CO., LTD., Tokyo (JP)

(72) Inventors: Akio Himizu, Tokyo (JP); Yu Aotani, Tokyo (JP); Atsushi Koseki, Tokyo (JP); Naoki Deguchi, Tokyo (JP); Tomoaki Masuoka, Tokyo (JP); Tomohiko Hoshino, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 277 days.

(21) Appl. No.: 16/612,409

(22) PCT Filed: May 11, 2018

(86) PCT No.: PCT/JP2018/018420
§ 371 (c)(1),
(2) Date: Nov. 11, 2019

(87) PCT Pub. No.: WO2018/207933
PCT Pub. Date: Nov. 15, 2018

(65) Prior Publication Data
US 2020/0131379 A1    Apr. 30, 2020

(30) Foreign Application Priority Data

May 12, 2017 (JP) .............................. JP2017-095486
Nov. 1, 2017 (JP) .............................. JP2017-211690
Dec. 26, 2017 (JP) .............................. JP2017-250110

(51) Int. Cl.
| | | |
|---|---|---|
| *C09D 7/63* | (2018.01) | |
| *C08K 5/3492* | (2006.01) | |
| *C09D 101/02* | (2006.01) | |
| *C09D 129/04* | (2006.01) | |
| *H01M 4/13* | (2010.01) | |
| *H01M 4/66* | (2006.01) | |

(52) U.S. Cl.
CPC .............. *C09D 7/63* (2018.01); *C08K 5/3492* (2013.01); *C09D 101/02* (2013.01); *C09D 129/04* (2013.01); *H01M 4/13* (2013.01); *H01M 4/667* (2013.01); *H01M 2300/0017* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,687,789 | A | * 8/1987 | Gonnet | ................. C08F 220/06 523/122 |
| 4,983,185 | A | * 1/1991 | Streicher | ................... D06P 1/44 8/436 |
| 2007/0021530 | A1 | * 1/2007 | Palumbo | .............. C09D 11/326 523/160 |
| 2010/0028773 | A1 | 2/2010 | Hirota et al. | |
| 2010/0201326 | A1 | * 8/2010 | Takami | ................. H01M 4/131 320/152 |
| 2010/0233532 | A1 | 9/2010 | Hirota et al. | |
| 2011/0064933 | A1 | * 3/2011 | Bergman | ............. C09D 167/08 428/220 |

FOREIGN PATENT DOCUMENTS

| | | |
|---|---|---|
| CN | 105073915 | 11/2015 |
| JP | S50060528 | 5/1975 |
| JP | 2003157846 | 5/2003 |
| JP | 2010061932 | 3/2010 |
| JP | 2011184664 | 9/2011 |
| JP | 2013139488 | 7/2013 |
| JP | 5369550 | 12/2013 |
| JP | 2015101615 | 6/2015 |
| JP | 2017174708 | 9/2017 |
| WO | 2008108360 | 9/2008 |

OTHER PUBLICATIONS

"Office Action of Japan Related Application No. 2017-095486", with English translation thereof, dated Oct. 3, 2017, pp. 1-9.
"Office Action of Japan Related Application No. 2017-211690", with English translation thereof, dated Mar. 27, 2018, pp. 1-9.
"Office Action of Japan Related Application No. 2017-250110", with English translation thereof, dated Feb. 6, 2018, pp. 1-12.
"International Search Report (Form PCT/ISA/210) of PCT/JP2018/018420," dated Jul. 3, 2018, with English translation thereof, pp. 1-6.
"Office Action of China Counterpart Application", dated Feb. 3, 2021, with English translation thereof, pp. 1-16.

* cited by examiner

*Primary Examiner* — Anca Eoff
(74) *Attorney, Agent, or Firm* — JCIPRNET

(57) ABSTRACT

Provided are: a dispersant which has good dispersibility and reduces electronic resistance; and a battery having excellent characteristics, which uses this dispersant and is decreased in the ionic resistance and the reaction resistance. A dispersant contains a triazine derivative represented by general formula (1), and an amine or an inorganic base (in general formula (1), $R^1$ is as defined in the description).

12 Claims, No Drawings

DISPERSANT, DISPERSANT COMPOSITION, DISPERSION COMPOSITION FOR BATTERIES, ELECTRODE AND BATTERY

CROSS-REFERENCE TO RELATED APPLICATION

This application is a 371 application of the international PCT application serial no. PCT/JP2018/018420, filed on May 11, 2018, which claims the priority benefits of Japan application no. 2017-095486, filed on May 12, 2017, Japan application no. 2017-211690, filed on Nov. 1, 2017, and Japan application no. 2017-250110, filed on Dec. 26, 2017. The entirety of each of the abovementioned patent applications is hereby incorporated by reference herein and made a part of this specification.

BACKGROUND

Technical Field

The present invention relates to a dispersant, a dispersant composition, a dispersion composition for batteries, an electrode, and a battery.

Description of Related Art

Carbon materials are widely used as conduction auxiliary agents in the battery field. In order to reduce resistance of a battery and obtain a high performance, a conductive path needs to be efficiently formed in an electrode by controlling the carbon material distribution with high accuracy.

To realize the above-description, carbon materials need to be uniformly dispersed in a solution at a high concentration. However, carbon materials, which are nanoparticles with a large surface area, have strong cohesion force between themselves. Accordingly, it is difficult to manufacture a dispersion liquid that is stable not only in an initial stage but also after the elapse of time.

Various dispersants have been actively studied to solve these problems. For example, Patent Literature 1 and Patent Literature 2 disclose a composition for batteries in which a carbon material is dispersed using polymer dispersants such as polyvinyl pyrrolidone or polyvinyl butyral.

However, such polymer dispersants are themselves viscous. For this reason, in a case where they are used for carbon materials with a high specific surface area, such as carbon nanotubes, which are known for their high conductivity, an amount of dispersant required increases, and therefore a viscosity of a dispersion liquid may increase. As a result, coatability of a composition deteriorates, and a favorable electrode may not be obtained.

In addition, there is a case in which polymer dispersants absorb an electrolyte solution in a battery and swell, a contact state between carbon materials, or between carbon materials and active materials or current collectors breaks, and thereby an appropriately formed conductive path is cut off. As a result, problems such as a deterioration in battery resistance and a decrease in cycle life occur.

Furthermore, there is a problem of a deterioration in battery resistance because polymer dispersants dissolved in an electrolyte solution increase a viscosity of the electrolyte solution and decrease diffusibility of electrolyte ions. Because a viscosity increase in an electrolyte solution is particularly affected by low temperatures, the ionic resistance significantly deteriorates at a low temperature range.

Meanwhile, Patent Literature 3 discloses a dispersion composition for batteries which is formed of dispersants in which an amine is added to an acidic derivative of a triazine. These dispersants are not viscous unlike polymer, and cause appropriate charge repulsion in a solvent such as N-methyl-2-pyrrolidone, which is an aprotic polar solvent, thereby enabling manufacture of a favorable dispersion liquid.

Dispersants can improve a battery characteristic through formation of an efficient conductive path. Meanwhile, because the above-described dispersants are themselves insulating components, there is a limitation on raising the inherent conductivity of a carbon material to the maximum, indicating that they cannot cope with demands for further lowering resistance. In addition, it is impossible to realize a reduction in resistance components such as ionic resistance and reaction resistance, other than electrical resistance.

Patent Literature 4 discloses a composition for batteries which is formed of triazine derivatives having an aromatic hydroxyl group or an aromatic thiol group. These derivatives are considered to impart excellent dispersion stability to carbon materials and to improve wettability of an electrolyte solution. However, the triazine derivatives of Patent Literature 4 also cannot realize a reduction in resistance components such as ionic resistance and reaction resistance, other than electrical resistance.

In addition, as a method for obtaining a carbon material pre-treated with dispersants, a method in which dispersants are completely or partially dissolved in a basic aqueous solution to which an amine or an inorganic base is added; a carbon material is added, mixed in, and dispersed in the solution to allow these dispersants to act on (for example, be adsorbed to) the carbon material; and thereby aggregated particles are obtained by agglomeration has been disclosed. However, when adjusting a pH to be basic by adding an amine or an inorganic base to increase the solubility of dispersants, active material components are eluted, causing problems of a deterioration in battery characteristics and life, and an increase in resistance due to corrosion of a metal foil of a current collector.

Furthermore, there is also concern that, because the dispersants of Patent Literature 3 and Patent Literature 4 are not only highly soluble in a dispersion solvent but also easily eluted in an electrolyte solution, eluted dispersants may diffuse in a battery and may adversely affect a counter electrode or separator, and surrounding members such an exterior body.

In Patent Literature 5, a carbon material dispersion liquid is manufactured by using triazine derivatives and polyvinyl alcohol in combination as dispersants, and thereby an electrode and a secondary battery are manufactured. This can provide a dispersion liquid which has an excellent storage stability at a high concentration, and by which adhesiveness of a coated electrode (coating film) becomes favorable. However, the advantages of triazine derivatives and polyvinyl alcohol were simply combined with each other, and it is not expected that any effect beyond their respective performances would be exhibited.

In addition, as in the triazine derivatives disclosed in Patent Literature 3 and Patent Literature 4, the triazine derivatives disclosed in Patent Literature 5 had the same problem of solubility in an electrolyte solution.

Meanwhile, the performances required of batteries has further increased in recent years. For example, regarding mobile applications, smartphones are required to cope with more complex applications on a large screen, and despite increasing power consumption, there is demand for faster charging, a longer operation time, a thinner thickness, a smaller size, and a lower weight at the same time. In addition, in accordance with the spread of wearable terminals such as watches, yet smaller batteries having a higher energy density have become necessary. Regarding in-vehicle applications, the demand is changing from batteries for hybrid vehicles in which a high output is required but a low capacity has been allowed, to batteries for plug-in hybrid vehicles and electric vehicles in which all characteristics are required to be excellent and well-balanced.

REFERENCE LIST

Patent Literature

Patent Literature 1: Japanese Patent Application Laid-Open (JP-A) No. 2003-157846
Patent Literature 2: Japanese Patent Application Laid-Open (JP-A) No. 2011-184664
Patent Literature 3: PCT International Publication No. WO2008/108360
Patent Literature 4: Japanese Patent Application Laid-Open (JP-A) No. 2010-61932
Patent Literature 5: Japanese Patent Application Laid-Open (JP-A) No. 2015-101615

SUMMARY

Technical Problem

In view of the above background, the present invention provides a dispersant which has favorable dispersibility and reduces electrical resistance as compared to dispersants of the related art; and a battery in which ionic resistance and reaction resistance are reduced through use of this dispersant, and thereby has excellent characteristics.

Solution to Problem

As a result of intensive studies, the inventors of the present invention have found that, by using a dispersant including a triazine derivative having a specific structure, and an amine or an inorganic base, a favorable conductive path is formed, and thereby not only electrical resistance can be reduced but also the ionic resistance and reaction resistance can be reduced. Accordingly, the present invention has been completed.

That is, the present invention relates to a dispersant including a triazine derivative represented by General Formula (1), and an amine or an inorganic base.

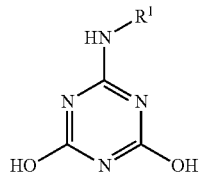

General Formula (1)

[In General Formula (1), $R^1$ is a group represented by $-X^1-Y^1$, where $X^1$ is an arylene group which may have a substituent, and $Y^1$ is a sulfo group or a carboxyl group; or $R^1$ is a phenyl group having a substituent containing at least $-NHC(=O)-$, a benzimidazole group, an indole group which may have a substituent, or a pyrazole group which may have a substituent.]

In one aspect of the dispersant, a content of the amine with respect to the triazine derivative is 0.1 to 5 molar equivalents.

In one aspect of the dispersant, a content of the amine with respect to the triazine derivative is 0.3 to 2 molar equivalents.

In one aspect of the dispersant, a content of the inorganic base with respect to the triazine derivative is 0.1 to 1 molar equivalent.

The present invention relates to a dispersant composition including the above-described dispersant and a polymer dispersant.

In one aspect of the dispersant composition, the polymer dispersant has a hydroxyl group.

In one aspect of the dispersant composition, the polymer dispersant is a polyvinyl alcohol resin and/or a cellulose resin.

The present invention relates to a dispersion composition including the above-described dispersant, a carbon material, and a solvent.

The present invention relates to a dispersion composition including the above-described dispersant composition, a carbon material, and a solvent.

One aspect of the dispersion composition further includes a binder.

The present invention relates to a dispersion composition for batteries, in which the above-described dispersion composition further contains an active material.

In one aspect of the dispersion composition for batteries, a content of a dispersant containing a triazine derivative, and an amine or an inorganic base is 0.1 to 200 mg with respect to a 1 $m^2$ surface area of the active material.

The present invention relates to an electrode including a mixture layer formed from the above-described dispersion composition for batteries on a current collector.

The present invention relates to a battery including the above-described electrode and a non-aqueous electrolyte solution.

In one aspect of the battery, a content of a dispersant containing a triazine derivative, and an amine or an inorganic base is 10 µg to 60 mg with respect to 1 ml of the non-aqueous electrolyte solution.

Advantageous Effects of Invention

According to the present invention, it is possible to provide a dispersant which has favorable dispersibility and reduces electrical resistance; and a battery in which ionic resistance and reaction resistance are reduced through use of this dispersant, and thereby has excellent characteristics.

DESCRIPTION OF EMBODIMENTS

Hereinafter, a dispersant, a dispersant composition, a dispersion composition for batteries, an electrode, and a battery according to the present invention will be described in detail in order.

In the present invention, "(meth)acryl" means "acryl" or "methacryl."

<Dispersant>

A dispersant according to the present invention includes a triazine derivative represented by General Formula (1), and an amine or an inorganic base.

General Formula (1)

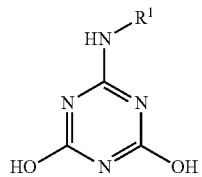

[In General Formula (1), $R^1$ is a group represented by —$X^1$—$Y^1$, where $X^1$ is an arylene group which may have a substituent, and $Y^1$ is a sulfo group or a carboxyl group; or $R^1$ is a phenyl group having a substituent containing at least —NHC(=O)—, a benzimidazole group, an indole group which may have a substituent, or a pyrazole group which may have a substituent.]

In the following description, unless otherwise specified, the "dispersant" means the above-described dispersant, and is distinguished from a polymer dispersant.

The inventors of the present invention have found that, using a dispersion composition which is formed of a dispersant including a triazine derivative that has a specific structure and is represented by General Formula (1), and including an amine or an inorganic base, a favorable conductive path is formed, and thereby not only electrical resistance can be reduced but also the ionic resistance and reaction resistance can be reduced. Accordingly, the present invention has been completed.

According to the present invention, it is possible to manufacture a battery having lower ionic resistance and reaction resistance, and an excellent rate characteristic and low-temperature characteristics, compared with a case of using known dispersion compositions of the related art.

In addition, because the dispersant including a triazine derivative represented by General Formula (1), and an amine or an inorganic base has low solubility, elution into an electrolyte solution is inhibited. The reason for this is thought to be that crystallinity is improved, and solubility is reduced due to a structure having storing hydrogen bonding properties, in which —NH—$R^1$ and two hydroxyl groups are directly connected to one triazine ring. In addition, because strong interactions such as hydrogen bonding occur easily, it is considered that sufficient dispersibility can be exhibited even though the dispersant easily acts on carbon materials and has low solubility in a dispersion liquid.

In General Formula (1), $R^1$ is a group represented by —$X^1$—$Y^1$, where $X^1$ is an arylene group which may have a substituent, and $Y^1$ is a sulfo group or a carboxyl group; or $R^1$ is a phenyl group having a substituent containing at least —NHC(=O)—, a benzimidazole group, an indole group which may have a substituent, or a pyrazole group which may have a substituent.

"Substituents" of an arylene group, as $X^1$, which may have a substituent may be the same as or different from each other, and specific examples thereof include a sulfo group, a carboxyl group, a hydroxyl group, a halogen group such as fluorine, chlorine, and bromine, a nitro group, an alkyl group, an alkoxyl group, and the like. In addition, there may be a plurality of these substituents.

Examples of "arylene groups" for the arylene group which may have a substituent include a phenylene group, a naphthylene group, and the like.

Examples of substituents containing —NHC(=O)— in $R^1$ include the following structures. Here, a mark "*" represents a bonding site with a benzene ring.

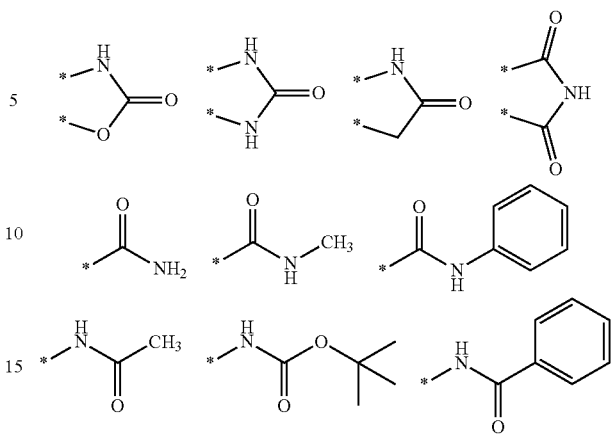

In addition, a phenyl group having a substituent containing at least —NHC(=O)— may have a methyl group, a trifluoromethyl group, a methoxy group, an ethoxy group, a halogen group such as fluorine and chlorine, and the like, as other substituents. Furthermore, there may be a plurality of these substituents.

Examples of substituents of an indole group which may have a substituent, or a pyrazole group which may have a substituent, which are $R^1$, include a methyl group.

In addition, examples of amines added to triazine derivatives include primary, secondary, and tertiary alkylamines having 1 to 40 carbon atoms.

Examples of primary alkylamines having 1 to 40 carbon atoms include propylamine, butylamine, isobutylamine, octylamine, 2-ethylhexylamine, laurylamine, stearylamine, oleylamine, 2-aminoethanol, 3-aminopropanol, 3-ethoxypropylamine, 3-lauryloxypropylamine, and the like.

Examples of secondary alkylamines having 1 to 40 carbon atoms include dibutylamine, diisobutylamine, N-methylhexylamine, dioctylamine, distearylamine, 2-methylaminoethanol, and the like.

Examples of tertiary alkylamines having 1 to 40 carbon atoms include triethylamine, tributylamine, N,N-dimethylbutylamine, N,N-diisopropylethylamine, dimethyloctylamine, trioctylamine, dimethyldecylamine, dimethyllaurylamine, dimethylmyristylamine, dimethylpalmitylamine, dimethylstearylamine, dilaurylmonomethylamine, triethanolamine, 2-(dimethylamino)ethanol, and the like.

Among them, primary, secondary, or tertiary alkylamines having 1 to 30 carbon atoms are preferable, and primary, secondary, or tertiary alkylamines having 1 to 20 carbon atoms are more preferable.

An added amount of amines used in the present invention is not particularly limited, but it is preferably 0.1 to 5 molar equivalents, and is more preferably 0.3 to 2 molar equivalents with respect to the triazine derivative represented by General Formula (1).

Amines can be added at the time of manufacturing the dispersant and/or at the time of manufacturing a composition for batteries.

Examples of inorganic bases added to triazine derivatives include alkali metal hydroxides, alkaline earth metal hydroxides, alkali metal carbonates, alkaline earth metal carbonates, alkali metal phosphates, alkaline earth metal phosphates, and the like.

Examples of alkali metal hydroxides include lithium hydroxide, sodium hydroxide, potassium hydroxide, and the like.

Examples of alkaline earth metal hydroxides include magnesium hydroxide, calcium hydroxide, strontium hydroxide, barium hydroxide, and the like.

Examples of alkali metal carbonates include lithium carbonate, sodium carbonate, sodium bicarbonate, potassium carbonate, potassium bicarbonate, and the like.

Examples of alkaline earth metal carbonates include magnesium carbonate, calcium carbonate, strontium carbonate, barium carbonate, and the like.

Examples of alkali metal phosphates include lithium phosphate, trisodium phosphate, disodium hydrogen phosphate, tripotassium phosphate, dipotassium hydrogen phosphate, and the like.

Examples of alkaline earth metal phosphates include magnesium phosphate, calcium phosphate, strontium phosphate, barium phosphate, and the like.

An added amount of inorganic base used in the present invention is not particularly limited, but it is preferably 0.1 mol to 1.0 mol, and is more preferably 0.3 mol to 0.7 mol with respect to 1 mol of the triazine derivative represented by General Formula (1).

Inorganic bases can be added at the time of manufacturing the dispersant and/or at the time of manufacturing a composition for batteries.

The dispersant of the present invention can be suitably used as a dispersant particularly for carbon materials such as carbon black used for batteries, condensers, and capacitors, and it can also be used as a dispersant for pigments used in various coloring compositions such as inks, paints, and color filter resists.

[Dispersant Composition]

A dispersant composition of the present invention contains the above-described dispersant and a polymer dispersant.

The inventors of the present invention have found that, when the dispersant containing the triazine derivative represented by General Formula (1) is used in combination with a polymer dispersant, a synergistic effect that specifically improves adhesiveness (peeling strength) between carbon materials, and between carbon materials and active materials or current collectors can be obtained. In addition, they also have found that use in combination can curb electrode peeling and deterioration during repeated charging and discharging over a long period of time, and thereby cycle characteristics can be improved. Furthermore, they also have found that a dispersion composition for batteries, which is formed of the triazine derivative represented by General Formula (1) and the polymer dispersant, not only can reduce electrical resistance but also can reduce the ionic resistance and reaction resistance through formation of a favorable conductive path.

Furthermore, by using the polymer dispersant in combination, film formability and film hardness can be adjusted, or rheological control can be performed.

<Polymer Dispersant>

For the polymer dispersant used in the present invention, it is possible to use a polyvinyl alcohol with functional groups other than a hydroxyl group, for example, a modified polyvinyl alcohol having an acetyl group, a sulfo group, a carboxyl group, a carbonyl group, or an amino group; polyvinyl alcohols modified with various salts; polyvinyl alcohols modified with an anion or a cation; acetal-modified (for example, acetoacetal-modified or butyral-modified, and the like) polyvinyl alcohol resins which are modified by aldehydes; various (meth)acrylic polymers; polymers derived from ethylenically unsaturated hydrocarbons; various cellulose resins; and the like; and copolymers thereof, but examples are not limited thereto. Among them, the polymer dispersant in the present invention is preferably a polyvinyl alcohol resin and/or a cellulose resin. The polymer dispersants can be used alone or in combination of two or more kinds thereof.

In addition, among them, the polymer dispersant in the present invention preferably has a hydroxyl group. An effect of combining the above-described dispersant and the polymer dispersant was particularly remarkable in a case where the polymer dispersant had a hydroxyl group. Although principles thereof are not clear, the reason for this is thought to be that strong intermolecular forces such as hydrogen bonding acted between the dispersant and the polymer dispersant.

An average degree of polymerization of polymer dispersants is preferably 50 to 3000, is particularly preferably 100 to 2000, and is even more preferably 200 to 1000, because when it is too low, the strength of adsorption to dispersoids is weak, and when it is too high, not only does a viscosity increase, but also a dispersion stabilization effect is diminished because polymer dispersants do not spread favorably in a dispersion liquid.

In the polyvinyl alcohol resin, there is preferably 60 mol % or more of hydroxyl groups, more preferably 70 mol % or more, and even more preferably 75 mol % or more, in order to impart an appropriate affinity with a dispersoid, a dispersion solvent, and an electrolyte solution.

As commercially available polyvinyl alcohol resins in which an amount of hydroxyl groups falls within the above-described range, it is possible to obtain various grades, for example, KURARAY POVAL (a polyvinyl alcohol resin manufactured by Kuraray Co., Ltd.), GOHSENOL and GOHSENX (a polyvinyl alcohol resin manufactured by Nippon Synthetic Chemical Industry Co., Ltd.), DENKA POVAL (a polyvinyl alcohol resin manufactured by Denka Company Limited), J-POVAL (a polyvinyl alcohol resin manufactured by Japan Vam & Poval Co., Ltd.), and the like (all of which are trade names). In addition, modified polyvinyl alcohols having various functional groups are also available.

It is known that, in a case of synthesizing without using commercially available products, in general, vinyl acetate is polymerized to a specified degree of polymerization in a methanol solution or the like, an alkali catalyst such as sodium hydroxide is added to the obtained polyvinyl acetate, and saponification reaction is performed, thereby polyvinyl alcohol in which an amount of hydroxyl group is controlled can be obtained.

It is known that, in a case where modified polyvinyl alcohol is synthesized and used, in general, vinyl acetate is copolymerized with (meth)acrylic monomers such as (meth)acrylic acid, vinyl ester monomers, monomers having α-β unsaturated bonds and functional groups, and the like in a methanol solution or the like, and then saponification reaction is performed, and thereby modified polyvinyl alcohol in which a modification rate is controlled can be obtained. In addition, a modified polyvinyl alcohol resin can be obtained by adding an acid anhydride to a polyvinyl alcohol resin to react them, or by esterification reaction thereof.

As commercially available polyvinyl acetal resins, various grades are available under the trade names such as MOWITAL (a polyvinyl butyral resin manufactured by Kuraray Co., Ltd.), and S-LEC (polyvinyl acetal or polyvinyl butyral manufactured by SEKISUI CHEMICAL CO., LTD.), but a polyvinyl acetal resin may be synthesized and used in order to obtain the above-described preferable amount of hydroxyl groups. As a general synthesis method, it is possible to obtain a polyvinyl acetal resin controlled to a predetermined degree of acetalization by reacting polyvinyl alcohol with an aldehyde. In addition, the carbon number of an acetal group can be arbitrarily selected by changing the carbon number of aldehyde.

As cellulose resins, it is possible to use cellulose; cellulose in which a hydroxyl group is partially modified with an alkyl group, hydroxyalkyl group, or carboxyalkyl group; or salts thereof. For example, various grades are available under the trade names such as METOLOSE (methylcellulose or hydroxypropylmethylcellulose manufactured by Shin-Etsu Chemical Co., Ltd.), Mecellose (water-soluble cellulose ether, hydroxyethylmethylcellulose, hydroxypropylmethylcellulose, and methylcellulose manufactured by TOMOE KOGYO CO., LTD.), SUNROSE (carboxymethylcellulose sodium manufactured by Nippon Paper Industries Co., Ltd.), ETHOCEL (ethyl cellulose manufactured by Dow Chemical Company), and DAICEL-CMC (carboxymethylcellulose sodium manufactured by Daicel FineChem Ltd.). In particular, alkylcelluloses such as methylcellulose and ethylcellulose are preferable from the viewpoints of solubility in an electrolyte solution and swellable ability.

[Dispersion Composition]

The dispersion composition of the present invention contains the dispersant or the dispersant composition, a carbon material, and a solvent.

The carbon material used in the present invention is not particularly limited, but in a case of being used as a carbon material for batteries, graphite, carbon black, carbon nanotube, carbon nanofiber, carbon fiber, graphene, fullerene, and the like are preferably used alone or in combination of two or more kinds thereof. In a case of being used as a carbon material, it is preferable to use carbon black from the viewpoints of conductivity, availability, and cost.

As the carbon black used in the present invention, commercially available various carbon blacks such as furnace black, channel black, thermal black, acetylene black, and ketjenblack can be used alone or in combination of two or more kinds thereof. In addition, carbon black subjected to oxidization, which is generally performed, hollow carbon, and the like can also be used. Furthermore, a particle diameter of carbon black is preferably 0.01 to 1 μm and is more preferably 0.01 to 0.2 μm. The particle diameter referred herein means an average primary particle diameter measured with an electron microscope, and this physical property value is generally used to represent physical characteristics of carbon black.

The carbon nanotube used in the present invention is a carbon material having a shape in which graphene is wound into a cylindrical shape. A diameter obtained by observation with an electron microscope is about several nm to 100 nm, and a length is about several nm to 1 mm. In order to exhibit semiconductor characteristics, transparency of a coating film, and the like, the diameter is preferably 50 nm or less and is particularly 20 nm or less. The length is preferably 100 nm to 1 mm and is particularly preferably 500 nm to 1 mm. There are single-walled carbon nanotubes, and carbon nanotubes having a multilayer structure, but any structure may be used. In addition, it is also possible to use carbon nanotubes which are classified as carbon nanofibers, and have a fiber diameter of about 100 nm to 1 μm which is obtained by observation with an electron microscope.

The graphene used in the present invention is a monoatomic thin film constituting graphite, and is a carbon material in which carbon atoms are arranged in a honeycomb lattice (a hexagonal shape) on a flat surface, and this includes a multi-layered graphene. As the multi-layered graphene, a multi-layered graphene having 2 to 50 graphene layers can be used.

<Solvent>

The solvent used in the present invention may be an aprotic polar solvent and a water-soluble polar solvent, and one kind thereof may be used in water, or two or more kinds thereof may be mixed and used in water. The aprotic polar solvent is preferably an amide solvent. It is particularly preferable to use amide aprotic solvents such as N,N-dimethylformamide, N,N-diethylformamide, N,N-dimethylacetamide, N,N-diethylacetamide, N-methyl-2-pyrrolidone, and hexamethylphosphoric triamide. The water-soluble polar solvent is preferably alcohol-based, ester-based, ether-based, glycol-based, glycol ester-based, or glycol ether-based. Water may be used alone, and a small amount of water-soluble polar solvent with low surface tension may be used in combination to improve wettability and coatability of carbon materials. It is particularly preferable to use water in combination with propylene glycol monoethyl ether, ethylene glycol dimethyl ether, diethylene glycol methyl ethyl ether, dipropylene glycol dimethyl ether, propylene glycol monopropyl ether, and N-methyl-2-pyrrolidone.

<Binder>

The dispersion composition of the present invention may further contain a binder. The binder to be used is not particularly limited, but examples thereof include polymers or copolymers containing, as constitutional units, ethylene, propylene, vinyl chloride, vinyl acetate, vinyl alcohol, maleic acid, acrylic acid, acrylic ester, methacrylic acid, methacrylic acid esters, acrylonitrile, styrene, vinyl butyral, vinyl acetal, vinyl pyrrolidone, and the like, a polyurethane resin, a polyester resin, a phenol resin, an epoxy resin, a phenoxy resin, a urea resin, a melamine resin, an alkyd resin, an acrylic resin, a formaldehyde resin, a silicone resin, a fluorine resin, cellulose resins such as carboxymethylcellulose, rubbers such as a styrene-butadiene rubber and a fluorine rubber, conductive resins such as polyaniline and polyacetylene, and the like. In addition, modified products and copolymers of these resins may be used. In particular, when being used for battery applications, it is preferable to use a polymer compound containing a fluorine atom in a molecule, for example, polyvinylidene fluoride, polyvinyl fluoride, tetrafluoroethylene, and the like, from the viewpoint of resistance. These binders can be used alone or a plurality of binders may be combined and used. Furthermore, in a case of using water as a solvent, it is preferable to use, in combination, polymer compounds containing fluorine atoms and emulsions such as styrene-butadiene rubber, and carboxymethylcellulose which also functions as a thickener.

The dispersion composition of the present invention is a carbon material dispersion liquid containing the above-described dispersant, a carbon material, and a solvent, or a carbon material dispersion varnish containing a binder, and can be used in fields such as printing inks, paints, plastics, toners, color filter resist inks, and batteries in which uniform and favorable coating properties are required. In particular, because the dispersion composition can provide a coating film suitable for an electrode layer having a uniform and favorable coating properties and a low surface resistance, the dispersion composition can be suitably used for forming an electrode for batteries. The dispersion composition may be used for a base layer provided between a current collector and a mixture layer.

<Method for Producing Dispersion Composition>

The carbon material dispersion liquid which is the dispersion composition of the present invention can be manufactured by mixing the above-described dispersant or dispersant composition, the carbon material, and a solvent. In addition, the carbon material dispersion varnish can be manufactured by mixing the above-described dispersant or dispersant composition, the carbon material, a solvent, and a binder. The order of addition of each component is not limited, and for the case of the carbon material dispersion liquid, examples thereof include (1) method of mixing and dispersing all components at once; (2) method of dispersing a carbon material in a solvent in which a dispersant or a dispersant composition is dispersed and dissolved in advance; and the like. In addition, for the case of the carbon material dispersion varnish, examples of orders of addition include (1) method of mixing, dispersing, and dissolving all components at once; (2) method of mixing and dissolving a binder powder after producing a carbon material dispersion liquid in advance; (3) method of mixing a binder solution after producing a carbon material dispersion liquid in advance; and the like. Furthermore, the above-described solvent may be further added as needed.

As a mixing/dispersing/dissolving device, a dispersing device generally used for pigment dispersion or the like can be used. For example, mixers such as dispersers, homomixers, planetary mixers; homogenizers ("Clare mix" manufactured by M Technique, "Fillmix" and the like manufactured by PRIMIX, "Abramix" and the like manufactured by Silverson); paint conditioners (manufactured by Red Devil); colloid mills ("PUC colloid mill" manufactured by PUC, "Colloid Mill MK" manufactured by IKA); corn mills ("Cone Mill MKO" and the like manufactured by IKA); ball mills; sand mills ("Dynomill" and the like manufactured by Shinmaru Enterprises); attritors; pearl mills ("DCP mill" and the like manufactured by Eirich); media-type dispersers such as coball mills; wet jet mills ("Genus PY" manufactured by Genus, "Starburst" manufactured by Sugino Machine, "Nanomizer" manufactured by Nanomizer, and the like); "Claire SS-5" manufactured by M Technique; media-less dispersers such as "MICROS" manufactured by Nara Machinery Co., Ltd.; other roll mills; and the like, but examples are not limited thereto.

In addition, it is preferable to use a disperser that has been treated to prevent metal contamination from the disperser. As metal contamination prevention treatment, for example, when using a media-type disperser, it is preferable to use a method in which disperser with an agitator and a vessel made of ceramic or resin is used, or to use a metal agitator and a disperser in which a surface of a vessel is treated with tungsten carbide spraying, resin coating, or the like. As the media, it is preferable to use glass beads, ceramic beads such as zirconia beads or alumina beads. In addition, when using a roll mill, it is preferable to use a ceramic roll. Only one type of disperser may be used, or multiple types of devices may be used in combination.

[Dispersion Composition for Batteries]

The dispersion composition for batteries of the present invention is a dispersion composition for batteries in which the above-described dispersion composition further contains an active material.

<Active Material>

The active material is a substance that charges or discharges a battery with a redox reaction in the battery. Examples thereof include a cathode active material used for a cathode and an anode active material used for an anode.

(Cathode Active Material)

The cathode active material to be used is not particularly limited as long as it functions as a battery active material. For example, when being used in a lithium ion secondary battery, metal oxides capable of doping or intercalating lithium ions, metal compounds such as metal sulfides, conductive polymers, and the like can be used.

Specific examples thereof include powders of complex oxides of lithium and transition metal, such as a lithium manganese composite oxide (for example, $Li_xMn_2O_4$ or $Li_xMnO_2$), a lithium nickel composite oxide (for example, $Li_xNiO_2$), a lithium cobalt composite oxide ($Li_xCoO_2$), a lithium nickel cobalt composite oxide (for example, $Li_xNi_{1-y}Co_yO_2$), a lithium manganese cobalt composite oxide (for example, $Li_xMn_yCo_{1-y-z}O_2$), a lithium nickel manganese cobalt composite oxide (for example, $Li_xNi_yCo_zMn_{1-y-z}O_2$), and a spinel-type lithium manganese nickel composite oxide (for example, $Li_xMn_{2-y}Ni_yO_4$); powders of lithium phosphorus oxides having an olivine structure (for example, $Li_xFePO_4$, $LiFe_{1-y}Mn_yPO_4$, $LiCoPO_4$, and the like); powders of transition metal oxides such as a manganese oxide, an iron oxide, a copper oxide, a nickel oxide, a vanadium oxide (for example, $V_2O_5$, $V_6O_{13}$), and a titanium oxide; powders of transition metal sulfides such as iron sulfate ($Fe_2(SO_4)_3$), $TiS_2$, and FeS; and the like. Where, x, y, and z are numbers, and $0<x<1$, $0<y<1$, $0<z<1$, $0<y+z<1$. In addition, conductive polymers such as polyaniline, polyacetylene, polypyrrole, and polythiophene can also be used. These cathode active materials can be used alone or in combination.

(Anode Active Material)

Anode active materials to be used are not particularly limited, but Li metal that can be doped or intercalated with lithium ions, or its alloys, tin alloys, silicon alloy anodes, metal oxides such as $Li_xTiO_2$, $Li_xFe_2O_3$, $Li_xFe_3O_4$, $Li_xWO_2$, conductive polymers such as polyacetylene and poly-p-phenylene, carbonaceous powders of artificial graphite such as amorphous carbonaceous materials such as soft carbon and hard carbon and highly graphitized carbon material, or natural graphite, and carbon-based materials such as carbon black, mesophase carbon black, resin-fired carbon material, vapor phase-grown carbon fiber, and carbon fiber are used. Where, x is a number, and $0<x<1$. These anode active materials can be used alone or in combination.

In the dispersion composition for batteries, a content of the dispersant is preferably 0.1 to 200 mg, is more preferably 0.2 to 100 mg, and is even more preferably 0.5 to 50 mg with respect to a 1 $m^2$ the active material surface area.

The dispersion composition for batteries of the present invention is a carbon material dispersion liquid containing the above-described composition for batteries, a carbon material, and a solvent, or a carbon material dispersion varnish containing a binder, and can be used in fields such as printing inks, paints, plastics, toners, color filter resist inks, and batteries in which uniform and favorable coating properties are required. In particular, because the dispersion composition can provide a coating film suitable for an electrode layer having a uniform and favorable coating properties and a low surface resistance, the dispersion composition can be suitably used for forming an electrode for batteries. The dispersion composition can be used for a base layer provided between a current collector and a mixture layer.

The dispersion composition for batteries is preferably used as a dispersion composition for batteries (hereinafter referred to as a "mixture paste") in which an active material is contained in a dispersion composition for batteries containing the above-described dispersant or dispersant composition, a carbon material, a solvent, and a binder.

This mixture paste can be produced by mixing the above-described dispersant, a carbon material, a solvent, a binder, and an active material. The order of addition of each component is not limited. Examples thereof include a method of mixing all components at once; a method in which the remaining components are added to and mixed with a carbon material dispersion liquid produced in advance by the above-described method; a method in which an active material is added to and mixed with a carbon material dispersion varnish produced in advance by the above-described method; and the like. Furthermore, the above-described solvent may be further added as needed.

As a device for manufacturing the mixture paste, the same device as used in manufacturing the dispersion composition described above can be used.

[Electrode and Battery]

The electrode according to the present invention includes a mixture layer formed from the above-described dispersion composition for batteries on a current collector.

In addition, the battery according to the present invention includes the electrode and a non-aqueous electrolyte solution.

The dispersion composition for batteries of the present invention can be suitably used particularly for a lithium ion secondary battery. Hereinafter, a lithium ion secondary battery will be described as an example. However, a battery formed of the dispersion composition for batteries is not limited to a lithium ion secondary battery.

A lithium ion secondary battery includes a cathode having a cathode mixture layer on a current collector, an anode having an anode mixture layer on the current collector, and a non-aqueous electrolyte solution formed of an electrolyte containing lithium.

Regarding the electrode, materials and shapes of the current collector to be used are not particularly limited. As materials thereof, metals such as aluminum, copper, nickel, titanium, and stainless steel, and alloys thereof are used, but in particular, it is preferable to use aluminum as a cathode material, and copper as an anode material. In addition, as shapes, foil on a flat plate is generally used, but a roughened surface, a perforated foil shape, and a mesh shape can also be used. Furthermore, the current collector may have a conductive underlayer for the purpose of improving contact resistance and adhesiveness between the current collector and the mixture layer.

The mixture layer can be formed by applying the above-described mixture paste directly on the current collector and drying. A thickness of the mixture layer is generally 1 μm to 1 mm, and is preferably 100 μm to 500 μm. A coating method therefor is not particularly limited, and a well-known method can be used. Specific examples thereof include a die coating method, a dip coating method, a roll coating method, a doctor coating method, a spray coating method, a gravure coating method, a screen printing method, an electrostatic coating method, and the like. In addition, rolling treatment by a lithographic press, a calender roll, and the like after application may be performed.

In the battery of the present invention, a content of the dispersant is preferably 10 μg to 60 mg, is more preferably 50 μg to 20 mg, and is even more preferably 70 μg to 15 mg with respect to 1 ml of the non-aqueous electrolyte solution.

As the electrolyte solution that constitutes the lithium ion secondary battery, an electrolyte solution in which an electrolyte containing lithium is dissolved in a non-aqueous solvent is used. Examples of electrolytes include $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, $LiI$, $LiBr$, $LiCl$, $LiAlCl$, $LiHF_2$, $LiSCN$, $LiBPh_4$ (where Ph is a phenyl group), and the like, but examples are not limited thereto.

A non-aqueous solvent is not particularly limited, but examples thereof include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; nitriles such as acetonitrile; n-methyl-2-pyrrolidone; and the like. These solvents may be used alone or in combination of two or more kinds thereof. In particular, it is preferable to mix ethylene carbonate having a high dielectric constant and high electrolyte dissolving power with other solvents. Furthermore, as other solvents, linear carbonate solvents such as propylene carbonate, butylene carbonate, dimethyl carbonate, ethyl methyl carbonate, and diethyl carbonate are more preferable.

Furthermore, the above-described electrolyte solution can be held in a polymer matrix to form a gel polymer electrolyte. Examples of polymer matrix include an acrylate resin having a polyalkylene oxide segment, a polyphosphazene resin having a polyalkylene oxide segment, a polysiloxane having a polyalkylene oxide segment, and the like, but examples are not limited thereto.

A structure of the battery of the present invention is not particularly limited, but it is generally composed of a cathode and an anode, and a separator provided as necessary. As shapes, various shapes such as paper type, cylindrical type, square type, button type, laminated type, and winding type can be adopted according to the purpose of use.

[Other Embodiments]

In a case where the triazine derivative represented by General Formula (1) has an acidic functional group, it can be used as a dispersant by combining with the polymer dispersant even when it does not have an amine or an inorganic base. That is, as one embodiment of the dispersant composition, a dispersant composition containing the triazine derivative having an acidic functional group represented by General Formula (1), and a polymer dispersant may be adopted. In this case, in General Formula (1), $R^1$ is a group represented by $—X^1—Y^1$, in which $X^1$ represents an arylene group which may have a substituent, and $Y^1$ represents a sulfo group or a carboxyl group.

In each configuration of the present invention, the dispersant composition of the present embodiment can be used instead of the dispersant composition of the present invention.

EXAMPLES

Hereinafter, the present invention will be described in detail based on examples. However, the present invention is not limited to the following examples as long as the gist thereof is not exceeded. In addition, in order to clarify differences between respective compositions, a dispersion composition composed of a dispersant, a carbon material, and a solvent is referred to as a "carbon material dispersion liquid," a dispersion composition composed of a dispersant, a carbon material, a solvent, and a binder is referred to as "carbon material dispersion varnish," and a dispersion composition for batteries composed of a dispersant, a carbon material, a solvent, a binder, and an active material is referred to as a "mixture paste." Furthermore, unless otherwise specified, N-methyl-2-pyrrolidone used as a solvent is abbreviated as "NMP," and % by mass is abbreviated as "%."

Hereinafter, examples will be explained in three separate example groups. Each example group is independent, and the same abbreviation may be given to different dispersants among the example groups.

Because materials other than dispersants are common to the three example groups, they will be described below, and their descriptions will be omitted in each example group.

<Carbon Material>

DENKA BLACK HS100 (manufactured by Denka Company Limited): Acetylene black, in which an average primary particle diameter obtained by observation with an electron microscope is 48 nm, and a specific surface area obtained by an S-BET formula from a nitrogen adsorption amount is 39 $m^2/g$ (hereinafter abbreviated as "HS100").

super-P (manufactured by TIMCAL): Furnace black, in which an average primary particle diameter obtained by observation with an electron microscope is 40 nm, and a specific surface area obtained by an S-BET formula from a nitrogen adsorption amount is 62 $m^2/g$.

MONARCH 800 (manufactured by Cabot Corporation): Furnace Black, in which an average primary particle diameter obtained by observation with an electron microscope is 17 nm, and a specific surface area obtained by an S-BET formula from a nitrogen adsorption amount is 210 $m^2/g$ (hereinafter abbreviated as "M800").

EC-300J (manufactured by LION SPECIALTY CHEMICALS CO., LTD.): KETJENBLACK, in which an average primary particle diameter obtained by observation with an electron microscope is 40 nm, and a specific surface area obtained by an S-BET formula from a nitrogen adsorption amount is 800 $m^2/g$.

Carbon nanotubes: Multi-layered carbon nanotubes, in which a fiber diameter is 10 nm and a fiber length is 2 to 5 µm, which are obtained by observation with an electron microscope, and a specific surface area obtained by an S-BET formula from a nitrogen adsorption amount is 600 $m^2/g$ (hereinafter abbreviated as CNT).

VGCF (manufactured by Showa Denko K. K.): Carbon nanofibers, in which a fiber diameter is 150 nm and a fiber length is 10 to 20 µm, which are obtained by observation with an electron microscope.

<Binder>

KF Polymer W1100 (manufactured by Kureha Corporation): Polyvinylidene fluoride (PVDF), hereinafter abbreviated as PVDF.

Polytetrafluoroethylene emulsion: (manufactured by Du Pont-Mitsui Fluorochemicals Co., Ltd.), hereinafter abbreviated as PTFE.

Carboxymethylcellulose (manufactured by Nippon Paper Industries Co., Ltd.): hereinafter abbreviated as CMC.

<Cathode Active Material>

$LiNi_{1/3}Mn_{1/3}Co_{1/3}O_2$ (manufactured by TODA KOGYO CORP.): Cathode active material, lithium nickel manganese cobalt oxide, in which an average primary particle diameter obtained by observation with an electron microscope is 5.0 µm, and a specific surface area obtained by an S-BET formula from a nitrogen adsorption amount is 0.62 $m^2/g$ (hereinafter abbreviated as NMC).

HLC-22 (manufactured by Honjo Chemical Corporation): Cathode active material, lithium cobalt oxide ($LiCoO_2$), in which an average primary particle diameter obtained by observation with an electron microscope is 6.6 µm, and a specific surface area obtained by an S-BET formula from a nitrogen adsorption amount is 0.62 $m^2/g$ (hereinafter abbreviated as LCO).

$LiNi_{0.8}Co_{0.15}Al_{0.05}O_2$ (manufactured by Sumitomo Metal Mining Co., Ltd.): Cathode active material, lithium nickel cobalt aluminate, in which an average primary particle diameter obtained by observation with an electron microscope is 5.8 µm, and a specific surface area obtained by an S-BET formula from a nitrogen adsorption amount is 0.38 $m^2/g$ (hereinafter abbreviated as NCA).

$LiFePO_4$ (manufactured by Clariant): Cathode active material, lithium iron phosphate, in which an average primary particle diameter obtained by observation with an electron microscope is 0.4 µm, and a specific surface area obtained by an S-BET formula from a nitrogen adsorption amount is 15.3 $m^2/g$ (hereinafter abbreviated as LFP).

<Anode Active Material>

Spheroidal graphite (manufactured by Nippon Graphite Industries, Co., Ltd.): Anode active material, in which a primary particle diameter obtained by observation with an electron microscope is 15 µm, and a specific surface area obtained by an S-BET formula from a nitrogen adsorption amount is 1.0 $m^2/g$ (hereinafter abbreviated as spheroidal graphite).

<Polymer Dispersant>

PVA-103 (manufactured by Kuraray Co., Ltd.): Polyvinyl alcohol, in which a degree of saponification is 98.0 to 99.0 mol %, and an average degree of polymerization is 300.

PVA-403 (manufactured by Kuraray Co., Ltd.): Polyvinyl alcohol, in which a degree of saponification is 78.5 to 81.5 mol %, and an average degree of polymerization is 300.

KL-506 (manufactured by Kuraray Co., Ltd.): Anion-modified polyvinyl alcohol, in which a degree of saponification is 74.0 to 80.0 mol %, and a degree of polymerization is 600.

GOHSENX L-3266 (manufactured by Nippon Synthetic Chemical Industry Co., Ltd.): Sulfonic-acid-modified polyvinyl alcohol, in which a degree of saponification is 86.5 to 89.0 mol % (hereinafter abbreviated as L-3266).

GOHSENX K-434 (manufactured by Nippon Synthetic Chemical Industry Co., Ltd.): Cation-modified polyvinyl alcohol, in which a degree of saponification is 85.5 to 88.0 mol % (hereinafter abbreviated as K-434).

Polyvinyl butyral A: Polyvinyl butyral, in which a degree of butyralization is 15 mol %, a content of hydroxyl groups is 84 mol %, a content of acetic acid groups is 1 mol %, and a degree of polymerization is 300 (hereinafter abbreviated as PVB-A).

METOLOSE SM-15 (manufactured by Shin-Etsu Chemical Co., Ltd.): Methyl cellulose, in which a degree of substitution is 1.8, and a viscosity of a 2% aqueous solution at 20° C. is about 15 mPa·s (hereinafter abbreviated as SM-15).

ETHOCEL 10 (manufactured by Dow Chemical Company): Ethyl cellulose, in which a viscosity of a 5% toluene/ethanol (8/2) solution at 25° C. is 9.0 to 11.0 mPa·s.

(Synthesis Example) Synthesis of PVB-A

A 10% aqueous solution of PVA-103 was prepared, and 0.2 parts by mass of hydrochloric acid and 2 parts by mass of butylaldehyde were added dropwise to 100 parts by mass of the aqueous solution while stirring. Subsequently, a temperature was raised to 80° C., held for 1 hour, and then cooling was allowed. This mixture was dried and pulverized, and thereby PVB-A having a 15 mol % degree of acetalization was obtained.

First Example Group

In First Example Group, among the triazine derivatives represented by General Formula (1), a triazine derivative in which $R^1$ is a group represented by $-X^1-Y^1$, where $X^1$ is an arylene group which may have a substituent, and $Y^1$ is a sulfo group or a carboxyl group will be described.

<Dispersant>

Structures of the triazine derivatives A to T represented by General Formula (1) of the present invention are shown below. A method for manufacturing the triazine derivatives A to T represented by General Formula (1) used in the present invention is not particularly limited, and a well-known method can be applied. For example, a method described in JP2004-217842A can be applied. The disclosure by the above publication is partially incorporated in the present specification by reference.

A
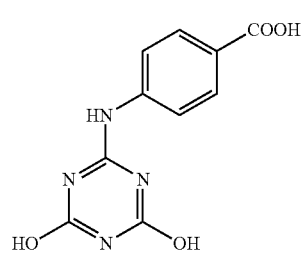

B
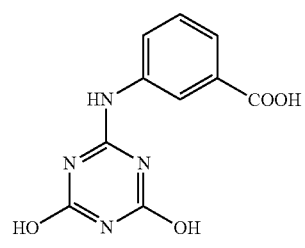

C
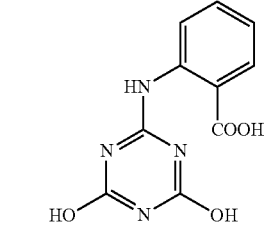

D
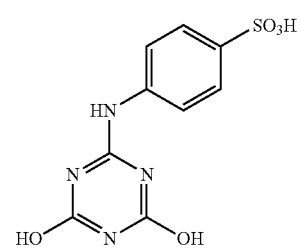

E
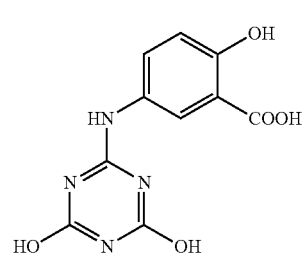

F
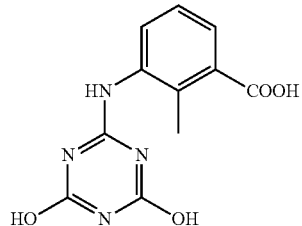

G
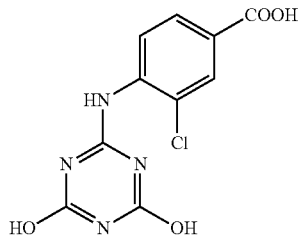

H
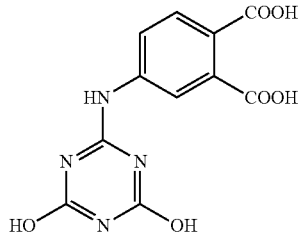

I
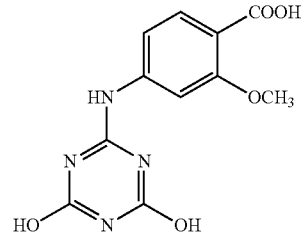

J
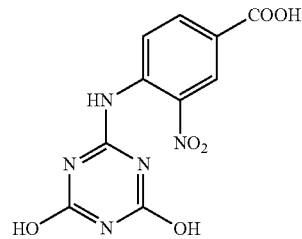

K
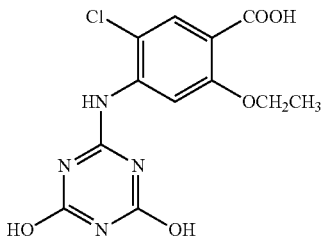

-continued

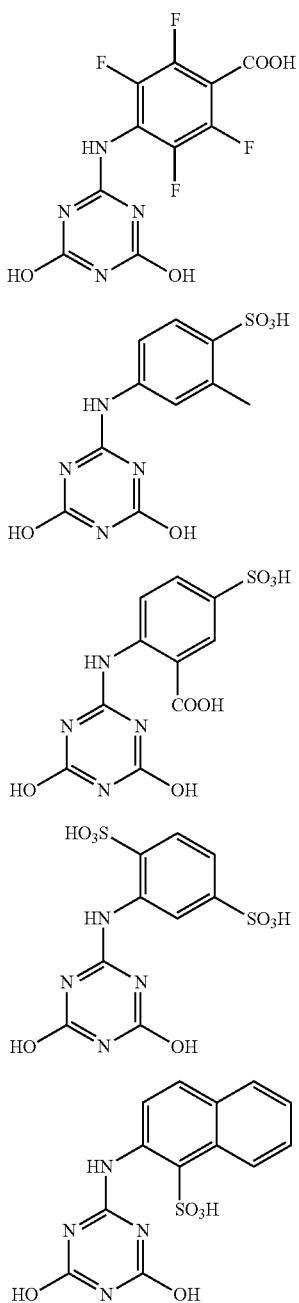

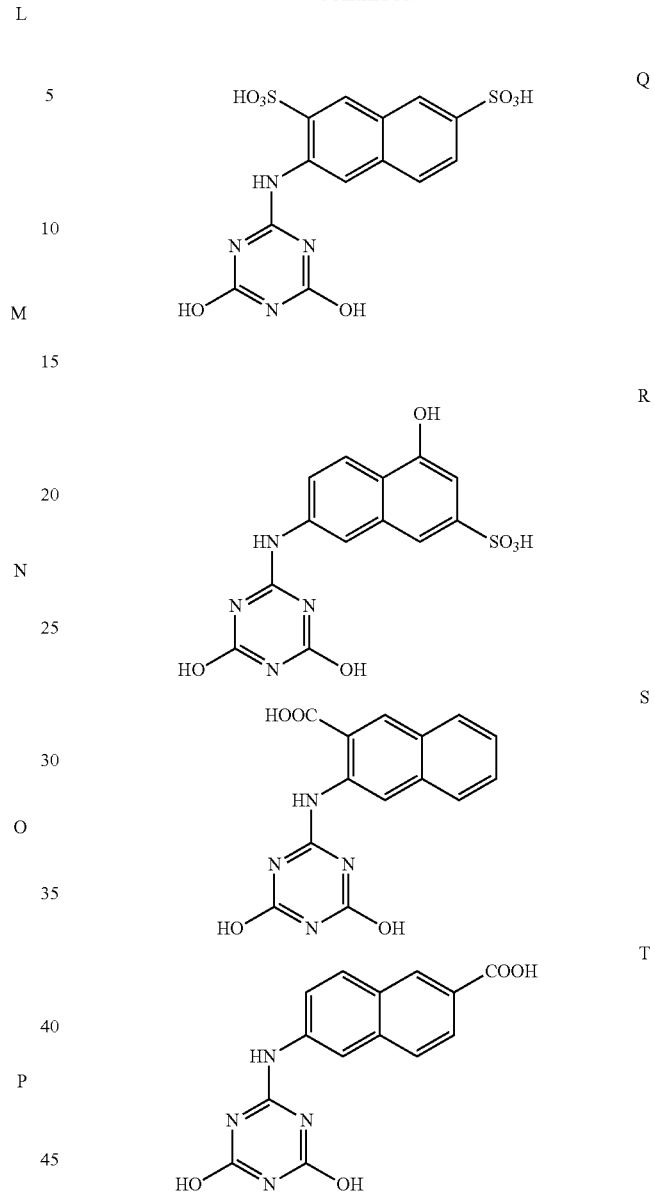

<Method for Manufacturing Dispersant Composed of Triazine Derivative and Amine>

Dispersants a to aj shown in Table 1 were manufactured by methods described in the following examples.

TABLE 1

|  | Dispersant | Triazine derivative | Amine | Molar equivalent of amine with respect to triazine derivative |
|---|---|---|---|---|
| Example A1-1 | a | Triazine derivative A | Octylamine | 1.0 |
| Example A1-2 | b | Triazine derivative B | Octylamine | 1.0 |
| Example A1-3 | c | Triazine derivative C | Octylamine | 1.0 |
| Example A1-4 | d | Triazine derivative D | Octylamine | 1.0 |
| Example A1-5 | e | Triazine derivative E | Octylamine | 1.0 |
| Example A1-6 | f | Triazine derivative F | Octylamine | 1.0 |
| Example A1-7 | g | Triazine derivative G | Octylamine | 1.0 |
| Example A1-8 | h | Triazine derivative H | Octylamine | 1.0 |
| Example A1-9 | i | Triazine derivative I | Octylamine | 1.0 |
| Example A1-10 | j | Triazine derivative J | Octylamine | 1.0 |

TABLE 1-continued

| | Dispersant | Triazine derivative | Amine | Molar equivalent of amine with respect to triazine derivative |
|---|---|---|---|---|
| Example A1-11 | k | Triazine derivative K | Octylamine | 1.0 |
| Example A1-12 | l | Triazine derivative L | Octylamine | 1.0 |
| Example A1-13 | m | Triazine derivative M | Octylamine | 1.0 |
| Example A1-14 | n | Triazine derivative N | Octylamine | 1.0 |
| Example A1-15 | o | Triazine derivative O | Octylamine | 1.0 |
| Example A1-16 | p | Triazine derivative P | Octylamine | 1.0 |
| Example A1-17 | q | Triazine derivative Q | Octylamine | 1.0 |
| Example A1-18 | r | Triazine derivative R | Octylamine | 1.0 |
| Example A1-19 | s | Triazine derivative S | Octylamine | 1.0 |
| Example A1-20 | t | Triazine derivative T | Octylamine | 1.0 |
| Example A1-21 | u | Triazine derivative B | Propylamine | 1.0 |
| Example A1-22 | v | Triazine derivative B | Stearylamine | 1.0 |
| Example A1-23 | w | Triazine derivative B | 2-Aminoethanol | 1.0 |
| Example A1-24 | x | Triazine derivative B | Dibutylamine | 1.0 |
| Example A1-25 | y | Triazine derivative B | Dioctylamine | 1.0 |
| Example A1-26 | z | Triazine derivative B | Distearylamine | 1.0 |
| Example A1-27 | aa | Triazine derivative B | Triethylamine | 1.0 |
| Example A1-28 | ab | Triazine derivative B | Dimethyloctylamine | 1.0 |
| Example A1-29 | ac | Triazine derivative B | Trioctylamine | 1.0 |
| Example A1-30 | ad | Triazine derivative B | Dimethylstearylamine | 1.0 |
| Example A1-31 | ae | Triazine derivative B | Triethanolamine | 1.0 |
| Example A1-32 | af | Triazine derivative B | Octylamine | 0.1 |
| Example A1-33 | ag | Triazine derivative B | Octylamine | 0.3 |
| Example A1-34 | ah | Triazine derivative B | Octylamine | 0.5 |
| Example A1-35 | ai | Triazine derivative B | Octylamine | 2.0 |
| Example A1-36 | aj | Triazine derivative B | Octylamine | 5.0 |

Example A1-1

(Manufacture of Dispersant a)

0.040 mol of the triazine derivative A was added to 200 g of water. 0.040 mol of octylamine was added thereto and stirred at 60° C. for 2 hours. After cooling to room temperature, filtration and purification were performed. The obtained residue was dried at 90° C. for 48 hours, and thereby a dispersant a was obtained.

Example A1-2 to Example A1-20

(Manufacture of Dispersant b to Dispersant t)

A dispersant b to a dispersant t were obtained by manufacture in the same manner as in Example A1-1, except that a triazine derivative B to a triazine derivative T shown in Example A1-2 to Example A1-20 in Table 1 were added instead of the triazine derivative A in the manufacture of the dispersant a.

Example A1-21 to Example A1-31

(Manufacture of Dispersant u to Dispersant ae)

A dispersant u to a dispersant ae were obtained by manufacture in the same manner as in Example A1-2 except that amines shown in Example A1-21 to Example A1-31 in Table 1 were added instead of octylamine in the manufacture of the dispersant b.

Example A1-32 to Example A1-36

(Manufacture of Dispersant af to Dispersant aj)

A dispersant af to a dispersant aj were obtained by manufacture in the same manner as in Example A1-2 except that an amount of octylamine added in the manufacture of the dispersant b was changed to addition amounts which are shown in Example A1-32 to Example A1-36 in Table 1.

Structures of triazine derivatives U to W used in comparative examples are shown below. A method for manufacturing the triazine derivatives U to W used in the comparative examples is not particularly limited, and a well-known method can be applied. For example, a method described in JP2004-217842A can be applied. The disclosure by the above publication is partially incorporated in the present specification by reference.

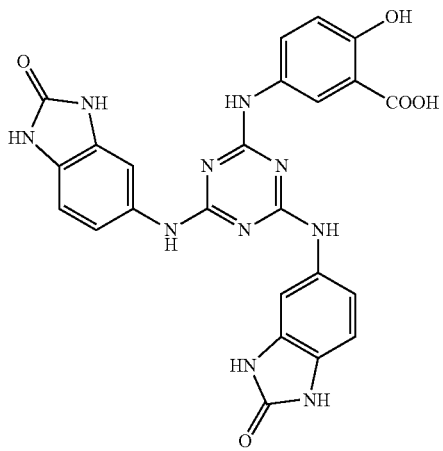

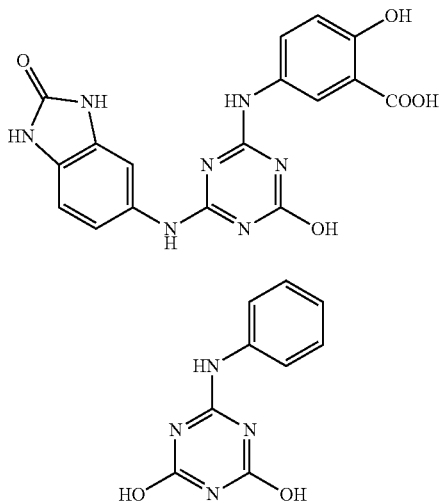

Dispersants ak to am shown in Table 2 were manufactured by methods described in the following comparative examples.

TABLE 2

| | Dispersant | Triazine derivative | Amine | Molar equivalent of amine with respect to triazine derivative |
|---|---|---|---|---|
| Comparative Example A1-1 | ak | Triazine derivative U | Octylamine | 1.0 |
| Comparative Example A1-2 | al | Triazine derivative V | Octylamine | 1.0 |
| Comparative Example A1-3 | am | Triazine derivative W | Octylamine | 1.0 |

Comparative Example A1-1 to Comparative Example A1-3

(Manufacture of Dispersant ak to Dispersant am)

A dispersant ak to a dispersant am were obtained by manufacture in the same manner as in Example A1-1, except that the triazine derivative U to the triazine derivative W shown in Comparative Example A1-1 to Comparative Example A1-3 in Table 2 were added instead of the triazine derivative A in the manufacture of the dispersant a.

Example A2-1

<Preparation of Carbon Material Dispersion Liquid>

According to the composition shown in Table 3, N-methyl-2-pyrrolidone and the dispersant a were added to a glass bottle and mixed. Thereafter, a carbon material was added thereto and dispersed with a paint conditioner for 2 hours using zirconia beads as media. Thereby, a carbon material dispersion liquid containing the dispersant a was obtained.

<Preparation of Carbon Material Dispersion Varnish>

According to the composition shown in Table 4, the prepared carbon material dispersion liquid containing the dispersant a was mixed with a binder and N-methyl-2-pyrrolidone with a disper. Thereby, a carbon material dispersion varnish was obtained.

<Preparation of Mixture Paste>

According to the composition shown in Table 5, the prepared carbon material dispersion varnish containing the dispersant a was mixed with an active material and N-methyl-2-pyrrolidone with a disper. Thereby, a cathode mixture paste was obtained.

<Production of Electrode>

The prepared cathode mixture paste containing the dispersant a was applied onto an aluminum foil having a thickness of 20 μm using a doctor blade, and then dried at 120° C. for 30 minutes under reduced pressure. Thereafter, the aluminum foil was rolled with a roller pressing machine. Thereby, an electrode having an application amount of 17 mg/cm$^2$ and a density of 3.0 g/cm$^3$ was produced. An electrode having a uniform thickness and density was obtained.

<Assembly of Cell for Evaluation Cathode of Lithium Ion Secondary Battery>

The produced electrode containing the dispersant a was punched out to a diameter of 16 mm to be used as a cathode, and a metallic lithium foil (a thickness of 0.15 mm) was used as an anode. A separator made of a porous polypropylene film (a thickness of 20 μm, and a porosity of 50%) was inserted and laminated between the cathode and the anode, and was filled with 0.1 ml of an electrolyte solution (a non-aqueous electrolyte solution in which LiPF$_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

[Examples A2-2 to A2-36] Comparison 1 of Dispersant Types

A cell for cathode evaluation was assembled by dispersion in the same manner as in Example A2-1 except that the dispersants b to aj shown in Table 3 were used instead of the dispersant a.

(Composition of Carbon Material Dispersion Liquid)

TABLE 3

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Example A2-1 | a | 0.2 | HS100 | 10.0 | NMP | 89.8 |
| Example A2-2 | b | 0.2 | HS100 | 10.0 | NMP | 89.8 |
| Example A2-3 | c | 0.2 | HS100 | 10.0 | NMP | 89.8 |
| Example A2-4 | d | 0.2 | HS100 | 10.0 | NMP | 89.8 |
| Example A2-5 | e | 0.2 | HS100 | 10.0 | NMP | 89.8 |
| Example A2-6 | f | 0.2 | HS100 | 10.0 | NMP | 89.8 |
| Example A2-7 | g | 0.2 | HS100 | 10.0 | NMP | 89.8 |
| Example A2-8 | h | 0.2 | HS100 | 10.0 | NMP | 89.8 |
| Example A2-9 | i | 0.2 | HS100 | 10.0 | NMP | 89.8 |
| Example A2-10 | j | 0.2 | HS100 | 10.0 | NMP | 89.8 |
| Example A2-11 | k | 0.2 | HS100 | 10.0 | NMP | 89.8 |
| Example A2-12 | l | 0.2 | HS100 | 10.0 | NMP | 89.8 |
| Example A2-13 | m | 0.2 | HS100 | 10.0 | NMP | 89.8 |
| Example A2-14 | n | 0.2 | HS100 | 10.0 | NMP | 89.8 |
| Example A2-15 | o | 0.2 | HS100 | 10.0 | NMP | 89.8 |
| Example A2-16 | p | 0.2 | HS100 | 10.0 | NMP | 89.8 |
| Example A2-17 | q | 0.2 | HS100 | 10.0 | NMP | 89.8 |
| Example A2-18 | r | 0.2 | HS100 | 10.0 | NMP | 89.8 |
| Example A2-19 | s | 0.2 | HS100 | 10.0 | NMP | 89.8 |

TABLE 3-continued

Composition of carbon material dispersion liquid

| | Dispersant Type | Content (%) | Carbon material Type | Content (%) | Solvent Type | Content (%) |
|---|---|---|---|---|---|---|
| Example A2-20 | t | 0.2 | HS100 | 10.0 | NMP | 89.8 |
| Example A2-21 | u | 0.2 | HS100 | 10.0 | NMP | 89.8 |
| Example A2-22 | v | 0.2 | HS100 | 10.0 | NMP | 89.8 |
| Example A2-23 | w | 0.2 | HS100 | 10.0 | NMP | 89.8 |
| Example A2-24 | x | 0.2 | HS100 | 10.0 | NMP | 89.8 |
| Example A2-25 | y | 0.2 | HS100 | 10.0 | NMP | 89.8 |
| Example A2-26 | z | 0.2 | HS100 | 10.0 | NMP | 89.8 |
| Example A2-27 | aa | 0.2 | HS100 | 10.0 | NMP | 89.8 |
| Example A2-28 | ab | 0.2 | HS100 | 10.0 | NMP | 89.8 |
| Example A2-29 | ac | 0.2 | HS100 | 10.0 | NMP | 89.8 |
| Example A2-30 | ad | 0.2 | HS100 | 10.0 | NMP | 89.8 |
| Example A2-31 | ae | 0.2 | HS100 | 10.0 | NMP | 89.8 |
| Example A2-32 | af | 0.2 | HS100 | 10.0 | NMP | 89.8 |
| Example A2-33 | ag | 0.2 | HS100 | 10.0 | NMP | 89.8 |
| Example A2-34 | ah | 0.2 | HS100 | 10.0 | NMP | 89.8 |
| Example A2-35 | ai | 0.2 | HS100 | 10.0 | NMP | 89.8 |
| Example A2-36 | aj | 0.2 | HS100 | 10.0 | NMP | 89.8 |

TABLE 4

Composition of carbon material dispersion varnish

| | Dispersant Type | Content (%) | Carbon material Type | Content (%) | Binder Type | Content (%) | Solvent Type | Content (%) |
|---|---|---|---|---|---|---|---|---|
| Example A2-1 | a | 0.12 | HS100 | 6.0 | PVDF | 6.0 | NMP | 87.9 |
| Example A2-2 | b | 0.12 | HS100 | 6.0 | PVDF | 6.0 | NMP | 87.9 |
| Example A2-3 | c | 0.12 | HS100 | 6.0 | PVDF | 6.0 | NMP | 87.9 |
| Example A2-4 | d | 0.12 | HS100 | 6.0 | PVDF | 6.0 | NMP | 87.9 |
| Example A2-5 | e | 0.12 | HS100 | 6.0 | PVDF | 6.0 | NMP | 87.9 |
| Example A2-6 | f | 0.12 | HS100 | 6.0 | PVDF | 6.0 | NMP | 87.9 |
| Example A2-7 | g | 0.12 | HS100 | 6.0 | PVDF | 6.0 | NMP | 87.9 |
| Example A2-8 | h | 0.12 | HS100 | 6.0 | PVDF | 6.0 | NMP | 87.9 |
| Example A2-9 | i | 0.12 | HS100 | 6.0 | PVDF | 6.0 | NMP | 87.9 |
| Example A2-10 | j | 0.12 | HS100 | 6.0 | PVDF | 6.0 | NMP | 87.9 |
| Example A2-11 | k | 0.12 | HS100 | 6.0 | PVDF | 6.0 | NMP | 87.9 |
| Example A2-12 | l | 0.12 | HS100 | 6.0 | PVDF | 6.0 | NMP | 87.9 |
| Example A2-13 | m | 0.12 | HS100 | 6.0 | PVDF | 6.0 | NMP | 87.9 |
| Example A2-14 | n | 0.12 | HS100 | 6.0 | PVDF | 6.0 | NMP | 87.9 |
| Example A2-15 | o | 0.12 | HS100 | 6.0 | PVDF | 6.0 | NMP | 87.9 |
| Example A2-16 | p | 0.12 | HS100 | 6.0 | PVDF | 6.0 | NMP | 87.9 |
| Example A2-17 | q | 0.12 | HS100 | 6.0 | PVDF | 6.0 | NMP | 87.9 |
| Example A2-18 | r | 0.12 | HS100 | 6.0 | PVDF | 6.0 | NMP | 87.9 |
| Example A2-19 | s | 0.12 | HS100 | 6.0 | PVDF | 6.0 | NMP | 87.9 |
| Example A2-20 | t | 0.12 | HS100 | 6.0 | PVDF | 6.0 | NMP | 87.9 |
| Example A2-21 | u | 0.12 | HS100 | 6.0 | PVDF | 6.0 | NMP | 87.9 |
| Example A2-22 | v | 0.12 | HS100 | 6.0 | PVDF | 6.0 | NMP | 87.9 |
| Example A2-23 | w | 0.12 | HS100 | 6.0 | PVDF | 6.0 | NMP | 87.9 |
| Example A2-24 | x | 0.12 | HS100 | 6.0 | PVDF | 6.0 | NMP | 87.9 |
| Example A2-25 | y | 0.12 | HS100 | 6.0 | PVDF | 6.0 | NMP | 87.9 |
| Example A2-26 | z | 0.12 | HS100 | 6.0 | PVDF | 6.0 | NMP | 87.9 |
| Example A2-27 | aa | 0.12 | HS100 | 6.0 | PVDF | 6.0 | NMP | 87.9 |
| Example A2-28 | ab | 0.12 | HS100 | 6.0 | PVDF | 6.0 | NMP | 87.9 |
| Example A2-29 | ac | 0.12 | HS100 | 6.0 | PVDF | 6.0 | NMP | 87.9 |
| Example A2-30 | ad | 0.12 | HS100 | 6.0 | PVDF | 6.0 | NMP | 87.9 |
| Example A2-31 | ae | 0.12 | HS100 | 6.0 | PVDF | 6.0 | NMP | 87.9 |
| Example A2-32 | af | 0.12 | HS100 | 6.0 | PVDF | 6.0 | NMP | 87.9 |
| Example A2-33 | ag | 0.12 | HS100 | 6.0 | PVDF | 6.0 | NMP | 87.9 |
| Example A2-34 | ah | 0.12 | HS100 | 6.0 | PVDF | 6.0 | NMP | 87.9 |
| Example A2-35 | ai | 0.12 | HS100 | 6.0 | PVDF | 6.0 | NMP | 87.9 |
| Example A2-36 | aj | 0.12 | HS100 | 6.0 | PVDF | 6.0 | NMP | 87.9 |

(Composition of Cathode Mixture Paste)

TABLE 5

Composition of cathode mixture paste

| | Dispersant Type | Content (%) | Carbon material Type | Content (%) | Binder Type | Content (%) | Active material Type | Content (%) | Solvent Type | Content (%) |
|---|---|---|---|---|---|---|---|---|---|---|
| Example A2-1 | a | 0.04 | HS100 | 2.0 | PVDF | 2.0 | NMC | 54.0 | NMP | 42.0 |
| Example A2-2 | b | 0.04 | HS100 | 2.0 | PVDF | 2.0 | NMC | 54.0 | NMP | 42.0 |
| Example A2-3 | c | 0.04 | HS100 | 2.0 | PVDF | 2.0 | NMC | 54.0 | NMP | 42.0 |
| Example A2-4 | d | 0.04 | HS100 | 2.0 | PVDF | 2.0 | NMC | 54.0 | NMP | 42.0 |
| Example A2-5 | e | 0.04 | HS100 | 2.0 | PVDF | 2.0 | NMC | 54.0 | NMP | 42.0 |
| Example A2-6 | f | 0.04 | HS100 | 2.0 | PVDF | 2.0 | NMC | 54.0 | NMP | 42.0 |
| Example A2-7 | g | 0.04 | HS100 | 2.0 | PVDF | 2.0 | NMC | 54.0 | NMP | 42.0 |
| Example A2-8 | h | 0.04 | HS100 | 2.0 | PVDF | 2.0 | NMC | 54.0 | NMP | 42.0 |
| Example A2-9 | i | 0.04 | HS100 | 2.0 | PVDF | 2.0 | NMC | 54.0 | NMP | 42.0 |
| Example A2-10 | j | 0.04 | HS100 | 2.0 | PVDF | 2.0 | NMC | 54.0 | NMP | 42.0 |
| Example A2-11 | k | 0.04 | HS100 | 2.0 | PVDF | 2.0 | NMC | 54.0 | NMP | 42.0 |
| Example A2-12 | l | 0.04 | HS100 | 2.0 | PVDF | 2.0 | NMC | 54.0 | NMP | 42.0 |
| Example A2-13 | m | 0.04 | HS100 | 2.0 | PVDF | 2.0 | NMC | 54.0 | NMP | 42.0 |
| Example A2-14 | n | 0.04 | HS100 | 2.0 | PVDF | 2.0 | NMC | 54.0 | NMP | 42.0 |
| Example A2-15 | o | 0.04 | HS100 | 2.0 | PVDF | 2.0 | NMC | 54.0 | NMP | 42.0 |
| Example A2-16 | p | 0.04 | HS100 | 2.0 | PVDF | 2.0 | NMC | 54.0 | NMP | 42.0 |
| Example A2-17 | q | 0.04 | HS100 | 2.0 | PVDF | 2.0 | NMC | 54.0 | NMP | 42.0 |
| Example A2-18 | r | 0.04 | HS100 | 2.0 | PVDF | 2.0 | NMC | 54.0 | NMP | 42.0 |
| Example A2-19 | s | 0.04 | HS100 | 2.0 | PVDF | 2.0 | NMC | 54.0 | NMP | 42.0 |
| Example A2-20 | t | 0.04 | HS100 | 2.0 | PVDF | 2.0 | NMC | 54.0 | NMP | 42.0 |
| Example A2-21 | u | 0.04 | HS100 | 2.0 | PVDF | 2.0 | NMC | 54.0 | NMP | 42.0 |
| Example A2-22 | v | 0.04 | HS100 | 2.0 | PVDF | 2.0 | NMC | 54.0 | NMP | 42.0 |
| Example A2-23 | w | 0.04 | HS100 | 2.0 | PVDF | 2.0 | NMC | 54.0 | NMP | 42.0 |
| Example A2-24 | x | 0.04 | HS100 | 2.0 | PVDF | 2.0 | NMC | 54.0 | NMP | 42.0 |
| Example A2-25 | y | 0.04 | HS100 | 2.0 | PVDF | 2.0 | NMC | 54.0 | NMP | 42.0 |

TABLE 5-continued

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Example A2-26 | z | 0.04 | HS100 | 2.0 | PVDF | 2.0 | NMC | 54.0 | NMP | 42.0 |
| Example A2-27 | aa | 0.04 | HS100 | 2.0 | PVDF | 2.0 | NMC | 54.0 | NMP | 42.0 |
| Example A2-28 | ab | 0.04 | HS100 | 2.0 | PVDF | 2.0 | NMC | 54.0 | NMP | 42.0 |
| Example A2-29 | ac | 0.04 | HS100 | 2.0 | PVDF | 2.0 | NMC | 54.0 | NMP | 42.0 |
| Example A2-30 | ad | 0.04 | HS100 | 2.0 | PVDF | 2.0 | NMC | 54.0 | NMP | 42.0 |
| Example A2-31 | ae | 0.04 | HS100 | 2.0 | PVDF | 2.0 | NMC | 54.0 | NMP | 42.0 |
| Example A2-32 | af | 0.04 | HS100 | 2.0 | PVDF | 2.0 | NMC | 54.0 | NMP | 42.0 |
| Example A2-33 | ag | 0.04 | HS100 | 2.0 | PVDF | 2.0 | NMC | 54.0 | NMP | 42.0 |
| Example A2-34 | ah | 0.04 | HS100 | 2.0 | PVDF | 2.0 | NMC | 54.0 | NMP | 42.0 |
| Example A2-35 | ai | 0.04 | HS100 | 2.0 | PVDF | 2.0 | NMC | 54.0 | NMP | 42.0 |
| Example A2-36 | aj | 0.04 | HS100 | 2.0 | PVDF | 2.0 | NMC | 54.0 | NMP | 42.0 |

[Comparative Examples A2-1 to A2-4] Comparison 2 of Dispersant Types

According to materials and compositions of the carbon material dispersion liquids shown in Table 6, the carbon material dispersion varnishes shown in Table 7, and the cathode mixture pastes shown in Table 8, dispersion was performed in the same manner as in Example A2-1, and thereby a cell for cathode evaluation was assembled. In Comparative Example A2-4, a dispersant was not used.

(Composition of Carbon Material Dispersion Liquids)

TABLE 6

| | Dispersant | | Carbon material | | Solvent | |
|---|---|---|---|---|---|---|
| | Type | Content (%) | Type | Content (%) | Type | Content (%) |
| Comparative Example A2-1 | ak | 0.2 | HS100 | 10.0 | NMP | 89.8 |
| Comparative Example A2-2 | al | 0.2 | HS100 | 10.0 | NMP | 89.8 |
| Comparative Example A2-3 | am | 0.2 | HS100 | 10.0 | NMP | 89.8 |
| Comparative Example A2-4 | Not used | 0 | HS100 | 10.0 | NMP | 90.0 |

(Composition of Carbon Material Dispersion Varnishes)

TABLE 7

| | Dispersant | | Carbon material | | Binder | | Solvent | |
|---|---|---|---|---|---|---|---|---|
| | Type | Content (%) | Type | Content (%) | Type | Content (%) | Type | Content (%) |
| Comparative Example A2-1 | ak | 0.12 | HS100 | 6.0 | PVDF | 6.0 | NMP | 87.9 |
| Comparative Example A2-2 | al | 0.12 | HS100 | 6.0 | PVDF | 6.0 | NMP | 87.9 |
| Comparative Example A2-3 | am | 0.12 | HS100 | 6.0 | PVDF | 6.0 | NMP | 87.9 |
| Comparative Example A2-4 | Not used | 0 | HS100 | 6.0 | PVDF | 6.0 | NMP | 88.0 |

(Composition of Cathode Mixture Pastes)

TABLE 8

| | Dispersant | | Carbon material | | Binder | | active material | | Solvent | |
|---|---|---|---|---|---|---|---|---|---|---|
| | Type | Content (%) | Type | Content (%) | Type | Content (%) | Type | Content (%) | Type | Content (%) |
| Comparative Example A2-1 | ak | 0.04 | HS100 | 2.0 | PVDF | 2.0 | NMC | 54.0 | NMP | 42.0 |
| Comparative Example A2-2 | al | 0.04 | HS100 | 2.0 | PVDF | 2.0 | NMC | 54.0 | NMP | 44.0 |
| Comparative Example A2-3 | am | 0.04 | HS100 | 2.0 | PVDF | 2.0 | NMC | 54.0 | NMP | 44.0 |
| Comparative Example A2-4 | Not used | 0 | HS100 | 2.0 | PVDF | 2.0 | NMC | 54.0 | NMP | 42.0 |

<Evaluation of Ionic Resistance>

The cell for cathode evaluation assembled in Examples A2-1 to A2-36 and Comparative Examples A2-1 to A2-4 was allowed to stand in a constant-temperature tank at −20° C. for 12 hours. An AC impedance was measured at an open circuit potential with a frequency of 0.1 Hz and an amplitude of 10 mV to obtain an ionic resistance $|Z|_{ion}$. Subsequently, the cell for cathode evaluation was moved into room temperature (25° C.) and allowed to stand for 3 hours, and the impedance was measured in the same manner to obtain the ionic resistance $|Z|_{ion}$. An impedance analyzer was used for the measurement.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (an upper limit voltage of 4.2V) at room temperature, and discharging was performed with a constant current of 0.1C to a discharge lower limit voltage of 3.0V. 0.1C discharge capacity at the fifth cycle was recorded. Next, the cell for cathode evaluation in a state of being discharged to 3.0V was connected to an impedance analyzer, and AC impedance measurement was performed at 3.0V, an amplitude of 10 mV, and a frequency from 0.1 Hz to 1 MHz. When the results were plotted on the complex plane by a Cole-Cole plot method, a semicircular curve was obtained. A size of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature in the same manner, discharging was performed with a constant current of 0.5C to a discharge lower limit voltage of 3.0V, full charging was performed again with 0.1C, and then discharging was performed with a constant current of 5C to 3.0V. A ratio of 5C discharge capacity to 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and then discharged with a constant current of 0.5C. A ratio of 0.5C discharge capacity at −20° C. to 0.5C discharge capacity at room temperature was defined as a low-temperature discharge characteristic (%). As the room temperature rate characteristic and low-temperature discharge characteristic become closer to 100%, the characteristics become more favorable.

<Evaluation Results>

The carbon material dispersion liquids, carbon material dispersion varnishes, and cathode mixture pastes shown in Examples A2-1 to A2-36 and Comparative Examples A2-1, A2-2 were in a favorably dispersed state, and sedimentation or thickening did not occur even after the elapse of one month. The carbon material dispersion liquid, carbon material dispersion varnish, and cathode mixture paste of Comparative Example A2-3 had a high viscosity from the initial stage, and their dispersibility was considerably reduced. Regarding the carbon material dispersion liquid, carbon material dispersion varnish, and cathode mixture paste of Comparative Example A2-4 in which a dispersant was not used, a viscosity was considerably high and fluidity was inferior from the initial stage, but they were used as themselves for comparison. In addition, after the elapse of one month, the dispersed material had gelled.

Table 9 shows evaluation results of ionic resistance, reaction resistance, room temperature rate characteristic, and low-temperature discharge characteristic of Examples A2-1 to A2-36 and Comparative Examples A2-1 to A2-4.

TABLE 9

| | Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example A2-1 | a | 10 | 428 | 5.5 | 68.0 | 74.2 |
| Example A2-2 | b | 10 | 420 | 5.0 | 68.8 | 75.2 |
| Example A2-3 | c | 10 | 425 | 5.4 | 68.2 | 74.0 |
| Example A2-4 | d | 14 | 487 | 8.1 | 62.4 | 63.2 |
| Example A2-5 | e | 14 | 488 | 8.0 | 62.5 | 63.0 |
| Example A2-6 | f | 12 | 477 | 6.9 | 64.4 | 70.0 |
| Example A2-7 | g | 12 | 470 | 7.0 | 64.7 | 71.2 |
| Example A2-8 | h | 11 | 447 | 6.7 | 66.0 | 72.0 |
| Example A2-9 | i | 12 | 473 | 7.2 | 64.3 | 70.9 |
| Example A2-10 | j | 11 | 451 | 6.6 | 65.7 | 72.4 |
| Example A2-11 | k | 12 | 468 | 7.1 | 64.1 | 70.1 |
| Example A2-12 | l | 12 | 479 | 7.3 | 64.2 | 70.4 |
| Example A2-13 | m | 12 | 473 | 7.1 | 64.1 | 70.3 |
| Example A2-14 | n | 11 | 440 | 6.4 | 65.3 | 72.0 |
| Example A2-15 | o | 10 | 430 | 5.9 | 66.8 | 74.5 |
| Example A2-16 | p | 14 | 490 | 7.7 | 63.1 | 63.0 |
| Example A2-17 | q | 12 | 477 | 7.2 | 64.0 | 69.8 |
| Example A2-18 | r | 12 | 475 | 7.4 | 64.5 | 70.0 |
| Example A2-19 | s | 14 | 486 | 7.9 | 63.7 | 62.1 |
| Example A2-20 | t | 14 | 492 | 7.8 | 63.5 | 62.5 |
| Example A2-21 | u | 11 | 450 | 6.3 | 65.9 | 71.8 |
| Example A2-22 | v | 10 | 431 | 5.7 | 66.7 | 74.2 |
| Example A2-23 | w | 12 | 472 | 7.6 | 64.8 | 68.8 |
| Example A2-24 | x | 12 | 474 | 7.5 | 64.1 | 70.0 |
| Example A2-25 | y | 13 | 480 | 7.7 | 63.7 | 64.0 |
| Example A2-26 | z | 14 | 483 | 7.9 | 63.0 | 61.2 |
| Example A2-27 | aa | 11 | 435 | 6.4 | 65.7 | 72.0 |
| Example A2-28 | ab | 10 | 428 | 5.7 | 67.1 | 74.3 |
| Example A2-29 | ac | 14 | 481 | 7.8 | 62.8 | 62.0 |
| Example A2-30 | ad | 11 | 446 | 6.2 | 65.8 | 72.8 |
| Example A2-31 | ae | 12 | 477 | 7.3 | 64.0 | 68.0 |
| Example A2-32 | af | 11 | 444 | 6.1 | 65.5 | 72.5 |
| Example A2-33 | ag | 10 | 433 | 5.8 | 67.2 | 75.0 |
| Example A2-34 | ah | 10 | 429 | 5.8 | 67.3 | 74.8 |
| Example A2-35 | ai | 11 | 442 | 6.0 | 65.0 | 73.0 |
| Example A2-36 | aj | 12 | 479 | 7.2 | 63.9 | 69.3 |
| Comparative Example A2-1 | ak | 18 | 650 | 10.0 | 52.9 | 48.0 |
| Comparative Example A2-2 | al | 17 | 644 | 9.8 | 54.1 | 49.0 |
| Comparative Example A2-3 | am | 16 | 601 | 9.1 | 56.8 | 52.8 |
| Comparative Example A2-4 | Not used | 16 | 606 | 9.2 | 57.0 | 53.0 |

As can be seen from Table 9, the cathodes of Examples A2-1 to A2-36 in which the dispersants a to aj were used were extremely excellent in the all ionic resistance, reaction resistance, room temperature rate characteristic, and low-temperature discharge characteristic at room temperature and −20° C., as compared to the cathodes of Comparative Example A2-4 in which a dispersant was not used, and Comparative Examples A2-1 to A2-3 in which the dispersants ak to am were used. The dispersants ak and al had particularly high ionic resistance at low temperatures and poor low-temperature discharge characteristic.

The reason for this is thought to be that, because Li$^+$ with extremely high electron density is present near the dispersants a to aj, dielectric polarization occurs, and thereby the dispersants have a high dielectric constant in a battery. It is considered that, accordingly, ionic conductivity is improved, and desolvation energy and solvation energy of $Li^+$ when an active material reacts with Li are reduced. As a result, ionic resistance and reaction resistance are reduced, and therefore characteristics in terms of the whole battery is also improved.

[Examples A3-1 to A3-5] [Comparative Examples A3-1 to A3-5] Comparison of Carbon Material Types According to materials and compositions of the carbon material dispersion liquid shown in Table 10, the carbon material dispersion varnish shown in Table 11, and the cathode mixture paste shown in Table 12, dispersion was performed in the same manner as in Example A2-1, and thereby a cell for cathode evaluation was assembled. Because a large amount of dispersant is required for carbon materials with a high specific surface area, an appropriate amount to be used was determined according to each carbon material.

(Composition of Carbon Material Dispersion Liquids)

TABLE 10

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Example A3-1 | b | 0.4 | super-P | 10.0 | NMP | 89.6 |
| Example A3-2 | b | 0.4 | M800 | 10.0 | NMP | 89.6 |
| Example A3-3 | b | 1.0 | EC-300J | 10.0 | NMP | 89.0 |
| Example A3-4 | b | 1.0 | CNT | 2.0 | NMP | 97.0 |
| Example A3-5 | b | 0.2 | VGCF | 10.0 | NMP | 89.8 |
| Comparative Example A3-1 | ak | 0.4 | super-P | 10.0 | NMP | 89.6 |
| Comparative Example A3-2 | ak | 0.4 | M800 | 10.0 | NMP | 89.6 |
| Comparative Example A3-3 | ak | 1.0 | EC-300J | 10.0 | NMP | 89.0 |
| Comparative Example A3-4 | ak | 1.5 | CNT | 3.0 | NMP | 95.5 |
| Comparative Example A3-5 | ak | 0.2 | VGCF | 10.0 | NMP | 89.8 |

(Composition of Carbon Material Dispersion Varnishes)

TABLE 11

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Example A3-1 | b | 0.24 | super-P | 6.0 | PVDF | 6.0 | NMP | 87.8 |
| Example A3-2 | b | 0.24 | M800 | 6.0 | PVDF | 6.0 | NMP | 87.8 |
| Example A3-3 | b | 0.6 | EC-300J | 6.0 | PVDF | 6.0 | NMP | 87.4 |
| Example A3-4 | b | 1.45 | CNT | 2.9 | PVDF | 2.9 | NMP | 92.8 |
| Example A3-5 | b | 0.12 | VGCF | 6.0 | PVDF | 6.0 | NMP | 87.9 |
| Comparative Example A3-1 | ak | 0.24 | super-P | 6.0 | PVDF | 6.0 | NMP | 87.8 |
| Comparative Example A3-2 | ak | 0.24 | M800 | 6.0 | PVDF | 6.0 | NMP | 87.8 |
| Comparative Example A3-3 | ak | 0.6 | EC-300J | 6.0 | PVDF | 6.0 | NMP | 87.4 |
| Comparative Example A3-4 | ak | 1.45 | CNT | 2.9 | PVDF | 2.9 | NMP | 92.8 |
| Comparative Example A3-5 | ak | 0.12 | VGCF | 6.0 | PVDF | 6.0 | NMP | 87.9 |

(Composition of Cathode Mixture Pastes)

TABLE 12

| | Composition of cathode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Example A3-1 | b | 0.08 | super-P | 2.0 | PVDF | 2.0 | NMC | 54.0 | NMP | 41.9 |
| Example A3-2 | b | 0.08 | M800 | 2.0 | PVDF | 2.0 | NMC | 54.0 | NMP | 41.9 |
| Example A3-3 | b | 0.2 | EC-300J | 2.0 | PVDF | 2.0 | NMC | 54.0 | NMP | 41.8 |
| Example A3-4 | b | 0.390 | CNT | 1.3 | PVDF | 1.3 | NMC | 54.0 | NMP | 43.0 |
| Example A3-5 | b | 0.04 | VGCF | 2.0 | PVDF | 2.0 | NMC | 54.0 | NMP | 42.0 |
| Comparative Example A3-1 | ak | 0.08 | super-P | 2.0 | PVDF | 2.0 | NMC | 54.0 | NMP | 41.9 |
| Comparative Example A3-2 | ak | 0.08 | M800 | 2.0 | PVDF | 2.0 | NMC | 54.0 | NMP | 41.9 |
| Comparative Example A3-3 | ak | 0.2 | EC-300J | 2.0 | PVDF | 2.0 | NMC | 54.0 | NMP | 41.8 |

TABLE 12-continued

| | Composition of cathode mixture paste | | | | | | | | |
|---|---|---|---|---|---|---|---|---|---|
| | Dispersant | | Carbon material | | Binder | | Active material | | Solvent |
| | Type | Content (%) | Type | Content (%) | Type | Content (%) | Type | Content (%) | Type | Content (%) |
| Comparative Example A3-4 | ak | 0.390 | CNT | 1.3 | PVDF | 1.3 | NMC | 54.0 | NMP | 43.0 |
| Comparative Example A3-5 | ak | 0.04 | VGCF | 2.0 | PVDF | 2.0 | NMC | 54.0 | NMP | 42.0 |

<Evaluation Results>

The carbon material dispersion liquids, carbon material dispersion varnishes, and cathode mixture pastes shown in all of the examples and comparative examples were also in a favorably dispersed state, and sedimentation or thickening did not occur even after the elapse of one month.

Table 13 shows evaluation results of ionic resistance, reaction resistance, room temperature rate characteristic, and low-temperature discharge characteristic of Examples A3-1 to A3-5 and Comparative Examples A3-1 to A3-5.

TABLE 13

| | Carbon material Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example A3-1 | super-P | 12 | 475 | 7.3 | 63.8 | 64.2 |
| Example A3-2 | M800 | 13 | 473 | 7.7 | 64.2 | 62.3 |
| Example A3-3 | EC-300J | 10 | 420 | 5.9 | 65.7 | 72.8 |
| Example A3-4 | CNT | 11 | 436 | 6.4 | 67.1 | 75.0 |
| Example A3-5 | VGCF | 14 | 449 | 8.1 | 62.1 | 61.9 |
| Comparative Example A3-1 | super-P | 18 | 643 | 10.1 | 52.7 | 48.3 |
| Comparative Example A3-2 | M800 | 18 | 640 | 9.7 | 53.2 | 48.4 |
| Comparative Example A3-3 | EC-300J | 20 | 661 | 10.1 | 52.3 | 48.0 |
| Comparative Example A3-4 | CNT | 21 | 669 | 10.3 | 51.9 | 47.7 |
| Comparative Example A3-5 | VGCF | 18 | 645 | 9.8 | 52.6 | 48.3 |

The same effects were confirmed for all the carbon materials. Differences between Examples A3-1 to A3-5 were thought to be differences due to conductivities of the carbon materials. In addition, in Comparative Examples A3-1 to A3-5, as an amount of dispersant added became larger, the low-temperature ionic resistance tended to become higher.

Based on the above verification, it was confirmed that the above-described effects were not dependent on the type of carbon material.

[Examples A4-1 to A4-6] Comparison 1 of Amount of Dispersant Per Active Material Surface Area A cell for cathode evaluation was assembled in the same manner except that dispersant amounts shown in Table 14, Table 15, and Table 16 were used instead of the dispersant amount in Example A2-1. Table 17 shows a dispersant amount (mg) with respect to 1 m² active material surface area in the electrode.

(Composition of Carbon Material Dispersion Liquids)

TABLE 14

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Comparative Example A2-4 | Not used | 0 | HS100 | 10.0 | NMP | 90.0 |
| Example A4-1 | b | 0.01 | HS100 | 10.0 | NMP | 90.0 |
| Example A4-2 | b | 0.02 | HS100 | 10.0 | NMP | 90.0 |
| Example A4-3 | b | 0.05 | HS100 | 10.0 | NMP | 90.0 |
| Example A4-4 | b | 0.1 | HS100 | 10.0 | NMP | 89.9 |
| Example A2-2 | b | 0.2 | HS100 | 10.0 | NMP | 89.8 |
| Example A4-5 | b | 0.4 | HS100 | 10.0 | NMP | 89.6 |
| Example A4-6 | b | 0.8 | HS100 | 10.0 | NMP | 89.2 |

(Composition of Carbon Material Dispersion Varnishes)

TABLE 15

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Comparative Example A2-4 | Not used | 0 | HS100 | 6.0 | PVDF | 6.0 | NMP | 88.0 |
| Example A4-1 | b | 0.006 | HS100 | 6.0 | PVDF | 6.0 | NMP | 88.0 |
| Example A4-2 | b | 0.012 | HS100 | 6.0 | PVDF | 6.0 | NMP | 88.0 |
| Example A4-3 | b | 0.03 | HS100 | 6.0 | PVDF | 6.0 | NMP | 88.0 |
| Example A4-4 | b | 0.06 | HS100 | 6.0 | PVDF | 6.0 | NMP | 87.9 |
| Example A2-2 | b | 0.12 | HS100 | 6.0 | PVDF | 6.0 | NMP | 87.9 |
| Example A4-5 | b | 0.24 | HS100 | 6.0 | PVDF | 6.0 | NMP | 87.8 |
| Example A4-6 | b | 0.48 | HS100 | 6.0 | PVDF | 6.0 | NMP | 87.5 |

(Composition of Cathode Mixture Pastes)

TABLE 16

| | Composition of cathode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Comparative Example A2-4 | Not used | 0 | HS100 | 2.0 | PVDF | 2.0 | NMC | 54.0 | NMP | 42.0 |
| Example A4-1 | b | 0.002 | HS100 | 2.0 | PVDF | 2.0 | NMC | 54.0 | NMP | 42.0 |
| Example A4-2 | b | 0.004 | HS100 | 2.0 | PVDF | 2.0 | NMC | 54.0 | NMP | 42.0 |
| Example A4-3 | b | 0.01 | HS100 | 2.0 | PVDF | 2.0 | NMC | 54.0 | NMP | 42.0 |
| Example A4-4 | b | 0.02 | HS100 | 2.0 | PVDF | 2.0 | NMC | 54.0 | NMP | 42.0 |
| Example A2-2 | b | 0.04 | HS100 | 2.0 | PVDF | 2.0 | NMC | 54.0 | NMP | 42.0 |
| Example A4-5 | b | 0.08 | HS100 | 2.0 | PVDF | 2.0 | NMC | 54.0 | NMP | 41.9 |
| Example A4-6 | b | 0.16 | HS100 | 2.0 | PVDF | 2.0 | NMC | 54.0 | NMP | 41.8 |

(Amount of Dispersant Per Active Material Surface Area)

TABLE 17

| | Dispersant amount per active material surface area (mg/m$^2$) |
|---|---|
| Comparative Example A2-4 | 0 |
| Example A4-1 | 0.06 |
| Example A4-2 | 0.12 |
| Example A4-3 | 0.30 |
| Example A4-4 | 0.60 |
| Example A2-2 | 1.19 |
| Example A4-5 | 2.39 |
| Example A4-6 | 4.78 |

<Evaluation Results>

Table 18 shows evaluation results of reaction resistance, room temperature rate characteristic, and low-temperature discharge characteristic of Comparative Example A2-4, Example A2-2, and Examples A4-1 to A4-6.

TABLE 18

| | Dispersant amount per active material surface area (mg/m$^2$) | $|Z|_{re}$ at 25° C. [Ω] | Room temperature rate characteristic [%] | Low-temperature discharge characteristic [%] |
|---|---|---|---|---|
| Comparative Example A2-4 | 0 | 9.2 | 57.0 | 53.0 |
| Example A4-1 | 0.06 | 8.0 | 62.6 | 63.1 |
| Example A4-2 | 0.12 | 6.9 | 65.2 | 71.1 |
| Example A4-3 | 0.30 | 6.8 | 65.4 | 70.9 |
| Example A4-4 | 0.60 | 6.3 | 66.6 | 72.1 |
| Example A2-2 | 1.19 | 5.0 | 68.8 | 75.2 |
| Example A4-5 | 2.39 | 5.1 | 69.2 | 75.5 |
| Example A4-6 | 4.78 | 5.1 | 69.7 | 75.9 |

Based on Example A4-1, it was found that when a dispersant amount with respect to the active material surface area was too small, the effects were diminished. An excellent effect was obtained when a dispersant amount became larger than that of Example A4-2, and the effect was gradually improved as the dispersant amount increased.

[Examples A5-1 to A5-8] Comparison 2 of Amount of Dispersant Per Active Material Surface Area Dispersion was performed in the same manner as in Example A2-1 with materials and compositions shown in Table 19, Table 20, and Table 21, and thereby a cell for cathode evaluation was produced. Table 22 shows a dispersant amount (mg) with respect to 1 m$^2$ active material surface area in the electrode.

(Composition of Carbon Material Dispersion Liquids)

TABLE 19

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Example A5-1 | b | 1.98 | CNT | 6.6 | NMP | 91.4 |
| Example A5-2 | b | 3.3 | CNT | 6.6 | NMP | 90.1 |
| Example A5-3 | b | 6.6 | CNT | 6.6 | NMP | 86.8 |
| Example A5-4 | b | 9.9 | CNT | 6.6 | NMP | 83.5 |
| Example A5-5 | b | 11.6 | CNT | 6.6 | NMP | 81.9 |
| Example A5-6 | b | 13.2 | CNT | 6.6 | NMP | 80.2 |
| Example A5-7 | b | 14.9 | CNT | 6.6 | NMP | 78.6 |
| Example A5-8 | b | 16.5 | CNT | 6.6 | NMP | 76.9 |

(Composition of Carbon Material Dispersion Varnishes)

TABLE 20

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Example A5-1 | b | 1.86 | CNT | 6.2 | PVDF | 5.0 | NMP | 86.9 |
| Example A5-2 | b | 3.1 | CNT | 6.2 | PVDF | 5.0 | NMP | 85.7 |
| Example A5-3 | b | 6.2 | CNT | 6.2 | PVDF | 5.0 | NMP | 82.6 |
| Example A5-4 | b | 9.3 | CNT | 6.2 | PVDF | 5.0 | NMP | 79.5 |
| Example A5-5 | b | 10.9 | CNT | 6.2 | PVDF | 5.0 | NMP | 78.0 |
| Example A5-6 | b | 12.4 | CNT | 6.2 | PVDF | 5.0 | NMP | 76.4 |
| Example A5-7 | b | 14.0 | CNT | 6.2 | PVDF | 5.0 | NMP | 74.9 |
| Example A5-8 | b | 15.5 | CNT | 6.2 | PVDF | 5.0 | NMP | 73.3 |

(Composition of Cathode Mixture Pastes)

TABLE 21

| | Composition of cathode mixture paste | | | | | | | | |
|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Example A5-1 | b | 0.93 | CNT | 3.1 | PVDF | 2.5 | NMC | 50.0 | NMP | 43.5 |
| Example A5-2 | b | 1.6 | CNT | 3.1 | PVDF | 2.5 | NMC | 50.0 | NMP | 42.9 |
| Example A5-3 | b | 3.1 | CNT | 3.1 | PVDF | 2.5 | NMC | 50.0 | NMP | 41.3 |
| Example A5-4 | b | 4.7 | CNT | 3.1 | PVDF | 2.5 | NMC | 50.0 | NMP | 39.8 |
| Example A5-5 | b | 5.4 | CNT | 3.1 | PVDF | 2.5 | NMC | 50.0 | NMP | 39.0 |
| Example A5-6 | b | 6.2 | CNT | 3.1 | PVDF | 2.5 | NMC | 50.0 | NMP | 38.2 |
| Example A5-7 | b | 7.0 | CNT | 3.1 | PVDF | 2.5 | NMC | 50.0 | NMP | 37.4 |
| Example A5-8 | b | 7.8 | CNT | 3.1 | PVDF | 2.5 | NMC | 50.0 | NMP | 36.7 |

(Amount of Dispersant Per Active Material Surface Area)

TABLE 22

| | Dispersant amount per active material surface area (mg/m$^2$) |
|---|---|
| Example A5-1 | 30 |
| Example A5-2 | 50 |
| Example A5-3 | 100 |
| Example A5-4 | 150 |
| Example A5-5 | 175 |
| Example A5-6 | 200 |
| Example A5-7 | 225 |
| Example A5-8 | 250 |

<Evaluation Results>

Table 23 shows evaluation results of reaction resistance, room temperature rate characteristic, and low-temperature discharge characteristic of Example A5-1 to Example A5-8.

TABLE 23

| | Dispersant amount per active material surface area (mg/m$^2$) | $|Z|_{re}$ at 25° C. [Ω] | Room temperature rate characteristic [%] | Low-temperature discharge characteristic [%] |
|---|---|---|---|---|
| Example A5-1 | 30 | 5.6 | 66.7 | 72.8 |
| Example A5-2 | 50 | 5.6 | 68.1 | 74.1 |
| Example A5-3 | 100 | 5.6 | 69.2 | 74.3 |
| Example A5-4 | 150 | 5.6 | 67.6 | 73.9 |
| Example A5-5 | 175 | 6.4 | 66.3 | 70.1 |
| Example A5-6 | 200 | 7.4 | 64.6 | 69.7 |
| Example A5-7 | 225 | 8.0 | 63.8 | 62.6 |
| Example A5-8 | 250 | 8.1 | 63.3 | 62.1 |

Based on Table 23, it was found that when a dispersant amount exceeded the dispersant amount in Example A5-6, an effect of reducing reaction resistance was diminished. The reason for this was thought to be that, when a dispersant amount was in excess, the adverse effect of a resistance component becoming larger than an amount of reduction in desolvation energy.

Based on the above results, it was found that there is an optimum range for an amount of dispersant added to the active material surface area for obtaining an excellent effect of reducing reaction resistance.

[Examples A6-1 to A6-6] Comparison 1 of Amount of Dispersant with Respect to Amount of Electrolyte Solution A cell for cathode evaluation was assembled in the same manner as in Example A4-2, except that an amount of an electrolyte solution was changed to an amount shown in Table 24 using the cathode produced in Example A4-2.

TABLE 24

| | Electrolyte solution amount added in cell (ml) | Dispersant amount with respect to electrolyte solution amount (mg/ml) |
|---|---|---|
| Example A6-1 | 0.05 | 0.12 |
| Example A4-2 | 0.1 | 0.059 |
| Example A6-2 | 0.2 | 0.023 |
| Example A6-3 | 0.4 | 0.015 |
| Example A6-4 | 0.6 | 0.010 |
| Example A6-5 | 0.7 | 0.007 |
| Example A6-6 | 1.2 | 0.005 |

[Examples A7-1 to A7-7] Comparison 2 of Amount of Dispersant with Respect to Amount of Electrolyte Solution A cathode was produced in the same manner as in Example A5-3 except that the cathode mixture paste produced in Example A5-3 was used, and a coating amount was changed to 28 mg/cm$^2$. In addition, a cell for cathode evaluation was assembled in the same manner as in Example A5-3 except that an amount of electrolyte solution added to the cell for cathode evaluation was changed to an amount shown in Table 25.

TABLE 25

| | Electrolyte solution amount added in cell (ml) | Dispersant amount with respect to electrolyte solution amount (mg/ml) |
|---|---|---|
| Example A7-1 | 0.03 | 99.1 |
| Example A7-2 | 0.04 | 74.3 |
| Example A7-3 | 0.05 | 59.4 |
| Example A7-4 | 0.06 | 49.3 |
| Example A7-5 | 0.08 | 37.2 |
| Example A7-6 | 0.1 | 29.7 |
| Example A7-7 | 0.2 | 14.9 |

<Evaluation Results>

Table 26 shows evaluation results of ionic resistance, reaction resistance, room temperature rate characteristic, and low-temperature discharge characteristic of Example A4-2, Examples A6-1 to A6-6, and Comparative Example A2-4. Table 27 shows evaluation results of ionic resistance, reaction resistance, room temperature rate characteristic, and low-temperature discharge characteristic of Example A7-1 to Example A7-7.

The reaction resistances of Example A4-2 and Examples A6-1 to A6-6 were all the same level. The reason for this is thought to be that amounts of dispersant with respect to the active material surface area were the same.

In addition, the ionic resistance at room temperature and low temperature was low in Examples A6-1 to A6-4, and the effects were poor in Examples A6-5 and A6-6 with Example A6-4 as the lower limit. It was shown that there is a lower limit of an optimum amount of dispersant with respect to an amount of electrolyte solution for obtaining an excellent effect.

Because room temperature rate characteristic and low-temperature discharge characteristic are affected by both ionic resistance and reaction resistance, there is a need for a design in which both effects can be obtained, in order to obtain excellent characteristics in a battery.

Meanwhile, from the comparison between Examples A7-1 to A7-7, it was found that the effect of reducing ionic resistance was diminished even when an amount of dispersant is too large with respect to an amount of electrolyte solution. The reason for this is thought to be that because the dispersant is an insulating compound, when an amount thereof is in excess, the dispersant becomes a resistance component itself.

Based on the above results, it was found that there is also an upper limit to an optimum amount of dispersant with respect to an amount of electrolyte solution.

TABLE 26

| | Dispersant amount with respect to electrolyte solution amount (mg/ml) | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example A6-1 | 0.12 | 10 | 429 | 6.6 | 68.1 | 74.2 |
| Example A4-2 | 0.059 | 10 | 450 | 6.8 | 65.2 | 71.1 |
| Example A6-2 | 0.023 | 11 | 478 | 6.9 | 64.5 | 71.9 |
| Example A6-3 | 0.015 | 12 | 475 | 6.7 | 64.8 | 69.4 |
| Example A6-4 | 0.010 | 12 | 477 | 6.7 | 64.1 | 69.1 |
| Example A6-5 | 0.007 | 14 | 498 | 6.8 | 63.2 | 61.3 |
| Example A6-6 | 0.005 | 14 | 503 | 6.8 | 62.9 | 61.8 |
| Comparative Example A2-4 | 0 | 16 | 606 | 9.2 | 57.0 | 53.0 |

| | Dispersant amount with respect to electrolyte solution amount (mg/ml) | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example A7-1 | 99.1 | 14 | 521 | 5.7 | 61.9 | 60.6 |
| Example A7-2 | 74.3 | 14 | 517 | 5.8 | 62.4 | 61.5 |
| Example A7-3 | 59.4 | 10 | 422 | 5.6 | 67.1 | 74.8 |
| Example A7-4 | 49.3 | 10 | 430 | 5.7 | 66.7 | 74.3 |
| Example A7-5 | 37.2 | 10 | 448 | 5.7 | 66.2 | 73.9 |
| Example A7-6 | 29.7 | 11 | 470 | 5.6 | 65.3 | 72.5 |
| Example A7-7 | 14.9 | 12 | 482 | 5.7 | 64.9 | 71.8 |

[Example A8-1] Investigation of Influence of Electrolyte Solution

A cell for cathode evaluation was assembled in the same manner as in Example A2-2 except that a non-aqueous electrolyte solution, in which $LiPF_6$ was dissolved at a concentration of 1 M in a mixed solvent in which ethylene carbonate and diethyl carbonate were mixed at a volume ratio of 1:2, was used instead of the electrolyte solution used in Example A2-2 (a non-aqueous electrolyte solution in which $LiPF_6$ was dissolved at a concentration of 1 M in a mixed solvent in which ethylene carbonate and diethyl carbonate were mixed at a volume ratio of 1:1).

Example A8-2

A cell for cathode evaluation was assembled in the same manner as in Example A2-2 except that a non-aqueous electrolyte solution, in which $LiPF_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Example A2-2 (a non-aqueous electrolyte solution in which $LiPF_6$ was dissolved at a concentration of 1 M in a mixed solvent in which ethylene carbonate and diethyl carbonate were mixed at a volume ratio of 1:1).

A cell for cathode evaluation was assembled in the same manner as in Comparative Example A2-4 except that a non-aqueous electrolyte solution, in which $LiPF_6$ was dissolved at a concentration of 1 M in a mixed solvent in which ethylene carbonate and diethyl carbonate were mixed at a volume ratio of 1:2, was used instead of the electrolyte solution used in Comparative Example A2-4 (a non-aqueous electrolyte solution in which $LiPF_6$ was dissolved at a concentration of 1 M in a mixed solvent in which ethylene carbonate and diethyl carbonate were mixed at a volume ratio of 1:1).

Comparative Example A8-2

A cell for cathode evaluation was assembled in the same manner as in Comparative Example A2-4 except that a non-aqueous electrolyte solution, in which $LiPF_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Comparative Example A2-4 (a non-aqueous electrolyte solution in which $LiPF_6$ was dissolved at a concentration of 1 M in a mixed solvent in which ethylene carbonate and diethyl carbonate were mixed at a volume ratio of 1:1).

<Evaluation Results>

Table 28 shows evaluation results of ionic resistance, room temperature rate characteristic, and low-temperature discharge characteristic of Example A2-2, Example A8-1, Example A8-2, Comparative Example A2-4, Comparative Example A8-1, and Comparative Example A8-2.

TABLE 28

| | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|
| Example A2-2 | 10 | 420 | 5.0 | 68.8 | 75.2 |
| Example A8-1 | 9 | 413 | 5.1 | 69.2 | 76.6 |
| Example A8-2 | 9 | 409 | 5.0 | 69.2 | 77.8 |
| Comparative Example A2-4 | 16 | 606 | 9.1 | 57.0 | 53.0 |
| Comparative Example A8-1 | 16 | 595 | 9.1 | 57.1 | 55.1 |
| Comparative Example A8-2 | 16 | 592 | 9.2 | 57.2 | 55.4 |

From Example A8-1 and Example A8-2, it was confirmed that all characteristics were improved regardless of the type of electrolyte solution. In addition to the electrolyte solutions shown in the present examples, the same effects are expected to be obtained regardless of the type of non-aqueous electrolyte solution as long as it is a non-aqueous electrolyte solution that is generally used.

Next, the type of active material was changed, and evaluation was performed in the same manner.

[Examples A9-1 to A9-3] Comparison of Active Material Species

Using the carbon material dispersion varnish used in Example A2-2, the cell for cathode evaluation was assembled by dispersion performed in the same manner as in Example A2-2 according to the active material and composition shown in Table 29.

Comparative Examples A9-1 to A9-3

Using the carbon material dispersion varnish used in Comparative Example A2-1, the cell for cathode evaluation was assembled by dispersion performed in the same manner as in Comparative Example A2-1 according to the active material and composition shown in Table 30.

TABLE 29

| | Composition of cathode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Example A9-1 | b | 0.04 | HS100 | 2.0 | PVDF | 2.0 | LCO | 54.0 | NMP | 42.0 |
| Example A9-2 | b | 0.04 | HS100 | 2.0 | PVDF | 2.0 | NCA | 54.0 | NMP | 42.0 |
| Example A9-3 | b | 0.04 | HS100 | 2.0 | PVDF | 2.0 | LFP | 48.0 | NMP | 48.0 |

TABLE 30

| | Composition of cathode mixture paste | | | | | | | | |
|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Comparative Example A9-1 | ak | 0.04 | HS100 | 2.0 | PVDF | 2.0 | LCO | 54.0 | NMP | 42.0 |
| Comparative Example A9-2 | ak | 0.04 | HS100 | 2.0 | PVDF | 2.0 | NCA | 54.0 | NMP | 42.0 |
| Comparative Example A9-3 | ak | 0.04 | HS100 | 2.0 | PVDF | 2.0 | LFP | 48.0 | NMP | 48.0 |

<Evaluation Results>

Table 31 shows evaluation results of ionic resistance, reaction resistance, room temperature rate characteristic, and low-temperature discharge characteristic of Examples A9-1 to A9-3 and Comparative Examples A9-1 to A9-3.

| | Dispersant Type | $|Z|_{ion}$ at 25° C. [Ω] | $Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example A9-1 | b | 10 | 425 | 5.0 | 68.4 | 75.1 |
| Example A9-2 | b | 10 | 420 | 5.0 | 68.8 | 76.9 |
| Example A9-3 | b | 10 | 418 | 6.3 | 72.2 | 80.4 |
| Comparative Example A9-1 | ak | 18 | 650 | 10.0 | 52.9 | 48.0 |
| Comparative Example A9-2 | ak | 18 | 637 | 10.0 | 53.1 | 52.7 |
| Comparative Example A9-3 | ak | 18 | 645 | 11.9 | 53.8 | 60.1 |

Although there were differences in battery characteristics depending on a performance of the active material, it was confirmed that all characteristics were improved when compared with those of the same active material.

Subsequently, a case of use in the anode was evaluated.

Example A10-1

<Preparation of Carbon Material Dispersion Varnish>

According to the composition shown in Table 32, the carbon material dispersion liquid which contains the dispersant a and was produced in Example A2-1 was mixed with a binder and N-methyl-2-pyrrolidone with a disper. Thereby, a carbon material dispersion varnish was obtained.

<Preparation of Mixture Paste>

According to the composition shown in Table 33, the prepared carbon material dispersion varnish containing the dispersant a was mixed with an active material and N-methyl-2-pyrrolidone with a disper. Thereby, an anode mixture paste was obtained.

<Production of Electrode>

The prepared anode mixture paste containing the dispersant a was applied onto a copper foil having a thickness of 20 μm using a doctor blade, and then dried at 120° C. for 30 minutes under reduced pressure. Thereafter, the copper foil was rolled with a roller pressing machine. Thereby, an electrode having an application amount of 15 mg/cm² and a density of 1.8 g/cm³ was produced. An electrode having a uniform thickness and density was obtained.

<Assembly of Cell for Evaluation Anode of Lithium Ion Secondary Battery>

The produced electrode containing the dispersant a was punched out to a diameter of 18 mm to be used as an anode, and a metallic lithium foil (a thickness of 0.15 mm) was used as a cathode. A separator made of a porous polypropylene film (a thickness of 20 μm, and a porosity of 50%) was inserted and laminated between the anode and the cathode, and was filled with 0.1 ml of an electrolyte solution (a non-aqueous electrolyte solution in which $LiPF_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

Examples A10-2 to A10-36

Using the carbon material dispersion liquids which respectively contain the dispersant b to the dispersant aj and were produced in Examples A2-2 to A2-36, a cell for anode evaluation was assembled by dispersion performed in the same manner as in Example A10-1 according to the materials and compositions shown in Table 32 and Table 33.

TABLE 32

Composition of carbon material dispersion varnish

| | Dispersant | | Carbon material | | Binder | | Solvent | |
|---|---|---|---|---|---|---|---|---|
| | Type | Content (%) | Type | Content (%) | Type | Content (%) | Type | Content (%) |
| Example A10-1 | a | 0.08 | HS100 | 4.0 | PVDF | 8.0 | NMP | 87.9 |
| Example A10-2 | b | 0.08 | HS100 | 4.0 | PVDF | 8.0 | NMP | 87.9 |
| Example A10-3 | c | 0.08 | HS100 | 4.0 | PVDF | 8.0 | NMP | 87.9 |
| Example A10-4 | d | 0.08 | HS100 | 4.0 | PVDF | 8.0 | NMP | 87.9 |
| Example A10-5 | e | 0.08 | HS100 | 4.0 | PVDF | 8.0 | NMP | 87.9 |
| Example A10-6 | f | 0.08 | HS100 | 4.0 | PVDF | 8.0 | NMP | 87.9 |
| Example A10-7 | g | 0.08 | HS100 | 4.0 | PVDF | 8.0 | NMP | 87.9 |
| Example A10-8 | h | 0.08 | HS100 | 4.0 | PVDF | 8.0 | NMP | 87.9 |
| Example A10-9 | i | 0.08 | HS100 | 4.0 | PVDF | 8.0 | NMP | 87.9 |
| Example A10-10 | j | 0.08 | HS100 | 4.0 | PVDF | 8.0 | NMP | 87.9 |
| Example A10-11 | k | 0.08 | HS100 | 4.0 | PVDF | 8.0 | NMP | 87.9 |
| Example A10-12 | l | 0.08 | HS100 | 4.0 | PVDF | 8.0 | NMP | 87.9 |
| Example A10-13 | m | 0.08 | HS100 | 4.0 | PVDF | 8.0 | NMP | 87.9 |
| Example A10-14 | n | 0.08 | HS100 | 4.0 | PVDF | 8.0 | NMP | 87.9 |
| Example A10-15 | o | 0.08 | HS100 | 4.0 | PVDF | 8.0 | NMP | 87.9 |
| Example A10-16 | p | 0.08 | HS100 | 4.0 | PVDF | 8.0 | NMP | 87.9 |
| Example A10-17 | q | 0.08 | HS100 | 4.0 | PVDF | 8.0 | NMP | 87.9 |
| Example A10-18 | r | 0.08 | HS100 | 4.0 | PVDF | 8.0 | NMP | 87.9 |
| Example A10-19 | s | 0.08 | HS100 | 4.0 | PVDF | 8.0 | NMP | 87.9 |
| Example A10-20 | t | 0.08 | HS100 | 4.0 | PVDF | 8.0 | NMP | 87.9 |
| Example A10-21 | u | 0.08 | HS100 | 4.0 | PVDF | 8.0 | NMP | 87.9 |
| Example A10-22 | v | 0.08 | HS100 | 4.0 | PVDF | 8.0 | NMP | 87.9 |
| Example A10-23 | w | 0.08 | HS100 | 4.0 | PVDF | 8.0 | NMP | 87.9 |
| Example A10-24 | x | 0.08 | HS100 | 4.0 | PVDF | 8.0 | NMP | 87.9 |
| Example A10-25 | y | 0.08 | HS100 | 4.0 | PVDF | 8.0 | NMP | 87.9 |
| Example A10-26 | z | 0.08 | HS100 | 4.0 | PVDF | 8.0 | NMP | 87.9 |
| Example A10-27 | aa | 0.08 | HS100 | 4.0 | PVDF | 8.0 | NMP | 87.9 |
| Example A10-28 | ab | 0.08 | HS100 | 4.0 | PVDF | 8.0 | NMP | 87.9 |
| Example A10-29 | ac | 0.08 | HS100 | 4.0 | PVDF | 8.0 | NMP | 87.9 |
| Example A10-30 | ad | 0.08 | HS100 | 4.0 | PVDF | 8.0 | NMP | 87.9 |
| Example A10-31 | ae | 0.08 | HS100 | 4.0 | PVDF | 8.0 | NMP | 87.9 |
| Example A10-32 | af | 0.08 | HS100 | 4.0 | PVDF | 8.0 | NMP | 87.9 |
| Example A10-33 | ag | 0.08 | HS100 | 4.0 | PVDF | 8.0 | NMP | 87.9 |
| Example A10-34 | ah | 0.08 | HS100 | 4.0 | PVDF | 8.0 | NMP | 87.9 |
| Example A10-35 | ai | 0.08 | HS100 | 4.0 | PVDF | 8.0 | NMP | 87.9 |
| Example A10-36 | aj | 0.08 | HS100 | 4.0 | PVDF | 8.0 | NMP | 87.9 |

TABLE 33

Composition of anode mixture paste

| | Dispersant | | Carbon material | | Binder | Active material | | Solvent | |
|---|---|---|---|---|---|---|---|---|---|
| | Type | Content (%) | Type | Content (%) | (%) | Type | Content (%) | Type | Content (%) |
| Example A10-1 | a | 0.03 | HS 100 | 1.5 | PVDF 3.0 | Spheroidal graphite | 45.0 | NMP | 50.5 |
| Example A10-2 | b | 0.03 | HS 100 | 1.5 | PVDF 3.0 | Spheroidal graphite | 45.0 | NMP | 50.47 |
| Example A10-3 | c | 0.03 | HS 100 | 1.5 | PVDF 3.0 | Spheroidal graphite | 45.0 | NMP | 50.5 |
| Example A10-4 | d | 0.03 | HS 100 | 1.5 | PVDF 3.0 | Spheroidal graphite | 45.0 | NMP | 50.5 |
| Example A10-5 | e | 0.03 | HS 100 | 1.5 | PVDF 3.0 | Spheroidal graphite | 45.0 | NMP | 50.5 |
| Example A10-6 | f | 0.03 | HS 100 | 1.5 | PVDF 3.0 | Spheroidal graphite | 45.0 | NMP | 50.5 |
| Example A10-7 | g | 0.03 | HS 100 | 1.5 | PVDF 3.0 | Spheroidal graphite | 45.0 | NMP | 50.5 |
| Example A10-8 | h | 0.03 | HS 100 | 1.5 | PVDF 3.0 | Spheroidal graphite | 45.0 | NMP | 50.5 |
| Example A10-9 | i | 0.03 | HS 100 | 1.5 | PVDF 3.0 | Spheroidal graphite | 45.0 | NMP | 50.5 |
| Example A10-10 | j | 0.03 | HS 100 | 1.5 | PVDF 3.0 | Spheroidal graphite | 45.0 | NMP | 50.5 |
| Example A10-11 | k | 0.03 | HS 100 | 1.5 | PVDF 3.0 | Spheroidal graphite | 45.0 | NMP | 50.5 |
| Example A10-12 | l | 0.03 | HS 100 | 1.5 | PVDF 3.0 | Spheroidal graphite | 45.0 | NMP | 50.5 |

TABLE 33-continued

| | Composition of anode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content |
| Example A10-13 | m | 0.03 | HS 100 | 1.5 | PVDF | 3.0 | Spheroidal graphite | 45.0 | NMP | 50.5 |
| Example A10-14 | n | 0.03 | HS 100 | 1.5 | PVDF | 3.0 | Spheroidal graphite | 45.0 | NMP | 50.5 |
| Example A10-15 | o | 0.03 | HS 100 | 1.5 | PVDF | 3.0 | Spheroidal graphite | 45.0 | NMP | 50.5 |
| Example A10-16 | p | 0.03 | HS 100 | 1.5 | PVDF | 3.0 | Spheroidal graphite | 45.0 | NMP | 50.5 |
| Example A10-17 | q | 0.03 | HS 100 | 1.5 | PVDF | 3.0 | Spheroidal graphite | 45.0 | NMP | 50.5 |
| Example A10-18 | r | 0.03 | HS 100 | 1.5 | PVDF | 3.0 | Spheroidal graphite | 45.0 | NMP | 50.5 |
| Example A10-19 | s | 0.03 | HS 100 | 1.5 | PVDF | 3.0 | Spheroidal graphite | 45.0 | NMP | 50.5 |
| Example A10-20 | t | 0.03 | HS 100 | 1.5 | PVDF | 3.0 | Spheroidal graphite | 45.0 | NMP | 50.5 |
| Example A10-21 | u | 0.03 | HS 100 | 1.5 | PVDF | 3.0 | Spheroidal graphite | 45.0 | NMP | 50.5 |
| Example A10-22 | v | 0.03 | HS 100 | 1.5 | PVDF | 3.0 | Spheroidal graphite | 45.0 | NMP | 50.5 |
| Example A10-23 | w | 0.03 | HS 100 | 1.5 | PVDF | 3.0 | Spheroidal graphite | 45.0 | NMP | 50.5 |
| Example A10-24 | x | 0.03 | HS 100 | 1.5 | PVDF | 3.0 | Spheroidal graphite | 45.0 | NMP | 50.5 |
| Example A10-25 | y | 0.03 | HS 100 | 1.5 | PVDF | 3.0 | Spheroidal graphite | 45.0 | NMP | 50.5 |
| Example A10-26 | z | 0.03 | HS 100 | 1.5 | PVDF | 3.0 | Spheroidal graphite | 45.0 | NMP | 50.5 |
| Example A10-27 | aa | 0.03 | HS 100 | 1.5 | PVDF | 3.0 | Spheroidal graphite | 45.0 | NMP | 50.5 |
| Example A10-28 | ab | 0.03 | HS 100 | 1.5 | PVDF | 3.0 | Spheroidal graphite | 45.0 | NMP | 50.5 |
| Example A10-29 | ac | 0.03 | HS 100 | 1.5 | PVDF | 3.0 | Spheroidal graphite | 45.0 | NMP | 50.5 |
| Example A10-30 | ad | 0.03 | HS 100 | 1.5 | PVDF | 3.0 | Spheroidal graphite | 45.0 | NMP | 50.5 |
| Example A10-31 | ae | 0.03 | HS 100 | 1.5 | PVDF | 3.0 | Spheroidal graphite | 45.0 | NMP | 50.5 |
| Example A10-32 | af | 0.03 | HS 100 | 1.5 | PVDF | 3.0 | Spheroidal graphite | 45.0 | NMP | 50.5 |
| Example A10-33 | ag | 0.03 | HS 100 | 1.5 | PVDF | 3.0 | Spheroidal graphite | 45.0 | NMP | 50.5 |
| Example A10-34 | ah | 0.03 | HS 100 | 1.5 | PVDF | 3.0 | Spheroidal graphite | 45.0 | NMP | 50.5 |
| Example A10-35 | ai | 0.03 | HS 100 | 1.5 | PVDF | 3.0 | Spheroidal graphite | 45.0 | NMP | 50.5 |
| Example A10-36 | aj | 0.03 | HS 100 | 1.5 | PVDF | 3.0 | Spheroidal graphite | 45.0 | NMP | 50.5 |

Comparative Examples A10-1 to A10-4

Using the carbon material dispersion liquids produced in Comparative Examples A2-1 to A2-4, a cell for anode evaluation was assembled by dispersing the carbon material dispersion varnish and the anode mixture paste in the same manner as in Example A10-1 according to the materials and compositions shown in Table 34 and Table 35. In Comparative Example A10-4, a dispersant was not used.

(Composition of Carbon Material Dispersion Varnishes)

TABLE 34

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Comparative Example A10-1 | ak | 0.08 | HS100 | 4.0 | PVDF | 8.0 | NMP | 87.9 |
| Comparative Example A10-2 | al | 0.08 | HS100 | 4.0 | PVDF | 8.0 | NMP | 87.9 |

TABLE 34-continued

Composition of carbon material dispersion varnish

| | Dispersant | | Carbon material | | Binder | | Solvent | |
|---|---|---|---|---|---|---|---|---|
| | Type | Content (%) | Type | Content (%) | Type | Content (%) | Type | Content (%) |
| Comparative Example A10-3 | am | 0.08 | HS100 | 4.0 | PVDF | 8.0 | NMP | 87.9 |
| Comparative Example A10-4 | Not used | 0 | HS100 | 4.0 | PVDF | 8.0 | NMP | 88.0 |

(Composition of Anode Mixture Pastes)

TABLE 35

Composition of anode mixture paste

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Comparative Example A10-1 | ak | 0.03 | HS100 | 1.5 | PVDF | 3.0 | Spheroidal graphite | 45.0 | NMP | 50.5 |
| Comparative Example A10-2 | al | 0.03 | HS100 | 1.5 | PVDF | 3.0 | Spheroidal graphite | 45.0 | NMP | 50.5 |
| Comparative Example A10-3 | am | 0.03 | HS100 | 1.5 | PVDF | 3.0 | Spheroidal graphite | 45.0 | NMP | 50.5 |
| Comparative Example A10-4 | Not used | 0 | HS100 | 1.5 | PVDF | 3.0 | Spheroidal graphite | 45.0 | NMP | 50.5 |

<Evaluation of Ionic Resistance>

Impedance was measured under the same conditions as in Example A2-1, and the ionic resistance $|Z|_{ion}$ at −20° C. and room temperature (25° C.) was obtained.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (an upper limit voltage of 2.0V) at room temperature, and discharging was performed with a constant current of 0.1C to a discharge lower limit voltage of 0.0V. 0.1C discharge capacity at the fifth cycle was recorded. Next, the cell for anode evaluation in a state of being discharged to 0.0V was connected to an impedance analyzer, and AC impedance measurement was performed at 0.0V, an amplitude of 10 mV, and a frequency from 0.1 Hz to 1 MHz. When the results were plotted on the complex plane by a Cole-Cole plot method, a semicircular curve was obtained. A size of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature, discharging was performed with a constant current of 0.5C to a discharge lower limit voltage of 0.0V, full charging was performed again with 0.1C, and then discharging was performed with a constant current of 5C to 0.0V. A ratio of a 5C discharge capacity to a 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and discharged with a constant current of 0.5C. A ratio of 0.5C discharge capacity at −20° C. to 0.5C discharge capacity at room temperature was defined as a low-temperature discharge characteristic (%).

<Evaluation Results>

The carbon material dispersion liquids, carbon material dispersion varnishes, and anode mixture pastes shown in Examples A10-1 to A10-36 and Comparative Examples A10-1 to A10-2 were in a favorably dispersed state, and sedimentation or thickening did not occur even after the elapse of one month. The carbon material dispersion liquid, carbon material dispersion varnish, and anode mixture paste of Comparative Example A10-3 had a high viscosity from the initial stage, and their dispersibility was considerably reduced. Regarding the carbon material dispersion liquid, carbon material dispersion varnish, and anode mixture paste of Comparative Example A10-4 in which a dispersant was not used, a viscosity was high and fluidity was inferior from the initial stage, but they were used as is for comparison. In addition, sedimentation of the active material was confirmed after the elapse of one month.

Table 36 shows evaluation results of ionic resistance, reaction resistance, room temperature rate characteristic, and low-temperature discharge characteristic of Examples A10-1 to A10-36 and Comparative Examples A10-1 to A10-4.

TABLE 36

| | Dispersant Type | \|Z\|ion at 25° C. [Ω] | \|Z\|ion at −20° C. [Ω] | \|Z\|re at 25° C. [Ω] | Room temperature rate characteristic [%] | Low-temperature discharge characteristic [%] |
|---|---|---|---|---|---|---|
| Example A10-1 | a | 13 | 460 | 4.5 | 64.5 | 73.8 |
| Example A10-2 | b | 13 | 452 | 4.3 | 65.5 | 76.0 |
| Example A10-3 | c | 13 | 458 | 4.6 | 63.8 | 75.1 |
| Example A10-4 | d | 20 | 604 | 6.6 | 59.3 | 61.4 |
| Example A10-5 | e | 20 | 606 | 6.8 | 59.1 | 60.8 |
| Example A10-6 | f | 18 | 580 | 5.9 | 60.0 | 71.0 |
| Example A10-7 | g | 18 | 584 | 5.9 | 61.4 | 72.1 |
| Example A10-8 | h | 16 | 520 | 5.7 | 62.8 | 70.8 |
| Example A10-9 | i | 18 | 593 | 6.1 | 61.0 | 70.4 |
| Example A10-10 | j | 16 | 520 | 5.5 | 62.6 | 72.0 |
| Example A10-11 | k | 18 | 591 | 6.0 | 61.1 | 69.5 |
| Example A10-12 | l | 18 | 587 | 6.2 | 60.8 | 69.9 |
| Example A10-13 | m | 18 | 590 | 6.1 | 60.7 | 70.5 |
| Example A10-14 | n | 16 | 550 | 5.4 | 62.5 | 71.7 |
| Example A10-15 | o | 14 | 466 | 5.1 | 63.4 | 74.0 |
| Example A10-16 | p | 20 | 600 | 6.5 | 59.9 | 62.4 |
| Example A10-17 | q | 18 | 579 | 6.1 | 60.8 | 68.1 |
| Example A10-18 | r | 18 | 577 | 6.2 | 61.3 | 71.1 |
| Example A10-19 | s | 20 | 605 | 6.8 | 60.6 | 63.2 |
| Example A10-20 | t | 20 | 603 | 6.7 | 60.4 | 63.5 |
| Example A10-21 | u | 16 | 540 | 5.3 | 62.8 | 72.0 |
| Example A10-22 | v | 14 | 467 | 4.8 | 63.8 | 73.8 |
| Example A10-23 | w | 17 | 560 | 6.5 | 62.0 | 68.2 |
| Example A10-24 | x | 17 | 565 | 6.4 | 60.7 | 71.0 |
| Example A10-25 | y | 19 | 590 | 6.4 | 60.5 | 62.7 |
| Example A10-26 | z | 20 | 608 | 6.7 | 59.7 | 63.4 |
| Example A10-27 | aa | 15 | 530 | 5.4 | 62.4 | 72.9 |
| Example A10-28 | ab | 13 | 461 | 4.8 | 63.7 | 73.1 |
| Example A10-29 | ac | 20 | 607 | 6.7 | 59.5 | 64.5 |
| Example A10-30 | ad | 16 | 540 | 5.3 | 62.1 | 73.4 |
| Example A10-31 | ae | 18 | 592 | 6.2 | 60.7 | 67.5 |
| Example A10-32 | af | 15 | 520 | 5.1 | 62.5 | 70.9 |
| Example A10-33 | ag | 13 | 460 | 4.9 | 63.9 | 76.5 |
| Example A10-34 | ah | 14 | 468 | 5.0 | 63.4 | 75.2 |
| Example A10-35 | ai | 15 | 515 | 5.1 | 61.6 | 72.1 |
| Example A10-36 | aj | 18 | 591 | 6.2 | 60.7 | 70.0 |
| Comparative Example A10-1 | ak | 25 | 730 | 8.5 | 50.2 | 47.0 |
| Comparative Example A10-2 | al | 25 | 722 | 8.3 | 51.1 | 48.0 |
| Comparative Example A10-3 | am | 23 | 694 | 7.7 | 53.4 | 52.3 |
| Comparative Example A10-4 | Not used | 23 | 693 | 7.8 | 54.1 | 52.8 |

The effect of reducing ionic resistance and reaction resistance was obtained also in the case of using the dispersion composition of the present invention for the anode, as in the case of using the dispersion composition of the present invention for the cathode.

Dispersant aqueous solutions wa to xe shown in Table 37 were manufactured by methods described in the following examples.

Example A11-1

(Manufacture of Dispersant Aqueous Solution wa)
0.040 mol of the triazine derivative A was added to 200 g of water. 0.040 mol of sodium hydroxide was added thereto and stirred at 60° C. for 2 hours. After cooling to room temperature, a dispersant aqueous solution wa containing the triazine derivative A and the sodium hydroxide was obtained.

Example A11-2 to A11-20

(Manufacture of Dispersant Aqueous Solutions wb to wt)
Dispersant aqueous solutions wb to wt were obtained by manufacture in the same manner as in Example A11-1, except that a triazine derivative B to a triazine derivative T shown in Example A11-2 to Example A11-20 in Table 37 were added instead of the triazine derivative A in the manufacture of the dispersant wa.

Examples A11-21 to A11-26

(Manufacture of Dispersant Aqueous Solutions wu to wz)
Dispersant aqueous solutions wu to wz were obtained by manufacture in the same manner as in Example A11-2 except that each inorganic base shown in Table 37 was added instead of the sodium hydroxide in the manufacture of the dispersant aqueous solution wb.

Examples A11-27 to A11-31

(Manufacture of Dispersant Aqueous Solutions xa to xe)
Dispersant aqueous solutions xa to xe were obtained by manufacture in the same manner as in Example A11-2 except that an amount of sodium hydroxide added in the manufacture of the dispersant aqueous solution wb was changed to addition amounts which are shown in Examples A11-27 to A11-31 in Table 37.

TABLE 37

| | Dispersant | Triazine derivative | Inorganic base | Molar equivalent of inorganic base with respect to triazine derivative |
|---|---|---|---|---|
| Example A11-1 | wa | Triazine derivative A | NaOH | 1.0 |
| Example A11-2 | wb | Triazine derivative B | NaOH | 1.0 |
| Example A11-3 | wc | Triazine derivative C | NaOH | 1.0 |
| Example A11-4 | wd | Triazine derivative D | NaOH | 1.0 |
| Example A11-5 | we | Triazine derivative E | NaOH | 1.0 |
| Example A11-6 | wf | Triazine derivative F | NaOH | 1.0 |
| Example A11-7 | wg | Triazine derivative G | NaOH | 1.0 |
| Example A11-8 | wh | Triazine derivative H | NaOH | 1.0 |
| Example A11-9 | wi | Triazine derivative I | NaOH | 1.0 |
| Example A11-10 | wj | Triazine derivative J | NaOH | 1.0 |
| Example A11-11 | wk | Triazine derivative K | NaOH | 1.0 |
| Example A11-12 | wl | Triazine derivative L | NaOH | 1.0 |
| Example A11-13 | wm | Triazine derivative M | NaOH | 1.0 |
| Example A11-14 | wn | Triazine derivative N | NaOH | 1.0 |
| Example A11-15 | wo | Triazine derivative O | NaOH | 1.0 |
| Example A11-16 | wp | Triazine derivative P | NaOH | 1.0 |
| Example A11-17 | wq | Triazine derivative Q | NaOH | 1.0 |
| Example A11-18 | wr | Triazine derivative R | NaOH | 1.0 |
| Example A11-19 | ws | Triazine derivative S | NaOH | 1.0 |
| Example A11-20 | wt | Triazine derivative T | NaOH | 1.0 |
| Example A11-21 | wu | Triazine derivative B | NaOH | 1.0 |
| Example A11-22 | wv | Triazine derivative B | NaOH | 1.0 |
| Example A11-23 | ww | Triazine derivative B | NaOH | 1.0 |
| Example A11-24 | wx | Triazine derivative B | NaOH | 1.0 |
| Example A11-25 | wy | Triazine derivative B | NaOH | 1.0 |
| Example A11-26 | wz | Triazine derivative B | NaOH | 1.0 |
| Example A11-27 | xa | Triazine derivative B | NaOH | 0.1 |
| Example A11-28 | xb | Triazine derivative B | NaOH | 0.3 |
| Example A11-29 | xc | Triazine derivative B | NaOH | 0.5 |
| Example A11-30 | xd | Triazine derivative B | NaOH | 2.0 |
| Example A11-31 | xe | Triazine derivative B | NaOH | 5.0 |

Dispersants xf to xh shown in Table 38 were manufactured by methods described in the following comparative examples.

Comparative Examples A11-1 to A11-3

(Manufacture of Dispersants xf to xh)

Dispersants xf to xh were obtained by manufacture in the same manner as in Example A11-1, except that the triazine derivative U to the triazine derivative W shown in Comparative Example A11-1 to Comparative Example A11-3 in Table 38 were added instead of the triazine derivative A in the manufacture of the dispersant wa.

TABLE 38

| | Dispersant | Triazine derivative | Inorganic base | Molar equivalent of inorganic base with respect to triazine derivative |
|---|---|---|---|---|
| Comparative Example A11-1 | xf | Triazine derivative U | NaOH | 1.0 |
| Comparative Example A11-2 | xg | Triazine derivative V | NaOH | 1.0 |
| Comparative Example A11-3 | xh | Triazine derivative W | NaOH | 1.0 |

Example A12-1

<Preparation of Carbon Material Dispersion Liquid>

According to the composition shown in Table 39, water and the dispersant aqueous solution wa were added to a glass bottle and mixed. Thereafter, a carbon material was added thereto and dispersed with a paint conditioner for 2 hours using zirconia beads as media. Thereby, a carbon material dispersion liquid was obtained. At this time, an amount of dispersant aqueous solution added was determined with a total amount of triazine derivative A and NaOH as the active ingredient, such that a proportion of the active ingredient in a total amount of carbon material dispersion liquid was as in the composition shown in Table 39. In addition, water contained in the dispersant aqueous solution was used as the solvent for the carbon material dispersion liquid as it was, with more being added to make up any shortage.

<Preparation of Carbon Material Dispersion Varnish>

According to the composition shown in Table 40, the prepared carbon material dispersion liquid, a binder, and water were mixed with a disper. Thereby, a carbon material dispersion varnish was obtained.

<Preparation of Mixture Paste>

According to the composition shown in Table 41, the prepared carbon material dispersion varnish, an active material, and water were mixed with a disper. Thereby, a cathode mixture paste was obtained.

<Production of Electrode>

<Assembly of Cell for Evaluation Cathode of Lithium Ion Secondary Battery>

A cell for cathode evaluation was assembled by producing an electrode in the same manner as in Example A2-1 except that the cathode mixture paste containing the dispersant aqueous solution wa was used instead of the cathode mixture paste containing the dispersant a in Example A2-1.

Examples A12-2 to A12-31

A cell for cathode evaluation was assembled by dispersion in the same manner as in Example A12-1 except that the dispersants wb to xe shown in Table 39 were used instead of the dispersant wa.

TABLE 39

| | Composition of carbon material dispersion liquid | | | | | |
|---|---|---|---|---|---|---|
| | Dispersant aqueous solution | | Carbon material | | Solvent | |
| | Type | Content of active ingredient (%) | Type | Content (%) | Type | Content (%) containing dispersant aqueous |
| Example A12-1 | wa | 1.0 | HS100 | 10.0 | Water | 89.0 |
| Example A12-2 | wb | 1.0 | HS100 | 10.0 | Water | 89.0 |
| Example A12-3 | wc | 1.0 | HS100 | 10.0 | Water | 89.0 |

TABLE 39-continued

| | Composition of carbon material dispersion liquid | | | | | |
|---|---|---|---|---|---|---|
| | Dispersant aqueous solution | | Carbon material | | Solvent | Content (%) containing |
| | Type | Content of active ingredient (%) | Type | Content (%) | Type | dispersant aqueous |
| Example A12-4 | wd | 1.0 | HS100 | 10.0 | Water | 89.0 |
| Example A12-5 | we | 1.0 | HS100 | 10.0 | Water | 89.0 |
| Example A12-6 | wf | 1.0 | HS100 | 10.0 | Water | 89.0 |
| Example A12-7 | wg | 1.0 | HS100 | 10.0 | Water | 89.0 |
| Example A12-8 | wh | 1.0 | HS100 | 10.0 | Water | 89.0 |
| Example A12-9 | wi | 1.0 | HS100 | 10.0 | Water | 89.0 |
| Example A12-10 | wj | 1.0 | HS 100 | 10.0 | Water | 89.0 |
| Example A12-11 | wk | 1.0 | HS 100 | 10.0 | Water | 89.0 |
| Example A12-12 | wl | 1.0 | HS 100 | 10.0 | Water | 89.0 |
| Example A12-13 | wm | 1.0 | HS 100 | 10.0 | Water | 89.0 |
| Example A12-14 | wn | 1.0 | HS 100 | 10.0 | Water | 89.0 |
| Example A12-15 | wo | 1.0 | HS 100 | 10.0 | Water | 89.0 |
| Example A12-16 | wp | 1.0 | HS 100 | 10.0 | Water | 89.0 |
| Example A12-17 | wq | 1.0 | HS 100 | 10.0 | Water | 89.0 |
| Example A12-18 | wr | 1.0 | HS 100 | 10.0 | Water | 89.0 |
| Example A12-19 | ws | 1.0 | HS 100 | 10.0 | Water | 89.0 |
| Example A12-20 | wt | 1.0 | HS 100 | 10.0 | Water | 89.0 |
| Example A12-21 | wu | 1.0 | HS 100 | 10.0 | Water | 89.0 |
| Example A12-22 | wv | 1.0 | HS 100 | 10.0 | Water | 89.0 |
| Example A12-23 | ww | 1.0 | HS 100 | 10.0 | Water | 89.0 |
| Example A12-24 | wx | 1.0 | HS 100 | 10.0 | Water | 89.0 |
| Example A12-25 | wy | 1.0 | HS 100 | 10.0 | Water | 89.0 |
| Example A12-26 | wz | 1.0 | HS 100 | 10.0 | Water | 89.0 |
| Example A12-27 | xa | 1.0 | HS 100 | 10.0 | Water | 89.0 |
| Example A12-28 | xb | 1.0 | HS 100 | 10.0 | Water | 89.0 |
| Example A12-29 | xc | 1.0 | HS 100 | 10.0 | Water | 89.0 |
| Example A12-30 | xd | 1.0 | HS 100 | 10.0 | Water | 89.0 |
| Example A12-31 | xe | 1.0 | HS 100 | 10.0 | Water | 89.0 |

TABLE 40

| | Composition of carbon material dispersion varnish | | | | | | | | | |
|---|---|---|---|---|---|---|---|---|---|---|
| | Dispersant | | Carbon material | | Binder 1 | | Binder 2 | | Solvent | |
| | Type | Content (%) | Type | Content (%) | Type | Content (%) | Type | Content (%) | Type | Content (%) |
| Example A12-1 | wa | 0.6 | HS100 | 6.0 | PTFE | 3.0 | CMC | 1.2 | Water | 90.4 |
| Example A12-2 | wb | 0.6 | HS100 | 6.0 | PTFE | 3.0 | CMC | 1.2 | Water | 90.4 |
| Example A12-3 | wc | 0.6 | HS100 | 6.0 | PTFE | 3.0 | CMC | 1.2 | Water | 90.4 |
| Example A12-4 | wd | 0.6 | HS100 | 6.0 | PTFE | 3.0 | CMC | 1.2 | Water | 90.4 |
| Example A12-5 | we | 0.6 | HS100 | 6.0 | PTFE | 3.0 | CMC | 1.2 | Water | 90.4 |
| Example A12-6 | wf | 0.6 | HS100 | 6.0 | PTFE | 3.0 | CMC | 1.2 | Water | 90.4 |
| Example A12-7 | wg | 0.6 | HS100 | 6.0 | PTFE | 3.0 | CMC | 1.2 | Water | 90.4 |
| Example A12-8 | wh | 0.6 | HS100 | 6.0 | PTFE | 3.0 | CMC | 1.2 | Water | 90.4 |
| Example A12-9 | wi | 0.6 | HS100 | 6.0 | PTFE | 3.0 | CMC | 1.2 | Water | 90.4 |
| Example A12-10 | wj | 0.6 | HS100 | 6.0 | PTFE | 3.0 | CMC | 1.2 | Water | 90.4 |
| Example A12-11 | wk | 0.6 | HS100 | 6.0 | PTFE | 3.0 | CMC | 1.2 | Water | 90.4 |
| Example A12-12 | wl | 0.6 | HS100 | 6.0 | PTFE | 3.0 | CMC | 1.2 | Water | 90.4 |
| Example A12-13 | wm | 0.6 | HS100 | 6.0 | PTFE | 3.0 | CMC | 1.2 | Water | 90.4 |
| Example A12-14 | wn | 0.6 | HS100 | 6.0 | PTFE | 3.0 | CMC | 1.2 | Water | 90.4 |
| Example A12-15 | wo | 0.6 | HS100 | 6.0 | PTFE | 3.0 | CMC | 1.2 | Water | 90.4 |
| Example A12-16 | wp | 0.6 | HS100 | 6.0 | PTFE | 3.0 | CMC | 1.2 | Water | 90.4 |
| Example A12-17 | wq | 0.6 | HS100 | 6.0 | PTFE | 3.0 | CMC | 1.2 | Water | 90.4 |
| Example A12-18 | wr | 0.6 | HS100 | 6.0 | PTFE | 3.0 | CMC | 1.2 | Water | 90.4 |
| Example A12-19 | ws | 0.6 | HS100 | 6.0 | PTFE | 3.0 | CMC | 1.2 | Water | 90.4 |
| Example A12-20 | wt | 0.6 | HS100 | 6.0 | PTFE | 3.0 | CMC | 1.2 | Water | 90.4 |

TABLE 40-continued

Composition of carbon material dispersion varnish

| | Dispersant | | Carbon material | | Binder 1 | | Binder 2 | | Solvent | |
|---|---|---|---|---|---|---|---|---|---|---|
| | Type | Content (%) | Type | Content (%) | Type | Content (%) | Type | Content (%) | Type | Content (%) |
| Example A12-21 | wu | 0.6 | HS100 | 6.0 | PTFE | 3.0 | CMC | 1.2 | Water | 90.4 |
| Example A12-22 | wv | 0.6 | HS100 | 6.0 | PTFE | 3.0 | CMC | 1.2 | Water | 90.4 |
| Example A12-23 | ww | 0.6 | HS100 | 6.0 | PTFE | 3.0 | CMC | 1.2 | Water | 90.4 |
| Example A12-24 | wx | 0.6 | HS100 | 6.0 | PTFE | 3.0 | CMC | 1.2 | Water | 90.4 |
| Example A12-25 | wy | 0.6 | HS100 | 6.0 | PTFE | 3.0 | CMC | 1.2 | Water | 90.4 |
| Example A12-26 | wz | 0.6 | HS100 | 6.0 | PTFE | 3.0 | CMC | 1.2 | Water | 90.4 |
| Example A12-27 | xa | 0.6 | HS100 | 6.0 | PTFE | 3.0 | CMC | 1.2 | Water | 90.4 |
| Example A12-28 | xb | 0.6 | HS100 | 6.0 | PTFE | 3.0 | CMC | 1.2 | Water | 90.4 |
| Example A12-29 | xc | 0.6 | HS100 | 6.0 | PTFE | 3.0 | CMC | 1.2 | Water | 90.4 |
| Example A12-30 | xd | 0.6 | HS100 | 6.0 | PTFE | 3.0 | CMC | 1.2 | Water | 90.4 |
| Example A12-31 | xe | 0.6 | HS100 | 6.0 | PTFE | 3.0 | CMC | 1.2 | Water | 90.4 |

TABLE 41

Composition of cathode mixture paste

| | Dispersant | | Carbon material | | Binder 1 | | Binder 2 | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Example A12-1 | wa | 0.2 | HS100 | 2.0 | PTFE | 1.0 | CMC | 0.4 | LFP | 54.0 | Water | 42.4 |
| Example A12-2 | wb | 0.2 | HS100 | 2.0 | PTFE | 1.0 | CMC | 0.4 | LFP | 54.0 | Water | 42.4 |
| Example A12-3 | wc | 0.2 | HS100 | 2.0 | PTFE | 1.0 | CMC | 0.4 | LFP | 54.0 | Water | 42.4 |
| Example A12-4 | wd | 0.2 | HS100 | 2.0 | PTFE | 1.0 | CMC | 0.4 | LFP | 54.0 | Water | 42.4 |
| Example A12-5 | we | 0.2 | HS100 | 2.0 | PTFE | 1.0 | CMC | 0.4 | LFP | 54.0 | Water | 42.4 |
| Example A12-6 | wf | 0.2 | HS100 | 2.0 | PTFE | 1.0 | CMC | 0.4 | LFP | 54.0 | Water | 42.4 |
| Example A12-7 | wg | 0.2 | HS100 | 2.0 | PTFE | 1.0 | CMC | 0.4 | LFP | 54.0 | Water | 42.4 |
| Example A12-8 | wh | 0.2 | HS100 | 2.0 | PTFE | 1.0 | CMC | 0.4 | LFP | 54.0 | Water | 42.4 |
| Example A12-9 | wi | 0.2 | HS100 | 2.0 | PTFE | 1.0 | CMC | 0.4 | LFP | 54.0 | Water | 42.4 |
| Example A12-10 | wj | 0.2 | HS100 | 2.0 | PTFE | 1.0 | CMC | 0.4 | LFP | 54.0 | Water | 42.4 |
| Example A12-11 | wk | 0.2 | HS100 | 2.0 | PTFE | 1.0 | CMC | 0.4 | LFP | 54.0 | Water | 42.4 |
| Example A12-12 | wl | 0.2 | HS100 | 2.0 | PTFE | 1.0 | CMC | 0.4 | LFP | 54.0 | Water | 42.4 |
| Example A12-13 | wm | 0.2 | HS100 | 2.0 | PTFE | 1.0 | CMC | 0.4 | LFP | 54.0 | Water | 42.4 |
| Example A12-14 | wn | 0.2 | HS100 | 2.0 | PTFE | 1.0 | CMC | 0.4 | LFP | 54.0 | Water | 42.4 |
| Example A12-15 | wo | 0.2 | HS100 | 2.0 | PTFE | 1.0 | CMC | 0.4 | LFP | 54.0 | Water | 42.4 |
| Example A12-16 | wp | 0.2 | HS100 | 2.0 | PTFE | 1.0 | CMC | 0.4 | LFP | 54.0 | Water | 42.4 |
| Example A12-17 | wq | 0.2 | HS100 | 2.0 | PTFE | 1.0 | CMC | 0.4 | LFP | 54.0 | Water | 42.4 |
| Example A12-18 | wr | 0.2 | HS100 | 2.0 | PTFE | 1.0 | CMC | 0.4 | LFP | 54.0 | Water | 42.4 |
| Example A12-19 | ws | 0.2 | HS100 | 2.0 | PTFE | 1.0 | CMC | 0.4 | LFP | 54.0 | Water | 42.4 |
| Example A12-20 | wt | 0.2 | HS100 | 2.0 | PTFE | 1.0 | CMC | 0.4 | LFP | 54.0 | Water | 42.4 |
| Example A12-21 | wu | 0.2 | HS100 | 2.0 | PTFE | 1.0 | CMC | 0.4 | LFP | 54.0 | Water | 42.4 |
| Example A12-22 | wv | 0.2 | HS100 | 2.0 | PTFE | 1.0 | CMC | 0.4 | LFP | 54.0 | Water | 42.4 |
| Example A12-23 | ww | 0.2 | HS100 | 2.0 | PTFE | 1.0 | CMC | 0.4 | LFP | 54.0 | Water | 42.4 |
| Example A12-24 | wx | 0.2 | HS100 | 2.0 | PTFE | 1.0 | CMC | 0.4 | LFP | 54.0 | Water | 42.4 |
| Example A12-25 | wy | 0.2 | HS100 | 2.0 | PTFE | 1.0 | CMC | 0.4 | LFP | 54.0 | Water | 42.4 |
| Example A12-26 | wz | 0.2 | HS100 | 2.0 | PTFE | 1.0 | CMC | 0.4 | LFP | 54.0 | Water | 42.4 |
| Example A12-27 | xa | 0.2 | HS100 | 2.0 | PTFE | 1.0 | CMC | 0.4 | LFP | 54.0 | Water | 42.4 |
| Example A12-28 | xb | 0.2 | HS100 | 2.0 | PTFE | 1-0 | CMC | 0.4 | LFP | 54.0 | Water | 42.4 |
| Example A12-29 | xc | 0.2 | HS100 | 2.0 | PTFE | 1.0 | CMC | 0.4 | LFP | 54.0 | Water | 42.4 |
| Example A12-30 | xd | 0.2 | HS100 | 2.0 | PTFE | 1.0 | CMC | 0.4 | LFP | 54.0 | Water | 42.4 |
| Example A12-31 | xe | 0.2 | HS100 | 2.0 | PTFE | 1.0 | CMC | 0.4 | LFP | 54.0 | Water | 42.4 |

Comparative Examples A12-1 to A12-4

According to materials and compositions of the carbon material dispersion liquid shown in Table 42, the carbon material dispersion varnish shown in Table 43, and the cathode mixture paste shown in Table 44, dispersion was performed in the same manner as in Example A12-2, and thereby a cell for cathode evaluation was assembled. In Comparative Example A12-4, a dispersant was not used.

TABLE 42

Composition of carbon material dispersion liquid

| | Dispersant | | | | Solvent | |
|---|---|---|---|---|---|---|
| | aqueous solution | | Carbon material | | | Content (%) containing dispersant aqueous solution |
| | Type | Content of active ingredient (%) | Type | Content (%) | Type | |
| Comparative Example A12-1 | xf | 1.0 | HS100 | 10.0 | Water | 89.0 |
| Comparative Example A12-2 | xg | 1.0 | HS100 | 10.0 | Water | 89.0 |
| Comparative Example A12-3 | xh | 1.0 | HS100 | 10.0 | Water | 89.0 |
| Comparative Example A12-4 | Not used | 0 | HS100 | 10.0 | Water | 90.0 |

TABLE 43

Composition of carbon material dispersion varnish

| | Dispersant | | Carbon material | | Binder 1 | | Binder 2 | | Solvent | |
|---|---|---|---|---|---|---|---|---|---|---|
| | Type | Content (%) | Type | Content (%) | Type | Content (%) | Type | Content (%) | Type | Content (%) |
| Comparative Example A12-1 | xf | 0.6 | HS100 | 6.0 | PTFE | 3.0 | CMC | 1.2 | Water | 90.4 |
| Comparative Example A12-2 | xg | 0.6 | HS100 | 6.0 | PTFE | 3.0 | CMC | 1.2 | Water | 90.4 |
| Comparative Example A12-3 | xh | 0.6 | HS100 | 6.0 | PTFE | 3.0 | CMC | 1.2 | Water | 90.4 |
| Comparative Example A12-4 | Not used | 0 | HS100 | 6.0 | PTFE | 3.0 | CMC | 1.2 | Water | 91.0 |

TABLE 44

Composition of cathode mixture paste

| | Dispersant | | Carbon material | | Binder 1 | | Binder 2 | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Comparative Example A12-1 | xf | 0.2 | HS100 | 2.0 | PTFE | 1.0 | CMC | 0.4 | LFP | 54.0 | Water | 42.4 |
| Comparative Example A12-2 | xg | 0.2 | HS100 | 2.0 | PTFE | 1.0 | CMC | 0.4 | LFP | 54.0 | Water | 42.4 |
| Comparative Example A12-3 | xh | 0.2 | HS100 | 2.0 | PTFE | 1.0 | CMC | 0.4 | LFP | 54.0 | Water | 42.4 |
| Comparative Example A12-4 | Not used | 0 | HS100 | 2.0 | PTFE | 1.0 | CMC | 0.4 | LFP | 54.0 | Water | 42.6 |

<Evaluation Results>

All of the carbon material dispersion liquids, carbon material dispersion varnishes, and cathode mixture pastes prepared in Examples A12-1 to A12-31 were in a favorably dispersed state, and sedimentation or thickening did not occur even after the elapse of one month. Regarding the carbon material dispersion liquids, carbon material dispersion varnishes, and cathode mixture pastes of Comparative Examples A12-1 to A12-4, a viscosity was high and there were many coarse particles from the initial stage, but they were used as themselves for comparison. After the elapse of one month, the dispersed material had gelled.

Because the triazine derivatives A to T have two hydroxyl groups and an acidic functional group which are directly attached to the triazine ring, they were thought to have sufficiently high hydrophilicity and excellent dispersibility. On the other hand, as compared to the above triazine derivatives, the triazine derivatives U to W were poorly dispersible in water because of their insufficient hydrophilicity.

Using the cells for cathode evaluation of Examples A12-1 to A12-31 and Comparative Examples A12-1 to A12-4, and using the same method as Example A2-1, ionic resistance, reaction resistance, room temperature rate characteristic, low-temperature discharge characteristic were evaluated. The results are shown in Table 45.

TABLE 45

| Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|
| Example A12-1 | wa | 10 | 418 | 6.3 | 71.5 | 79.2 |
| Example A12-2 | wb | 10 | 416 | 6.1 | 72.0 | 80.1 |

TABLE 45-continued

| | Dispersant Type | $|Z|_{ion}$ at 25° C. [Ω] | $|Z|_{ion}$ at -20° C. [Ω] | $|Z|_{re}$ at 25° C. [Ω] | Room temperature rate characteristic [%] | Low-temperature discharge characteristic [%] |
|---|---|---|---|---|---|---|
| Example A12-3 | wc | 10 | 418 | 6.2 | 71.3 | 79.5 |
| Example A12-4 | wd | 14 | 491 | 8.5 | 62.1 | 63.4 |
| Example A12-5 | we | 14 | 488 | 8.3 | 61.8 | 63.5 |
| Example A12-6 | wf | 13 | 469 | 7.6 | 65.6 | 75.1 |
| Example A12-7 | wg | 13 | 451 | 7.2 | 66.7 | 74.6 |
| Example A12-8 | wh | 11 | 426 | 6.8 | 68.9 | 77.5 |
| Example A12-9 | wi | 13 | 457 | 7.6 | 65.1 | 73.8 |
| Example A12-10 | wj | 11 | 432 | 6.5 | 68.7 | 77.0 |
| Example A12-11 | wk | 13 | 463 | 7.1 | 64.9 | 74.7 |
| Example A12-12 | wl | 13 | 458 | 7.5 | 65.3 | 75.2 |
| Example A12-13 | wm | 13 | 467 | 7.3 | 65.7 | 74.9 |
| Example A12-14 | wn | 11 | 438 | 6.7 | 68.3 | 76.5 |
| Example A12-15 | wo | 10 | 420 | 6.2 | 71.0 | 79.0 |
| Example A12-16 | wp | 14 | 474 | 8.1 | 63.1 | 64.7 |
| Example A12-17 | wq | 13 | 449 | 7.5 | 64.7 | 76.0 |
| Example A12-18 | wr | 13 | 456 | 7.2 | 64.2 | 75.1 |
| Example A12-19 | ws | 14 | 483 | 7.9 | 62.9 | 66.0 |
| Example A12-20 | wt | 14 | 478 | 7.7 | 63.4 | 65.8 |
| Example A12-21 | wu | 11 | 433 | 6.9 | 67.6 | 76.9 |
| Example A12-22 | wv | 10 | 420 | 6.3 | 70.5 | 78.8 |
| Example A12-23 | ww | 12 | 461 | 7.5 | 66.3 | 74.8 |
| Example A12-24 | wx | 12 | 455 | 7.3 | 65.4 | 73.3 |
| Example A12-25 | wy | 14 | 485 | 7.6 | 63.3 | 71.0 |
| Example A12-26 | wz | 14 | 480 | 7.7 | 64.1 | 69.4 |
| Example A12-27 | xa | 11 | 431 | 6.7 | 68.2 | 76.8 |
| Example A12-28 | xb | 10 | 420 | 6.3 | 70.3 | 78.7 |
| Example A12-29 | xc | 14 | 476 | 8.0 | 64.8 | 69.2 |
| Example A12-30 | xd | 11 | 425 | 6.6 | 68.3 | 77.0 |
| Example A12-31 | xe | 11 | 427 | 6.8 | 68.1 | 76.9 |
| Comparative Example A12-1 | xf | 18 | 640 | 12.0 | 53.4 | 55.2 |
| Comparative Example A12-2 | xg | 17 | 632 | 11.8 | 54.0 | 55.6 |
| Comparative Example A12-3 | xh | 16 | 625 | 11.5 | 54.8 | 56.1 |
| Comparative Example A12-4 | Not used | 16 | 623 | 11.4 | 55.1 | 56.3 |

Examples A12-1 to A12-31 were excellent regarding all characteristics, and it was confirmed that the same effects were obtained even in a case where an amine was an inorganic base and a solvent was water.

Second Example Group

In Second Example Group, among the triazine derivatives represented by General Formula (1), a triazine derivative in which $R^1$ is a phenyl group having a substituent containing at least —NHC(=O)—, a benzimidazole group, an indole group which may have a substituent, or a pyrazole group which may have a substituent will be described.

<Dispersant>

Structures of the triazine derivatives A to Y represented by General Formula (1) of the present invention are shown below. A method for manufacturing the triazine derivatives A to Y represented by General Formula (1) used in the present invention is not particularly limited, and a well-known method can be applied. For example, a method described in JP2004-217842A can be applied. The disclosure by the above publication is partially incorporated in the present specification by reference.

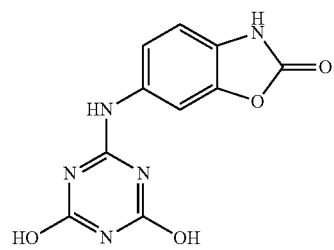

A

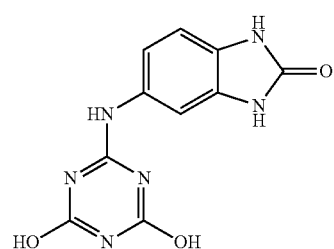

B

| | |
|---|---|
| -continued | -continued |
| 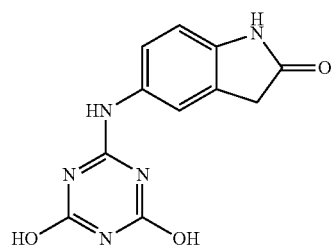 C | 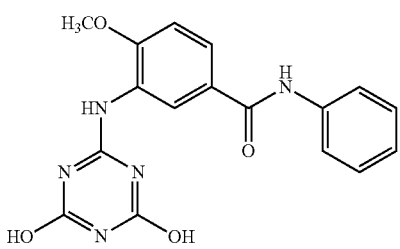 I |
| 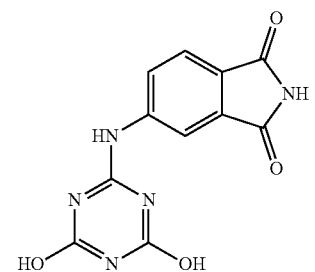 D | 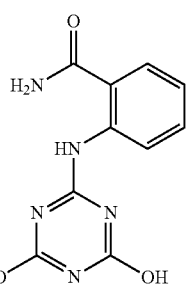 J |
| 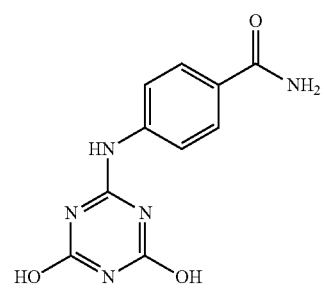 E | 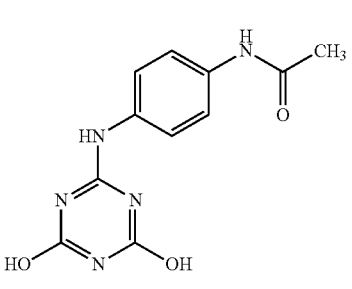 K |
| 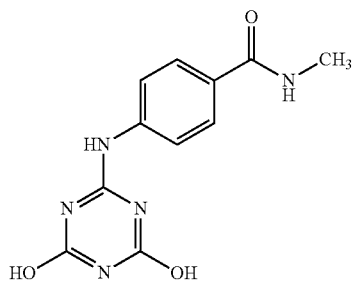 F | 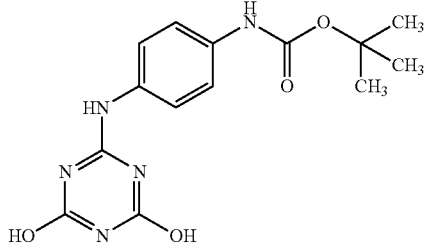 L |
| 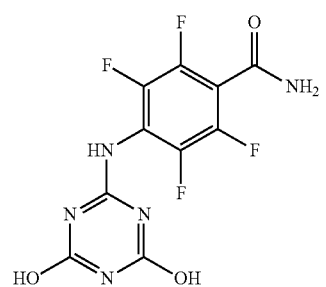 G | 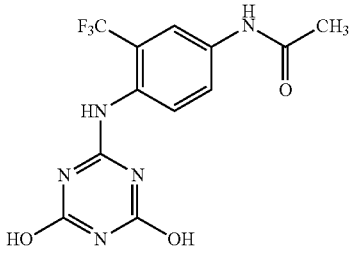 M |
| 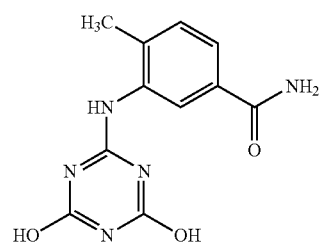 H | 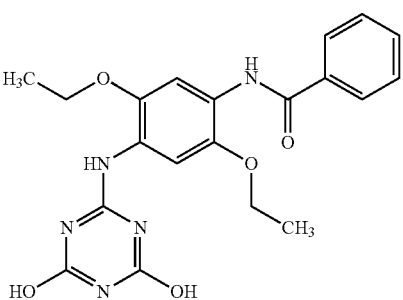 N |

| | |
|---|---|
| 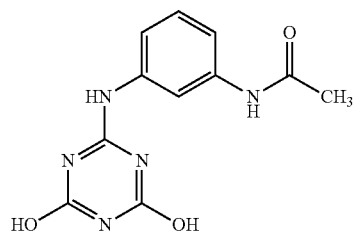 O | 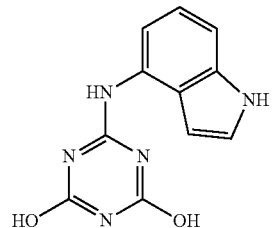 T |
| 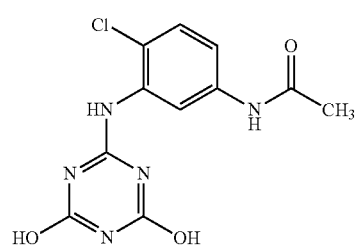 P | 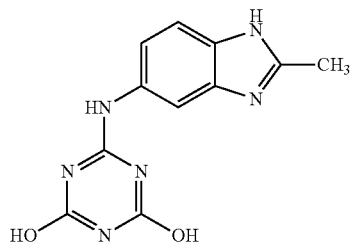 U |
| 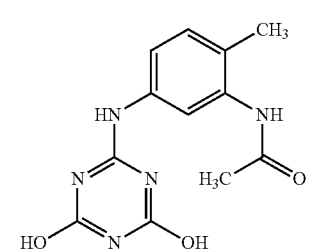 Q | 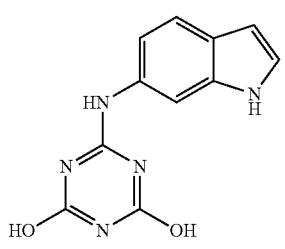 V |
| 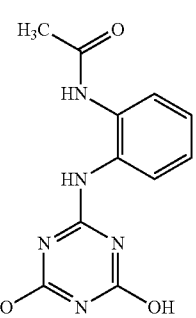 R | 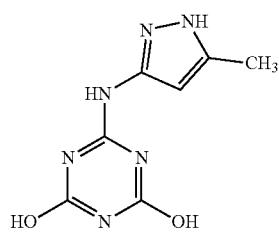 W |
| | 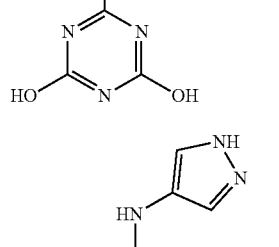 X |
| 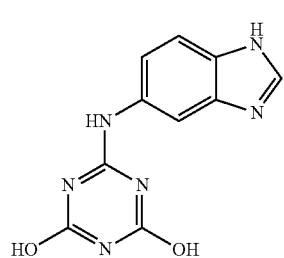 S | 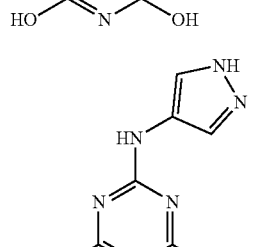 Y |

<Method for Manufacturing Dispersant Composed of Triazine Derivative and Amine>

Dispersants a to ao shown in Table 46 were manufactured by methods described in the following examples.

TABLE 46

| | Dispersant | Triazine derivative | Amine | Molar equivalent of amine with respect to triazine derivative |
|---|---|---|---|---|
| Example B1-1 | a | Triazine derivative A | Octylamine | 1.0 |
| Example B1-2 | b | Triazine derivative B | Octylamine | 1.0 |
| Example B1-3 | c | Triazine derivative C | Octylamine | 1.0 |
| Example B1-4 | d | Triazine derivative D | Octylamine | 1.0 |
| Example B1-5 | e | Triazine derivative E | Octylamine | 1.0 |
| Example B1-6 | f | Triazine derivative F | Octylamine | 1.0 |
| Example B1-7 | g | Triazine derivative G | Octylamine | 1.0 |
| Example B1-8 | h | Triazine derivative H | Octylamine | 1.0 |
| Example B1-9 | i | Triazine derivative I | Octylamine | 1.0 |
| Example B1-10 | j | Triazine derivative J | Octylamine | 1.0 |
| Example B1-11 | k | Triazine derivative K | Octylamine | 1.0 |
| Example B1-12 | l | Triazine derivative L | Octylamine | 1.0 |
| Example B1-13 | m | Triazine derivative M | Octylamine | 1.0 |
| Example B1-14 | n | Triazine derivative N | Octylamine | 1.0 |
| Example B1-15 | o | Triazine derivative O | Octylamine | 1.0 |
| Example B1-16 | p | Triazine derivative P | Octylamine | 1.0 |
| Example B1-17 | q | Triazine derivative Q | Octylamine | 1.0 |
| Example B1-18 | r | Triazine derivative R | Octylamine | 1.0 |
| Example B1-19 | s | Triazine derivative S | Octylamine | 1.0 |
| Example B1-20 | t | Triazine derivative T | Octylamine | 1.0 |
| Example B1-21 | u | Triazine derivative U | Octylamine | 1.0 |
| Example B1-22 | v | Triazine derivative V | Octylamine | 1.0 |
| Example B1-23 | w | Triazine derivative W | Octylamine | 1.0 |
| Example B1-24 | x | Triazine derivative X | Octylamine | 1.0 |
| Example B1-25 | y | Triazine derivative Y | Octylamine | 1.0 |
| Example B1-26 | z | Triazine derivative B | Propylamine | 1.0 |
| Example B1-27 | aa | Triazine derivative B | Stearylamine | 1.0 |
| Example B1-28 | ab | Triazine derivative B | 2-Aminoethanol | 1.0 |
| Example B1-29 | ac | Triazine derivative B | Dibutylamine | 1.0 |
| Example B1-30 | ad | Triazine derivative B | Dioctylamine | 1.0 |
| Example B1-31 | ae | Triazine derivative B | Distearylamine | 1.0 |
| Example B1-32 | af | Triazine derivative B | Triethylamine | 1.0 |
| Example B1-33 | ag | Triazine derivative B | Dimethyloctylamine | 1.0 |
| Example B1-34 | ah | Triazine derivative B | Trioctylamine | 1.0 |
| Example B1-35 | ai | Triazine derivative B | Dimethylstearylamine | 1.0 |
| Example B1-36 | aj | Triazine derivative B | Triethanolamine | 1.0 |
| Example B1-37 | ak | Triazine derivative B | Octylamine | 0.1 |
| Example B1-38 | al | Triazine derivative B | Octylamine | 0.3 |
| Example B1-39 | am | Triazine derivative B | Octylamine | 0.5 |
| Example B1-40 | an | Triazine derivative B | Octylamine | 2.0 |
| Example B1-41 | ao | Triazine derivative B | Octylamine | 5.0 |

Example B1-1

(Manufacture of Dispersant a)

0.040 mol of the triazine derivative A was added to 200 g of water. 0.040 mol of octylamine was added thereto and stirred at 60° C. for 2 hours. After cooling to room temperature, filtration and purification were performed. The obtained residue was dried at 90° C. for 48 hours, and thereby a dispersant a was obtained.

Examples B1-2 to B1-25

(Manufacture of Dispersants b to y)

Dispersants b to y were obtained by manufacture in the same manner as in Example B1-1, except that triazine derivatives B to Y shown in Examples B1-2 to B1-25 in Table 46 were added instead of the triazine derivative A in the manufacture of the dispersant a.

Examples B1-26 to B1-36

(Manufacture of Dispersants z to aj)

Dispersants z to aj were obtained by manufacture in the same manner as in Example B1-2 except that amines shown in Examples B1-26 to B1-36 in Table 46 were added instead of octylamine in the manufacture of the dispersant b.

Examples B1-37 to B1-41

(Manufacture of Dispersants ak to ao)

Dispersants ak to ao were obtained by manufacture in the same manner as in Example B1-2 except that an amount of octylamine added in the manufacture of the dispersant b was changed to addition amounts which are shown in Examples B1-37 to B1-41 in Table 46.

Structures of triazine derivatives AA to AC used in comparative examples are shown below. A method for manufacturing the triazine derivatives AA to AC used in the comparative examples is not particularly limited, and a well-known method can be applied. For example, a method described in JP2004-217842A can be applied. The disclosure by the above publication is partially incorporated in the present specification by reference.

AA
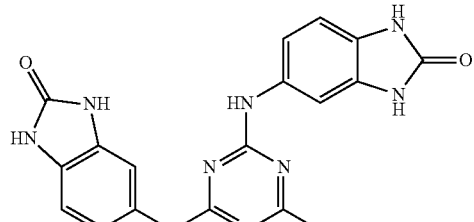

AB
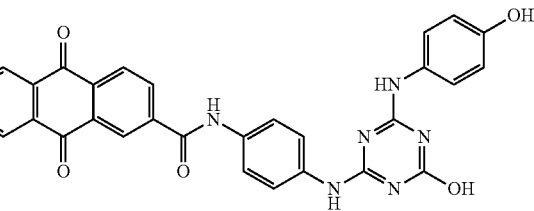

AC
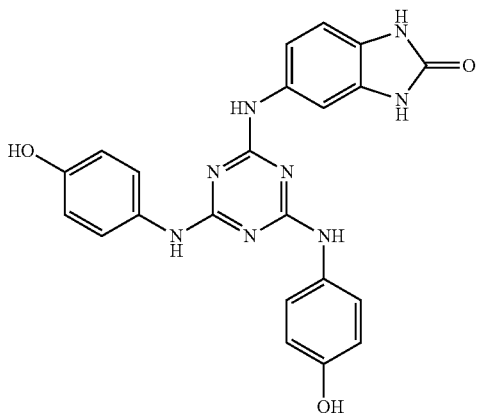

Dispersants ba to bc shown in Table 47 were manufactured by methods described in the following comparative examples.

TABLE 47

| Dispersant | | Triazine derivative Amine | Amine | Molar equivalent of amine with respect to triazine derivative |
|---|---|---|---|---|
| Example B1-1 | ba | Triazine derivative AA | Octylamine | 1.0 |
| Example B1-2 | bb | Triazine derivative AB | Octylamine | 1.0 |

TABLE 47-continued

| Dispersant | | Triazine derivative Amine | Amine | Molar equivalent of amine with respect to triazine derivative |
|---|---|---|---|---|
| Example B1-3 | bc | Triazine derivative AC | Octylamine | 1.0 |

Comparative Examples B1-1 to B1-3

(Manufacture of Dispersants ba to bc)

Dispersants ba to bc were obtained by manufacture in the same manner as in Example B1-1, except that the triazine derivatives AA to AC shown in Comparative Examples B1-1 to B1-3 in Table 47 were added instead of the triazine derivative A in the manufacture of the dispersant a.

<Method for Manufacturing Dispersant Composed of Triazine Derivative and Inorganic Base>

Dispersants ca to di shown in Table 48 were manufactured by methods described in the following examples.

TABLE 48

| | Dispersant | Triazine derivative | Inorganic base | Molar equivalent of inorganic base with respect to triazine derivative |
|---|---|---|---|---|
| Example B2-1 | ca | Triazine derivative A | NaOH | 0.5 |
| Example B2-2 | cb | Triazine derivative B | NaOH | 0.5 |
| Example B2-3 | cc | Triazine derivative C | NaOH | 0.5 |
| Example B2-4 | cd | Triazine derivative D | NaOH | 0.5 |
| Example B2-5 | ce | Triazine derivative E | NaOH | 0.5 |
| Example B2-6 | cf | Triazine derivative F | NaOH | 0.5 |
| Example B2-7 | cg | Triazine derivative G | NaOH | 0.5 |
| Example B2-8 | ch | Triazine derivative H | NaOH | 0.5 |
| Example B2-9 | ci | Triazine derivative I | NaOH | 0.5 |
| Example B2-10 | cj | Triazine derivative J | NaOH | 0.5 |
| Example B2-11 | ck | Triazine derivative K | NaOH | 0.5 |
| Example B2-12 | cl | Triazine derivative L | NaOH | 0.5 |
| Example B2-13 | cm | Triazine derivative M | NaOH | 0.5 |
| Example B2-14 | cn | Triazine derivative N | NaOH | 0.5 |
| Example B2-15 | co | Triazine derivative O | NaOH | 0.5 |
| Example B2-16 | cp | Triazine derivative P | NaOH | 0.5 |
| Example B2-17 | cq | Triazine derivative Q | NaOH | 0.5 |
| Example B2-18 | cr | Triazine derivative R | NaOH | 0.5 |
| Example B2-19 | cs | Triazine derivative S | NaOH | 0.5 |
| Example B2-20 | ct | Triazine derivative T | NaOH | 0.5 |
| Example B2-21 | cu | Triazine derivative U | NaOH | 0.5 |
| Example B2-22 | cv | Triazine derivative V | NaOH | 0.5 |
| Example B2-23 | cw | Triazine derivative W | NaOH | 0.5 |
| Example B2-24 | cx | Triazine derivative X | NaOH | 0.5 |
| Example B2-25 | cy | Triazine derivative Y | NaOH | 0.5 |
| Example B2-26 | cz | Triazine derivative B | $Na_2CO_3$ | 0.5 |
| Example B2-27 | da | Triazine derivative B | $Li_2CO_3$ | 0.5 |
| Example B2-28 | db | Triazine derivative B | $K_2CO_3$ | 0.5 |
| Example B2-29 | dc | Triazine derivative B | $K_3PO_4$ | 0.5 |
| Example B2-30 | dd | Triazine derivative B | $Ca(OH)_2$ | 0.5 |
| Example B2-31 | de | Triazine derivative B | $Mg(OH)_2$ | 0.5 |
| Example B2-32 | df | Triazine derivative B | NaOH | 0.1 |
| Example B2-33 | dg | Triazine derivative B | NaOH | 0.3 |
| Example B2-34 | dh | Triazine derivative B | NaOH | 0.7 |
| Example B2-35 | di | Triazine derivative B | NaOH | 1.0 |

Example B2-1

(Manufacture of Dispersant ca)

0.040 mol of the triazine derivative A was added to 200 g of water. 0.020 mol of sodium hydroxide was added thereto and stirred at 60° C. for 2 hours. After cooling to room temperature, filtration and purification were performed. The obtained residue was dried at 90° C. for 48 hours, and thereby a dispersant ca was obtained.

Examples B2-2 to B2-25

(Manufacture of Dispersants cb to cy)

Dispersants cb to cy were obtained by manufacture in the same manner as in Example B2-1, except that triazine derivatives B to Y shown in Examples B2-2 to B2-25 in Table 48 were added instead of the triazine derivative A in the manufacture of the dispersant ca.

Examples B2-26 to B2-31

(Manufacture of Dispersants cz to de)

Dispersants cz to de were obtained by manufacture in the same manner as in Example B2-2 except that inorganic bases shown in Examples B2-26 to B2-31 in Table 48 were added instead of sodium hydroxide in the manufacture of the dispersant cb.

Examples B2-32 to B2-35

(Manufacture of Dispersants df to di)

Dispersants df to di were obtained by manufacture in the same manner as in Example B2-2 except that an amount of sodium hydroxide added in the manufacture of the dispersant cb was changed to addition amounts which are shown in Examples B2-32 to B2-35 in Table 48.

Dispersants ea to ec shown in Table 49 were manufactured by methods described in the following comparative examples.

TABLE 49

| | Dispersant | Triazine derivative | Inorganic base | Molar equivalent of inorganic base with respect to triazine derivative |
|---|---|---|---|---|
| Comparative Example B2-1 | ea | Triazine derivative AA | NaOH | 0.5 |
| Comparative Example B2-2 | eb | Triazine derivative AB | NaOH | 0.5 |
| Comparative Example B2-3 | ec | Triazine derivative AC | NaOH | 0.5 |

Comparative Examples B2-1 to B2-3

(Manufacture of Dispersants ea to ec)

Dispersants ea to ec were obtained by manufacture in the same manner as in Example B2-1, except that the triazine derivatives AA to AC shown in Comparative Examples B2-1 to B2-3 in Table 49 were added instead of the triazine derivative A in the manufacture of the dispersant ca.

The carbon material dispersion liquids, carbon material dispersion varnishes, and mixture pastes shown in the examples and comparative examples were produced using the following materials.

Example B3-1

<Preparation of Carbon Material Dispersion Liquid>

According to the composition shown in Table 50, N-methyl-2-pyrrolidone and the dispersant a were added to a glass bottle and mixed. Thereafter, a carbon material was added thereto and dispersed with a paint conditioner for 2 hours using zirconia beads as media. Thereby, a carbon material dispersion liquid containing the dispersant a was obtained.

<Preparation of Carbon Material Dispersion Varnish>

According to the composition shown in Table 50, the prepared carbon material dispersion liquid containing the dispersant a was mixed with a binder and N-methyl-2-pyrrolidone with a disper. Thereby, a carbon material dispersion varnish was obtained.

<Preparation of Cathode Mixture Paste>

According to the composition shown in Table 50, the prepared carbon material dispersion varnish containing the dispersant a was mixed with an active material and N-methyl-2-pyrrolidone with a disper. Thereby, a cathode mixture paste was obtained.

<Production of Electrode>

The prepared cathode mixture paste containing the dispersant a was applied onto an aluminum foil having a thickness of 20 μm using a doctor blade, and then dried at 120° C. for 30 minutes under reduced pressure. Thereafter, the aluminum foil was rolled with a roller pressing machine. Thereby, an electrode having an application amount of 17 mg/cm$^2$ and a density of 3.0 g/cm$^3$ was produced. An electrode having a uniform thickness and density was obtained.

<Assembly of Cell for Evaluation Cathode of Lithium Ion Secondary Battery>

The produced electrode containing the dispersant a was punched out to a diameter of 16 mm to be used as a cathode, and a metallic lithium foil (a thickness of 0.15 mm) was used as an anode. A separator made of a porous polypropylene film (a thickness of 20 μm, and a porosity of 50%) was inserted and laminated between the cathode and the anode, and was filled with 0.1 ml of an electrolyte solution (a non-aqueous electrolyte solution in which $LiPF_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

TABLE 50

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Composition of carbon material dispersion liquid | a | 0.2 | HS100 | 10.0 | | | | | NMP | 89.8 |

TABLE 50-continued

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Composition of carbon material dispersion varnish | | 0.12 | | 6.0 | PVDF | 6.0 | | | | 87.9 |
| Composition of cathode mixture paste | | 0.04 | | 2.0 | | 2.0 | NMC | 54.0 | | 42.0 |

[Examples B3-2 to B3-76] Comparison 1 of Dispersant Types

A cell for cathode evaluation was assembled by dispersion with the same composition and in the same manner as in Example B3-1 except that the dispersants b to ao and ca to di shown in Table 51 were used instead of the dispersant a.

TABLE 51

| | Dispersant |
|---|---|
| Example B3-2 | b |
| Example B3-3 | c |
| Example B3-4 | d |
| Example B3-5 | e |
| Example B3-6 | f |
| Example B3-7 | g |
| Example B3-8 | h |
| Example B3-9 | i |
| Example B3-10 | j |
| Example B3-11 | k |
| Example B3-12 | l |
| Example B3-13 | m |
| Example B3-14 | n |
| Example B3-15 | o |
| Example B3-16 | p |
| Example B3-17 | q |
| Example B3-18 | r |
| Example B3-19 | s |
| Example B3-20 | t |
| Example B3-21 | u |
| Example B3-22 | v |
| Example B3-23 | w |
| Example B3-24 | x |
| Example B3-25 | y |
| Example B3-26 | z |
| Example B3-27 | aa |
| Example B3-28 | ab |
| Example B3-29 | ac |
| Example B3-30 | ad |
| Example B3-31 | ae |
| Example B3-32 | af |
| Example B3-33 | ag |
| Example B3-34 | ah |
| Example B3-35 | ai |
| Example B3-36 | aj |
| Example B3-37 | ak |
| Example B3-38 | al |
| Example B3-39 | am |
| Example B3-40 | an |
| Example B3-41 | ao |
| Example B3-42 | ca |
| Example B3-43 | cb |
| Example B3-44 | cc |
| Example B3-45 | cd |
| Example B3-46 | ce |
| Example B3-47 | cf |
| Example B3-48 | cg |
| Example B3-49 | ch |
| Example B3-50 | ci |
| Example B3-51 | cj |
| Example B3-52 | ck |
| Example B3-53 | cl |

TABLE 51-continued

| | Dispersant |
|---|---|
| Example B3-54 | cm |
| Example B3-55 | cn |
| Example B3-56 | co |
| Example B3-57 | cp |
| Example B3-58 | cq |
| Example B3-59 | cr |
| Example B3-60 | cs |
| Example B3-61 | ct |
| Example B3-62 | cu |
| Example B3-63 | cv |
| Example B3-64 | cw |
| Example B3-65 | cx |
| Example B3-66 | cy |
| Example B3-67 | cz |
| Example B3-68 | da |
| Example B3-69 | db |
| Example B3-70 | dc |
| Example B3-71 | dd |
| Example B3-72 | de |
| Example B3-73 | df |
| Example B3-74 | dg |
| Example B3-75 | dh |
| Example B3-76 | di |

[Comparative Examples B3-1 to B3-7] Comparison 2 of Dispersant Types

A cell for cathode evaluation was assembled by dispersion in the same manner as in Example B3-1 except that the dispersants ba to be and ea to ec shown in Table 52 were used. However, in Comparative Example B3-7, a dispersant was not used, and a composition for a dispersant was changed to a solvent.

TABLE 52

| | Dispersant |
|---|---|
| Comparative Example B3-1 | ba |
| Comparative Example B3-2 | bb |
| Comparative Example B3-3 | bc |
| Comparative Example B3-4 | ea |
| Comparative Example B3-5 | eb |
| Comparative Example B3-6 | ec |
| Comparative Example B3-7 | Not used |

<Evaluation of Ionic Resistance>

The cell for cathode evaluation assembled in Examples B3-1 to B3-76 and Comparative Examples B3-1 to B3-7 was allowed to stand in a constant-temperature tank at −20° C. for 12 hours. An AC impedance was measured at an open circuit potential with a frequency of 0.1 Hz and an amplitude of 10 mV to obtain an ionic resistance $|Z|_{ion}$. Subsequently, the cell for cathode evaluation was moved into room temperature (25° C.) and allowed to stand for 3 hours, and the impedance was measured in the same manner to obtain the ionic resistance $|Z|_{ion}$. An impedance analyzer was used for the measurement.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (an upper limit voltage of 4.2V) at room temperature, and discharging was performed with a constant current of 0.1C to a discharge lower limit voltage of 3.0V. 0.1C discharge capacity at the fifth cycle was recorded. Next, the cell for cathode evaluation in a state of being discharged to 3.0V was connected to an impedance analyzer, and AC impedance measurement was performed at 3.0V, an amplitude of 10 mV, and a frequency from 0.1 Hz to 1 MHz. When the results were plotted on the complex plane by a Cole-Cole plot method, a semicircular curve was obtained. A diameter of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature, discharging was performed with a constant current of 0.5C to a discharge lower limit voltage of 3.0V, full charging was performed again with 0.1C, and then discharging was performed with a constant current of 5C to 3.0V. A ratio of 5C discharge capacity to 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and then discharged with a constant current of 0.5C. A ratio of 0.5C discharge capacity at −20° C. to 0.5C discharge capacity at room temperature was defined as a low-temperature discharge characteristic (%). As the room temperature rate characteristic and low-temperature discharge characteristic become closer to 100%, the characteristics become more favorable.

<Evaluation Results>

The carbon material dispersion liquids, carbon material dispersion varnishes, and cathode mixture pastes shown in Examples B3-1 to B3-76 and Comparative Examples B3-1 to B3-6 were in a favorably dispersed state, and sedimentation or thickening did not occur even after the elapse of one month. Regarding the carbon material dispersion liquid, carbon material dispersion varnish, and cathode mixture paste of Comparative Example B3-7 in which a dispersant was not used, a viscosity was considerably high and fluidity was inferior from the initial stage, but they were used as themselves for comparison. In addition, after the elapse of one month, the dispersed material had gelled.

Table 53-1 and Table 53-2 show evaluation results of ionic resistance, reaction resistance, room temperature rate characteristic, and low-temperature discharge characteristic of the cell for cathode evaluation of Examples B3-1 to B3-76 and Comparative Examples B3-1 to B3-7.

TABLE 53-1

| | Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B3-1 | a | 10 | 427 | 5.2 | 68.8 | 75.5 |
| Example B3-2 | b | 10 | 421 | 4.9 | 69.1 | 76.0 |
| Example B3-3 | c | 10 | 423 | 5.3 | 68.9 | 75.8 |
| Example B3-4 | d | 10 | 425 | 5.3 | 68.3 | 75.4 |
| Example B3-5 | e | 11 | 445 | 6.2 | 67.6 | 73.5 |
| Example B3-6 | f | 14 | 485 | 8.0 | 63.3 | 65.0 |
| Example B3-7 | g | 12 | 455 | 7.3 | 66.1 | 70.5 |
| Example B3-8 | h | 13 | 475 | 7.8 | 64.5 | 64.2 |
| Example B3-9 | i | 14 | 490 | 8.1 | 63.0 | 63.8 |
| Example B3-10 | j | 12 | 460 | 7.5 | 65.8 | 70.1 |
| Example B3-11 | k | 14 | 493 | 8.5 | 62.3 | 63.4 |
| Example B3-12 | l | 14 | 489 | 8.1 | 62.8 | 64.3 |
| Example B3-13 | m | 13 | 480 | 7.9 | 64.6 | 66.4 |
| Example B3-14 | n | 14 | 487 | 8.2 | 62.7 | 64.7 |
| Example B3-15 | o | 11 | 440 | 6.1 | 67.5 | 71.8 |
| Example B3-16 | p | 12 | 459 | 7.2 | 64.9 | 70.1 |
| Example B3-17 | q | 13 | 482 | 7.7 | 63.8 | 64.4 |
| Example B3-18 | r | 12 | 462 | 7.4 | 65.2 | 68.9 |
| Example B3-19 | s | 11 | 447 | 6.3 | 66.6 | 71.9 |
| Example B3-20 | t | 12 | 463 | 7.3 | 65.3 | 69.2 |
| Example B3-21 | u | 13 | 479 | 7.8 | 63.7 | 66.6 |
| Example B3-22 | v | 12 | 467 | 7.5 | 65.5 | 69.3 |
| Example B3-23 | w | 11 | 443 | 6.4 | 66.8 | 72.0 |
| Example B3-24 | x | 13 | 477 | 7.9 | 63.6 | 67.5 |
| Example B3-25 | y | 11 | 445 | 6.1 | 66.5 | 72.6 |
| Example B3-26 | z | 10 | 422 | 5.1 | 68.7 | 75.9 |
| Example B3-27 | aa | 10 | 423 | 5.0 | 68.8 | 75.0 |
| Example B3-28 | ab | 10 | 421 | 5.3 | 68.9 | 74.5 |
| Example B3-29 | ac | 10 | 423 | 5.2 | 68.6 | 74.6 |
| Example B3-30 | ad | 10 | 422 | 5.1 | 69.0 | 74.8 |
| Example B3-31 | ae | 10 | 423 | 5.1 | 68.5 | 75.1 |
| Example B3-32 | af | 10 | 424 | 5.3 | 68.8 | 75.3 |
| Example B3-33 | ag | 10 | 421 | 5.0 | 68.4 | 75.8 |
| Example B3-34 | ah | 10 | 423 | 5.2 | 68.7 | 74.5 |
| Example B3-35 | ai | 10 | 422 | 5.3 | 68.3 | 75.3 |
| Example B3-36 | aj | 10 | 421 | 5.3 | 68.8 | 75.7 |

TABLE 53-1-continued

| | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B3-37 | ak | 12 | 429 | 7.1 | 65.2 | 69.4 |
| Example B3-38 | al | 10 | 425 | 5.2 | 68.1 | 74.7 |
| Example B3-39 | am | 10 | 426 | 5.0 | 68.7 | 75.8 |
| Example B3-40 | an | 11 | 427 | 6.4 | 67.0 | 72.5 |

TABLE 53-2

| | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B3-41 | ao | 12 | 440 | 7.3 | 64.9 | 68.5 |
| Example B3-42 | ca | 10 | 424 | 5.2 | 68.4 | 74.9 |
| Example B3-43 | cb | 10 | 420 | 5.0 | 69.1 | 76.0 |
| Example B3-44 | cc | 10 | 423 | 5.1 | 68.7 | 74.6 |
| Example B3-45 | cd | 10 | 426 | 5.2 | 68.3 | 74.8 |
| Example B3-46 | ce | 11 | 445 | 6.2 | 67.1 | 73.0 |
| Example B3-47 | cf | 14 | 486 | 8.0 | 63.1 | 63.9 |
| Example B3-48 | cg | 12 | 463 | 7.4 | 66.0 | 68.8 |
| Example B3-49 | ch | 13 | 480 | 7.7 | 63.9 | 66.5 |
| Example B3-50 | ci | 14 | 487 | 8.2 | 62.9 | 63.7 |
| Example B3-51 | cj | 12 | 468 | 7.6 | 65.9 | 68.9 |
| Example B3-52 | ck | 14 | 493 | 8.5 | 62.3 | 63.4 |
| Example B3-53 | cl | 14 | 489 | 8.1 | 62.4 | 64.6 |
| Example B3-54 | cm | 13 | 476 | 7.8 | 63.8 | 66.8 |
| Example B3-55 | cn | 14 | 485 | 8.3 | 62.8 | 63.9 |
| Example B3-56 | co | 11 | 443 | 6.1 | 66.9 | 74.9 |
| Example B3-57 | cp | 12 | 467 | 7.7 | 65.7 | 69.1 |
| Example B3-58 | cq | 13 | 478 | 7.9 | 64.0 | 67.0 |
| Example B3-59 | cr | 12 | 465 | 7.4 | 65.2 | 68.8 |
| Example B3-60 | cs | 11 | 444 | 6.3 | 67.0 | 74.5 |
| Example B3-61 | ct | 12 | 460 | 7.5 | 64.9 | 69.6 |
| Example B3-62 | cu | 13 | 481 | 7.6 | 64.3 | 67.2 |
| Example B3-63 | cv | 12 | 458 | 7.2 | 65.8 | 70.3 |
| Example B3-64 | cw | 11 | 442 | 6.2 | 66.7 | 75.1 |
| Example B3-65 | cx | 13 | 482 | 7.7 | 64.6 | 66.8 |
| Example B3-66 | cy | 11 | 440 | 6.3 | 66.6 | 75.3 |
| Example B3-67 | cz | 10 | 422 | 5.4 | 68.9 | 75.8 |
| Example B3-68 | da | 10 | 425 | 5.1 | 68.5 | 75.2 |
| Example B3-69 | db | 10 | 429 | 5.2 | 68.0 | 74.6 |
| Example B3-70 | dc | 10 | 430 | 5.3 | 68.1 | 74.7 |
| Example B3-71 | dd | 11 | 441 | 6.4 | 66.8 | 75.8 |
| Example B3-72 | de | 11 | 445 | 6.5 | 67.6 | 75.9 |
| Example B3-73 | df | 11 | 443 | 6.4 | 68.0 | 73.5 |
| Example B3-74 | dg | 10 | 420 | 5.1 | 68.8 | 75.8 |
| Example B3-75 | dh | 10 | 421 | 5.2 | 68.6 | 75.5 |
| Example B3-76 | di | 11 | 442 | 6.5 | 68.2 | 72.6 |
| Comparative Example B3-1 | ba | 17 | 515 | 9.5 | 53.4 | 42.1 |
| Comparative Example B3-2 | bb | 18 | 530 | 10.1 | 50.6 | 37.2 |
| Comparative Example B3-3 | bc | 17 | 517 | 9.3 | 52.7 | 43.0 |
| Comparative Example B3-4 | ea | 17 | 520 | 9.4 | 52.6 | 39.7 |
| Comparative Example B3-5 | eb | 18 | 526 | 9.9 | 50.1 | 40.1 |
| Comparative Example B3-6 | ec | 17 | 518 | 9.6 | 52.9 | 43.3 |
| Comparative Example B3-7 | Not used | 16 | 507 | 9.2 | 54.4 | 44.9 |

As can be seen from Tables 53-1 and 53-2, the cathodes of Examples B3-1 to B3-76 in which the dispersants a to ao and ca to di were used were extremely excellent in the all ionic resistance, reaction resistance, room temperature rate characteristic, and low-temperature discharge characteristic at room temperature and −20° C., as compared to the cathodes of Comparative Example B3-7 in which a dispersant was not used, and Comparative Examples B3-1 to B3-6 in which the dispersants ba to be and ea to ec were used.

The reason for this is thought to be that, because $Li^+$ with extremely high electron density is present near the dispersants a to ao and ca to di, dielectric polarization occurs, and thereby the dispersants have a high dielectric constant in a battery. It is considered that, accordingly, ionic conductivity is improved, and desolvation energy and solvation energy of $Li^+$ when an active material reacts with Li are reduced. As a result, ionic resistance and reaction resistance are reduced, and therefore characteristics in terms of the whole battery is also improved.

[Examples B4-1 to B4-5] [Comparative Examples B4-1 to B4-5] Comparison of Carbon Material Types According to materials and compositions of the carbon material dispersion liquid shown in Table 54, the carbon material dispersion varnish shown in Table 55, and the cathode mixture paste shown in Table 56, dispersion was performed in the same manner as in Example B3-1, and thereby a cell for cathode evaluation was assembled. Because a large amount of dispersant is required for carbon materials with a high specific surface area, an appropriate amount to be used was determined according to each carbon material.

(Composition of Carbon Material Dispersion Liquids)

TABLE 54

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Example B4-1 | b | 0.4 | super-P | 10.0 | NMP | 89.6 |
| Example B4-2 | b | 0.4 | M800 | 10.0 | NMP | 89.6 |
| Example B4-3 | b | 1.0 | EC-300J | 10.0 | NMP | 89.0 |
| Example B4-4 | b | 1.5 | CNT | 3.0 | NMP | 95.5 |
| Example B4-5 | b | 0.2 | VGCF | 10.0 | NMP | 89.8 |
| Comparative Example B4-1 | ba | 0.4 | super-P | 10.0 | NMP | 89.6 |
| Comparative Example B4-2 | ba | 0.4 | M800 | 10.0 | NMP | 89.6 |
| Comparative Example B4-3 | ba | 1.0 | EC-300J | 10.0 | NMP | 89.0 |
| Comparative Example B4-4 | ba | 1.5 | CNT | 3.0 | NMP | 95.5 |
| Comparative Example B4-5 | ba | 0.2 | VGCF | 10.0 | NMP | 89.8 |

(Composition of Carbon Material Dispersion Varnishes)

TABLE 55

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Example B4-1 | b | 0.24 | super-P | 6.0 | PVDF | 6.0 | NMP | 87.8 |
| Example B4-2 | b | 0.24 | M800 | 6.0 | PVDF | 6.0 | NMP | 87.8 |
| Example B4-3 | b | 0.6 | EC-300J | 6.0 | PVDF | 6.0 | NMP | 87.4 |
| Example B4-4 | b | 1.45 | CNT | 2.9 | PVDF | 2.9 | NMP | 92.8 |
| Example B4-5 | b | 0.12 | VGCF | 6.0 | PVDF | 6.0 | NMP | 87.9 |
| Comparative Example B4-1 | ba | 0.24 | super-P | 6.0 | PVDF | 6.0 | NMP | 87.8 |
| Comparative Example B4-2 | ba | 0.24 | M800 | 6.0 | PVDF | 6.0 | NMP | 87.8 |
| Comparative Example B4-3 | ba | 0.6 | EC-300J | 6.0 | PVDF | 6.0 | NMP | 87.4 |
| Comparative Example B4-4 | ba | 1.45 | CNT | 2.9 | PVDF | 2.9 | NMP | 92.8 |
| Comparative Example B4-5 | ba | 0.12 | VGCF | 6.0 | PVDF | 6.0 | NMP | 87.9 |

(Composition of Cathode Mixture Pastes)

TABLE 56

| | Composition of cathode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Example B4-1 | b | 0.08 | super-P | 2.0 | PVDF | 2.0 | NMC | 54.0 | NMP | 41.9 |
| Example B4-2 | b | 0.08 | M800 | 2.0 | PVDF | 2.0 | NMC | 54.0 | NMP | 41.9 |
| Example B4-3 | b | 0.2 | EC-300J | 2.0 | PVDF | 2.0 | NMC | 54.0 | NMP | 41.8 |
| Example B4-4 | b | 0.650 | CNT | 1.3 | PVDF | 1.3 | NMC | 54.0 | NMP | 42.8 |
| Example B4-5 | b | 0.04 | VGCF | 2.0 | PVDF | 2.0 | NMC | 54.0 | NMP | 42.0 |
| Comparative Example B4-1 | ba | 0.08 | super-P | 2.0 | PVDF | 2.0 | NMC | 54.0 | NMP | 41.9 |
| Comparative Example B4-2 | ba | 0.08 | M800 | 2.0 | PVDF | 2.0 | NMC | 54.0 | NMP | 41.9 |
| Comparative Example B4-3 | ba | 0.2 | EC-300J | 2.0 | PVDF | 2.0 | NMC | 54.0 | NMP | 41.8 |

TABLE 56-continued

| | Composition of cathode mixture paste | | | | | | | | |
|---|---|---|---|---|---|---|---|---|---|
| | Dispersant | | Carbon material | | Binder | | Active material | | Solvent |
| | Type | Content (%) | Type | Content (%) | Type | Content (%) | Type | Content (%) | Type | Content (%) |
| Comparative Example B4-4 | ba | 0.650 | CNT | 1.3 | PVDF | 1.3 | NMC | 54.0 | NMP | 42.8 |
| Comparative Example B4-5 | ba | 0.04 | VGCF | 2.0 | PVDF | 2.0 | NMC | 54.0 | NMP | 42.0 |

<Evaluation Results>

The carbon material dispersion liquids, carbon material dispersion varnishes, and cathode mixture pastes shown in all of the examples and comparative examples were also in a favorably dispersed state, and sedimentation or thickening did not occur even after the elapse of one month.

Table 57 shows evaluation results of ionic resistance, reaction resistance, room temperature rate characteristic, and low-temperature discharge characteristic of the cell for cathode evaluation of Examples B4-1 to B4-5 and Comparative Examples B4-1 to B4-5.

TABLE 57

| | Carbon material Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B4-1 | super-P | 10 | 423 | 5.1 | 68.6 | 75.7 |
| Example B4-2 | M800 | 11 | 446 | 6.4 | 66.9 | 72.0 |
| Example B4-3 | EC-300J | 12 | 462 | 7.3 | 65.7 | 69.2 |
| Example B4-4 | CNT | 10 | 422 | 5.2 | 68.8 | 76.0 |
| Example B4-5 | VGCF | 12 | 459 | 7.5 | 65.9 | 68.9 |
| Comparative Example B4-1 | super-P | 17 | 612 | 10.7 | 51.9 | 42.4 |
| Comparative Example B4-2 | M800 | 17 | 618 | 10.8 | 52.5 | 43.2 |
| Comparative Example B4-3 | EC-300J | 18 | 625 | 10.9 | 50.3 | 37.1 |
| Comparative Example B4-4 | CNT | 18 | 628 | 11.1 | 49.1 | 36.7 |
| Comparative Example B4-5 | VGCF | 16 | 609 | 10.3 | 54.6 | 45.3 |

The same effects were confirmed for all the carbon materials. Differences between Examples B4-1 to B4-5 were thought to be differences due to conductivities of the carbon materials. In addition, in Comparative Examples B4-1 to B4-5, there was a tendency in which as an amount of dispersant added became larger, resistance became higher, which is an inferior characteristic.

Based on the above verification, it was confirmed that the above-described effects were not dependent on the type of carbon material.

[Examples B5-1 to B5-6] Comparison 1 of Amount of Dispersant Per Active Material Surface Area A cell for cathode evaluation was assembled in the same manner except that dispersant amounts shown in Table 58, Table 59, and Table 60 were used instead of the dispersant amount in Example B3-2. Table 61 shows a dispersant amount (mg) with respect to 1 m² active material surface area in the electrode.

(Composition of Carbon Material Dispersion Liquids)

TABLE 58

| | Composition of carbon material dispersion liquid | | | | | |
|---|---|---|---|---|---|---|
| | Dispersant | | Carbon material | | Solvent | |
| | Type | Content (%) | Type | Content (%) | Type | Content (%) |
| Comparative Example B3-7 | Not used | 0 | HS100 | 10.0 | NMP | 90.0 |
| Example B5-1 | b | 0.01 | HS100 | 10.0 | NMP | 90.0 |
| Example B5-2 | b | 0.02 | HS100 | 10.0 | NMP | 90.0 |
| Example B5-3 | b | 0.05 | HS100 | 10.0 | NMP | 90.0 |
| Example B5-4 | b | 0.1 | HS100 | 10.0 | NMP | 89.9 |
| Example B3-2 | b | 0.2 | HS100 | 10.0 | NMP | 89.8 |
| Example B5-5 | b | 0.4 | HS100 | 10.0 | NMP | 89.6 |
| Example B5-6 | b | 0.8 | HS100 | 10.0 | NMP | 89.2 |

(Composition of Carbon Material Dispersion Varnishes)

TABLE 59

| | Composition of carbon material dispersion varnish | | | | | | | |
|---|---|---|---|---|---|---|---|---|
| | Dispersant | | Carbon material | | Binder | | Solvent | |
| | Type | Content (%) | Type | Content (%) | Type | Content (%) | Type | Content (%) |
| Comparative Example B3-7 | Not used | 0 | HS100 | 6.0 | PVDF | 6.0 | NMP | 88.0 |
| Example B5-1 | b | 0.006 | HS100 | 6.0 | PVDF | 6.0 | NMP | 88.0 |
| Example B5-2 | b | 0.012 | HS100 | 6.0 | PVDF | 6.0 | NMP | 88.0 |
| Example B5-3 | b | 0.03 | HS100 | 6.0 | PVDF | 6.0 | NMP | 88.0 |
| Example B5-4 | b | 0.06 | HS100 | 6.0 | PVDF | 6.0 | NMP | 87.9 |
| Example B3-2 | b | 0.12 | HS100 | 6.0 | PVDF | 6.0 | NMP | 87.9 |
| Example B5-5 | b | 0.24 | HS100 | 6.0 | PVDF | 6.0 | NMP | 87.8 |
| Example B5-6 | b | 0.48 | HS100 | 6.0 | PVDF | 6.0 | NMP | 87.5 |

(Composition of Cathode Mixture Pastes)

TABLE 60

| | Composition of cathode mixture paste | | | | | | | | | |
|---|---|---|---|---|---|---|---|---|---|---|
| | Dispersant | | Carbon material | | Binder | | Active material | | Solvent | |
| | Type | Content (%) | Type | Content (%) | Type | Content (%) | Type | Content (%) | Type | Content (%) |
| Comparative Example B3-7 | Not used | 0 | HS100 | 2.0 | PVDF | 2.0 | NMC | 54.0 | NMP | 42.0 |
| Example B5-1 | b | 0.002 | HS100 | 2.0 | PVDF | 2.0 | NMC | 54.0 | NMP | 42.0 |
| Example B5-2 | b | 0.004 | HS100 | 2.0 | PVDF | 2.0 | NMC | 54.0 | NMP | 42.0 |
| Example B5-3 | b | 0.01 | HS100 | 2.0 | PVDF | 2.0 | NMC | 54.0 | NMP | 42.0 |
| Example B5-4 | b | 0.02 | HS100 | 2.0 | PVDF | 2.0 | NMC | 54.0 | NMP | 42.0 |
| Example B3-2 | b | 0.04 | HS100 | 2.0 | PVDF | 2.0 | NMC | 54.0 | NMP | 42.0 |
| Example B5-5 | b | 0.08 | HS100 | 2.0 | PVDF | 2.0 | NMC | 54.0 | NMP | 41.9 |
| Example B5-6 | b | 0.16 | HS100 | 2.0 | PVDF | 2.0 | NMC | 54.0 | NMP | 41.8 |

(Amount of Dispersant Per Active Material Surface Area)

TABLE 61

| | Dispersant amount per active material surface area (mg/m$^2$) |
|---|---|
| Comparative Example B3-7 | 0 |
| Example B5-1 | 0.06 |
| Example B5-2 | 0.12 |
| Example B5-3 | 0.30 |
| Example B5-4 | 0.60 |
| Example B3-2 | 1.19 |
| Example B5-5 | 2.39 |
| Example B5-6 | 4.78 |

<Evaluation Results>

Table 62 shows evaluation results of reaction resistance, room temperature rate characteristic, and low-temperature discharge characteristic of Comparative Example B3-7, Example B3-2, and Examples B5-1 to B5-6.

TABLE 62

| | Dispersant amount per active material surface area (mg/m$^2$) | $|Z|_{re}$ at 25° C. [Ω] | Room temperature rate characteristic [%] | Low-temperature discharge characteristic [%] |
|---|---|---|---|---|
| Comparative Example B3-7 | 0 | 10.2 | 54.4 | 44.9 |
| Example B5-1 | 0.06 | 8.0 | 64.7 | 66.7 |
| Example B5-2 | 0.12 | 7.2 | 64.9 | 69.3 |
| Example B5-3 | 0.30 | 6.8 | 66.8 | 73.2 |
| Example B5-4 | 0.60 | 6.3 | 67.2 | 72.6 |
| Example B3-2 | 1.19 | 4.9 | 69.1 | 76.0 |
| Example B5-5 | 2.39 | 4.8 | 69.3 | 76.7 |
| Example B5-6 | 4.78 | 4.8 | 69.6 | 77.1 |

Based on Example B5-1, it was found that when a dispersant amount with respect to the active material surface area was too small, the effect was diminished. A particularly excellent effect was obtained when a dispersant amount became larger than that of Example B5-2, and the effect was gradually improved as the dispersant amount increased.

[Examples B6-1 to B6-9] Comparison 2 of Amount of Dispersant Per Active Material Surface Area Dispersion was performed in the same manner as in Example B3-2 with materials and compositions shown in Table 63, Table 64, and Table 65, and thereby a cell for cathode evaluation was produced. Table 66 shows a dispersant amount (mg) with respect to 1 m² active material surface area in the electrode.

(Composition of Carbon Material Dispersion Liquids)

TABLE 63

Composition of carbon material dispersion liquid

| | Dispersant | | Carbon material | | Solvent | |
|---|---|---|---|---|---|---|
| | Type | Content (%) | Type | Content (%) | Type | Content (%) |
| Example B6-1 | b | 0.66 | CNT | 6.6 | NMP | 92.7 |
| Example B6-2 | b | 1.98 | CNT | 6.6 | NMP | 91.4 |
| Example B6-3 | b | 3.3 | CNT | 6.6 | NMP | 90.1 |
| Example B6-4 | b | 6.6 | CNT | 6.6 | NMP | 86.8 |
| Example B6-5 | b | 9.9 | CNT | 6.6 | NMP | 83.5 |
| Example B6-6 | b | 11.6 | CNT | 6.6 | NMP | 81.9 |
| Example B6-7 | b | 13.2 | CNT | 6.6 | NMP | 80.2 |
| Example B6-8 | b | 14.9 | CNT | 6.6 | NMP | 78.6 |
| Example B6-9 | b | 16.5 | CNT | 6.6 | NMP | 76.9 |

(Composition of Carbon Material Dispersion Varnishes)

TABLE 64

Composition of carbon material dispersion varnish

| | Dispersant | | Carbon material | | Binder | | Solvent | |
|---|---|---|---|---|---|---|---|---|
| | Type | Content (%) | Type | Content (%) | Type | Content (%) | Type | Content (%) |
| Example B6-1 | b | 0.62 | CNT | 6.2 | PVDF | 5.0 | NMP | 88.2 |
| Example B6-2 | b | 1.86 | CNT | 6.2 | PVDF | 5.0 | NMP | 86.9 |
| Example B6-3 | b | 3.1 | CNT | 6.2 | PVDF | 5.0 | NMP | 85.7 |
| Example B6-4 | b | 6.2 | CNT | 6.2 | PVDF | 5.0 | NMP | 82.6 |
| Example B6-5 | b | 9.3 | CNT | 6.2 | PVDF | 5.0 | NMP | 79.5 |
| Example B6-6 | b | 10.9 | CNT | 0.2 | PVDF | 5.0 | NMP | 78.0 |
| Example B6-7 | b | 12.4 | CNT | 6.2 | PVDF | 5.0 | NMP | 76.4 |
| Example B6-8 | b | 14.0 | CNT | 6.2 | PVDF | 5.0 | NMP | 74.9 |
| Example B6-9 | b | 15.5 | CNT | 6.2 | PVDF | 5.0 | NMP | 73.3 |

(Composition of Cathode Mixture Pastes)

TABLE 65

Composition of cathode mixture paste

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Example B6-1 | b | 0.31 | CNT | 3.1 | PVDF | 2.5 | NMC | 50.0 | NMP | 44.1 |
| Example B6-2 | b | 0.93 | CNT | 3.1 | PVDF | 2.5 | NMC | 50.0 | NMP | 43.5 |
| Example B6-3 | b | 1.6 | CNT | 3.1 | PVDF | 2.5 | NMC | 50.0 | NMP | 42.9 |
| Example B6-4 | b | 3.1 | CNT | 3.1 | PVDF | 2.5 | NMC | 50.0 | NMP | 41.3 |
| Example B6-5 | b | 4.7 | CNT | 3.1 | PVDF | 2.5 | NMC | 50.0 | NMP | 39.8 |
| Example B6-6 | b | 5.4 | CNT | 3.1 | PVDF | 2.5 | NMC | 50.0 | NMP | 39.0 |
| Example B6-7 | b | 6.2 | CNT | 3.1 | PVDF | 2.5 | NMC | 50.0 | NMP | 38.2 |
| Example B6-8 | b | 7.0 | CNT | 3.1 | PVDF | 2.5 | NMC | 50.0 | NMP | 37.4 |
| Example B6-9 | b | 7.8 | CNT | 3.1 | PVDF | 2.5 | NMC | 50.0 | NMP | 36.7 |

(Amount of Dispersant Per Active Material Surface Area)

TABLE 66

| | Dispersant amount per active material surface area (mg/m²) |
|---|---|
| Example B6-1 | 10 |
| Example B6-2 | 30 |
| Example B6-3 | 50 |
| Example B6-4 | 100 |
| Example B6-5 | 150 |
| Example B6-6 | 175 |
| Example B6-7 | 200 |
| Example B6-8 | 225 |
| Example B6-9 | 250 |

<Evaluation Results>

Table 67 shows evaluation results of reaction resistance, room temperature rate characteristic, and low-temperature discharge characteristic of Example B6-1 to Example B6-9.

TABLE 67

| | Dispersant amount per active material surface area (mg/m²) | $\|Z\|_{re}$ at 25° C. [Ω] | Room temperature rate characteristic [%] | Low-temperature discharge characteristic [%] |
|---|---|---|---|---|
| Example B6-1 | 10 | 6.2 | 66.7 | 72.1 |
| Example B6-2 | 30 | 6.1 | 66.5 | 72.5 |

TABLE 67-continued

|  | Dispersant amount per active material surface area (mg/m²) | $|Z|_{re}$ at 25° C. [Ω] | Room temperature rate characteristic [%] | Low-temperature discharge characteristic [%] |
|---|---|---|---|---|
| Example B6-3 | 50 | 5.4 | 68.2 | 75.5 |
| Example B6-4 | 100 | 5.4 | 68.1 | 75.8 |
| Example B6-5 | 150 | 5.5 | 68.0 | 75.3 |
| Example B6-6 | 175 | 6.2 | 66.8 | 71.9 |
| Example B6-7 | 200 | 7.0 | 65.3 | 70.1 |
| Example B6-8 | 225 | 7.6 | 63.6 | 67.4 |
| Example B6-9 | 250 | 7.7 | 64.1 | 66.8 |

Based on Table 67, it was found that when a dispersant amount exceeded the dispersant amount in Example B6-6, an effect of reducing reaction resistance was diminished. The reason for this was thought to be that, when a dispersant amount was in excess, the adverse effect of a resistance component becoming larger than an amount of reduction in desolvation energy.

Based on the above results, it was found that there is an optimum range of an amount of dispersant added to the active material surface area for obtaining an excellent effect of reducing reaction resistance.

[Examples B7-1 to B7-6] Comparison 1 of Amount of Dispersant with Respect to Amount of Electrolyte Solution A cell for cathode evaluation was assembled in the same manner as in Example B5-2, except that an amount of an electrolyte solution was changed to an amount shown in Table 68 using the cathode produced in Example B5-2.

TABLE 68

|  | Electrolyte solution amount added in cell (ml) | Dispersant amount with respect to electrolyte solution amount(mg/ml) |
|---|---|---|
| Example B7-1 | 0.05 | 0.12 |
| Example B5-2 | 0.1 | 0.059 |
| Example B7-2 | 0.2 | 0.023 |
| Example B7-3 | 0.4 | 0.015 |
| Example B7-4 | 0.6 | 0.010 |
| Example B7-5 | 0.7 | 0.007 |
| Example B7-6 | 1.2 | 0.005 |

[Examples B8-1 to B8-7] Comparison 2 of Amount of Dispersant with Respect to Amount of Electrolyte Solution A cathode was produced in the same manner as in Example B6-3 except that the cathode mixture paste produced in Example B6-3 was used, and a coating amount was changed to 28 mg/cm². In addition, a cell for cathode evaluation was assembled in the same manner as in Example B6-3 except that an amount of electrolyte solution added to the cell for cathode evaluation was changed to an amount shown in Table 69.

TABLE 69

|  | Electrolyte solution amount added in cell (ml) | Dispersant amount with respect to electrolyte solution amount (mg/ml) |
|---|---|---|
| Example B8-1 | 0.03 | 99.1 |
| Example B8-2 | 0.04 | 74.3 |
| Example B8-3 | 0.05 | 59.4 |
| Example B8-4 | 0.06 | 49.3 |
| Example B8-5 | 0.08 | 37.2 |
| Example B8-6 | 0.1 | 29.7 |
| Example B8-7 | 0.2 | 14.9 |

<Evaluation Results>

Table 70 shows evaluation results of ionic resistance, reaction resistance, room temperature rate characteristic, and low-temperature discharge characteristic of Example B5-2, Examples B7-1 to B7-6, and Comparative Example B3-7. Table 71 shows evaluation results of ionic resistance, reaction resistance, room temperature rate characteristic, and low-temperature discharge characteristic of Example B8-1 to Example B8-7.

The reaction resistances of Example B5-2 and Examples B7-1 to B7-6 were all the same level. The reason for this is thought to be that amounts of dispersant with respect to the active material surface area were the same.

In addition, ionic resistance at room temperature and low temperature greatly became lower in Examples B7-1 to B7-4 than that of Comparative Example B3-7, and the effects were poor in Examples B7-5 and B7-6 with Example B7-4 as the lower limit. It was shown that there is a lower limit of an optimum amount of dispersant with respect to an amount of electrolyte solution for obtaining an excellent effect.

Because room temperature rate characteristic and low-temperature discharge characteristic are affected by both ionic resistance and reaction resistance, there is a need for a design in which both effects can be obtained, in order to obtain excellent characteristics in a battery.

Meanwhile, from the comparison between Examples B8-1 to B8-7, it was found that the effect of reducing ionic resistance was diminished even when an amount of dispersant was too large with respect to an amount of electrolyte solution. The reason for this is thought to be that because the dispersant is an insulating compound, when an amount thereof is in excess, the dispersant becomes a resistance component itself.

Based on the above results, it was found that there is also an upper limit to an optimum amount of dispersant with respect to an amount of electrolyte solution.

TABLE 70

|  | Dispersant amount with respect to electrolyte solution amount (mg/ml) | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B7-1 | 0.12 | 12 | 460 | 7.1 | 66.6 | 71.1 |
| Example B5-2 | 0.059 | 12 | 462 | 7.2 | 64.9 | 69.3 |
| Example B7-2 | 0.023 | 12 | 460 | 7.2 | 65.2 | 70.1 |

TABLE 70-continued

| | Dispersant amount with respect to electrolyte solution amount (mg/ml) | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B7-3 | 0.015 | 12 | 458 | 7.2 | 65.3 | 70.3 |
| Example B7-4 | 0.010 | 12 | 455 | 7.3 | 64.9 | 70.5 |
| Example B7-5 | 0.007 | 13 | 482 | 7.3 | 64.5 | 67.5 |
| Example B7-6 | 0.005 | 13 | 479 | 7.3 | 64.1 | 67.1 |
| Comparative Example B3-7 | 0 | 16 | 607 | 10.2 | 54.4 | 44.9 |

TABLE 71

| | Dispersant amount with respect to electrolyte solution amount (mg/ml) | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B8-1 | 99.1 | 13 | 482 | 7.2 | 63.8 | 66.3 |
| Example B8-2 | 74.3 | 13 | 479 | 7.1 | 64.2 | 67.1 |
| Example B8-3 | 59.4 | 10 | 426 | 7.1 | 68 | 75.2 |
| Example B8-4 | 49.3 | 10 | 423 | 7.0 | 68.3 | 75.5 |
| Example B8-5 | 37.2 | 10 | 425 | 7.0 | 68.6 | 75.0 |
| Example B8-6 | 29.7 | 11 | 441 | 7.1 | 67.5 | 73.4 |
| Example B8-7 | 14.9 | 11 | 444 | 7.2 | 66.9 | 72.8 |

[Example B9-1] Investigation of Influence of Electrolyte Solution

A cell for cathode evaluation was assembled in the same manner as in Example B3-2 except that a non-aqueous electrolyte solution, in which $LiPF_6$ was dissolved at a concentration of 1 M in a mixed solvent in which ethylene carbonate and diethyl carbonate were mixed at a volume ratio of 1:2, was used instead of the electrolyte solution used in Example B3-2 (a non-aqueous electrolyte solution in which $LiPF_6$ was dissolved at a concentration of 1 M in a mixed solvent in which ethylene carbonate and diethyl carbonate were mixed at a volume ratio of 1:1).

Example B9-2

A cell for cathode evaluation was assembled in the same manner as in Example B3-2 except that a non-aqueous electrolyte solution, in which $LiPF_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Example B3-2 (a non-aqueous electrolyte solution in which $LiPF_6$ was dissolved at a concentration of 1 M in a mixed solvent in which ethylene carbonate and diethyl carbonate were mixed at a volume ratio of 1:1).

Comparative Example B9-1

A cell for cathode evaluation was assembled in the same manner as in Comparative Example B3-7 except that a non-aqueous electrolyte solution, in which $LiPF_6$ was dissolved at a concentration of 1 M in a mixed solvent in which ethylene carbonate and diethyl carbonate were mixed at a volume ratio of 1:2, was used instead of the electrolyte solution used in Comparative Example B3-7 (a non-aqueous electrolyte solution in which $LiPF_6$ was dissolved at a concentration of 1 M in a mixed solvent in which ethylene carbonate and diethyl carbonate were mixed at a volume ratio of 1:1).

Comparative Example B9-2

A cell for cathode evaluation was assembled in the same manner as in Comparative Example B3-7 except that a non-aqueous electrolyte solution, in which $LiPF_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Comparative Example B3-7 (a non-aqueous electrolyte solution in which $LiPF_6$ was dissolved at a concentration of 1 M in a mixed solvent in which ethylene carbonate and diethyl carbonate were mixed at a volume ratio of 1:1).

<Evaluation Results>

Table 72 shows evaluation results of ionic resistance, reaction resistance, room temperature rate characteristic, and low-temperature discharge characteristic of Example B3-2, Example B9-1, Example B9-2, Comparative Example B3-7, Comparative Example B9-1, and Comparative Example B9-2.

TABLE 72

|  | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B3-2 | b | 10 | 421 | 4.9 | 69.1 | 76.0 |
| Example B9-1 | b | 10 | 416 | 4.8 | 69.4 | 76.4 |
| Example B9-2 | b | 10 | 407 | 4.7 | 69.9 | 76.8 |
| Comparative Example B3-7 | Not used | 16 | 607 | 10.2 | 54.4 | 44.9 |
| Comparative Example B9-1 | Not used | 17 | 601 | 10.0 | 55.1 | 45.5 |
| Comparative Example B9-2 | Not used | 17 | 598 | 9.8 | 55.7 | 45.9 |

From Example B9-1 and Example B9-2, it was confirmed that all characteristics were improved regardless of the type of electrolyte solution, as compared to the comparative example. In addition to the electrolyte solutions shown in the present examples, the same effects are expected to be obtained regardless of the type of non-aqueous electrolyte solution as long as it is a non-aqueous electrolyte solution that is generally used.

Next, the type of active material was changed, and evaluation was performed in the same manner.

[Examples B10-1 to B10-3] Comparison of Active Material Species

Using the carbon material dispersion varnish used in Example B3-2, the cell for cathode evaluation was assembled by dispersion performed in the same manner as in Example B3-2 according to the active material and composition shown in Table 73.

Comparative Examples B10-1 to B10-3

Using the carbon material dispersion varnish used in Comparative Example B3-1, the cell for cathode evaluation was assembled by dispersion performed in the same manner as in Comparative Example B3-1 according to the active material and composition shown in Table 73.

TABLE 73

| | Composition of cathode mixture paste | | | | | | | | |
|---|---|---|---|---|---|---|---|---|---|
| | Dispersant | | Carbon material | | Binder | | Active material | | Solvent |
| | Type | Content (%) | Type | Content (%) | Type | Content (%) | Type | Content (%) | Type | Content (%) |
| Example B10-1 | b | 0.04 | HS 100 | 2.0 | PVDF | 2.0 | LCO | 54.0 | NMP | 42.0 |
| Example B10-2 | b | 0.04 | HS 100 | 2.0 | PVDF | 2.0 | NCA | 54.0 | NMP | 42.0 |
| Example B10-3 | b | 0.04 | HS 100 | 2.0 | PVDF | 2.0 | LFP | 48.0 | NMP | 48.0 |
| Comparative Example B10-1 | ba | 0.04 | HS 100 | 2.0 | PVDF | 2.0 | LCO | 54.0 | NMP | 42.0 |
| Comparative Example B10-2 | ba | 0.04 | HS 100 | 2.0 | PVDF | 2.0 | NCA | 54.0 | NMP | 42.0 |
| Comparative Example B10-3 | ba | 0.04 | HS 100 | 2.0 | PVDF | 2.0 | LFP | 48.0 | NMP | 48.0 |

<Evaluation Results>

Table 74 shows evaluation results of ionic resistance, reaction resistance, room temperature rate characteristic, and low-temperature discharge characteristic of Examples B10-1 to B10-3 and Comparative Examples B10-1 to B10-3.

TABLE 74

|  | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B10-1 | b | 10 | 425 | 5.0 | 68.0 | 75.2 |
| Example B10-2 | b | 10 | 420 | 5.0 | 68.7 | 74.1 |
| Example B10-3 | b | 10 | 418 | 5.7 | 69.0 | 75.8 |
| Comparative Example B10-1 | ba | 17 | 620 | 10.5 | 53.5 | 42.3 |

TABLE 74-continued

| | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Comparative Example B10-2 | ba | 17 | 613 | 10.3 | 53.1 | 41.7 |
| Comparative Example B10-3 | ba | 18 | 646 | 11.1 | 53.9 | 43.4 |

Although there were differences in battery characteristics depending on a performance of the active material, when comparing the examples and the comparative examples with the same active materials, it was confirmed that all characteristics were improved in Examples B10-1 to B10-3.

Subsequently, a case of using the dispersion composition of the present invention in the anode was evaluated.

Example B11-1

<Preparation of Carbon Material Dispersion Varnish>
According to the composition shown in Table 75, the carbon material dispersion liquid which contains the dispersant a and was produced in Example B3-1 was mixed with a binder and N-methyl-2-pyrrolidone with a disper. Thereby, a carbon material dispersion varnish was obtained.

<Preparation of Anode Mixture Paste>
According to the composition shown in Table 75, the prepared carbon material dispersion varnish containing the dispersant a was mixed with an active material and N-methyl-2-pyrrolidone with a disper. Thereby, an anode mixture paste was obtained.

TABLE 75

| | Dispersant | | Carbon material | | Binder | | Active material | | Solvent | |
|---|---|---|---|---|---|---|---|---|---|---|
| | Type | Content (%) | Type | Content (%) | Type | Content (%) | Type | Content (%) | Type | Content (%) |
| Composition of carbon material dispersion liquid | a | 0.2 | HS100 | 10.0 | | | | | NMP | 89.8 |
| Composition of carbon material dispersion varnish | | 0.08 | | 4.0 | PVDF | 8.0 | | | | 87.9 |
| Composition of anode mixture paste | | 0.03 | | 1.5 | | 3.0 | Spheroidal graphite | 45.0 | | 50.5 |

<Production of Electrode>
The prepared anode mixture paste containing the dispersant a was applied onto a copper foil having a thickness of 20 μm using a doctor blade, and then dried at 120° C. for 30 minutes under reduced pressure. Thereafter, the copper foil was rolled with a roller pressing machine. Thereby, an electrode having an application amount of 15 mg/cm$^2$ and a density of 1.8 g/cm$^3$ was produced. An electrode having a uniform thickness and density was obtained.

<Assembly of Cell for Evaluation Anode of Lithium Ion Secondary Battery>
The produced electrode containing the dispersant a was punched out to a diameter of 18 mm to be used as an anode, and a metallic lithium foil (a thickness of 0.15 mm) was used as a cathode. A separator made of a porous polypropylene film (a thickness of 20 μm, and a porosity of 50%) was inserted and laminated between the anode and the cathode, and was filled with 0.1 ml of an electrolyte solution (a non-aqueous electrolyte solution in which LiPF$_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

Examples B11-2 to B11-76

Using the carbon material dispersion liquids which respectively contain the dispersants b to ao and the dispersants ca to di and were produced in Examples B3-2 to B3-76, dispersion was performed with the same composition and by the same method as Example B11-1 to produce a carbon material dispersion varnish and an anode mixture paste. Thereby, a cell for anode evaluation was assembled. Table 76 shows the correspondence between the carbon material dispersion liquid used and the dispersant.

Comparative Examples B11-1 to B11-7

Using the carbon material dispersion liquids which respectively contain the dispersants ba to be and the dispersants ea to ec and were produced in Comparative Examples B3-1 to B3-7, dispersion was performed with the same composition and by the same method as Example B11-1 to produce a carbon material dispersion varnish and an anode mixture paste. Thereby, a cell for anode evaluation was assembled. However, in Comparative Example B11-7, a dispersant was not used, and a composition for a dispersant was changed to a solvent. Table 77 shows the correspondence between the carbon material dispersion liquid used and the dispersant.

TABLE 76

| | Carbon material dispersion liquid | Dispersant |
|---|---|---|
| Example B11-2 | Example B3-2 | b |
| Example B11-3 | Example B3-3 | c |
| Example B11-4 | Example B3-4 | d |
| Example B11-5 | Example B3-5 | e |
| Example B11-6 | Example B3-6 | f |
| Example B11-7 | Example B3-7 | g |
| Example B11-8 | Example B3-8 | h |
| Example B11-9 | Example B3-9 | i |
| Example B11-10 | Example B3-10 | j |
| Example B11-11 | Example B3-11 | k |
| Example B11-12 | Example B3-12 | l |
| Example B11-13 | Example B3-13 | m |
| Example B11-14 | Example B3-14 | n |
| Example B11-15 | Example B3-15 | o |
| Example B11-16 | Example B3-16 | p |
| Example B11-17 | Example B3-17 | q |
| Example B11-18 | Example B3-18 | r |
| Example B11-19 | Example B3-19 | s |
| Example B11-20 | Example B3-20 | t |
| Example B11-21 | Example B3-21 | u |
| Example B11-22 | Example B3-22 | v |
| Example B11-23 | Example B3-23 | w |
| Example B11-24 | Example B3-24 | x |
| Example B11-25 | Example B3-25 | y |
| Example B11-26 | Example B3-26 | z |
| Example B11-27 | Example B3-27 | aa |
| Example B11-28 | Example B3-28 | ab |
| Example B11-29 | Example B3-29 | ac |
| Example B11-30 | Example B3-30 | ad |
| Example B11-31 | Example B3-31 | ae |
| Example B11-32 | Example B3-32 | af |
| Example B11-33 | Example B3-33 | ag |
| Example B11-34 | Example B3-34 | ah |
| Example B11-35 | Example B3-35 | ai |
| Example B11-36 | Example B3-36 | aj |
| Example B11-37 | Example B3-37 | ak |
| Example B11-38 | Example B3-38 | al |
| Example B11-39 | Example B3-39 | am |
| Example B11-40 | Example B3-40 | an |
| Example B11-41 | Example B3-41 | ao |
| Example B11-42 | Example B3-42 | ca |
| Example B11-43 | Example B3-43 | cb |
| Example B11-44 | Example B3-44 | cc |
| Example B11-45 | Example B3-45 | cd |
| Example B11-46 | Example B3-46 | ce |
| Example B11-47 | Example B3-47 | cf |
| Example B11-48 | Example B3-48 | cg |
| Example B11-49 | Example B3-49 | ch |
| Example B11-50 | Example B3-50 | ci |
| Example B11-51 | Example B3-51 | cj |
| Example B11-52 | Example B3-52 | ck |
| Example B11-53 | Example B3-53 | cl |
| Example B11-54 | Example B3-54 | cm |
| Example B11-55 | Example B3-55 | cn |
| Example B11-56 | Example B3-56 | co |
| Example B11-57 | Example B3-57 | cp |
| Example B11-58 | Example B3-58 | cq |
| Example B11-59 | Example B3-59 | cr |
| Example B11-60 | Example B3-60 | cs |
| Example B11-61 | Example B3-61 | ct |
| Example B11-62 | Example B3-62 | cu |
| Example B11-63 | Example B3-63 | cv |
| Example B11-64 | Example B3-64 | cw |
| Example B11-65 | Example B3-65 | cx |
| Example B11-66 | Example B3-66 | cy |
| Example B11-67 | Example B3-67 | cz |
| Example B11-68 | Example B3-68 | da |
| Example B11-69 | Example B3-69 | db |
| Example B11-70 | Example B3-70 | dc |
| Example B11-71 | Example B3-71 | dd |
| Example B11-72 | Example B3-72 | de |
| Example B11-73 | Example B3-73 | df |
| Example B11-74 | Example B3-74 | dg |
| Example B11-75 | Example B3-75 | dh |
| Example B11-76 | Example B3-76 | di |

TABLE 77

| | Carbon material dispersion liquid | Dispersant |
|---|---|---|
| Comparative Example B11-1 | Comparative Example B3-1 | ba |
| Comparative Example B11-2 | Comparative Example B3-2 | bb |
| Comparative Example B11-3 | Comparative Example B3-3 | bc |
| Comparative Example B11-4 | Comparative Example B3-4 | ea |
| Comparative Example B11-5 | Comparative Example B3-5 | eb |
| Comparative Example B11-6 | Comparative Example B3-6 | ec |
| Comparative Example B11-7 | Comparative Example B3-7 | Not used |

<Evaluation of Ionic Resistance>

Impedance was measured under the same conditions as in Example B3-1, and an ionic resistance $|Z|_{ion}$ at −20° C. and room temperature (25° C.) was obtained.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (a lower limit voltage of 0.0V) at room temperature, and discharging was performed with a constant current of 0.1C to a discharge upper limit voltage of 2.0V. 0.1C discharge capacity at the fifth cycle was recorded. Next, the cell for anode evaluation discharged to 2.0V was connected to an impedance analyzer, and AC impedance measurement was performed at 2.0V, amplitude 10 mV, and frequency from 0.1 Hz to 1 MHz. When the results were plotted on the complex plane by a Cole-Cole plot method, a semicircular curve was obtained. A diameter of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature in the same manner, discharging was performed with a constant current of 0.5C to a discharge upper limit voltage of 2.0V, full charging was performed again with 0.1C, and then discharging was performed with a constant current of 5C to 2.0V. A ratio of a 5C discharge capacity to a 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and discharged with a constant current of 0.5C. A ratio of 0.5C discharge capacity at −20° C. to 0.5C discharge capacity at room temperature was defined as a low-temperature discharge characteristic (%).

<Evaluation Results>

The carbon material dispersion liquids, carbon material dispersion varnishes, and anode mixture pastes shown in Examples B11-1 to B11-76 and Comparative Examples B11-1 to B11-6 were in a favorably dispersed state, and sedimentation or thickening did not occur even after the elapse of one month. Regarding the carbon material dispersion liquid, carbon material dispersion varnish, and anode mixture paste of Comparative Example B11-7 in which a dispersant was not used, a viscosity was high and fluidity was inferior from the initial stage, but they were used as themselves for comparison. In addition, sedimentation of the active material was confirmed after the elapse of one month.

Table 78-1 and Table 78-2 show evaluation results of ionic resistance, reaction resistance, room temperature rate characteristic, and low-temperature discharge characteristic of the cell for anode evaluation of Examples B11-1 to B11-76 and Comparative Examples B11-1 to B11-7.

TABLE 78-1

|  | Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B11-1 | a | 10 | 428 | 5.5 | 68.7 | 75.8 |
| Example B11-2 | b | 10 | 421 | 5.2 | 68.9 | 76.0 |
| Example B11-3 | c | 10 | 424 | 5.8 | 68.6 | 75.5 |
| Example B11-4 | d | 10 | 426 | 5.7 | 68.2 | 75.3 |
| Example B11-5 | e | 11 | 443 | 6.4 | 67.5 | 71.9 |
| Example B11-6 | f | 14 | 487 | 8.5 | 63.3 | 63.7 |
| Example B11-7 | g | 12 | 459 | 7.6 | 64.9 | 68.9 |
| Example B11-8 | h | 13 | 478 | 8.1 | 63.6 | 66.4 |
| Example B11-9 | i | 14 | 483 | 8.4 | 63.0 | 64.6 |
| Example B11-10 | j | 12 | 457 | 8.0 | 65.8 | 70.1 |
| Example B11-11 | k | 14 | 492 | 9.0 | 63.0 | 63.4 |
| Example B11-12 | l | 14 | 490 | 8.5 | 62.8 | 63.6 |
| Example B11-13 | m | 13 | 480 | 8.3 | 64.5 | 66.3 |
| Example B11-14 | n | 14 | 486 | 8.6 | 62.9 | 64.1 |
| Example B11-15 | o | 11 | 446 | 6.7 | 67.2 | 72.6 |
| Example B11-16 | p | 12 | 460 | 7.7 | 65.8 | 70.2 |
| Example B11-17 | q | 13 | 477 | 8.2 | 64.1 | 66.5 |
| Example B11-18 | r | 12 | 465 | 7.8 | 65.6 | 69.2 |
| Example B11-19 | s | 11 | 481 | 6.8 | 67.1 | 72.1 |
| Example B11-20 | t | 12 | 457 | 7.7 | 65.7 | 69.5 |
| Example B11-21 | u | 13 | 477 | 8.3 | 64.3 | 67.3 |
| Example B11-22 | v | 12 | 459 | 7.9 | 65.5 | 68.7 |
| Example B11-23 | w | 11 | 442 | 7.0 | 66.9 | 72.3 |
| Example B11-24 | x | 13 | 479 | 8.2 | 63.8 | 67.1 |
| Example B11-25 | y | 11 | 443 | 7.1 | 66.8 | 71.9 |
| Example B11-26 | z | 10 | 430 | 6.0 | 68.4 | 75.9 |
| Example B11-27 | aa | 10 | 428 | 5.5 | 68.1 | 75.3 |
| Example B11-28 | ab | 10 | 425 | 5.7 | 68.2 | 75.2 |
| Example B11-29 | ac | 10 | 426 | 5.6 | 68.2 | 74.7 |
| Example B11-30 | ad | 10 | 427 | 5.5 | 68.3 | 74.6 |
| Example B11-31 | ae | 10 | 430 | 5.6 | 68.7 | 74.5 |
| Example B11-32 | af | 10 | 429 | 5.7 | 68.5 | 74.7 |
| Example B11-33 | ag | 10 | 427 | 5.7 | 68.6 | 74.8 |
| Example B11-34 | ah | 10 | 428 | 5.6 | 68.5 | 74.6 |
| Example B11-35 | ai | 10 | 429 | 5.8 | 68.3 | 74.5 |
| Example B11-36 | aj | 10 | 425 | 5.7 | 68.0 | 74.5 |
| Example B11-37 | ak | 12 | 456 | 7.4 | 66.1 | 69.9 |
| Example B11-38 | al | 10 | 428 | 5.5 | 68.1 | 74.9 |
| Example B11-39 | am | 10 | 421 | 5.6 | 68.9 | 75.7 |
| Example B11-40 | an | 11 | 439 | 6.3 | 65.0 | 72.5 |

TABLE 78-2

|  | Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B11-41 | ao | 12 | 463 | 7.1 | 65.6 | 69.2 |
| Example B11-42 | ca | 10 | 428 | 5.8 | 68.2 | 75.6 |
| Example B11-43 | cb | 10 | 422 | 5.4 | 68.0 | 76.2 |
| Example B11-44 | cc | 10 | 426 | 5.6 | 68.3 | 75.8 |
| Example B11-45 | cd | 10 | 425 | 5.7 | 68.5 | 75.5 |
| Example B11-46 | ce | 11 | 447 | 6.8 | 67.5 | 71.5 |
| Example B11-47 | cf | 14 | 479 | 8.6 | 62.5 | 64.8 |
| Example B11-48 | cg | 12 | 465 | 7.9 | 65.9 | 69.3 |
| Example B11-49 | ch | 13 | 478 | 8.3 | 63.7 | 66.9 |
| Example B11-50 | ci | 14 | 487 | 8.9 | 62.8 | 63.5 |
| Example B11-51 | cj | 12 | 467 | 7.6 | 65.5 | 68.7 |
| Example B11-52 | ck | 14 | 493 | 8.5 | 62.1 | 63.1 |
| Example B11-53 | cl | 14 | 490 | 8.1 | 62.5 | 64.7 |
| Example B11-54 | cm | 13 | 481 | 7.8 | 63.7 | 66.3 |
| Example B11-55 | cn | 14 | 487 | 8.3 | 62.8 | 64.9 |
| Example B11-56 | co | 11 | 445 | 6.1 | 67.4 | 72.1 |

TABLE 78-2-continued

|  | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B11-57 | cp | 12 | 457 | 7.7 | 65.4 | 69.2 |
| Example B11-58 | cq | 13 | 481 | 7.9 | 63.8 | 67.3 |
| Example B11-59 | cr | 12 | 466 | 7.4 | 64.9 | 70.3 |
| Example B11-60 | cs | 11 | 443 | 6.3 | 67.2 | 72.9 |
| Example B11-61 | ct | 12 | 457 | 7.5 | 64.8 | 70.0 |
| Example B11-62 | cu | 13 | 479 | 7.6 | 63.7 | 66.6 |
| Example B11-63 | cv | 12 | 461 | 7.2 | 64.9 | 69.1 |
| Example B11-64 | cw | 11 | 446 | 6.2 | 66.5 | 73.2 |
| Example B11-65 | cx | 13 | 479 | 7.7 | 62.3 | 66.9 |
| Example B11-66 | cy | 11 | 443 | 6.3 | 66.9 | 72.8 |
| Example B11-67 | cz | 10 | 429 | 5.4 | 68.5 | 75.7 |
| Example B11-68 | da | 10 | 427 | 5.1 | 68.7 | 75.5 |
| Example B11-69 | db | 10 | 428 | 5.2 | 68.7 | 75.2 |
| Example B11-70 | dc | 10 | 426 | 5.3 | 68.8 | 75.3 |
| Example B11-71 | dd | 10 | 428 | 6.4 | 68.6 | 75.3 |
| Example B11-72 | de | 10 | 427 | 6.5 | 68.5 | 75.2 |
| Example B11-73 | df | 11 | 443 | 6.4 | 67.4 | 72.7 |
| Example B11-74 | dg | 10 | 421 | 5.1 | 68.3 | 75.8 |
| Example B11-75 | dh | 10 | 422 | 5.2 | 68.3 | 76.0 |
| Example B11-76 | di | 11 | 447 | 6.5 | 67.0 | 71.7 |
| Comparative Example B11-1 | ba | 17 | 527 | 10.7 | 52.1 | 42.8 |
| Comparative Example B11-2 | bb | 18 | 542 | 11.3 | 50.1 | 37.9 |
| Comparative Example B11-3 | bc | 17 | 522 | 10.5 | 52.8 | 41.5 |
| Comparative Example B11-4 | ea | 17 | 517 | 10.5 | 52.3 | 41.7 |
| Comparative Example B11-5 | eb | 18 | 539 | 11.2 | 49.7 | 38.2 |
| Comparative Example B11-6 | ec | 17 | 511 | 10.8 | 51.4 | 42.6 |
| Comparative Example B11-7 | Not used | 16 | 598 | 10.4 | 53.9 | 45.1 |

The effect of reducing ionic resistance and reaction resistance was obtained also in the case of using the dispersion composition of the present invention for the anode, as in the case of using the dispersion composition of the present invention for the cathode.

Example B12-1

<Preparation of Carbon Material Dispersion Liquid>

According to the composition shown in Table 79, water and the dispersant ca were added to a glass bottle and mixed. Thereafter, a carbon material was added thereto and dispersed with a paint conditioner for 2 hours using zirconia beads as media. Thereby, a carbon material dispersion liquid was obtained.

<Preparation of Carbon Material Dispersion Varnish>

According to the composition shown in Table 79, the prepared carbon material dispersion liquid, a binder, and water were mixed with a disper. Thereby, a carbon material dispersion varnish was obtained.

<Preparation of Mixture Paste>

According to the composition shown in Table 79, the prepared carbon material dispersion varnish, an active material, and water were mixed with a disper. Thereby, a cathode mixture paste was obtained.

TABLE 79

|  | Dispersant | | Carbon material | | Binder 1 | | Binder 2 | | Active material | | Solvent | |
|---|---|---|---|---|---|---|---|---|---|---|---|---|
|  | Type | Content (%) | Type | Content (%) | Type | Content (%) | Type | Content (%) | Type | Content (%) | Type | Content (%) |
| Composition of carbon material dispersion liquid | ca | 1 | HS100 | 10.0 |  |  |  |  |  |  | Water | 89.0 |
| Composition of carbon material dispersion varnish |  | 0.6 |  | 6.0 | PTFE | 3.0 | CMC | 1.2 |  |  |  | 89.2 |
| Composition of cathode mixture paste |  | 0.2 |  | 20 |  | 1.0 |  | 0.4 | LFP | 54.0 |  | 42.4 |

<Production of Electrode>
<Assembly of Cell for Evaluation Cathode of Lithium Ion Secondary Battery>

A cell for cathode evaluation was assembled by producing an electrode in the same manner as in Example B3-1 except that the cathode mixture paste containing the dispersant ca was used instead of the cathode mixture paste containing the dispersant a in Example B3-1.

Examples B12-2 to B12-35

A cell for cathode evaluation was assembled by dispersion in the same manner as in Example B12-1 except that the dispersants cb to di shown in Table 80 were used instead of the dispersant ca.

TABLE 80

|  | Dispersant |
|---|---|
| Example B12-1 | ca |
| Example B12-2 | cb |
| Example B12-3 | cc |
| Example B12-4 | cd |
| Example B12-5 | ce |
| Example B12-6 | cf |
| Example B12-7 | cg |
| Example B12-8 | ch |
| Example B12-9 | ci |
| Example B12-10 | cj |
| Example B12-11 | ck |
| Example B12-12 | cl |
| Example B12-13 | cm |
| Example B12-14 | cn |
| Example B12-15 | co |
| Example B12-16 | cp |
| Example B12-17 | cq |
| Example B12-18 | cr |
| Example B12-19 | cs |
| Example B12-20 | ct |
| Example B12-21 | cu |
| Example B12-22 | cv |
| Example B12-23 | cw |
| Example B12-24 | cx |
| Example B12-25 | cy |
| Example B12-26 | cz |
| Example B12-27 | da |
| Example B12-28 | db |
| Example B12-29 | dc |
| Example B12-30 | dd |

TABLE 80-continued

|  | Dispersant |
|---|---|
| Example B12-31 | de |
| Example B12-32 | df |
| Example B12-33 | dg |
| Example B12-34 | dh |
| Example B12-35 | di |

Comparative Examples B12-1 to B12-4

Using the dispersant shown in Table 81, a cell for cathode evaluation was assembled by dispersion in the same manner as in Example B12-1. In Comparative Example B12-4, a dispersant was not used, and a composition for a dispersant was changed to a solvent.

TABLE 81

|  | Dispersant |
|---|---|
| Comparative Example B12-1 | ea |
| Comparative Example B12-2 | eb |
| Comparative Example B12-3 | ec |
| Comparative Example B12-4 | Not used |

<Evaluation Results>

All of the carbon material dispersion liquids, carbon material dispersion varnishes, and cathode mixture pastes prepared in Examples B12-1 to B12-35 and Comparative Examples B12-1 to B12-3 were in a favorably dispersed state, and sedimentation or thickening did not occur even after the elapse of one month. Regarding the carbon material dispersion liquid, carbon material dispersion varnish, and cathode mixture paste of Comparative Examples B12-4 in which a dispersant was not used, a viscosity was high and there were many coarse particles from the initial stage, but they were used as themselves for comparison. After the elapse of one month, the dispersed material had gelled.

Using the cells for cathode evaluation of Examples B12-1 to B12-35 and Comparative Examples B12-1 to B12-4, and using the same method as Example B3-1, ionic resistance, reaction resistance, room temperature rate characteristic, low-temperature discharge characteristic were evaluated. The results are shown in Table 82.

TABLE 82

|  | Dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|
| Example B12-1 | ca | 10 | 424 | 5.3 | 68.3 | 75.8 |
| Example B12-2 | cb | 10 | 420 | 5.1 | 69.0 | 76.0 |
| Example B12-3 | cc | 10 | 428 | 5.2 | 68.7 | 75.6 |
| Example B12-4 | cd | 10 | 430 | 5.4 | 68.5 | 75.7 |
| Example B12-5 | ce | 11 | 440 | 6.2 | 66.9 | 71.8 |
| Example B12-6 | cf | 14 | 484 | 8.1 | 63.1 | 65.0 |
| Example B12-7 | cg | 12 | 455 | 7.1 | 64.9 | 70.5 |
| Example B12-8 | ch | 13 | 475 | 7.7 | 65.8 | 67.3 |
| Example B12-9 | ci | 14 | 490 | 8.3 | 62.9 | 64.8 |
| Example B12-10 | cj | 12 | 460 | 7.2 | 65.7 | 70.1 |
| Example B12-11 | ck | 14 | 492 | 8.4 | 62.2 | 63.1 |
| Example B12-12 | cl | 14 | 487 | 8.2 | 62.5 | 63.9 |
| Example B12-13 | cm | 13 | 480 | 7.6 | 65.8 | 67.2 |
| Example B12-14 | cn | 14 | 476 | 8.2 | 62.8 | 64.3 |
| Example B12-15 | co | 11 | 441 | 6.4 | 67.2 | 72.7 |
| Example B12-16 | cp | 12 | 458 | 7.3 | 65.9 | 69.2 |
| Example B12-17 | cq | 14 | 479 | 7.8 | 65.3 | 66.6 |

TABLE 82-continued

| | Dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|
| Example B12-18 | cr | 12 | 467 | 7.2 | 66.0 | 68.6 |
| Example B12-19 | cs | 11 | 443 | 6.5 | 67.3 | 71.9 |
| Example B12-20 | ct | 12 | 461 | 7.2 | 66.1 | 69.3 |
| Example B12-21 | cu | 13 | 472 | 7.7 | 65.1 | 67.0 |
| Example B12-22 | cv | 12 | 460 | 7.4 | 65.3 | 70.1 |
| Example B12-23 | cw | 11 | 447 | 6.3 | 66.8 | 72.8 |
| Example B12-24 | cx | 13 | 481 | 7.8 | 65.2 | 66.0 |
| Example B12-25 | cy | 11 | 444 | 6.2 | 66.5 | 73.2 |
| Example B12-26 | cz | 10 | 423 | 5.1 | 68.2 | 75.2 |
| Example B12-27 | da | 10 | 425 | 5.4 | 68.5 | 74.8 |
| Example B12-28 | db | 10 | 427 | 5.3 | 68.4 | 75.3 |
| Example B12-29 | dc | 10 | 426 | 5.2 | 68.3 | 74.9 |
| Example B12-30 | dd | 10 | 422 | 5.2 | 68.5 | 74.7 |
| Example B12-31 | de | 10 | 423 | 5.3 | 68.2 | 75.6 |
| Example B12-32 | df | 11 | 440 | 6.4 | 67.0 | 73.5 |
| Example B12-33 | dg | 10 | 429 | 5.1 | 68.4 | 75.8 |
| Example B12-34 | dh | 10 | 427 | 5.2 | 68.5 | 75.7 |
| Example B12-35 | di | 11 | 441 | 6.1 | 67.1 | 74.6 |
| Comparative Example B12-1 | ea | 17 | 526 | 10.4 | 50.9 | 42.7 |
| Comparative Example B12-2 | eb | 18 | 543 | 10.2 | 50.1 | 38.9 |
| Comparative Example B12-3 | ec | 17 | 521 | 10.6 | 51.4 | 42.2 |
| Comparative Example B12-4 | Not used | 16 | 511 | 9.9 | 52.3 | 44.5 |

Examples B12-1 to B12-35 were excellent in all characteristics, and it was confirmed that the same effect was obtained even in a case where a solvent was water.

[Examples B13-1 to B13-8] Combination Use 1 with Polymer Dispersant

A carbon material dispersion liquid, a carbon material dispersion varnish, a cathode mixture paste, and an electrode were produced in the same manner as in Example B3-2, except that half of the dispersant b used in Example B3-2 was replaced with the polymer dispersant shown in Table 83, and a cell for cathode evaluation was assembled.

Comparative Examples B13-1 to B13-8

A carbon material dispersion liquid, a carbon material dispersion varnish, a cathode mixture paste, and an electrode were produced in the same manner as in Comparative Example B3-1, except that half of the dispersant ba used in Comparative Example B3-1 was replaced with the polymer dispersant shown in Table 83, and a cell for cathode evaluation was assembled.

TABLE 83

| | Dispersant | Polymer dispersant | | Dispersant | Polymer dispersant |
|---|---|---|---|---|---|
| Example B3-2 | b | — | Comparative Example B3-1 | ba | — |
| Example B13-1 | b | PVA-103 | Comparative Example B13-1 | ba | PVA-103 |
| Example B13-2 | b | PVA-403 | Comparative Example B13-2 | ba | PVA-403 |
| Example B13-3 | b | KL-506 | Comparative Example B13-3 | ba | KL-506 |
| Example B13-4 | b | L-3266 | Comparative Example B13-4 | ba | L-3266 |
| Example B13-5 | b | K-434 | Comparative Example B13-5 | ba | K-434 |
| Example B13-6 | b | PVB-A | Comparative Example B13-6 | ba | PVB-A |
| Example B13-7 | b | SM-15 | Comparative Example B13-7 | ba | SM-15 |
| Example B13-8 | b | ETHOCEL-10 | Comparative Example B13-8 | ba | ETHOCEL-10 |

<Peeling Strength Test>

A specimen for measuring peeling strength of the electrode was cut into two 90 mm×20 mm rectangles with a coating direction as a major axis, and used. The peeling strength was measured using a desktop tensile tester (STROGRAPH E3 manufactured by Toyo Seiki Seisaku-sho, Ltd.), and was evaluated by a 180-degree peeling test method. Specifically, a double-sided tape (No. 5000NS, manufactured by Nitoms, Inc.) having a size of 100 mm×30 mm was attached to a stainless steel plate, and a produced battery electrode mixture layer was adhered to the other side of the double-sided tape. Peeling was performed by pulling the tape upward from below at a constant speed (50 mm/min), and an average value of stress at this time was used as peeling strength. The results of the peeling strength test were as follows: A: excellent, B: no problem (favorable), C: peeling strength lower than B but no problem (usable), D: low strength and easy to be peeled (very poor).

<Evaluation Results>

All of the carbon material dispersion liquids, carbon material dispersion varnishes, and cathode mixture pastes prepared in Examples B13-1 to B13-8 and Comparative Examples B13-1 to B13-8 were in a favorably dispersed state, although a viscosity was slightly higher than those of Example B3-2 and Comparative Example B3-1, and sedimentation or thickening did not occur even after the elapse of one month.

Table 84 shows the results of the peeling strength test of the electrodes produced in Example B3-2, Examples B13-1 to B13-8, Comparative Example B3-1, and Comparative Examples B13-1 to B13-8. Compared to Comparative Example B3-1 in which only the dispersant ba was used, peeling strength was improved in all Comparative Examples B13-1 to B13-8 in which various polymer dispersants were used in combination. The reason why the peeling strength was improved although an increased amount was slight is thought to be that polymer components that can participate in film formation was contained instead of the low molecular weight dispersant ba which has no film forming ability. Meanwhile, when compared to Example B3-2 in which only the dispersant b was used, a significant improvement was observed in all Examples B13-1 to B13-8 in which various polymer dispersants were used in combination.

TABLE 84

|  | Peeling strength |
| --- | --- |
| Example B3-2 | C |
| Example B13-1 | B |
| Example B13-2 | B |
| Example B13-3 | A |
| Example B13-4 | B to A |
| Example B13-5 | B to A |
| Example B13-6 | B to A |
| Example B13-7 | A |
| Example B13-8 | B |
| Comparative Example B3-1 | C |
| Comparative Example B13-1 | C to B |
| Comparative Example B13-2 | C to B |
| Comparative Example B13-3 | B |
| Comparative Example B13-4 | C to B |
| Comparative Example B13-5 | C to B |
| Comparative Example B13-6 | C to B |
| Comparative Example B13-7 | B |
| Comparative Example B13-8 | C to B |

Using the cells for cathode evaluation of Example B3-2, Examples B13-1 to B13-8, Comparative Example B3-1, and Comparative Examples B13-1 to B13-8, and using the same method as Example B3-1, ionic resistance, reaction resistance, room temperature rate characteristic were evaluated. The results are shown in Table 85.

TABLE 85

|  | Dispersant Type | Polymer dispersant Type | $|Z|_{ion}$ at 25° C. [Ω] | $|Z|_{ion}$ at −20° C. [Ω] | $|Z|_{re}$ at 25° C. [Ω] | Room temperature rate characteristic [%] |
| --- | --- | --- | --- | --- | --- | --- |
| Example B3-2 | b | — | 10 | 421 | 4.9 | 69.1 |
| Example B13-1 | b | PVA-103 | 10 | 426 | 5.2 | 68.8 |
| Example B13-2 | b | PVA-403 | 11 | 440 | 6.2 | 67.4 |
| Example B13-3 | b | KL-506 | 11 | 445 | 6.3 | 66.8 |
| Example B13-4 | b | L-3266 | 10 | 426 | 5.4 | 68.3 |
| Example B13-5 | b | K-434 | 11 | 443 | 6.4 | 67.1 |
| Example B13-6 | b | PVB-A | 10 | 425 | 5.3 | 68.6 |
| Example B13-7 | b | MS-15 | 10 | 423 | 5.3 | 68.5 |
| Example B13-8 | b | ETHOCEL-10 | 11 | 444 | 6.3 | 66.9 |
| Comparative Example B3-1 | ba | — | 17 | 615 | 10.5 | 53.4 |
| Comparative Example B13-1 | ba | PVA-103 | 17 | 615 | 10.5 | 53.4 |
| Comparative Example B13-2 | ba | PVA-403 | 18 | 618 | 10.9 | 51.6 |
| Comparative Example B13-3 | ba | KL-506 | 17 | 617 | 10.7 | 52.8 |
| Comparative Example B13-4 | ba | L-3266 | 18 | 624 | 11.3 | 51.1 |
| Comparative Example B13-5 | ba | K-434 | 18 | 623 | 11.2 | 50.4 |
| Comparative Example B13-6 | ba | PVB-A | 17 | 619 | 10.7 | 51.5 |

TABLE 85-continued

|  | Dispersant Type | Polymer dispersant Type | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] |
|---|---|---|---|---|---|---|
| Comparative Example B13-7 | ba | MS-15 | 17 | 618 | 10.6 | 52.9 |
| Comparative Example B13-8 | ba | ETHOCEL-10 | 18 | 625 | 11.5 | 49.7 |

Examples B13-1 to B13-8 were excellent in all characteristics, and were comparable to Example B3-2. By using the dispersant of the present invention in combination with the polymer dispersant, it was possible to significantly improve peeling strength while maintaining excellent dispersibility and battery characteristic. Comparative Examples B13-1 to B13-8 were comparable to Comparative Example B3-1, and it was found that a battery characteristic was hardly affected even when the polymer dispersant was used.

Examples B13-9 to B13-14

Referring to the test results of peeling strength of Examples B13-1 to B13-8, the same test was performed on KL-506 and SM-15 in which the effect was particularly excellent to confirm whether the effect of improving peeling strength can be obtained with respect to other dispersants of the present invention. A carbon material dispersion liquid, a carbon material dispersion varnish, a cathode mixture paste, and an electrode were produced in the same manner as in Example B13-1, except that a half amount of the dispersants a, c, and d used in Examples B3-1, B3-3, and B3-4, respectively, was replaced with the polymer dispersant shown in Table 86, and a cell for cathode evaluation was assembled.

Comparative Examples B13-9 to B13-12

A carbon material dispersion liquid, a carbon material dispersion varnish, a cathode mixture paste, and an electrode were produced in the same manner as in Comparative Example B13-1, except that a half amount of the dispersants bb and bc used in Comparative Examples B3-2 and B3-3, respectively, was replaced with the polymer dispersant shown in Table 86, and a cell for cathode evaluation was assembled.

TABLE 86

|  | Dispersant | Polymer dispersant |  | Dispersant | Polymer dispersant |
|---|---|---|---|---|---|
| Example B3-1 | a | — | Comparative Example B3-2 | bb | — |
| Example B13-9 | a | KL-506 | Comparative Example B13-9 | bb | KL-506 |
| Example B13-10 | a | SM-15 | Comparative Example B13-10 | bb | SM-15 |
| Example B3-3 | c | — | Comparative Example B3-3 | bc | — |
| Example B13-11 | c | KL-506 | Comparative Example B13-11 | bc | KL-506 |
| Example B13-12 | c | SM-15 | Comparative Example B13-12 | bc | SM-15 |
| Example B3-4 | d | — |  |  |  |
| Example B13-13 | d | KL-506 |  |  |  |
| Example B13-14 | d | SM-15 |  |  |  |

<Evaluation Results>

Table 87 shows the results of the peeling strength test of the electrodes produced in Examples B3-1, B3-3, and B3-4, Examples B13-9 to B13-14, Comparative Examples B3-2 and 3-3, and Comparative Examples B13-9 to B13-12. As in the case of the dispersant ba, peeling strength was not specifically improved even when the dispersants bb and bc, and various polymer dispersants were used in combination, whereas as in the case of the dispersant b, a specific improvement in peeling strength was confirmed by using the dispersants a, c, and d in combination with various polymer dispersants. Furthermore, the same tendency was confirmed when other dispersants of the present invention were used.

The reason for this is thought to be that, because this effect is unique to the dispersant of the present invention, by a structure in which —NH—R' represented by General Formula (1) and two hydroxyl groups are directly connected to one triazine ring, strong intermolecular force such as hydrogen bonding acted between the dispersant and the polymer dispersant.

TABLE 87

|  | Peeling strength |
|---|---|
| Example B3-1 | C |
| Example B13-9 | A |
| Example B13-10 | A |
| Example B3-3 | C |
| Example B13-11 | A |
| Example B13-12 | A |
| Example B3-4 | C |
| Example B13-13 | A |
| Example B13-14 | A |
| Comparative Example B3-2 | C |
| Comparative Example B13-9 | B |
| Comparative Example B13-10 | B |
| Comparative Example B3-3 | C |
| Comparative Example B13-11 | B |
| Comparative Example B13-12 | B |

The ionic resistance, reaction resistance, room temperature rate characteristic, and low-temperature discharge characteristic of the cells for cathode evaluation produced in Examples B13-9 to B13-14 were excellent in the case where the dispersant of the present invention was used alone, as in the case of Examples B13-1 to B13-8. On the other hand, the ionic resistance, reaction resistance, room temperature rate characteristic, and low-temperature discharge characteristic of the cells for cathode evaluation produced in Comparative Examples B13-9 to B13-12 were the same level as those of the case where the polymer dispersant was not used, and no differences were observed, as in the case of Comparative Examples B13-1 to B13-8.

[Examples B13-15 to B13-22] Combination Use 2 with Polymer Dispersant

A carbon material dispersion liquid, a carbon material dispersion varnish, a cathode mixture paste, and an electrode were produced in the same manner as in Example B3-43, except that half of the dispersant cb used in Example B3-43 was replaced with the polymer dispersant shown in Table 88, and a cell for cathode evaluation was assembled.

[Examples B13-23 to B13-30] Combination Use 3 with Polymer Dispersant

A carbon material dispersion liquid, a carbon material dispersion varnish, a cathode mixture paste, and an electrode were produced in the same manner as in Example B12-2, except that half of the dispersant cb used in Example B12-2 was replaced with the polymer dispersant shown in Table 88, and a cell for cathode evaluation was assembled.

TABLE 88

|  | Dispersant | Polymer dispersant | Solvent |  | Dispersant | Polymer dispersant | Solvent |
|---|---|---|---|---|---|---|---|
| Example B3-43 | cb | — | NMP | Example B12-2 | cb | — | Water |
| Example B13-15 | cb | PVA-103 | NMP | Example B13-23 | cb | PVA-103 | Water |
| Example B13-16 | cb | PVA-403 | NMP | Example B13-24 | cb | PVA-403 | Water |
| Example B13-17 | cb | KL-506 | NMP | Example B13-25 | cb | KL-506 | Water |
| Example B13-18 | cb | L-3266 | NMP | Example B13-26 | cb | L-3266 | Water |
| Example B13-19 | cb | K-434 | NMP | Example B13-27 | cb | K-434 | Water |
| Example B13-20 | cb | PVB-A | NMP | Example B13-28 | cb | PVB-A | Water |
| Example B13-21 | cb | SM-15 | NMP | Example B13-29 | cb | SM-is | Water |
| Example B13-22 | cb | ETHOCEL-10 | NMP | Example B13-30 | cb | ETHOCEL-10 | Water |

Comparative Examples B13-13 to B13-20

A carbon material dispersion liquid, a carbon material dispersion varnish, a cathode mixture paste, and an electrode were produced in the same manner as in Comparative Example B3-4, except that half of the dispersant ea used in Comparative Example B3-4 was replaced with the polymer dispersant shown in Table 89, and a cell for cathode evaluation was assembled.

Comparative Examples B13-21 to B13-28

A carbon material dispersion liquid, a carbon material dispersion varnish, a cathode mixture paste, and an electrode were produced in the same manner as in Comparative Example B12-1, except that half of the dispersant ea used in Comparative Example B12-1 was replaced with the polymer dispersant shown in Table 89, and a cell for cathode evaluation was assembled.

TABLE 89

|  | Dispersant | Polymer dispersant | Solvent |  | Dispersant | Polymer dispersant | Solvent |
|---|---|---|---|---|---|---|---|
| Comparative Example B3-4 | ea | — | NMP | Comparative Example B12-1 | ea | — | Water |
| Comparative Example B13-13 | ea | PVA-103 | NMP | Comparative Example B13-21 | ea | PVA-103 | Water |
| Comparative Example B13-14 | ea | PVA-403 | NMP | Comparative Example B13-22 | ea | PVA-403 | Water |

TABLE 89-continued

| | Dispersant | Polymer dispersant | Solvent | | Dispersant | Polymer dispersant | Solvent |
|---|---|---|---|---|---|---|---|
| Comparative Example B13-15 | ea | KL-506 | NMP | Comparative Example B13-23 | ea | KL-506 | Water |
| Comparative Example B13-16 | ea | L-3266 | NMP | Comparative Example B13-24 | ea | L-3266 | Water |
| Comparative Example B13-17 | ea | K-434 | NMP | Comparative Example B13-25 | ea | K-434 | Water |
| Comparative Example B13-18 | ea | PVB-A | NMP | Comparative Example B13-26 | ea | PVB-A | Water |
| Comparative Example B13-19 | ea | SM-15 | NMP | Comparative Example B13-27 | ea | SM-15 | Water |
| Comparative Example B13-20 | ea | ETHOCEL-10 | NMP | Comparative Example B13-28 | ea | ETHOCEL-10 | Water |

<Evaluation Results>

Table 90 shows the results of the peeling strength test of Examples B3-43 and B12-2, Examples B13-15 to B13-30, Comparative Example B3-4, Comparative Example B12-1, and Comparative Examples B13-13 to B13-28. Regardless of whether which was used among an amine or an inorganic base, and even when the solvent type was changed, the tendency of peeling strength did not change. Accordingly, it was suggested that this specific peeling strength improvement effect is a phenomenon specific to the triazine derivative structure of the present invention.

TABLE 90

| | Peeling strength | | Peeling strength |
|---|---|---|---|
| Example B3-43 | C | Example B12-2 | C |
| Example B13-15 | B | Example B13-23 | B |
| Example B13-16 | B | Example B13-24 | B |
| Example B13-17 | A | Example B13-25 | A |
| Example B13-18 | B to A | Example B13-26 | B to A |
| Example B13-19 | B to A | Example B13-27 | B to A |
| Example B13-20 | B to A | Example B13-28 | B to A |
| Example B13-21 | A | Example B13-29 | A |
| Example B13-22 | B | Example B13-30 | B |
| Comparative Example B3-4 | C | Comparative Example B12-1 | C |
| Comparative Example B13-13 | C to B | Comparative Example B13-21 | C to B |
| Comparative Example B13-14 | C to B | Comparative Example B13-22 | C to B |
| Comparative Example B13-15 | B | Comparative Example B13-23 | B |
| Comparative Example B13-16 | C to B | Comparative Example B13-24 | C to B |
| Comparative Example B13-17 | C to B | Comparative Example B13-25 | C to B |
| Comparative Example B13-18 | C to B | Comparative Example B13-26 | C to B |
| Comparative Example B13-19 | B | Comparative Example B13-27 | B |
| Comparative Example B13-20 | C to B | Comparative Example B13-28 | C to B |

Also in the cells for cathode evaluation of Examples B13-15 to B13-30, ionic resistance, reaction resistance, room temperature rate characteristic, and low-temperature discharge characteristic were as excellent as those of the case in which the polymer dispersant was not used. Meanwhile, in the cells for cathode evaluation of Comparative Examples B13-13 to B13-28, ionic resistance, reaction resistance, room temperature rate characteristic, and low-temperature discharge characteristic were also the same level as those of the case in which the polymer dispersant was not used. Furthermore, the same tendency could be confirmed when other dispersants of the present invention were used.

Next, the following tests were conducted to confirm whether the same peeling strength improvement effect was obtained with respect to the anode.

Examples B14-1 to B14-2

A carbon material dispersion liquid, a carbon material dispersion varnish, an anode mixture paste, and an electrode were produced in the same manner as in Example B11-2, except that half of the dispersant b used in Example B11-2 was replaced with the polymer dispersant shown in Table 91, and a cell for anode evaluation was assembled.

TABLE 91

| | Dispersant | Polymer dispersant |
|---|---|---|
| Example B11-2 | b | — |
| Example B14-1 | b | KL-506 |
| Example B14-2 | b | SM-15 |

The ionic resistance, reaction resistance, room temperature rate characteristic, and low-temperature discharge characteristic of the cells for anode evaluation of Examples B14-1 and B14-2 were the same level as those of Example B11-2. In addition, the test results of peeling strength are shown in Table 47. As in the case of using the cathode, it could be confirmed that, by using the dispersant b and the polymer dispersant in combination, peeling strength was significantly improved while maintaining an excellent battery characteristic. Furthermore, the same tendency could be confirmed when other dispersants of the present invention were used, or when other polymer dispersants were used.

TABLE 92

|  | Peeling strength |
|---|---|
| Example B11-2 | C |
| Example B14-1 | A |
| Example B14-2 | A |

Combination used with two types of polymer dispersants

Example B15-1

Subsequently, the behavior when two types of polymer dispersants were used in combination was confirmed. A carbon material dispersion liquid, a carbon material dispersion varnish, a cathode mixture paste, and an electrode were produced in the same manner as in Example B13-3, except that another half amount of KL-506 used in Example B13-3 was replaced with SM-15, and a cell for cathode evaluation was assembled.

Example B15-2

A carbon material dispersion liquid, a carbon material dispersion varnish, a cathode mixture paste, and an electrode were produced in the same manner as in Example B13-17, except that another half amount of KL-506 used in Example B13-17 was replaced with SM-15, and a cell for cathode evaluation was assembled.

Example B15-3

A carbon material dispersion liquid, a carbon material dispersion varnish, a cathode mixture paste, and an electrode were produced in the same manner as in Example B13-25, except that another half amount of KL-506 used in Example B13-25 was replaced with SM-15, and a cell for cathode evaluation was assembled.

The test results of peeling strength of Examples B15-1 to B15-3 are shown in Table 93. In any example, peeling strength was extremely favorable, and the peeling strength was higher than when one type of polymer dispersant was used. In addition, the ionic resistance, reaction resistance, room temperature rate characteristic, and low-temperature discharge characteristic were all excellent. Furthermore, it was separately confirmed that the same tendency was observed when other dispersants of the present invention were used, or when they were used in combination with other polymer dispersants.

TABLE 93

|  | Dispersant | Polymer dispersant | Solvent | Peeling strength |
|---|---|---|---|---|
| Example B15-1 | b | KL-506/SM-15 | NMP | A |
| Example B15-2 | cb | KL-506/SM-15 | NMP | A |
| Example B15-3 | cb | KL-506/SM-15 | Water | A |

Based on the above verification, when workability and peeling for a long period of time of the electrode become problems, by combining the dispersant of the present invention and the polymer dispersant, this can be compensated while still taking advantage of the effects of the present invention. In addition, since a significant peeling strength improvement effect is obtained, it is possible to increase an amount of conduction auxiliary agent and active material by reducing an amount of binder, and to design a battery according to the intended use of the battery, such as higher output or higher capacity.

Third Example Group

In Third Example Group, the effect of combination use of the dispersant containing the triazine derivative mainly represented by General Formula (1) with the polymer dispersant will be described. In Third Example Group, examples having the suffix "a" in the example number are examples having no polymer dispersant.

<Triazine Derivative>

Structures of the triazine derivatives A to T represented by General Formula (1) of the present invention are shown below. A method for manufacturing the triazine derivatives A to T represented by General Formula (1) used in the present invention is not particularly limited, and a well-known method can be applied. For example, a method described in JP2004-217842A can be applied. The disclosure by the above publication is partially incorporated in the present specification by reference.

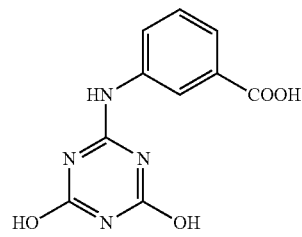

A

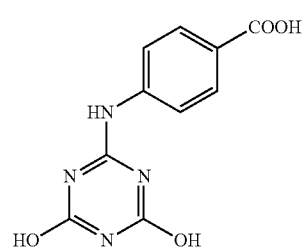

B

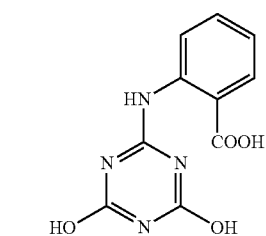

C

D
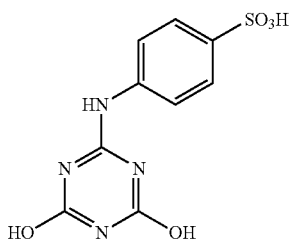
E
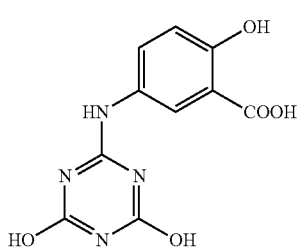
F
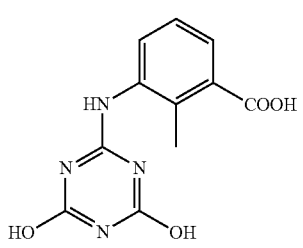
G
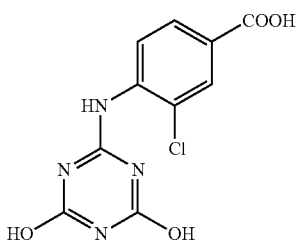
H
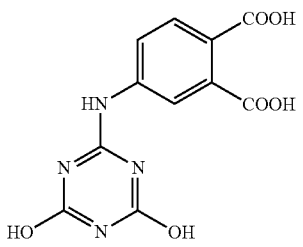
I
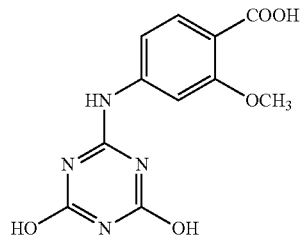
J
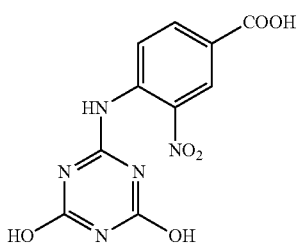
K
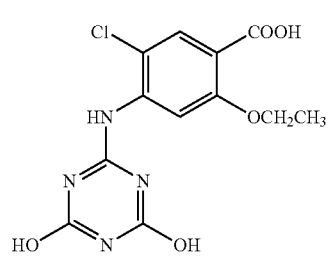
L
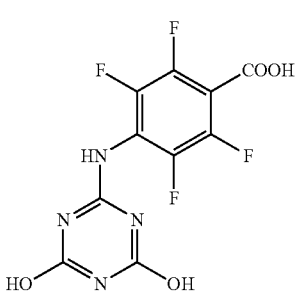
M
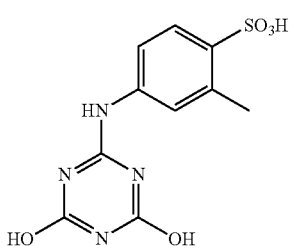
N
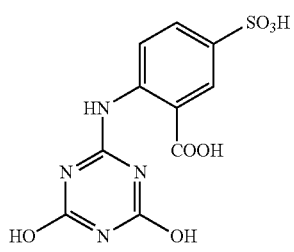
O
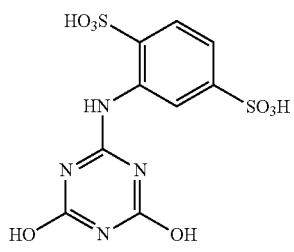

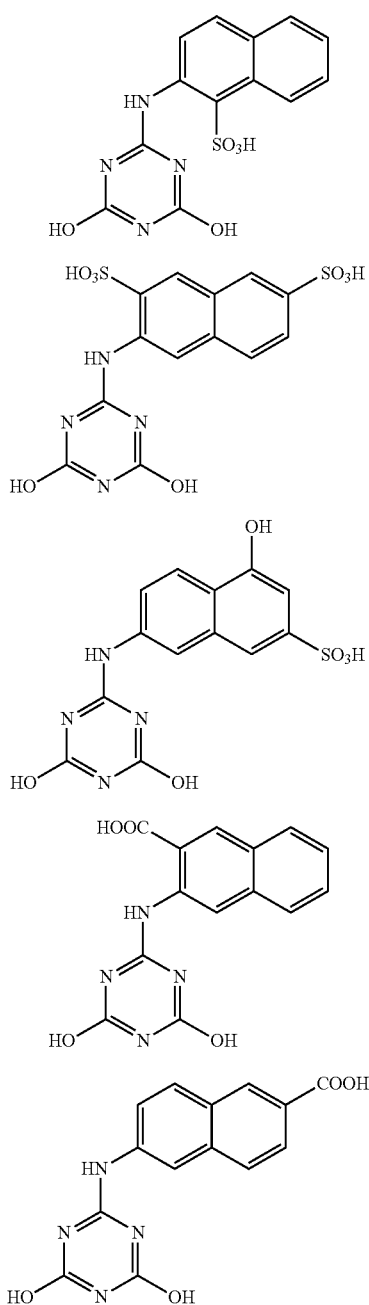

<Manufacture Example of Dispersant Composed of Triazine Derivative and Amine>

Dispersants a to aj shown in Table 94 were manufactured by methods described in the following examples.

TABLE 94

| Dispersant | Triazine derivative | Amine | Molar equivalent of amine with respect to triazine derivative |
|---|---|---|---|
| a | Triazine derivative A | Octylamine | 1.0 |
| b | Triazine derivative B | Octylamine | 1.0 |
| c | Triazine derivative C | Octylamine | 1.0 |
| d | Triazine derivative D | Octylamine | 1.0 |

TABLE 94-continued

| Dispersant | Triazine derivative | Amine | Molar equivalent of amine with respect to triazine derivative |
|---|---|---|---|
| e | Triazine derivative E | Octylamine | 1.0 |
| f | Triazine derivative F | Octylamine | 1.0 |
| g | Triazine derivative G | Octylamine | 1.0 |
| h | Triazine derivative H | Octylamine | 1.0 |
| i | Triazine derivative I | Octylamine | 1.0 |
| j | Triazine derivative J | Octylamine | 1.0 |
| k | Triazine derivative K | Octylamine | 1.0 |
| l | Triazine derivative L | Octylamine | 1.0 |
| m | Triazine derivative M | Octylamine | 1.0 |
| n | Triazine derivative N | Octylamine | 1.0 |
| o | Triazine derivative O | Octylamine | 1.0 |
| p | Triazine derivative P | Octylamine | 1.0 |
| q | Triazine derivative Q | Octylamine | 1.0 |
| r | Triazine derivative R | Octylamine | 1.0 |
| s | Triazine derivative S | Octylamine | 1.0 |
| t | Triazine derivative T | Octylamine | 1.0 |
| u | Triazine derivative A | Propylamine | 1.0 |
| v | Triazine derivative C | Stearylamine | 1.0 |
| w | Triazine derivative K | 2-Aminoethanol | 1.0 |
| x | Triazine derivative L | Dibutylamine | 1.0 |
| y | Triazine derivative I | Dioctylamine | 1.0 |
| z | Triazine derivative H | Distearylamine | 1.0 |
| aa | Triazine derivative C | Triethylamine | 1.0 |
| ab | Triazine derivative A | Dimethyloctylamine | 1.0 |
| ac | Triazine derivative J | Trioctylamine | 1.0 |
| ad | Triazine derivative B | Dimethylstearylamine | 1.0 |
| ae | Triazine derivative F | Triethanolamine | 1.0 |
| af | Triazine derivative A | Octylamine | 0.1 |
| ag | Triazine derivative A | Octylamine | 0.3 |
| ah | Triazine derivative A | Octylamine | 0.5 |
| ai | Triazine derivative A | Octylamine | 2.0 |
| aj | Triazine derivative A | Octylamine | 5.0 |

(Manufacture of Dispersant a)

0.040 mol of the triazine derivative A was added to 200 g of water. 0.040 mol of octylamine was added thereto and stirred at 60° C. for 2 hours. After cooling to room temperature, filtration and purification were performed. The obtained residue was dried at 90° C. for 48 hours, and thereby a dispersant a was obtained.

(Manufacture Example of Dispersants b to t)

Dispersants b to t were obtained by manufacture in the same manner as the dispersant a, except that triazine derivatives B to T described in Table 94 were respectively added instead of the triazine derivative A in the manufacture of the dispersant a.

(Manufacture Example of Dispersants u to ae)

Dispersants u to ae were obtained by manufacture in the same manner as the dispersant a, except that triazine derivatives described in Table 94 were respectively added instead of the triazine derivative A, and amines described in Table 94 were respectively added instead of octylamine in the manufacture of the dispersant a.

(Manufacture Example of Dispersants af to aj)

Dispersants af to aj were obtained by manufacture in the same manner as the dispersant a except that amounts of octylamine added in the manufacture of the dispersant a were respectively changed to addition amounts which are described in Table 94.

Structures of triazine derivatives AA and AB used in the dispersants ba and bb are shown below. A method for manufacturing the triazine derivatives AA and AB used in the comparative examples is not particularly limited, and a well-known method can be applied. For example, a method described in JP2004-217842A can be applied. The disclosure by the above publication is partially incorporated in the present specification by reference.

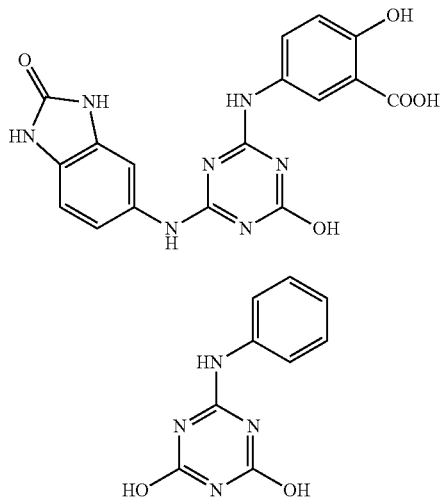

AA

AB

The dispersants ba and bb described in Table 95 were manufactured by the method described below.

TABLE 95

| Dispersant | Triazine derivative | Amine | Molar equivalent of amine with respect to triazine derivative |
|---|---|---|---|
| ba | Triazine derivative AA | Octylamine | 1.0 |
| bb | Triazine derivative AB | Octylamine | 1.0 |

(Manufacture Example of Dispersants ba and bb)

Dispersants ba and bb were obtained by manufacture in the same manner as the dispersant a, except that triazine derivatives AA and AB described in Table 95 were respectively added instead of the triazine derivative A in the manufacture of the dispersant a.

<Manufacture Example of Dispersant Composed of Triazine Derivative and Inorganic Base>

The dispersants ca to de described in Table 96 were manufactured by the method described below.

TABLE 96

| Dispersant | Triazine derivative | Inorganic base | Molar equivalent of inorganic base with respect to triazine derivative |
|---|---|---|---|
| ca | Triazine derivative A | NaOH | 0.5 |
| cb | Triazine derivative B | NaOH | 0.5 |
| cc | Triazine derivative C | NaOH | 0.5 |
| cd | Triazine derivative D | NaOH | 0.5 |
| ce | Triazine derivative E | NaOH | 0.5 |
| cf | Triazine derivative F | NaOH | 0.5 |
| cg | Triazine derivative G | NaOH | 0.5 |
| ch | Triazine derivative H | NaOH | 0.5 |
| ci | Triazine derivative I | NaOH | 0.5 |
| cj | Triazine derivative J | NaOH | 0.5 |
| ck | Triazine derivative K | NaOH | 0.5 |
| cl | Triazine derivative L | NaOH | 0.5 |
| cm | Triazine derivative M | NaOH | 0.5 |
| cn | Triazine derivative N | NaOH | 0.5 |
| co | Triazine derivative O | NaOH | 0.5 |

TABLE 96-continued

| Dispersant | Triazine derivative | Inorganic base | Molar equivalent of inorganic base with respect to triazine derivative |
|---|---|---|---|
| cp | Triazine derivative P | NaOH | 0.5 |
| cq | Triazine derivative Q | NaOH | 0.5 |
| cr | Triazine derivative R | NaOH | 0.5 |
| cs | Triazine derivative S | NaOH | 0.5 |
| ct | Triazine derivative T | NaOH | 0.5 |
| cu | Triazine derivative A | $Na_2CO_3$ | 0.5 |
| cv | Triazine derivative C | $NaHCO_3$ | 0.5 |
| cw | Triazine derivative B | $Li_2CO_3$ | 0.5 |
| cx | Triazine derivative I | $K_2CO_3$ | 0.5 |
| cy | Triazine derivative C | $K_3PO_4$ | 0.5 |
| cz | Triazine derivative K | $Ca(OH)_2$ | 0.5 |
| da | Triazine derivative A | $Mg(OH)_2$ | 0.5 |
| db | Triazine derivative A | NaOH | 0.1 |
| dc | Triazine derivative A | NaOH | 0.3 |
| dd | Triazine derivative A | NaOH | 0.7 |
| de | Triazine derivative A | NaOH | 1.0 |

(Manufacture Example of Dispersant Ca)

0.040 mol of the triazine derivative A was added to 200 g of water. 0.020 mol of sodium hydroxide was added thereto and stirred at 60° C. for 2 hours. After cooling to room temperature, filtration and purification were performed. The obtained residue was dried at 90° C. for 48 hours, and thereby a dispersant ca was obtained.

(Manufacture Example of Dispersants cb to ct)

Dispersants cb to ct were obtained by manufacture in the same manner as the dispersant ca, except that triazine derivatives B to T described in Table 96 were respectively added instead of the triazine derivative A in the manufacture of the dispersant ca.

(Manufacture Example of Dispersants cu to da)

Dispersants cu to da were obtained by manufacture in the same manner as the dispersant ca, except that triazine derivatives described in Table 96 were respectively added instead of the triazine derivative A, and the inorganic bases described in Table 96 were respectively added instead of sodium hydroxide in the manufacture of the dispersant ca.

(Manufacture Example of Dispersants db to de)

Dispersants db to de were obtained by manufacture in the same manner as the dispersant ca except that amounts of sodium hydroxide added in the manufacture of the dispersant ca were respectively changed to addition amounts which are described in Table 96.

The dispersants ea and eb described in Table 97 were manufactured by the method described below.

TABLE 97

| Dispersant | Triazine derivative | Inorganic base | Molar equivalent of inorganic base with respect to triazine derivative |
|---|---|---|---|
| ea | Triazine derivative AA | NaOH | 0.5 |
| eb | Triazine derivative AB | NaOH | 0.5 |

(Manufacture Example of Dispersants ea and eb)

The dispersants ea and eb were obtained by manufacture in the same manner as the dispersant ca, except that triazine derivatives AA and AB described in Table 97 were respectively added instead of the triazine derivative A in the manufacture of the dispersant ca.

Example C1-1

<Preparation of Carbon Material Dispersion Liquid>

According to the composition shown in Table 98, N-methyl-2-pyrrolidone, the dispersant a, and a polymer dispersant PVA-103 were added to a glass bottle and mixed. Thereafter, a carbon material was added thereto and dispersed with a paint conditioner for 2 hours using zirconia beads as media. Thereby, a carbon material dispersion liquid containing the dispersant a and the polymer dispersant PVA-103 was obtained.

<Preparation of Carbon Material Dispersion Varnish>

According to the composition shown in Table 98, the prepared carbon material dispersion liquid containing the dispersant a and the polymer dispersant PVA-103 was mixed with a binder and N-methyl-2-pyrrolidone with a disper. Thereby, a carbon material dispersion varnish was obtained.

<Preparation of Cathode Mixture Paste>

According to the composition shown in Table 98, the prepared carbon material dispersion varnish containing the dispersant a and the polymer dispersant PVA-103 was mixed with an active material and N-methyl-2-pyrrolidone with a disper. Thereby, a cathode mixture paste was obtained.

<Production of Electrode>

The prepared cathode mixture paste containing the dispersant a and the polymer dispersant PVA-103 was applied onto an aluminum foil having a thickness of 20 μm using a doctor blade, and then dried at 120° C. for 30 minutes under reduced pressure. Thereafter, the aluminum foil was rolled with a roller pressing machine. Thereby, an electrode having an application amount of 17 mg/cm$^2$ and a density of 3.0 g/cm$^3$ was produced. An electrode having a uniform thickness and density was obtained.

TABLE 98

| | Dispersant | | Polymer dispersant | | Carbon material | | Binder | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Composition of carbon material dispersion liquid | a | 0.1 | PVA-103 | 0.1 | HS100 | 10.0 | | | | | NMP | 89.9 |
| Composition of carbon material dispersion varnish | | 0.06 | | 0.06 | | 6.0 | PVDF | 6.0 | | | | 87.9 |
| Composition of cathode mixture paste | | 0.02 | | 0.02 | | 2.0 | | 2.0 | NMC | 54.0 | | 42.0 |

Examples C1-2 to C1-10

A carbon material dispersion liquid, a carbon material dispersion varnish, a cathode mixture paste, and an electrode were produced in the same manner as in Example C1-1, except that the polymer dispersant PVA-103 used in Example C1-1 was replaced with the polymer dispersant shown in Table 99.

TABLE 99

| | Polymer dispersant |
|---|---|
| Example C1-2 | PVA-403 |
| Example C1-3 | KL-506 |
| Example C1-4 | AP-17 |
| Example C1-5 | L-3266 |
| Example C1-6 | K-434 |

TABLE 99-continued

| | Polymer dispersant |
|---|---|
| Example C1-7 | PVB-A |
| Example C1-8 | SM-4 |
| Example C1-9 | SM-15 |
| Example C1-10 | ETHOCEL-10 |

[Example C1-1a] Dispersant a Only

A carbon material dispersion liquid, a carbon material dispersion varnish, a cathode mixture paste, and an electrode were produced in the same manner as in Example C1-1, except that the polymer dispersant PVA-103 used in Example C1-1 was replaced with the dispersant a as shown in Table 100, so that the dispersant is formed of only the dispersant a.

[Comparative Example C1-1] Comparison 1 of Dispersant Types

A carbon material dispersion liquid, a carbon material dispersion varnish, a cathode mixture paste, and an electrode were produced in the same manner as in Example C1-1a, except that the dispersant a used in Example C1-1a was replaced with the dispersant ba as shown in Table 100.

[Comparative Example C1-2] Comparison 2 of Dispersant Types

A carbon material dispersion liquid, a carbon material dispersion varnish, a cathode mixture paste, and an electrode were produced in the same manner as in Example C1-1, except that the dispersant a used in Example C1-1 was replaced with the dispersant ba as shown in Table 100.

[Comparative Examples C1-3 and C1-4] Comparison 3 of Dispersant Types

A carbon material dispersion liquid, a carbon material dispersion varnish, a cathode mixture paste, and an electrode were produced in the same manner as in Comparative Example C1-2, except that the polymer dispersants shown in Table 100 were respectively used instead of PVA-103 used in Comparative Example C1-2.

TABLE 100

|  | Dispersant | Polymer dispersant |
|---|---|---|
| Example C1-1a | a | — |
| Comparative Example C1-1 | ba | — |
| Comparative Example C1-2 | ba | PVA-103 |
| Comparative Example C1-3 | ba | L-3266 |
| Comparative Example C1-4 | ba | SM-4 |

<Peeling Strength Test>

A specimen for measuring peeling strength of the electrode was cut into two 90 mm×20 mm rectangles with a coating direction as a major axis, and used. The peeling strength was measured using a desktop tensile tester (STROGRAPH E3 manufactured by Toyo Seiki Seisaku-sho, Ltd.), and was evaluated by a 180-degree peeling test method. Specifically, a double-sided tape (No. 5000NS, manufactured by Nitoms, Inc.) having a size of 100 mm×30 mm was attached to a stainless steel plate, and a produced battery electrode mixture layer was adhered to the other side of the double-sided tape. Peeling was performed by pulling the tape upward from below at a constant speed (50 mm/min), and an average value of stress at this time was used as peeling strength.

<Evaluation Results>

All of the carbon material dispersion liquids, carbon material dispersion varnishes, and cathode mixture pastes prepared in Examples C1-1 to C1-10, Example C1-1a, and Comparative Examples C1-1 to C1-4 were in a favorably dispersed state, and sedimentation or thickening did not occur even after the elapse of one month.

Table 101 shows the results of the peeling strength test of Examples C1-1 to C1-10, Example C1-1a, and Comparative Examples C1-1 to C1-4. The results of the peeling strength test are as follows: A: 200% or more, A to B: less than 200% and 175% or more, B: less than 175% and 150% or more, B to C: less than 150% and 120% or more, C: less than 120% and 80% or more, when Example C1-1a is 100%. In the following, the results of peeling strength test, in which a solvent is NMP, of a cathode mixture material follows the above standard. Compared to Comparative Example C1-1 in which only the dispersant ba was used, peeling strength was slightly improved in all Comparative Examples C1-2 to C1-4 in which various polymer dispersants were used in combination. The reason why the peeling strength was improved although an increased amount was slight is thought to be that polymer components that can participate in film formation was contained instead of the low molecular weight dispersant ba which has no film forming ability. Meanwhile, by comparison, a significant improvement was observed in all Examples C1-1 to C1-10 in which various polymer dispersants were used in combination. Considering the results of Comparative Examples C1-1 to C1-4, the effects observed in Examples C1-1 to C1-10 are not expected to be due only to the incorporation of polymer components that can participate in film formation.

TABLE 101

|  | Dispersant | Polymer dispersant | Peeling strength |
|---|---|---|---|
| Example C1-1a | a | — | C |
| Example C1-1 | a | PVA-103 | A |
| Example C1-2 | a | PVA-403 | A |
| Example C1-3 | a | KL-506 | A |
| Example C1-4 | a | AP-17 | A |
| Example C1-5 | a | L-3266 | A to B |
| Example C1-6 | a | K-434 | A |
| Example C1-7 | a | PVB-A | A |
| Example C1-8 | a | SM-4 | A |
| Example C1-9 | a | SM-15 | A |
| Example C1-10 | a | ETHOCEL-10 | B |
| Comparative Example C1-1 | ba | — | C |
| Comparative Example C1-2 | ba | PVA-103 | B to C |
| Comparative Example C1-3 | ba | L-3266 | B to C |
| Comparative Example C1-4 | ba | SM-4 | B to C |

Examples C1-11 to C1-188

In order to confirm whether the peeling strength improvement effect can be obtained with other triazine derivatives represented by General Formula (1), a test was conducted in the same manner. A carbon material dispersion liquid, a carbon material dispersion varnish, a cathode mixture paste, and an electrode were produced in the same manner as in Example C1-1, except that the dispersant and polymer dispersant used in Example C1-1 were replaced with the dispersant and polymer dispersant shown in Table 102, respectively, and then the peeling strength test was conducted.

TABLE 102

|  | Dispersant | Polymer dispersant |
|---|---|---|
| Example C1-11 | b | PVA-103 |
| Example C1-12 |  | KL-506 |
| Example C1-13 |  | AP-17 |
| Example C1-14 |  | SM-4 |
| Example C1-15 |  | SM-15 |
| Example C1-16 | c | PVA-403 |
| Example C1-17 |  | KL-506 |
| Example C1-18 |  | AP-17 |
| Example C1-19 |  | SM-4 |
| Example C1-20 |  | SM-15 |
| Example C1-21 | d | KL-506 |
| Example C1-22 |  | SM-4 |
| Example C1-23 | e | PVA-103 |
| Example C1-24 |  | SM-15 |
| Example C1-25 | f | AP-17 |
| Example C1-26 |  | SM-15 |
| Example C1-27 | g | AP-17 |
| Example C1-28 |  | SM-4 |
| Example C1-29 | h | PVA-103 |
| Example C1-30 |  | AP-17 |
| Example C1-31 |  | SM-4 |
| Example C1-32 |  | SM-15 |
| Example C1-33 | i | PVA-403 |
| Example C1-34 |  | SM-15 |
| Example C1-35 | j | PVA-403 |
| Example C1-36 |  | KL-506 |
| Example C1-37 |  | AP-17 |
| Example C1-38 |  | SM-4 |
| Example C1-39 |  | SM-15 |
| Example C1-40 | k | KL-506 |
| Example C1-41 |  | SM-4 |
| Example C1-42 | l | PVA-103 |
| Example C1-43 |  | SM-15 |
| Example C1-44 | m | AP-17 |
| Example C1-45 |  | SM-4 |

TABLE 102-continued

| | Dispersant | Polymer dispersant |
|---|---|---|
| Example C1-46 | n | PVA-403 |
| Example C1-47 | | SM-4 |
| Example C1-48 | o | KL-506 |
| Example C1-49 | | SM-15 |
| Example C1-50 | p | PVA-103 |
| Example C1-51 | | SM-15 |
| Example C1-52 | q | AP-17 |
| Example C1-53 | | SM-15 |
| Example C1-54 | r | PVA-103 |
| Example C1-55 | | SM-4 |
| Example C1-56 | s | KL-506 |
| Example C1-57 | | SM-15 |
| Example C1-58 | t | PVA-103 |
| Example C1-59 | | SM-15 |
| Example C1-60 | u | PVA-103 |
| Example C1-61 | | AP-17 |
| Example C1-62 | | SM-4 |
| Example C1-63 | | SM-15 |
| Example C1-64 | v | PVA-103 |
| Example C1-65 | | KL-506 |
| Example C1-66 | | AP-17 |
| Example C1-67 | | SM-4 |
| Example C1-68 | | SM-15 |
| Example C1-69 | w | PVA-103 |
| Example C1-70 | | SM-15 |
| Example C1-71 | x | KL-506 |
| Example C1-72 | | SM-4 |
| Example C1-73 | y | KL-506 |
| Example C1-74 | | SM-4 |
| Example C1-75 | z | AP-17 |
| Example C1-76 | | SM-15 |
| Example C1-77 | aa | PVA-103 |
| Example C1-78 | | KL-506 |
| Example C1-79 | | SM-4 |
| Example C1-80 | | SM-15 |
| Example C1-81 | ab | PVA-403 |
| Example C1-82 | | KL-506 |
| Example C1-83 | | AP-17 |
| Example C1-84 | | SM-4 |
| Example C1-85 | | SM-15 |
| Example C1-86 | ac | PVA-103 |
| Example C1-87 | | SM-4 |
| Example C1-88 | ad | PVA-103 |
| Example C1-89 | | KL-506 |
| Example C1-90 | | AP-17 |
| Example C1-91 | | SM-4 |
| Example C1-92 | | SM-15 |
| Example C1-93 | ae | PVA-403 |
| Example C1-94 | | SM-15 |
| Example C1-95 | af | KL-506 |
| Example C1-96 | | SM-4 |
| Example C1-97 | ag | PVA-103 |
| Example C1-98 | | SM-15 |
| Example C1-99 | ah | AP-17 |
| Example C1-100 | | SM-4 |
| Example C1-101 | ai | KL-506 |
| Example C1-102 | | SM-15 |
| Example C1-103 | aj | PVA-103 |
| Example C1-104 | | SM-15 |
| Example C1-105 | ca | PVA-403 |
| Example C1-106 | | KL-506 |
| Example C1-107 | | AP-17 |
| Example C1-108 | | SM-4 |
| Example C1-109 | | SM-15 |
| Example C1-110 | cb | PVA-103 |
| Example C1-111 | | KL-506 |
| Example C1-112 | | AP-17 |
| Example C1-113 | | SM-4 |
| Example C1-114 | | SM-15 |
| Example C1-115 | cc | PVA-103 |
| Example C1-116 | | KL-506 |
| Example C1-117 | | AP-17 |
| Example C1-118 | | SM-4 |
| Example C1-119 | | SM-15 |
| Example C1-120 | cd | KL-506 |
| Example C1-121 | | SM-4 |
| Example C1-122 | ce | PVA-403 |
| Example C1-123 | | SM-15 |
| Example C1-124 | cf | AP-17 |
| Example C1-125 | | SM-15 |
| Example C1-126 | cg | AP-17 |
| Example C1-127 | | SM-4 |
| Example C1-128 | ch | PVA-403 |
| Example C1-129 | | AP-17 |
| Example C1-130 | | SM-4 |
| Example C1-131 | | SM-15 |
| Example C1-132 | ci | PVA-103 |
| Example C1-133 | | SM-15 |
| Example C1-134 | cj | PVA-103 |
| Example C1-135 | | KL-506 |
| Example C1-136 | | AP-17 |
| Example C1-137 | | SM-4 |
| Example C1-138 | | SM-15 |
| Example C1-139 | ck | PVA-403 |
| Example C1-140 | | SM-15 |
| Example C1-141 | cl | PVA-103 |
| Example C1-142 | | SM-15 |
| Example C1-143 | cm | PVA-103 |
| Example C1-144 | | SM-15 |
| Example C1-145 | cn | PVA-403 |
| Example C1-146 | | SM-4 |
| Example C1-147 | co | KL-506 |
| Example C1-148 | | SM-15 |
| Example C1-149 | cp | PVA-103 |
| Example C1-150 | | SM-15 |
| Example C1-151 | cq | AP-17 |
| Example C1-152 | | SM-15 |
| Example C1-153 | cr | KL-506 |
| Example C1-154 | | SM-4 |
| Example C1-155 | cs | PVA-403 |
| Example C1-156 | | SM-4 |
| Example C1-157 | ct | PVA-103 |
| Example C1-158 | | SM-15 |
| Example C1-159 | cu | PVA-103 |
| Example C1-160 | | KL-506 |
| Example C1-161 | | AP-17 |
| Example C1-162 | | SM-4 |
| Example C1-163 | | SM-15 |
| Example C1-164 | cv | PVA-403 |
| Example C1-165 | | KL-506 |
| Example C1-166 | | SM-4 |
| Example C1-167 | | SM-15 |
| Example C1-168 | cw | PVA-103 |
| Example C1-169 | | KL-506 |
| Example C1-170 | | AP-17 |
| Example C1-171 | | SM-4 |
| Example C1-172 | | SM-15 |
| Example C1-173 | cx | AP-17 |
| Example C1-174 | | SM-4 |
| Example C1-175 | cy | PVA-103 |
| Example C1-176 | | SM-15 |
| Example C1-177 | cz | KL-506 |
| Example C1-178 | | SM-4 |
| Example C1-179 | da | KL-506 |
| Example C1-180 | | SM-4 |
| Example C1-181 | db | AP-17 |
| Example C1-182 | | SM-15 |
| Example C1-183 | dc | PVA-403 |
| Example C1-184 | | SM-15 |
| Example C1-185 | dd | KL-506 |
| Example C1-186 | | SM-4 |
| Example C1-187 | de | PVA-103 |
| Example C1-188 | | SM-15 |

[Reference Example C1-189] Combination Use of Triazine Derivative and Polymer Dispersant A carbon material dispersion liquid, a carbon material dispersion varnish, a cathode mixture paste, and an electrode were produced in the same manner as in Example C1-1, except that the dispersant a used in Example C1-1 was replaced with the triazine derivative A as shown in Table 103, and then peeling strength test was conducted.

[Reference Examples C1-190 to C1-193]
Combination Use 2 of Triazine Derivative and Polymer Dispersant A carbon material dispersion liquid, a carbon material dispersion varnish, a cathode mixture paste, and an electrode were produced in the same manner as in Reference Example C1-189, except that each of the polymer dispersants shown in Table 103 was used instead of PVA-103 used in Reference Example C1-189, and each of the triazine derivatives shown in Table 103 was used instead of the triazine derivative A, and then the peeling strength test was conducted.

TABLE 103

|  | Triazine derivative | Polymer dispersant |
|---|---|---|
| Reference Example C1-189 | A | PVA-103 |
| Reference Example C1-190 |  | SM-4 |
| Reference Example C1-191 | E | AP-17 |
| Reference Example C1-192 | H | PVA-403 |
| Reference Example C1-193 | J | SM-15 |

[Example C1-194] Combination Use of Polymer Dispersant

A carbon material dispersion liquid, a carbon material dispersion varnish, a cathode mixture paste, and an electrode were produced in the same manner as in Example C1-1, except that another half amount of PVA-103 used in Example C1-1 was replaced with SM-15 as shown in Table 104, and the then peeling strength test was conducted.

[Examples C1-195 and C1-196] Combination Use 2 of Polymer Dispersant

A carbon material dispersion liquid, a carbon material dispersion varnish, a cathode mixture paste, and an electrode were produced in the same manner as in Example C1-194, except that the polymer dispersants shown in Table 104 were respectively used instead of PVA-103 used in Example C1-194, then the peeling strength test was conducted.

[Reference Examples C1-197 to C1-199]
Combination Use 3 of Polymer Dispersant

A carbon material dispersion liquid, a carbon material dispersion varnish, a cathode mixture paste, and an electrode were produced in the same manner as in Example C1-194, except that the polymer dispersants shown in Table 104 were respectively used instead of PVA-103 used in Example C1-194, and the triazine derivative A was used instead of the dispersant a, and then the peeling strength test was conducted.

TABLE 104

|  | Dispersant | Polymer dispersant 1 | Polymer dispersant 2 |
|---|---|---|---|
| Example C1-194 | a | PVA-103 | SM-15 |
| Example C1-195 |  | KL-506 |  |
| Example C1-196 |  | AP-17 |  |
| Reference Example C1-197 | A | PVA-103 |  |
| Reference Example C1-198 |  | KL-506 |  |
| Reference Example C1-199 |  | AP-17 |  |

Comparative Examples C1-5 to C1-7

A carbon material dispersion liquid, a carbon material dispersion varnish, a cathode mixture paste, and an electrode were produced in the same manner as in Example C1-1a, except that the dispersant a used in Example C1-1a was replaced with the dispersant shown in Table 105, and then the peeling strength test was conducted.

TABLE 105

|  | Dispersant |
|---|---|
| Comparative Example C1-5 | bb |
| Comparative Example C1-6 | ea |
| Comparative Example C1-7 | eb |

Comparative Examples C1-8 to C1-13

A carbon material dispersion liquid, a carbon material dispersion varnish, a cathode mixture paste, and an electrode were produced in the same manner as in Example C1-1, except that the dispersant a and the polymer dispersant PVA-103 used in Example C1-1 were respectively replaced with the dispersant and polymer dispersant shown in Table 106, and then the peeling strength test was conducted.

TABLE 106

|  | Dispersant | Polymer dispersant |
|---|---|---|
| Comparative Example C1-8 | bb | PVA-103 |
| Comparative Example C1-9 |  | SM-4 |
| Comparative Example C1-10 | ea | PVA-103 |
| Comparative Example C1-11 |  | SM-4 |
| Comparative Example C1-12 | eb | PVA-103 |
| Comparative Example C1-13 |  | SM-4 |

<Evaluation Results>

Table 107 shows the results of the peeling strength test of the electrodes produced in Examples C1-11 to C1-188, Examples C1-194 to C1-196, Example C1-1 a, Reference Examples C1-189 to C1-193, Reference Examples C1-197 to C1-199, and Comparative Examples C 1-5 to C1-13. As in the case of the dispersant ba, only a low degree of peeling strength was improved even when the dispersants bb, ea, and eb, and various polymer dispersants were used in combination, whereas as in the case of the dispersant a, a significant improvement in peeling strength was confirmed by using the dispersants b to aj and ca to de and the triazine derivatives A, E, H, and J in combination with one or two types of various polymer dispersants.

The reason for this is thought to be that, because this effect is unique to the triazine derivatives represented by the general formula (1), by the structure in which an arylene group having an acidic functional group and two phenolic hydroxyl groups are directly connected to one triazine ring, strong intermolecular force such as hydrogen bonding acted between the dispersant and the polymer dispersant.

TABLE 107

| | Dispersant or triazine derivative | Polymer dispersant | Peeling strength |
|---|---|---|---|
| Example C1-1a | a | — | C |
| Examples C1-11 to C1-188 | b to aj, ca to de | PVA-103 or PVA-403 | A |
| Reference Examples C1-189 to C1-193 | A, E, H, J | or KL-506 or AP-17 or SM-4 or SM-15 | |
| Examples C1-194 to C1-196 | a, A | PVA-103 and SM-15 | A |
| Reference Examples C1-197 to C1-199 | | or KL-506 and SM-15 or AP-17 and SM-15 | |
| Comparative Examples C1-5 to C1-7 | bb, ea, eb | — | C |
| Comparative Examples C1-8 to C1-13 | bb, ea, eb | PVA-103 or SM-4 | B to C |

Subsequently, a cell for evaluating a cathode of a lithium ion secondary battery was assembled, and ionic resistance, reaction resistance, room temperature rate characteristic, low-temperature discharge characteristic, and cycle characteristic were evaluated.

Example C2-1

<Assembly of Cell for Evaluation Cathode of Lithium Ion Secondary Battery>

The electrode which contains the dispersant a and was produced in Example C1-1 was punched out to a diameter of 16 mm to be used as a cathode, and a metallic lithium foil (a thickness of 0.15 mm) was used as an anode. A separator made of a porous polypropylene film (a thickness of 20 μm, and a porosity of 50%) was inserted and laminated between the cathode and the anode, and was filled with 0.1 ml of an electrolyte solution (a non-aqueous electrolyte solution in which $LiPF_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

<Evaluation of Ionic Resistance>

The cell for cathode evaluation assembled in Example C2-1 was allowed to stand in a constant-temperature tank at −20° C. for 12 hours. An AC impedance was measured at an open circuit potential with a frequency of 0.1 Hz and an amplitude of 10 mV to obtain an ionic resistance $|Z|_{ion}$. Subsequently, the cell for cathode evaluation was moved to room temperature (25° C.) and allowed to stand for 3 hours, and the impedance was measured in the same manner to obtain an ionic resistance $|Z|_{ion}$. An impedance analyzer was used for the measurement.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (an upper limit voltage of 4.2V) at room temperature, and discharging was performed with a constant current of 0.1C to a discharge lower limit voltage of 3.0V. 0.1C discharge capacity at the fifth cycle was recorded. Next, the cell for cathode evaluation in a state of being discharged to 3.0V was connected to an impedance analyzer, and AC impedance measurement was performed at 3.0V, an amplitude of 10 mV, and a frequency from 0.1 Hz to 1 MHz. When the results were plotted on the complex plane by a Cole-Cole plot method, a semicircular curve was obtained. A diameter of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature, discharging was performed with a constant current of 0.5C to a discharge lower limit voltage of 3.0V, full charging was performed again with 0.1C, and then discharging was performed with a constant current of 5C to 3.0V. A ratio of 5C discharge capacity to 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and then discharged with a constant current of 0.5C. A ratio of 0.5C discharge capacity at −20° C. to 0.5C discharge capacity at room temperature was defined as a low-temperature discharge characteristic (%). As the room temperature rate characteristic and low-temperature discharge characteristic become closer to 100%, the characteristics become more favorable.

<Cycle Characteristic Evaluation>

Next, the battery was left at room temperature for 12 hours, fully charged with 1C constant current-constant voltage charge (an upper limit voltage of 4.3V), and discharged with a constant current of 1C to 3.0V. This full charging and discharging were defined as one cycle, and it was repeated 500 cycles. A ratio of a discharge capacity at the 500th cycle to a discharge capacity at the 1st cycle was defined as cycle characteristic (%). As the cycle characteristic evaluation becomes closer to 100%, the characteristic becomes favorable.

[Examples C2-2 to C2-188 and Examples C2-194 to C2-196] [Reference Examples C2-189 to C2-193 and Reference Examples C2-197 to C2-199]

A cell for evaluating a cathode of a lithium ion secondary battery was assembled in the same manner as in Example C2-1 except that, in Example C2-1, the electrodes shown in Table 108 were respectively used instead of the electrode produced in Example C1-1, and then ionic resistance, reaction resistance, room temperature rate characteristic, low-temperature discharge characteristic, and cycle characteristic were evaluated.

TABLE 108

| | Electrode used | Dispersant or triazine derivative | Polymer dispersant |
|---|---|---|---|
| Example C2-2 | Example C1-2 | a | PVA-403 |
| Example C2-3 | Example C1-3 | | KL-506 |
| Example C2-4 | Example C1-4 | | AP-17 |
| Example C2-5 | Example C1-5 | | L-3266 |
| Example C2-6 | Example C1-6 | | K-434 |
| Example C2-7 | Example C1-7 | | PVB-A |
| Example C2-3 | Example C1-3 | | SM-4 |
| Example C2-9 | Example C1-9 | | SM-15 |
| Example C2-10 | Example C1-10 | | ETHOCEL-10 |
| Example C2-11 | Example C1-11 | b | PVA-103 |
| Example C2-12 | Example C1-12 | | KL-506 |
| Example C2-13 | Example C1-13 | | AP-17 |
| Example C2-14 | Example C1-14 | | SM-4 |
| Example C2-15 | Example C1-15 | | SM-15 |
| Example C2-16 | Example C1-16 | c | PVA-403 |
| Example C2-17 | Example C1-17 | | KL-506 |
| Example C2-18 | Example C1-18 | | AP-17 |
| Example C2-19 | Example C1-19 | | SM-4 |
| Example C2-20 | Example C1-20 | | SM-15 |
| Example C2-21 | Example C1-21 | d | KL-506 |
| Example C2-22 | Example C1-22 | | SM-4 |
| Example C2-23 | Example C1-23 | e | PVA-103 |
| Example C2-24 | Example C1-24 | | SM-15 |
| Example C2-25 | Example C1-25 | f | AP-17 |
| Example C2-26 | Example C1-26 | | SM-15 |
| Example C2-27 | Example C1-27 | g | AP-17 |
| Example C2-28 | Example C1-28 | | SM-4 |
| Example C2-29 | Example C1-29 | h | PVA-103 |
| Example C2-30 | Example C1-30 | | AP-17 |
| Example C2-31 | Example C1-31 | | SM-4 |
| Example C2-32 | Example C1-32 | | SM-15 |
| Example C2-33 | Example C1-33 | i | PVA-403 |
| Example C2-34 | Example C1-34 | | SM-15 |
| Example C2-35 | Example C1-35 | j | PVA-403 |
| Example C2-36 | Example C1-36 | | KL-506 |
| Example C2-37 | Example C1-37 | | AP-17 |
| Example C2-38 | Example C1-38 | | SM-4 |
| Example C2-39 | Example C1-39 | | SM-15 |
| Example C2-40 | Example C1-40 | k | KL-506 |
| Example C2-41 | Example C1-41 | | SM-4 |
| Example C2-42 | Example C1-42 | l | PVA-103 |
| Example C2-43 | Example C1-43 | | SM-15 |
| Example C2-44 | Example C1-44 | m | AP-17 |
| Example C2-45 | Example C1-45 | | SM-4 |
| Example C2-46 | Example C1-46 | n | PVA-403 |
| Example C2-47 | Example C1-47 | | SM-4 |
| Example C2-48 | Example C1-48 | o | KL-506 |
| Example C2-49 | Example C1-49 | | SM-15 |
| Example C2-50 | Example C1-50 | p | PVA-103 |
| Example C2-51 | Example C1-41 | | SM-15 |
| Example C2-52 | Example C1-52 | q | AP-17 |
| Example C2-53 | Example C1-53 | | SM-15 |
| Example C2-54 | Example C1-54 | r | PVA-103 |
| Example C2-55 | Example C1-55 | | SM-4 |
| Example C2-56 | Example C1-56 | s | KL-506 |
| Example C2-57 | Example C1-57 | | SM-15 |
| Example C2-58 | Example C1-58 | t | PVA-103 |
| Example C2-59 | Example C1-59 | | SM-15 |
| Example C2-60 | Example C1-60 | u | PVA-103 |
| Example C2-61 | Example C1-61 | | AP-17 |
| Example C2-62 | Example C1-62 | | SM-4 |
| Example C2-63 | Example C1-63 | | SM-15 |
| Example C2-64 | Example C1-64 | v | PVA-103 |
| Example C2-65 | Example C1-65 | | KL-506 |
| Example C2-66 | Example C1-66 | | AP-17 |
| Example C2-67 | Example C1-67 | | SM-4 |
| Example C2-68 | Example C1-68 | | SM-15 |
| Example C2-69 | Example C1-69 | w | PVA-103 |
| Example C2-70 | Example C1-70 | | SM-15 |
| Example C2-71 | Example C1-71 | x | KL-506 |
| Example C2-72 | Example C1-72 | | SM-4 |
| Example C2-73 | Example C1-73 | y | KL-506 |
| Example C2-74 | Example C1-74 | | SM-4 |
| Example C2-75 | Example C1-75 | z | AP-17 |
| Example C2-76 | Example C1-76 | | SM-15 |
| Example C2-77 | Example C1-77 | aa | PVA-103 |
| Example C2-78 | Example C1-78 | | KL-506 |

TABLE 108-continued

| | Electrode used | Dispersant or triazine derivative | Polymer dispersant |
|---|---|---|---|
| Example C2-79 | Example C1-79 | | SM-4 |
| Example C2-80 | Example C1-80 | | SM-15 |
| Example C2-81 | Example C1-81 | ab | PVA-403 |
| Example C2-82 | Example C1-82 | | KL-506 |
| Example C2-83 | Example C2-83 | | AP-17 |
| Example C2-84 | Example C1-84 | | SM-4 |
| Example C2-85 | Example C1-85 | | SM-15 |
| Example C2-86 | Example C1-86 | ac | PVA-103 |
| Example C2-87 | Example C1-87 | | SM-4 |
| Example C2-88 | Example C1-88 | ad | PVA-103 |
| Example C2-89 | Example C1-89 | | KL-506 |
| Example C2-90 | Example C1-90 | | AP-17 |
| Example C2-91 | Example C1-91 | | SM-4 |
| Example C2-92 | Example C1-92 | | SM-15 |
| Example C2-93 | Example C1-93 | ae | PVA-403 |
| Example C2-94 | Example C1-94 | | SM-15 |
| Example C2-95 | Example C1-95 | af | KL-506 |
| Example C2-96 | Example C1-96 | | SM-4 |
| Example C2-97 | Example C1-97 | ag | PVA-103 |
| Example C2-98 | Example C1-98 | | SM-15 |
| Example C2-99 | Example C1-99 | ah | AP-17 |
| Example C2-100 | Example C1-100 | | SM-4 |
| Example C2-101 | Example C1-101 | ai | KL-506 |
| Example C2-102 | Example C1-102 | | SM-15 |
| Example C2-103 | Example C1-103 | aj | PVA-103 |
| Example C2-104 | Example C1-104 | | SM-15 |
| Example C2-105 | Example C1-105 | ca | PVA-403 |
| Example C2-106 | Example C1-106 | | KL-506 |
| Example C2-107 | Example C1-107 | | AP-17 |
| Example C2-108 | Example C1-108 | | SM-4 |
| Example C2-109 | Example C1-109 | | SM-15 |
| Example C2-110 | Example C1-110 | cb | PVA-103 |
| Example C2-111 | Example C1-111 | | KL-506 |
| Example C2-112 | Example C1-112 | | AP-17 |
| Example C2-113 | Example C1-113 | | SM-4 |
| Example C2-114 | Example C1-114 | | SM-15 |
| Example C2-115 | Example C1-115 | cc | PVA-103 |
| Example C2-116 | Example C1-116 | | KL-506 |
| Example C2-117 | Example C1-117 | | AP-17 |
| Example C2-118 | Example C1-118 | | SM-4 |
| Example C2-119 | Example C1-119 | | SM-15 |
| Example C2-120 | Example C1-120 | cd | KL-506 |
| Example C2-121 | Example C1-121 | | SM-4 |
| Example C2-122 | Example C1-122 | ce | PVA-403 |
| Example C2-123 | Example C1-123 | | SM-15 |
| Example C2-124 | Example C1-124 | cf | AP-17 |
| Example C2-125 | Example C1-125 | | SM-15 |
| Example C2-126 | Example C1-126 | cg | AP-17 |
| Example C2-127 | Example C1-127 | | SM-4 |
| Example C2-128 | Example C1-128 | ch | PVA-403 |
| Example C2-129 | Example C1-129 | | AP-17 |
| Example C2-130 | Example C1-130 | | SM-4 |
| Example C2-131 | Example C1-131 | | SM-15 |
| Example C2-132 | Example C1-132 | ci | PVA-103 |
| Example C2-133 | Example C1-133 | | SM-15 |
| Example C2-134 | Example C1-134 | cj | PVA-103 |
| Example C2-135 | Example C1-135 | | KL-506 |
| Example C2-130 | Example C1-136 | | AP-17 |
| Example C2-137 | Example C1-137 | | SM-4 |
| Example C2-138 | Example C1-138 | | SM-15 |
| Example C2-139 | Example C1-139 | ck | PVA-403 |
| Example C2-140 | Example C1-140 | | SM-15 |
| Example C2-141 | Example C1-141 | cl | PVA-103 |
| Example C2-142 | Example C1-142 | | SM-15 |
| Example C2-143 | Example C1-143 | cm | PVA-103 |
| Example C2-144 | Example C1-144 | | SM-15 |
| Example C2-145 | Example C1-145 | cn | PVA-403 |
| Example C2-146 | Example C1-146 | | SM-4 |
| Example C2-147 | Example C1-147 | co | KL-506 |
| Example C2-148 | Example C1-148 | | SM-15 |
| Example C2-149 | Example C1-149 | cp | PVA-103 |
| Example C2-150 | Example C1-150 | | SM-15 |
| Example C2-151 | Example C1-151 | cq | AP-17 |
| Example C2-152 | Example C1-152 | | SM-15 |
| Example C2-153 | Example C1-153 | cr | KL-506 |
| Example C2-154 | Example C1-154 | | SM-4 |
| Example C2-155 | Example C1-155 | cs | PVA-403 |

TABLE 108-continued

| | Electrode used | Dispersant or triazine derivative | Polymer dispersant |
|---|---|---|---|
| Example C2-156 | Example C1-156 | | SM-4 |
| Example C2-157 | Example C1-157 | ct | PVA-103 |
| Example C2-158 | Example C1-158 | | SM-15 |
| Example C2-159 | Example C1-159 | cu | PVA-103 |
| Example C2-160 | Example C1-160 | | KL-506 |
| Example C2-161 | Example C1-161 | | AP-17 |
| Example C2-162 | Example C1-162 | | SM-4 |
| Example C2-163 | Example C1-163 | | SM-15 |
| Example C2-164 | Example C1-164 | cv | PVA-403 |
| Example C2-165 | Example C1-165 | | KL-506 |
| Example C2-166 | Example C1-166 | | SM-4 |
| Example C2-167 | Example C1-167 | | SM-15 |
| Example C2-168 | Example C1-168 | cw | PVA-103 |
| Example C2-169 | Example C1-169 | | KL-506 |
| Example C2-170 | Example C1-170 | | AP-17 |
| Example C2-171 | Example C1-171 | | SM-4 |
| Example C2-172 | Example C1-172 | | SM-15 |
| Example C2-173 | Example C1-173 | cx | AP-17 |
| Example C2-174 | Example C1-174 | | SM-4 |
| Example C2-175 | Example C1-175 | cy | PVA-103 |
| Example C2-176 | Example C1-176 | | SM-15 |
| Example C2-177 | Example C1-177 | cz | KL-506 |
| Example C2-178 | Example C1-178 | | SM-4 |
| Example C2-179 | Example C1-179 | da | KL-506 |
| Example C2-180 | Example C1-180 | | SM-4 |
| Example C2-181 | Example C1-181 | db | AP-17 |
| Example C2-182 | Example C1-182 | | SM-15 |
| Example C2-183 | Example C1-183 | dc | PVA-403 |
| Example C2-184 | Example C1-184 | | SM-15 |
| Example C2-185 | Example C1-185 | dd | KL-506 |
| Example C2-186 | Example C1-186 | | SM-4 |
| Example C2-187 | Example C1-187 | de | PVA-103 |
| Example C2-188 | Example C1-188 | | SM-15 |
| Reference Example C2-189 | Reference Example C1-189 | A | PVA-103 |
| Reference Example C2-190 | Reference Example C1-190 | | SM-4 |
| Reference Example C2-191 | Reference Example C1-191 | E | AP-17 |
| Reference Example C2-192 | Reference Example C1-192 | H | PVA-403 |
| Reference Example C2-193 | Reference Example C1-193 | J | SM-15 |
| Example C2-194 | Example C1-194 | a | PVA-103/SM-15 |
| Example C2-195 | Example C1-195 | | KL-506/SM-15 |
| Example C2-196 | Example C1-196 | | AP-17/SM-15 |
| Reference Example C2-197 | Reference Example C1-197 | A | PVA-103/SM-15 |
| Reference Example C2-198 | Reference Example C1-198 | | KL-506/SM-15 |
| Reference Example C2-199 | Reference Example C1-199 | | AP-17/SM-15 |

[Comparative Examples C2-1 to C2-4] [Example C2-1a]

A cell for evaluating a cathode of a lithium ion secondary battery was assembled in the same manner as in Example C2-1 except that, in Example C2-1, the electrodes shown in Table 109 were respectively used instead of the electrode produced in Example C1-1, and then ionic resistance, reaction resistance, room temperature rate characteristic, low-temperature discharge characteristic, and cycle characteristic were evaluated.

TABLE 109

| | Electrode used | Dispersant | Polymer dispersant |
|---|---|---|---|
| Comparative Example C2-1 | Comparative Example C1-2 | ba | PVA-103 |
| Comparative Example C2-2 | Comparative Example C1-9 | bb | SM-4 |
| Comparative Example C2-3 | Comparative Example C1-11 | ea | SM-4 |
| Comparative Example C2-4 | Comparative Example C1-12 | eb | PVA-103 |
| Example C2-1a | Example C1-1a | a | — |

Comparative Example C2-5

A carbon material dispersion liquid, a carbon material dispersion varnish, a cathode mixture paste, and an electrode were produced in the same manner as in Example C1-1, except that the dispersant a and the polymer dispersant PVA-103 used in Example C1-1 was replaced with a solvent. A cell for evaluating a cathode of a lithium ion secondary battery was assembled in the same manner as in Example C2-1 by using the electrode instead of the electrode produced in Example C1-1, and then ionic resistance, reaction resistance, room temperature rate characteristic, low-temperature discharge characteristic, and cycle characteristic were evaluated.

<Evaluation Results>

Table 110 shows the evaluation results of ionic resistance, reaction resistance, room temperature rate characteristic, low-temperature discharge characteristic, and cycle characteristics of Examples C2-1 to C2-104. Table 111 shows the evaluation results of ionic resistance, reaction resistance, room temperature rate characteristic, low-temperature discharge characteristic, and cycle characteristics of Examples C2-105 to C2-188, Reference Examples C2-189 to C2-193, Examples C2-194 to C2-196, and Reference Examples C2-197 to C2-199. Table 112 shows the evaluation results of ionic resistance, reaction resistance, room temperature rate characteristic, low-temperature discharge characteristic, and cycle characteristics of Comparative Examples C2-1 to C2-5 and Example C2-1a.

TABLE 110

|  | Dispersant or triazine derivative | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-1 | a | PVA-103 | 10 | 418 | 4.9 | 69.2 | 76.0 | 84.7 |
| Example C2-2 |  | mPVA-403 | 10 | 419 | 4.9 | 69.4 | 76.4 | 82.0 |
| Example C2-3 |  | KL-506 | 10 | 419 | 4.8 | 69.5 | 76.3 | 80.7 |
| Example C2-4 |  | AP-17 | 10 | 417 | 4.8 | 69.1 | 76.1 | 82.6 |
| Example C2-5 |  | L-3266 | 10 | 418 | 4.9 | 69.5 | 76.1 | 75.6 |
| Example C2-6 |  | K-434 | 10 | 417 | 4.8 | 69.5 | 76.1 | 81.7 |
| Example C2-7 |  | PVB-A | 10 | 418 | 4.8 | 69.5 | 76.0 | 83.9 |
| Example C2-8 |  | SM-4 | 10 | 420 | 4.9 | 69.2 | 76.3 | 82.5 |
| Example C2-9 |  | SM-15 | 10 | 419 | 4.9 | 69.3 | 76.3 | 81.3 |
| Example C2-10 |  | ETHOCEL-10 | 10 | 420 | 4.9 | 69.4 | 76.4 | 71.9 |
| Example C2-11 | b | PVA-103 | 10 | 426 | 5.4 | 68.1 | 74.7 | 83.1 |
| Example C2-12 |  | KL-506 | 10 | 422 | 5.3 | 68.7 | 75.4 | 82.9 |
| Example C2-13 |  | AP-17 | 10 | 427 | 5.2 | 68.5 | 75.4 | 81.2 |
| Example C2-14 |  | SM-4 | 10 | 425 | 5.3 | 68.9 | 74.8 | 82.3 |
| Example C2-15 |  | SM-15 | 10 | 423 | 5.2 | 68.4 | 74.8 | 84.5 |
| Example C2-16 | c | PVA-403 | 10 | 421 | 5.1 | 68.5 | 75.1 | 85.5 |
| Example C2-17 |  | KL-506 | 10 | 429 | 5.3 | 68.5 | 74.9 | 83.6 |
| Example C2-18 |  | AP-17 | 10 | 427 | 5.0 | 68.7 | 75.4 | 82.7 |
| Example C2-19 |  | SM-4 | 10 | 423 | 5.3 | 68.7 | 75.1 | 82.5 |
| Example C2-20 |  | SM-15 | 10 | 422 | 5.4 | 68.4 | 75.2 | 82.1 |
| Example C2-21 | d | KL-506 | 13 | 481 | 7.8 | 64.4 | 67.4 | 85.7 |
| Example C2-22 |  | SM-4 | 13 | 481 | 7.8 | 64.3 | 66.3 | 84.8 |
| Example C2-23 | e | PVA-103 | 12 | 467 | 7.4 | 65.3 | 70.2 | 84.6 |
| Example C2-24 |  | SM-15 | 12 | 466 | 7.3 | 65.3 | 68.8 | 84.5 |
| Example C2-25 | f | AP-17 | 12 | 459 | 7.4 | 65.7 | 68.8 | 82.5 |
| Example C2-26 |  | SM-15 | 12 | 458 | 7.3 | 65.0 | 69.1 | 81.4 |
| Example C2-27 | g | AP-17 | 12 | 464 | 7.1 | 65.0 | 69.8 | 83.1 |
| Example C2-28 |  | SM-4 | 12 | 465 | 7.1 | 65.3 | 69.3 | 85.8 |
| Example C2-29 | h | PVA-103 | 11 | 445 | 6.2 | 67.5 | 73.4 | 83.0 |
| Example C2-30 |  | AP-17 | 11 | 446 | 6.4 | 67.2 | 71.9 | 82.7 |
| Example C2-31 |  | SM-4 | 11 | 444 | 6.3 | 67.2 | 73.4 | 82.3 |
| Example C2-32 |  | SM-15 | 11 | 442 | 6.3 | 67.1 | 72.2 | 83.1 |
| Example C2-33 | i | PVA-403 | 12 | 459 | 7.2 | 65.9 | 69.6 | 81.6 |

TABLE 110-continued

| | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-34 | | SM-15 | 12 | 465 | 7.4 | 65.7 | 70.1 | 85.9 |
| Example C2-35 | j | PVA-403 | 11 | 445 | 6.2 | 67.0 | 72.9 | 86.0 |
| Example C2-36 | | KL-506 | 11 | 445 | 6.2 | 66.7 | 72.7 | 80.7 |
| Example C2-37 | | AP-17 | 11 | 443 | 6.3 | 67.0 | 71.9 | 80.8 |
| Example C2-38 | | SM-4 | 11 | 446 | 6.2 | 67.3 | 72.2 | 81.6 |
| Example C2-39 | | SM-15 | 11 | 445 | 6.3 | 66.8 | 72.6 | 80.9 |
| Example C2-40 | k | KL-506 | 12 | 456 | 7.2 | 65.0 | 89.1 | 84.3 |
| Example C2-41 | | SM-4 | 12 | 458 | 7.2 | 66.0 | 69.4 | 84.9 |
| Example C2-42 | l | PVA-103 | 12 | 461 | 7.4 | 65.1 | 69.4 | 83.0 |
| Example C2-43 | | SM-15 | 12 | 456 | 7.2 | 65.7 | 69.0 | 80.5 |
| Example C2-44 | m | AP-17 | 14 | 487 | 8.2 | 62.4 | 64.1 | 84.0 |
| Example C2-45 | | SM-4 | 14 | 490 | 8.3 | 63.0 | 64.7 | 81.6 |
| Example C2-46 | n | PVA-403 | 13 | 470 | 7.6 | 64.6 | 67.8 | 83.0 |
| Example C2-47 | | SM-4 | 13 | 471 | 7.6 | 64.9 | 67.7 | 85.3 |
| Example C2-48 | o | KL-506 | 13 | 480 | 7.8 | 64.2 | 66.9 | 81.0 |
| Example C2-49 | | SM-15 | 13 | 480 | 7.7 | 63.7 | 67.2 | 82.5 |
| Example C2-50 | p | PVA-103 | 15 | 495 | 8.6 | 60.8 | 620 | 83.7 |
| Example C2-51 | | SM-15 | 15 | 495 | 8.7 | 61.2 | 62.6 | 82.0 |
| Example C2-52 | q | AP-17 | 14 | 490 | 8.2 | 62.6 | 63.9 | 82.0 |
| Example C2-53 | | SM-15 | 14 | 487 | 8.3 | 63.1 | 63.9 | 84.5 |
| Example C2-54 | r | PVA-103 | 14 | 490 | 8.1 | 62.5 | 63.7 | 81.2 |
| Example C2-55 | | SM-4 | 14 | 488 | 8.3 | 62.8 | 64.3 | 81.9 |
| Example C2-56 | s | KL-506 | 13 | 476 | 7.7 | 64.3 | 66.4 | 82.8 |
| Example C2-57 | | SM-15 | 13 | 478 | 7.8 | 64.5 | 66.2 | 82.0 |
| Example C2-58 | t | PVA-103 | 13 | 479 | 7.7 | 64.0 | 66.4 | 85.5 |
| Example C2-59 | | SM-15 | 13 | 473 | 7.7 | 63.9 | 66.9 | 85.7 |
| Example C2-60 | u | PVA-103 | 11 | 444 | 6.1 | 66.7 | 72.1 | 85.7 |
| Example C2-61 | | AP-17 | 11 | 442 | 6.2 | 67.4 | 71.9 | 83.8 |
| Example C2-62 | | SM-4 | 11 | 445 | 6.1 | 67.4 | 72.3 | 81.5 |
| Example C2-63 | | SM-15 | 11 | 444 | 6.4 | 68.6 | 73.0 | 84.3 |
| Example C2-64 | v | PVA-103 | 10 | 429 | 5.1 | 68.4 | 75.1 | 81.6 |
| Example C2-65 | | KL-506 | 10 | 423 | 5.4 | 68.7 | 74.6 | 84.2 |
| Example C2-66 | | AP-17 | 10 | 429 | 5.1 | 68.6 | 74.6 | 82.2 |
| Example C2-67 | | SM-4 | 10 | 426 | 5.4 | 68.2 | 75.5 | 85.4 |
| Example C2-68 | | SM-15 | 10 | 429 | 5.0 | 68.9 | 75.8 | 81.9 |
| Example C2-69 | w | PVA-103 | 12 | 467 | 7.3 | 65.7 | 69.6 | 81.5 |
| Example C2-70 | | SM-15 | 12 | 457 | 7.1 | 65.3 | 69.9 | 83.6 |

TABLE 110-continued

| | Dispersant or triazine derivative | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-71 | x | KL-506 | 12 | 467 | 7.4 | 65.6 | 69.5 | 85.3 |
| Example C2-72 | | SM-4 | 12 | 464 | 7.1 | 65.7 | 70.1 | 81.7 |
| Example C2-73 | y | KL-506 | 13 | 481 | 7.7 | 64.2 | 66.2 | 81.7 |
| Example C2-74 | | SM-4 | 13 | 477 | 7.7 | 64.4 | 66.1 | 81.7 |
| Example C2-75 | z | AP-17 | 13 | 479 | 7.7 | 63.7 | 66.7 | 84.0 |
| Example C2-76 | | SM-15 | 13 | 476 | 7.7 | 64.5 | 66.1 | 84.5 |
| Example C2-77 | aa | PVA-103 | 11 | 444 | 6.3 | 66.9 | 73.1 | 81.6 |
| Example C2-78 | | KL-506 | 11 | 446 | 6.4 | 67.5 | 72.5 | 81.4 |
| Example C2-79 | | SM-4 | 11 | 441 | 6.3 | 67.5 | 73.2 | 83.7 |
| Example C2-80 | | SM-15 | 11 | 441 | 6.4 | 66.8 | 72.6 | 81.4 |
| Example C2-81 | ab | PVA-403 | 10 | 423 | 5.1 | 68.5 | 74.8 | 85.2 |
| Example C2-82 | | KL-506 | 10 | 426 | 5.3 | 68.7 | 74.8 | 84.4 |
| Example C2-83 | | AP-17 | 10 | 429 | 5.2 | 68.8 | 75.8 | 84.1 |
| Example C2-84 | | SM-4 | 10 | 429 | 5.0 | 68.3 | 75.7 | 82.9 |
| Example C2-85 | | SM-15 | 10 | 424 | 5.1 | 68.2 | 75.3 | 82.5 |
| Example C2-86 | ac | PVA-103 | 13 | 479 | 7.8 | 64.1 | 66.7 | 84.0 |
| Example C2-87 | | SM-4 | 13 | 477 | 7.8 | 64.0 | 67.3 | 84.6 |
| Example C2-88 | ad | PVA-103 | 11 | 444 | 6.3 | 67.1 | 72.1 | 85.5 |
| Example C2-89 | | KL-506 | 11 | 446 | 6.1 | 67.0 | 73.0 | 83.5 |
| Example C2-90 | | AP-17 | 11 | 441 | 6.2 | 66.7 | 72.0 | 80.6 |
| Example C2-91 | | SM-4 | 11 | 445 | 6.1 | 66.9 | 73.1 | 83.1 |
| Example C2-92 | | SM-15 | 11 | 446 | 6.3 | 67.0 | 72.1 | 84.1 |
| Example C2-93 | ae | PVA-403 | 12 | 463 | 7.2 | 65.4 | 69.1 | 83.3 |
| Example C2-94 | | SM-15 | 12 | 462 | 7.1 | 65.9 | 69.5 | 85.7 |
| Example C2-95 | af | KL-506 | 12 | 462 | 7.4 | 66.0 | 70.1 | 81.9 |
| Example C2-96 | | SM-4 | 12 | 457 | 7.4 | 65.9 | 69.3 | 83.6 |
| Example C2-97 | ag | PVA-103 | 10 | 431 | 5.6 | 67.9 | 74.3 | 81.7 |
| Example C2-98 | | SM-15 | 10 | 433 | 5.5 | 68.1 | 74.1 | 83.2 |
| Example C2-99 | ah | AP-17 | 10 | 425 | 5.1 | 68.7 | 74.7 | 81.7 |
| Example C2-100 | | SM-4 | 10 | 427 | 5.0 | 68.1 | 75.2 | 81.8 |
| Example C2-101 | ai | KL-506 | 11 | 446 | 6.1 | 66.9 | 73.1 | 85.7 |
| Example C2-102 | | SM-15 | 11 | 446 | 6.3 | 67.0 | 72.5 | 86.0 |
| Example C2-103 | aj | PVA-103 | 12 | 466 | 7.3 | 65.7 | 70.1 | 84.1 |
| Example C2-104 | | SM-15 | 12 | 460 | 7.4 | 65.2 | 69.1 | 82.3 |

TABLE 111

| | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-105 | ca | PVA-403 | 10 | 417 | 4.9 | 69.5 | 76.3 | 85.9 |
| Example C2-106 | | KL-506 | 10 | 419 | 4.8 | 69.1 | 76.4 | 83.3 |
| Example C2-107 | | AP-17 | 10 | 419 | 4.8 | 69.6 | 76.5 | 83.6 |
| Example C2-108 | | SM-4 | 10 | 418 | 4.8 | 69.3 | 76.2 | 84.1 |
| Example C2-109 | | SM-15 | 10 | 418 | 4.9 | 69.3 | 76.1 | 81.7 |
| Example C2-110 | cb | PVA-103 | 10 | 422 | 5.3 | 68.2 | 74.9 | 83.2 |
| Example C2-111 | | KL-506 | 10 | 427 | 5.1 | 68.9 | 75.6 | 82.1 |
| Example C2-112 | | AP-17 | 10 | 429 | 5.0 | 68.5 | 75.0 | 81.8 |
| Example C2-113 | | SM-4 | 10 | 425 | 5.4 | 68.5 | 75.8 | 84.6 |
| Example C2-114 | | SM-15 | 10 | 428 | 5.1 | 68.1 | 75.7 | 80.7 |
| Example C2-115 | cc | PVA-103 | 10 | 427 | 5.1 | 68.8 | 75.8 | 84.8 |
| Example C2-116 | | KL-506 | 10 | 428 | 5.4 | 68.9 | 74.6 | 80.7 |
| Example C2-117 | | AP-17 | 10 | 424 | 5.4 | 68.9 | 75.4 | 84.1 |
| Example C2-118 | | SM-4 | 10 | 427 | 5.0 | 68.9 | 75.3 | 85.5 |
| Example C2-119 | | SM-15 | 10 | 426 | 5.3 | 68.2 | 75.4 | 83.8 |
| Example C2-120 | cd | KL-506 | 13 | 480 | 7.8 | 64.1 | 66.1 | 82.6 |
| Example C2-121 | | SM-4 | 13 | 481 | 7.8 | 64.5 | 66.2 | 80.5 |
| Example C2-122 | ce | PVA-403 | 12 | 461 | 7.4 | 65.2 | 69.4 | 85.6 |
| Example C2-123 | | SM-15 | 12 | 456 | 7.1 | 65.2 | 69.4 | 82.4 |
| Example C2-124 | cf | AP-17 | 12 | 466 | 7.1 | 65.5 | 69.2 | 85.5 |
| Example C2-125 | | SM-15 | 12 | 467 | 7.2 | 65.1 | 69.2 | 85.9 |
| Example C2-126 | cg | AP-17 | 12 | 457 | 7.1 | 65.6 | 69.2 | 83.9 |
| Example C2-127 | | SM-4 | 12 | 464 | 7.3 | 65.1 | 70.4 | 82.2 |
| Example C2-128 | ch | PVA-403 | 11 | 443 | 6.2 | 67.1 | 72.8 | 86.0 |
| Example C2-129 | | AP-17 | 11 | 443 | 6.1 | 66.9 | 71.9 | 84.0 |
| Example C2-130 | | SM-4 | 11 | 441 | 6.1 | 66.9 | 71.9 | 85.5 |
| Example C2-131 | | SM-15 | 11 | 445 | 6.3 | 67.3 | 71.9 | 84.5 |
| Example C2-132 | ci | PVA-103 | 12 | 467 | 7.2 | 65.2 | 70.1 | 82.8 |
| Example C2-133 | | SM-15 | 12 | 459 | 7.3 | 65.8 | 68.6 | 82.8 |
| Example C2-134 | cj | PVA-103 | 11 | 443 | 6.3 | 67.0 | 72.2 | 82.6 |
| Example C2-135 | | KL-506 | 11 | 446 | 6.1 | 66.6 | 72.5 | 81.2 |
| Example C2-136 | | AP-17 | 11 | 445 | 6.4 | 66.9 | 73.0 | 81.8 |
| Example C2-137 | | SM-4 | 11 | 444 | 6.1 | 67.2 | 71.8 | 83.0 |
| Example C2-138 | | SM-15 | 11 | 443 | 6.4 | 66.6 | 72.6 | 85.3 |
| Example C2-139 | ck | PVA-403 | 12 | 467 | 7.3 | 65.6 | 69.8 | 84.4 |
| Example C2-140 | | SM-15 | 12 | 459 | 7.3 | 65.8 | 69.9 | 85.4 |
| Example C2-141 | cl | PVA-103 | 12 | 460 | 7.3 | 65.1 | 70.0 | 82.1 |
| Example C2-142 | | SM-15 | 12 | 458 | 7.3 | 65.3 | 69.8 | 80.5 |
| Example C2-143 | cm | PVA-103 | 14 | 489 | 8.3 | 62.7 | 64.5 | 81.7 |
| Example C2-144 | | SM-15 | 14 | 486 | 8.4 | 62.9 | 63.5 | 80.6 |
| Example C2-145 | cn | PVA-403 | 13 | 474 | 7.6 | 64.6 | 67.6 | 83.3 |
| Example C2-146 | | SM-4 | 13 | 475 | 7.6 | 64.5 | 67.4 | 84.6 |
| Example C2-147 | co | KL-506 | 13 | 480 | 7.8 | 64.1 | 67.1 | 84.4 |
| Example C2-148 | | SM-15 | 13 | 481 | 7.7 | 64.0 | 66.8 | 83.2 |
| Example C2-149 | cp | PVA-103 | 15 | 496 | 8.7 | 61.8 | 61.8 | 80.8 |
| Example C2-150 | | SM-15 | 15 | 495 | 8.6 | 61.1 | 62.5 | 84.2 |
| Example C2-151 | cq | AP-17 | 14 | 486 | 8.3 | 62.7 | 63.7 | 85.3 |
| Example C2-152 | | SM-15 | 14 | 490 | 8.4 | 62.4 | 64.7 | 84.2 |
| Example C2-153 | cr | KL-506 | 14 | 491 | 8.1 | 62.6 | 63.9 | 85.9 |
| Example C2-154 | | SM-4 | 14 | 487 | 8.3 | 62.7 | 63.9 | 81.2 |
| Example C2-155 | cs | PVA-403 | 13 | 479 | 7.7 | 64.4 | 67.0 | 85.9 |
| Example C2-156 | | SM-4 | 13 | 478 | 7.7 | 64.4 | 67.4 | 80.7 |
| Example C2-157 | ct | PVA-103 | 13 | 478 | 7.7 | 63.9 | 67.3 | 83.0 |
| Example C2-158 | | SM-15 | 13 | 478 | 7.7 | 63.8 | 67.0 | 84.9 |
| Example C2-159 | cu | PVA-103 | 10 | 427 | 5.0 | 66.1 | 75.2 | 80.9 |
| Example C2-160 | | KL-506 | 10 | 427 | 5.4 | 68.5 | 75.4 | 84.5 |
| Example C2-161 | | AP-17 | 10 | 426 | 5.0 | 68.2 | 74.6 | 84.4 |
| Example C2-162 | | SM-4 | 10 | 421 | 5.3 | 68.5 | 74.7 | 85.7 |
| Example C2-163 | | SM-15 | 10 | 424 | 5.3 | 68.6 | 74.7 | 82.6 |
| Example C2-164 | cv | PVA-403 | 11 | 446 | 6.3 | 66.7 | 72.7 | 85.3 |
| Example C2-165 | | KL-506 | 11 | 441 | 6.3 | 67.0 | 72.6 | 84.1 |
| Example C2-166 | | SM-4 | 11 | 444 | 6.3 | 67.2 | 72.9 | 86.0 |
| Example C2-167 | | SM-15 | 11 | 443 | 6.3 | 66.7 | 72.6 | 80.5 |
| Example C2-168 | cw | PVA-103 | 11 | 446 | 6.3 | 67.5 | 73.3 | 82.3 |
| Example C2-169 | | KL-506 | 11 | 443 | 6.2 | 66.7 | 73.4 | 84.1 |
| Example C2-170 | | AP-17 | 11 | 445 | 6.3 | 66.7 | 72.4 | 85.3 |
| Example C2-171 | | SM-4 | 11 | 446 | 6.4 | 66.8 | 71.8 | 81.1 |
| Example C2-172 | | SM-15 | 11 | 445 | 6.3 | 67.4 | 72.3 | 81.2 |
| Example C2-173 | cx | AP-17 | 12 | 459 | 7.4 | 66.0 | 69.3 | 84.7 |
| Example C2-174 | | SM-4 | 12 | 463 | 7.1 | 65.9 | 70.0 | 83.4 |
| Example C2-175 | cy | PVA-103 | 12 | 460 | 7.3 | 65.2 | 69.3 | 85.9 |
| Example C2-176 | | SM-15 | 12 | 460 | 7.3 | 65.2 | 69.0 | 81.0 |
| Example C2-177 | cz | KL-506 | 13 | 478 | 7.7 | 64.2 | 66.7 | 82.2 |
| Example C2-178 | | SM-4 | 13 | 476 | 7.7 | 64.5 | 66.5 | 80.9 |

TABLE 111-continued

|  | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-179 | da | KL-506 | 13 | 480 | 7.8 | 64.0 | 66.8 | 82.1 |
| Example C2-180 |  | SM-4 | 13 | 477 | 7.8 | 64.4 | 66.7 | 82.1 |
| Example C2-181 | db | AP-17 | 12 | 463 | 7.4 | 65.3 | 69.4 | 82.1 |
| Example C2-182 |  | SM-15 | 12 | 459 | 7.4 | 65.0 | 69.7 | 80.5 |
| Example C2-183 | dc | PVA-403 | 10 | 429 | 5.2 | 66.7 | 74.8 | 84.3 |
| Example C2-184 |  | SM-15 | 10 | 421 | 5.1 | 68.4 | 75.8 | 81.3 |
| Example C2-185 | dd | KL-506 | 10 | 429 | 5.3 | 68.4 | 74.6 | 84.1 |
| Example C2-186 |  | SM-4 | 10 | 421 | 5.4 | 68.8 | 74.9 | 82.6 |
| Example C2-187 | de | PVA-103 | 12 | 459 | 7.4 | 65.6 | 70.3 | 84.0 |
| Example C2-188 |  | SM-15 | 12 | 465 | 7.3 | 65.5 | 70.1 | 83.6 |
| Reference Example C2-189 | A | PVA-103 | 15 | 494 | 8.9 | 62.7 | 63.5 | 81.0 |
| Reference Example C2-190 |  | SM-4 | 15 | 494 | 8.7 | 61.9 | 63.6 | 82.7 |
| Reference Example C2-191 | E | AP-17 | 15 | 496 | 8.8 | 62.8 | 63.5 | 84.3 |
| Reference Example C2-192 | H | SM-4 | 15 | 495 | 8.9 | 62.7 | 63.5 | 82.7 |
| Reference Example C2-193 | J | SM-15 | 15 | 497 | 8.6 | 61.0 | 62.0 | 84.5 |
| Example C2-194 | a | PVA-103/SM-15 | 10 | 419 | 5.0 | 69.3 | 76.1 | 85.7 |
| Example C2-195 |  | KL-506/SM-15 | 10 | 418 | 4.9 | 69.2 | 76.0 | 82.7 |
| Reference Example C2-196 |  | AP-17/SM-15 | 10 | 419 | 4.8 | 69.6 | 76.1 | 81.7 |
| Reference Example C2-197 | A | PVA-103/SM-15 | 15 | 495 | 8.7 | 62.3 | 63.4 | 84.3 |
| Reference Example C2-198 |  | KL-506/SM-15 | 15 | 496 | 8.7 | 61.9 | 63.6 | 84.0 |
| Reference Example C2-199 |  | AP-17/SM-15 | 15 | 495 | 8.8 | 62.5 | 62.9 | 81.0 |

TABLE 112

|  | Dispersant or triazine derivative | Polymer dispersant | $\|Z\|ion$ at 25° C. [Ω] | $\|Z\|ion$ at −20° C. [Ω] | $\|Z\|re$ at 25° C. [Ω] | Room temperature rate characteristic [%] | Low-temperature discharge characteristic [%] | Cycle characteristic [%] |
|---|---|---|---|---|---|---|---|---|
| Comparative Example C2-1 | ba | PVA-103 | 18 | 541 | 11.0 | 49.5 | 38.5 | 63.6 |
| Comparative Example C2-2 | bb | SM-4 | 17 | 512 | 10.8 | 51.0 | 42.8 | 62.1 |
| Comparative Example C2-3 | ea | SM-4 | 18 | 543 | 11.1 | 50.8 | 37.9 | 63.7 |
| Comparative Example C2-4 | eb | PVA-103 | 17 | 521 | 10.6 | 52.6 | 41.2 | 62.4 |
| Comparative Example C2-5 | — | — | 16 | 510 | 10.4 | 54.0 | 45.1 | 58.6 |
| Example C2-1a | a | — | 10 | 420 | 4.9 | 69.1 | 76.0 | 60.9 |

As can be seen from Table 110, Table 111, and Table 112, the cathodes of Examples C2-1 to C2-188, Reference Examples C2-189 to C2-193, Examples C2-194 to C2-196, Reference Examples C2-197 to C2-199, and Examples C2-1a, in which the dispersants a to aj and ca to de, the triazine derivatives A, E, H, and J were used, were significantly excellent in all of the ionic resistance, reaction resistance, room temperature rate characteristic, and low-temperature discharge characteristic at room temperature and −20° C., as compared to the cathodes of Comparative Examples C2-1 to C2-4 in which the dispersants ba, bb, ea, and eb and polymer dispersant were used, and Comparative Example C2-5 in which a dispersant was not used.

The reason for this is thought to be that, because Li$^+$ with extremely high electron density is present near the dispersants a to aj and ca to de, dielectric polarization occurs, and thereby the dispersants have a high dielectric constant in a battery. It is considered that, accordingly, ionic conductivity is improved, and desolvation energy and solvation energy of $Li^+$ when an active material reacts with Li are reduced. As a result, ionic resistance and reaction resistance are reduced, and therefore characteristics in terms of the whole battery is also improved.

In addition, in the cathodes of Examples C2-1 to C2-199 in which the dispersants a to aj and ca to de and the polymer dispersant were used, the cycle characteristic was significantly improved as compared with the cathodes of Comparative Examples C2-1 to C2-4 in which the dispersants ba, bb, ea, and eb and the polymer dispersant were used, and Comparative Example C2-5 in which a dispersant was not used.

When the cells for cathode evaluation of the examples, the comparative examples, and the reference examples were disassembled to confirm a state of the electrode, the electrodes of the reference examples and the comparative examples were partially peeled off or cracked, whereas the electrodes of the examples were in a favorable state. It is considered that, when peeling strength is significantly improved, peeling and deterioration of the electrode due to the cycles are inhibited, and thereby the cycle characteristic is improved.

[Examples C3-1 to C3-10] [Comparative Examples C3-1 to C3-5] Comparison of Carbon Material Types In the same manner as Example C1-1, a carbon material dispersion liquid, carbon material dispersion varnish, cathode mixture paste, and electrode were produced according to materials and compositions of the carbon material dispersion liquid shown in Table 113, the carbon material dispersion varnish shown in Table 114, and the cathode mixture paste shown in Table 115, and a peeling strength test was conducted. In addition, a cell for evaluating a cathode of a lithium ion secondary battery was assembled in the same manner as in Example C2-1 by using, in Example C2-1, the electrodes instead of the electrode produced in Example C1-1, and then ionic resistance, reaction resistance, room temperature rate characteristic, low-temperature discharge characteristic, and cycle characteristic were evaluated. Because a large amount of dispersant is required for carbon materials with a high specific surface area, an appropriate amount to be used was determined according to each carbon material.

(Composition of Carbon Material Dispersion Liquids)

TABLE 113

| | Composition of carbon material dispersion liquid | | | | | | | |
|---|---|---|---|---|---|---|---|---|
| | Dispersant | | Polymer dispersant | | Carbon material | | Solvent | |
| | Type | Content (%) | Type | Content (%) | Type | Content (%) | Type | Content (%) |
| Example C3-1 | a | 0.20 | PVA-103 | 0.20 | super-P | 10.0 | NMP | 89.6 |
| Example C3-2 | a | 0.20 | PVA-403 | 0.20 | M800 | 10.0 | NMP | 89.6 |
| Example C3-3 | a | 0.50 | AP-17 | 0.50 | EC-300J | 10.0 | NMP | 89.0 |
| Example C3-4 | a | 0.75 | KL-506 | 0.75 | CNT | 3.0 | NMP | 95.5 |
| Example C3-5 | a | 0.10 | PVA-103 | 0.10 | VGCF | 10.0 | NMP | 89.8 |
| Example C3-6 | a | 0.20 | SM-4 | 0.20 | super-P | 10.0 | NMP | 89.6 |
| Example C3-7 | a | 0.20 | SM-15 | 0.20 | M800 | 10.0 | NMP | 89.6 |
| Example C3-8 | a | 0.50 | SM-4 | 0.50 | EC-300J | 10.0 | NMP | 89.0 |
| Example C3-9 | a | 0.75 | SM-15 | 0.75 | CNT | 3.0 | NMP | 95.5 |
| Example C3-10 | a | 0.10 | SM-4 | 0.10 | VGCF | 10.0 | NMP | 89.8 |
| Comparative Example C3-1 | ba | 0.20 | PVA-103 | 0.20 | super-P | 10.0 | NMP | 89.6 |
| Comparative Example C3-2 | ba | 0.20 | L-3266 | 0.20 | M800 | 10.0 | NMP | 89.6 |
| Comparative Example C3-3 | ba | 0.50 | AP-17 | 0.50 | EC-300J | 10.0 | NMP | 89.0 |
| Comparative Example C3-4 | ba | 0.75 | SM-4 | 0.75 | CNT | 3.0 | NMP | 95.5 |
| Comparative Example C3-5 | ba | 0.10 | SM-15 | 0.10 | VGCF | 10.0 | NMP | 89.8 |

(Composition of Carbon Material Dispersion Varnishes)

TABLE 114

| | Composition of carbon material dispersion varnish | | | | | | | | | |
|---|---|---|---|---|---|---|---|---|---|---|
| | Dispersant | | Polymer dispersant | | Carbon material | | Binder | | Solvent | |
| | Type | Content (%) | Type | Content (%) | Type | Content (%) | Type | Content (%) | Type | Content (%) |
| Example C3-1 | a | 0.12 | PVA-103 | 0.12 | super-P | 6.0 | PVDF | 6.0 | NMP | 87.8 |
| Example C3-2 | a | 0.12 | PVA-403 | 0.12 | M800 | 6.0 | PVDF | 6.0 | NMP | 87.8 |
| Example C3-3 | a | 0.30 | AP-17 | 0.30 | EC-300J | 6.0 | PVDF | 6.0 | NMP | 87.4 |
| Example C3-4 | a | 0.73 | KL-506 | 0.73 | CNT | 2.9 | PVDF | 2.9 | NMP | 92.8 |

TABLE 114-continued

| | Composition of carbon material dispersion varnish | | | | | | | | | |
|---|---|---|---|---|---|---|---|---|---|---|
| | Dispersant | | Polymer dispersant | | Carbon material | | Binder | | Solvent | |
| | Type | Content (%) | Type | Content (%) | Type | Content (%) | Type | Content (%) | Type | Content (%) |
| Example C3-5 | a | 0.06 | PVA-103 | 0.06 | VGCF | 6.0 | PVDF | 6.0 | NMP | 87.9 |
| Example C3-6 | a | 0.12 | SM-4 | 0.12 | super-P | 6.0 | PVDF | 6.0 | NMP | 87.8 |
| Example C3-7 | a | 0.12 | SM-15 | 0.12 | M800 | 6.0 | PVDF | 6.0 | NMP | 87.3 |
| Example C3-8 | a | 0.30 | SM-4 | 0.30 | EC-300J | 6.0 | PVDF | 6.0 | NMP | 87.4 |
| Example C3-9 | a | 0.73 | SM-15 | 0.73 | CNT | 2.9 | PVDF | 2.9 | NMP | 92.8 |
| Example C3-10 | a | 0.06 | SM-4 | 0.06 | VGCF | 6.0 | PVDF | 6.0 | NMP | 87.9 |
| Comparative Example C3-1 | ba | 0.12 | PVA-103 | 0.12 | super-P | 6.0 | PVDF | 6.0 | NMP | 87.8 |
| Comparative Example C3-2 | ba | 0.12 | L-3266 | 0.12 | M800 | 6.0 | PVDF | 6.0 | NMP | 87.8 |
| Comparative Example C3-3 | ba | 0.30 | AP-17 | 0.30 | EC-300J | 6.0 | PVDF | 6.0 | NMP | 87.4 |
| Comparative Example C3-4 | ba | 0.73 | SM-4 | 0.73 | CNT | 2.9 | PVDF | 2.9 | NMP | 92.8 |
| Comparative Example C3-5 | ba | 0.06 | SM-15 | 0.06 | VGCF | 6.0 | PVDF | 6.0 | NMP | 87.9 |

(Composition of Cathode Mixture Pastes)

TABLE 115

| | Composition of cathode mixture paste | | | | | | | | | | | |
|---|---|---|---|---|---|---|---|---|---|---|---|---|
| | Dispersant | | Polymer dispersant | | Carbon material | | Binder | | Active material | | Solvent | |
| | Type | Content (%) | Type | Content (%) | Type | Content (%) | Type | Content (%) | Type | Content (%) | Type | Content (%) |
| Example C3-1 | a | 0.04 | PVA-103 | 0.04 | super-P | 2.0 | PVDF | 2.0 | NMC | 54.0 | NMP | 41.9 |
| Example C3-2 | a | 0.04 | PVA-403 | 0.04 | M800 | 2.0 | PVDF | 2.0 | NMC | 54.0 | NMP | 41.9 |
| Example C3-3 | a | 0.10 | AP-17 | 0.10 | EC-300J | 2.0 | PVDF | 2.0 | NMC | 54.0 | NMP | 41.8 |
| Example C3-4 | a | 0.33 | KL-506 | 0.33 | CNT | 1.3 | PVDF | 1.3 | NMC | 54.0 | NMP | 42.8 |
| Example C3-5 | a | 0.02 | PVA-103 | 0.02 | VGCF | 2.0 | PVDF | 2.0 | NMC | 54.0 | NMP | 42.0 |
| Example C3-6 | a | 0.04 | SM-4 | 0.04 | super-P | 2.0 | PVDF | 2.0 | NMC | 54.0 | NMP | 41.9 |
| Example C3-7 | a | 0.04 | SM-15 | 0.04 | M800 | 2.0 | PVDF | 2.0 | NMC | 54.0 | NMP | 41.9 |
| Example C3-8 | a | 0.10 | SM-4 | 0.10 | EC-300J | 2.0 | PVDF | 2.0 | NMC | 54.0 | NMP | 41.8 |
| Example C3-9 | a | 0.33 | SM-15 | 0.33 | CNT | 1.3 | PVDF | 1.3 | NMC | 54.0 | NMP | 42.8 |
| Example C3-10 | a | 0.02 | SM-4 | 0.02 | VGCF | 2.0 | PVDF | 2.0 | NMC | 54.0 | NMP | 42.0 |
| Comparative Example C3-1 | ba | 0.04 | PVA-103 | 0.04 | super-P | 2.0 | PVDF | 2.0 | NMC | 54.0 | NMP | 41.9 |
| Comparative Example C3-2 | ba | 0.04 | L-3266 | 0.04 | M800 | 2.0 | PVDF | 2.0 | NMC | 54.0 | NMP | 41.9 |
| Comparative Example C3-3 | ba | 0.10 | AP-17 | 0.10 | EC-300J | 2.0 | PVDF | 2.0 | NMC | 54.0 | NMP | 41.8 |
| Comparative Example C3-4 | ba | 0.33 | SM-4 | 0.33 | CNT | 1.3 | PVDF | 1.3 | NMC | 54.0 | NMP | 42.8 |
| Comparative Example C3-5 | ba | 0.02 | SM-15 | 0.02 | VGCF | 2.0 | PVDF | 2.0 | NMC | 54.0 | NMP | 42.0 |

<Evaluation Results>

The carbon material dispersion liquids, carbon material dispersion varnishes, and cathode mixture pastes shown in all of the examples and comparative examples were also in a favorably dispersed state, and sedimentation or thickening did not occur even after the elapse of one month.

Table 116 shows evaluation results of ionic resistance, reaction resistance, room temperature rate characteristic, low-temperature discharge characteristic, cycle characteristic, and peeling strength of the cell for cathode evaluation of Examples C3-1 to C3-10 and Comparative Examples C3-1 to C3-5.

TABLE 116

| | Carbon material | Dispersant | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] | Peeling strength |
|---|---|---|---|---|---|---|---|---|---|---|
| Example C3-1 | super-P | a | PVA-103 | 10 | 423 | 5.1 | 68.6 | 75.7 | 80.5 | A |
| Example C3-2 | M800 | a | PVA-403 | 11 | 446 | 6.4 | 66.9 | 72.0 | 81.6 | A |
| Example C3-3 | EC-300J | a | AP-17 | 12 | 462 | 7.3 | 65.7 | 69.2 | 85.6 | A |
| Example C3-4 | CNT | a | KL-506 | 11 | 448 | 6.2 | 66.8 | 72.0 | 89.0 | A |
| Example C3-5 | VGCF | a | PVA-103 | 12 | 459 | 7.5 | 65.9 | 68.9 | 83.6 | A |
| Example C3-6 | super-P | a | SM-4 | 10 | 422 | 5.2 | 68.6 | 75.3 | 81.2 | A |
| Example C3-7 | M800 | a | SM-15 | 11 | 449 | 6.5 | 67.9 | 72.1 | 82.3 | A |
| Example C3-8 | EC-300J | a | SM-4 | 12 | 467 | 7.2 | 66.3 | 69.4 | 86.0 | A |
| Example C3-9 | CNT | a | SM-15 | 11 | 445 | 6.3 | 68.6 | 72.3 | 89.6 | A |
| Example C3-10 | VGCF | a | SM-4 | 12 | 487 | 7.6 | 66.2 | 69.0 | 81.9 | A |
| Comparative Example C3-1 | super-P | ba | PVA-103 | 17 | 612 | 10.7 | 51.9 | 42.4 | 63.2 | B to C |
| Comparative Example C3-2 | M800 | ba | L-3266 | 17 | 618 | 10.8 | 52.5 | 43.2 | 65.2 | B to C |
| Comparative Example C3-3 | EC-300J | ba | AP-17 | 18 | 625 | 10.9 | 50.3 | 37.1 | 63.3 | B to C |
| Comparative Example C3-4 | CNT | ba | SM-4 | 18 | 628 | 11.1 | 49.1 | 36.7 | 69.5 | B to C |
| Comparative Example C3-5 | VGCF | ba | SM-15 | 16 | 609 | 10.3 | 54.6 | 45.3 | 61.3 | B to C |

The same effects were confirmed for all the carbon materials. Differences between Examples C3-1 to C3-10 were thought to be differences due to conductivities of the carbon materials. In addition, in Comparative Examples C3-1 to C3-5, there was a tendency in which as an amount of dispersant added became larger, the all characteristics became inferior.

Based on the above verification, it was confirmed that the above-described effects were not dependent on the type of carbon material.

[Examples C4-1 to C4-12] Comparison 1 of Amount of Dispersant Per Active Material Surface Area An electrode was produced in the same manner as Example C1-2 except that the amounts of dispersants shown in Table 117, Table 118, and Table 119 were used instead of the amount of dispersant and the amount of polymer dispersant used in Example C1-2. A cell for evaluating a cathode of a lithium ion secondary battery was assembled in the same manner as in Example C2-2 by using, in Example C2-2, the electrodes instead of the electrode produced in Example C1-2, and then ionic resistance, reaction resistance, room temperature rate characteristic, and low-temperature discharge characteristic were evaluated. Table 120 shows a dispersant amount (mg) with respect to 1 m² active material surface area in the electrode.

(Composition of Carbon Material Dispersion Liquids)

TABLE 117

| | Composition of carbon material dispersion liquids | | | | | | | |
|---|---|---|---|---|---|---|---|---|
| | Dispersant | | Polymer dispersant | | Carbon material | | Solvent | |
| | Type | Content (%) | Type | Content (%) | Type | Content (%) | Type | Content (%) |
| Comparative Example C2-5 | — | 0 | — | 0 | HS100 | 10.0 | NMP | 90.0 |

TABLE 117-continued

Composition of carbon material dispersion liquids

| | Dispersant | | Polymer dispersant | | Carbon material | | Solvent | |
|---|---|---|---|---|---|---|---|---|
| | Type | Content (%) | Type | Content (%) | Type | Content (%) | Type | Content (%) |
| Example C4-1 | a | 0.01 | PVA-403 | 0.01 | HS100 | 10.0 | NMP | 90.0 |
| Example C4-2 | a | 0.02 | PVA-403 | 0.02 | HS100 | 10.0 | NMP | 90.0 |
| Example C4-3 | a | 0.05 | PVA-403 | 0.05 | HS100 | 10.0 | NMP | 89.9 |
| Example C2-2 | a | 0.1 | PVA-403 | 0.1 | HS100 | 10.0 | NMP | 89.8 |
| Example C4-4 | a | 0.2 | PVA-403 | 0.2 | HS100 | 10.0 | NMP | 89.6 |
| Example C4-5 | a | 0.4 | PVA-403 | 0.4 | HS100 | 10.0 | NMP | 89.2 |
| Example C4-6 | a | 0.8 | PVA-403 | 0.8 | HS100 | 10.0 | NMP | 88.4 |
| Example C4-7 | a | 0.01 | SM-4 | 0.01 | HS100 | 10.0 | NMP | 90.0 |
| Example C4-8 | a | 0.02 | SM-4 | 0.02 | HS100 | 10.0 | NMP | 90.0 |
| Example C4-9 | a | 0.05 | SM-4 | 0.05 | HS100 | 10.0 | NMP | 89.9 |
| Example C2-8 | a | 0.1 | SM-4 | 0.1 | HS100 | 10.0 | NMP | 89.8 |
| Example C4-10 | a | 0.2 | SM-4 | 0.2 | HS100 | 10.0 | NMP | 89.6 |
| Example C4-11 | a | 0.4 | SM-4 | 0.4 | HS100 | 10.0 | NMP | 89.2 |
| Example C4-12 | a | 0.8 | SM-4 | 0.8 | HS100 | 10.0 | NMP | 88.4 |

(Composition of Carbon Material Dispersion Varnishes)

TABLE 118

Composition of carbon material dispersion varnish

| | Dispersant | | Polymer dispersant | | Carbon material | | Binder | | Solvent | |
|---|---|---|---|---|---|---|---|---|---|---|
| | Type | Content (%) | Type | Content (%) | Type | Content (%) | Type | Content (%) | Type | Content (%) |
| Comparative Example C2-5 | — | 0 | — | 0 | HS100 | 6.0 | PVDF | 6.0 | NMP | 88.0 |
| Example C4-1 | a | 0.006 | PVA-403 | 0.006 | HS100 | 6.0 | PVDF | 6.0 | NMP | 88.0 |
| Example C4-2 | a | 0.012 | PVA-403 | 0.012 | HS100 | 6.0 | PVDF | 6.0 | NMP | 88.0 |
| Example C4-3 | a | 0.03 | PVA-403 | 0.03 | HS100 | 6.0 | PVDF | 6.0 | NMP | 87.9 |
| Example C2-2 | a | 0.06 | PVA-403 | 0.06 | HS100 | 6.0 | PVDF | 6.0 | NMP | 87.9 |
| Example C4-4 | a | 0.12 | PVA-403 | 0.12 | HS100 | 6.0 | PVDF | 6.0 | NMP | 87.8 |
| Example C4-5 | a | 0.24 | PVA-403 | 0.24 | HS100 | 6.0 | PVDF | 6.0 | NMP | 87.5 |
| Example C4-6 | a | 0.48 | PVA-403 | 0.48 | HS100 | 6.0 | PVDF | 6.0 | NMP | 87.0 |
| Example C4-7 | a | 0.006 | SM-4 | 0.006 | HS100 | 6.0 | PVDF | 6.0 | NMP | 88.0 |
| Example C4-8 | a | 0.012 | SM-4 | 0.012 | HS100 | 6.0 | PVDF | 6.0 | NMP | 88.0 |
| Example C4-9 | a | 0.03 | SM-4 | 0.03 | HS100 | 6.0 | PVDF | 6.0 | NMP | 87.9 |
| Example C2-8 | a | 0.06 | SM-4 | 0.06 | HS100 | 6.0 | PVDF | 6.0 | NMP | 87.9 |
| Example C4-10 | a | 0.12 | SM-4 | 0.12 | HS100 | 6.0 | PVDF | 6.0 | NMP | 87.8 |
| Example C4-11 | a | 0.24 | SM-4 | 0.24 | HS100 | 6.0 | PVDF | 6.0 | NMP | 87.5 |
| Example C4-12 | a | 0.48 | SM-4 | 0.48 | HS100 | 6.0 | PVDF | 6.0 | NMP | 87.0 |

(Composition of Cathode Mixture Pastes)

TABLE 119

Composition of cathode mixture paste

| | Dispersant | | Polymer dispersant | | Carbon material | | Binder | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Comparative Example C2-5 | — | 0 | — | 0 | HS100 | 2.0 | PVDF | 2.0 | NMC | 54.0 | NMP | 42.0 |
| Example C4-1 | a | 0.002 | PVA-403 | 0.002 | HS100 | 2.0 | PVDF | 2.0 | NMC | 54.0 | NMP | 42.0 |
| Example C4-2 | a | 0.004 | PVA-403 | 0.004 | HS100 | 2.0 | PVDF | 2.0 | NMC | 54.0 | NMP | 42.0 |
| Example C4-3 | a | 0.01 | PVA-403 | 0.01 | HS100 | 2.0 | PVDF | 2.0 | NMC | 54.0 | NMP | 42.0 |
| Example C2-2 | a | 0.02 | PVA-403 | 0.02 | HS100 | 2.0 | PVDF | 2.0 | NMC | 54.0 | NMP | 42.0 |

TABLE 119-continued

| | Composition of cathode mixture paste | | | | | | | | | | |
|---|---|---|---|---|---|---|---|---|---|---|---|
| | Dispersant | | Polymer dispersant | | Carbon material | | Binder | | Active material | | Solvent | |
| | Type | Content (%) | Type | Content (%) | Type | Content (%) | Type | Content (%) | Type | Content (%) | Type | Content (%) |
| Example C4-4 | a | 0.04 | PVA-403 | 0.04 | HS100 | 2.0 | PVDF | 2.0 | NMC | 54.0 | NMP | 41.9 |
| Example C4-5 | a | 0.08 | PVA-403 | 0.08 | HS100 | 2.0 | PVDF | 2.0 | NMC | 54.0 | NMP | 41.8 |
| Example C4-6 | a | 0.16 | PVA-403 | 0.16 | HS100 | 2.0 | PVDF | 2.0 | NMC | 54.0 | NMP | 41.7 |
| Example C4-7 | a | 0.002 | SM-4 | 0.002 | HS100 | 2.0 | PVDF | 2.0 | NMC | 54.0 | NMP | 42.0 |
| Example C4-8 | a | 0.004 | SM-4 | 0.004 | HS100 | 2.0 | PVDF | 2.0 | NMC | 54.0 | NMP | 42.0 |
| Example C4-9 | a | 0.01 | SM-4 | 0.01 | HS100 | 2.0 | PVDF | 2.0 | NMC | 54.0 | NMP | 42.0 |
| Example C2-8 | a | 0.02 | SM-4 | 0.02 | HS100 | 2.0 | PVDF | 2.0 | NMC | 54.0 | NMP | 42.0 |
| Example C4-10 | a | 0.04 | SM-4 | 0.04 | HS100 | 2.0 | PVDF | 2.0 | NMC | 54.0 | NMP | 41.9 |
| Example C4-11 | a | 0.08 | SM-4 | 0.08 | HS100 | 2.0 | PVDF | 2.0 | NMC | 54.0 | NMP | 41.8 |
| Example C4-12 | a | 0.16 | SM-4 | 0.16 | HS100 | 2.0 | PVDF | 2.0 | NMC | 54.0 | NMP | 41.7 |

(Amount of Dispersant Per Active Material Surface Area)

TABLE 120

| | Dispersant amount per active material surface area (mg/m$^2$) |
|---|---|
| Comparative Example C2-5 | 0 |
| Example C4-1, Example C4-7 | 0.06 |
| Example C4-2, Example C4-8 | 0.12 |
| Example C4-3, Example C4-9 | 0.30 |
| Example C2-2, Example C2-8 | 0.60 |
| Example C4-4, Example C4-10 | 1.19 |
| Example C4-5, Example C4-11 | 2.39 |
| Example C4-6, Example C4-12 | 4.78 |

<Evaluation Results>

Table 121 shows evaluation results of reaction resistance, room temperature rate characteristic, and low-temperature discharge characteristic of Comparative Example C2-5, and Examples C2-2, C2-8, and C4-1 to C4-12.

TABLE 121

| | Dispersant | Polymer dispersant | Dispersant amount per active material surface area (mm/m$^2$) | $|Z|_{re}$ at 25° C. [Ω] | Room temperature rate characteristic [%] | Low-temperature discharge characteristic [%] |
|---|---|---|---|---|---|---|
| Comparative Example C2-5 | — | — | 0 | 10.4 | 54.0 | 45.1 |
| Example C4-1 | a | PVA-403 | 0.06 | 8.0 | 64.7 | 66.7 |
| Example C4-2 | a | PVA-403 | 0.12 | 7.2 | 64.9 | 69.3 |
| Example C4-3 | a | PVA-403 | 0.30 | 6.8 | 66.8 | 73.2 |
| Example C2-2 | a | PVA-403 | 0.60 | 4.9 | 69.2 | 76.0 |
| Example C4-4 | a | PVA-403 | 1.19 | 4.9 | 69.1 | 76.0 |
| Example C4-5 | a | PVA-403 | 2.39 | 4.8 | 69.3 | 76.7 |
| Example C4-6 | a | PVA-403 | 4.78 | 4.8 | 69.6 | 77.1 |
| Example C4-7 | a | SM-4 | 0.06 | 8.1 | 64.5 | 66.1 |
| Example C4-8 | a | SM-4 | 0.12 | 7.1 | 64.5 | 69.1 |
| Example C4-9 | a | SM-4 | 0.30 | 6.7 | 66.2 | 72.1 |
| Example C2-8 | a | SM-4 | 0.60 | 4.9 | 69.2 | 76.3 |
| Example C4-10 | a | SM-4 | 1.19 | 4.9 | 69.6 | 76.3 |
| Example C4-11 | a | SM-4 | 2.39 | 4.8 | 69.2 | 76.8 |
| Example C4-12 | a | SM-4 | 4.78 | 4.8 | 69.4 | 77.5 |

Based on Example C4-1, it was found that when a dispersant amount with respect to the active material surface area was too small, the effect was diminished. A particularly excellent effect was obtained when a dispersant amount became larger than that of Examples C4-2 and C4-8, and the effect was gradually improved as the dispersant amount increased.

[Examples C5-1 to C5-18] Comparison 2 of Amount of Dispersant Per Active Material Surface Area Dispersion was performed using the materials and compositions shown in Table 122, Table 123, and Table 124 in the same manner as in Example C1-1 to assemble a cell for cathode evaluation, and ionic resistance, reaction resistance, room temperature rate characteristic, and low-temperature discharge characteristic were evaluated. Table 125 shows a dispersant amount (mg) with respect to 1 $m^2$ active material surface area in the electrode.

(Composition of Carbon Material Dispersion Liquids)

TABLE 122

| | Composition of carbon material dispersion liquid | | | | | | | |
|---|---|---|---|---|---|---|---|---|
| | Dispersant | | Polymer dispersant | | Carbon material | | Solvent | |
| | Type | Content (%) | Type | Content (%) | Type | Content (%) | Type | Content (%) |
| Example C5-1 | a | 0.7 | PVA-403 | 0.7 | CNT | 6.6 | NMP | 92.1 |
| Example C5-2 | a | 2.0 | PVA-403 | 2.0 | CNT | 6.6 | NMP | 89.4 |
| Example C5-3 | a | 3.3 | PVA-403 | 3.3 | CNT | 6.6 | NMP | 86.8 |
| Example C5-4 | a | 6.6 | PVA-403 | 6.6 | CNT | 6.6 | NMP | 80.2 |
| Example C5-5 | a | 9.9 | PVA-403 | 9.9 | CNT | 6.6 | NMP | 73.6 |
| Example C5-6 | a | 11.6 | PVA-403 | 11.6 | CNT | 6.6 | NMP | 70.3 |
| Example C5-7 | a | 13.2 | PVA-403 | 13.2 | CNT | 6.6 | NMP | 67.0 |
| Example C5-8 | a | 14.9 | PVA-403 | 14.9 | CNT | 6.6 | NMP | 63.7 |
| Example C5-9 | a | 16.5 | PVA-403 | 16.5 | CNT | 6.6 | NMP | 60.4 |
| Example C5-10 | a | 0.7 | SM-4 | 0.7 | CNT | 6.6 | NMP | 92.1 |
| Example C5-11 | a | 2.0 | SM-4 | 2.0 | CNT | 6.6 | NMP | 89.4 |
| Example C5-12 | a | 3.3 | SM-4 | 3.3 | CNT | 6.6 | NMP | 86.8 |
| Example C5-13 | a | 6.6 | SM-4 | 6.6 | CNT | 6.6 | NMP | 80.2 |
| Example C5-14 | a | 9.9 | SM-4 | 9.9 | CNT | 6.6 | NMP | 73.6 |
| Example C5-15 | a | 11.6 | SM-4 | 11.6 | CNT | 6.6 | NMP | 70.3 |
| Example C5-16 | a | 13.2 | SM-4 | 13.2 | CNT | 6.6 | NMP | 67.0 |
| Example C5-17 | a | 14.9 | SM-4 | 14.9 | CNT | 6.6 | NMP | 63.7 |
| Example C5-18 | a | 16.5 | SM-4 | 16.5 | CNT | 6.6 | NMP | 60.4 |

(Composition of Carbon Material Dispersion Varnishes)

TABLE 123

| | Composition of carbon material dispersion varnish | | | | | | | | | |
|---|---|---|---|---|---|---|---|---|---|---|
| | Dispersant | | Polymer dispersant | | Carbon material | | Binder | | Solvent | |
| | Type | Content (%) | Type | Content (%) | Type | Content (%) | Type | Content (%) | Type | Content (%) |
| Example C5-1 | a | 0.6 | PVA-403 | 0.6 | CNT | 6.2 | PVDF | 5.0 | NMP | 87.6 |
| Example C5-2 | a | 1.9 | PVA-403 | 1.9 | CNT | 6.2 | PVDF | 5.0 | NMP | 85.1 |
| Example C5-3 | a | 3.1 | PVA-403 | 3.1 | CNT | 6.2 | PVDF | 5.0 | NMP | 82.6 |
| Example C5-4 | a | 6.2 | PVA-403 | 6.2 | CNT | 6.2 | PVDF | 5.0 | NMP | 76.4 |
| Example C5-5 | a | 9.3 | PVA-403 | 9.3 | CNT | 6.2 | PVDF | 5.0 | NMP | 70.2 |
| Example C5-6 | a | 10.9 | PVA-403 | 10.9 | CNT | 6.2 | PVDF | 5.0 | NMP | 67.1 |
| Example C5-7 | a | 12.4 | PVA-403 | 12.4 | CNT | 6.2 | PVDF | 5.0 | NMP | 64.0 |
| Example C5-8 | a | 14.0 | PVA-403 | 14.0 | CNT | 6.2 | PVDF | 5.0 | NMP | 60.9 |
| Example C5-9 | a | 15.5 | PVA-403 | 15.5 | CNT | 6.2 | PVDF | 5.0 | NMP | 57.8 |
| Example C5-10 | a | 0.6 | SM-4 | 0.6 | CNT | 6.2 | PVDF | 5.0 | NMP | 87.6 |
| Example C5-11 | a | 1.9 | SM-4 | 1.9 | CNT | 6.2 | PVDF | 5.0 | NMP | 85.1 |
| Example C5-12 | a | 3.1 | SM-4 | 3.1 | CNT | 6.2 | PVDF | 5.0 | NMP | 82.6 |
| Example C5-13 | a | 6.2 | SM-4 | 6.2 | CNT | 6.2 | PVDF | 5.0 | NMP | 76.4 |
| Example C5-14 | a | 9.3 | SM-4 | 9.3 | CNT | 6.2 | PVDF | 5.0 | NMP | 70.2 |

TABLE 123-continued

Composition of carbon material dispersion varnish

| | Dispersant | | Polymer dispersant | | Carbon material | | Binder | | Solvent | |
|---|---|---|---|---|---|---|---|---|---|---|
| | Type | Content (%) | Type | Content (%) | Type | Content (%) | Type | Content (%) | Type | Content (%) |
| Example C5-15 | a | 10.9 | SM-4 | 10.9 | CNT | 6.2 | PVDF | 5.0 | NMP | 67.1 |
| Example C5-16 | a | 12.4 | SM-4 | 12.4 | CNT | 6.2 | PVDF | 5.0 | NMP | 64.0 |
| Example C5-17 | a | 14.0 | SM-4 | 14.0 | CNT | 6.2 | PVDF | 5.0 | NMP | 60.9 |
| Example C5-18 | a | 15.5 | SM-4 | 15.5 | CNT | 6.2 | PVDF | 5.0 | NMP | 57.8 |

(Composition of Cathode Mixture Pastes)

TABLE 124

Composition of cathode mixture paste

| | Dispersant | | Polymer dispersant | | Carbon material | | Binder | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Example C5-1 | a | 0.3 | PVA-403 | 0.3 | CNT | 3.1 | PVDF | 2.5 | NMC | 50.0 | NMP | 43.8 |
| Example C5-2 | a | 0.9 | PVA-403 | 0.9 | CNT | 3.1 | PVDF | 2.5 | NMC | 50.0 | NMP | 42.5 |
| Example C5-3 | a | 1.6 | PVA-403 | 1.6 | CNT | 3.1 | PVDF | 2.5 | NMC | 50.0 | NMP | 41.3 |
| Example C5-4 | a | 3.1 | PVA-403 | 3.1 | CNT | 3.1 | PVDF | 2.5 | NMC | 50.0 | NMP | 38.2 |
| Example C5-5 | a | 4.7 | PVA-403 | 4.7 | CNT | 3.1 | PVDF | 2.5 | NMC | 50.0 | NMP | 35.1 |
| Example C5-6 | a | 5.4 | PVA-403 | 5.4 | CNT | 3.1 | PVDF | 2.5 | NMC | 50.0 | NMP | 33.6 |
| Example C5-7 | a | 6.2 | PVA-403 | 6.2 | CNT | 3.1 | PVDF | 2.5 | NMC | 50.0 | NMP | 32.0 |
| Example C5-8 | a | 7.0 | PVA-403 | 7.0 | CNT | 3.1 | PVDF | 2.5 | NMC | 50.0 | NMP | 30.5 |
| Example C5-9 | a | 7.8 | PVA-403 | 7.8 | CNT | 3.1 | PVDF | 2.5 | NMC | 50.0 | NMP | 28.9 |
| Example C5-10 | a | 0.3 | SM-4 | 0.3 | CNT | 3.1 | PVDF | 2.5 | NMC | 50.0 | NMP | 43.8 |
| Example C5-11 | a | 0.9 | SM-4 | 0.9 | CNT | 3.1 | PVDF | 2.5 | NMC | 50.0 | NMP | 42.5 |
| Example C5-12 | a | 1.6 | SM-4 | 1.6 | CNT | 3.1 | PVDF | 2.5 | NMC | 50.0 | NMP | 41.3 |
| Example C5-13 | a | 3.1 | SM-4 | 3.1 | CNT | 3.1 | PVDF | 2.5 | NMC | 50.0 | NMP | 38.2 |
| Example C5-14 | a | 4.7 | SM-4 | 4.7 | CNT | 3.1 | PVDF | 2.5 | NMC | 50.0 | NMP | 35.1 |
| Example C5-15 | a | 5.4 | SM-4 | 5.4 | CNT | 3.1 | PVDF | 2.5 | NMC | 50.0 | NMP | 33.6 |
| Example C5-16 | a | 6.2 | SM-4 | 6.2 | CNT | 3.1 | PVDF | 2.5 | NMC | 50.0 | NMP | 32.0 |
| Example C5-17 | a | 7.0 | SM-4 | 7.0 | CNT | 3.1 | PVDF | 2.5 | NMC | 50.0 | NMP | 30.5 |
| Example C5-18 | a | 7.8 | SM-4 | 7.8 | CNT | 3.1 | PVDF | 2.5 | NMC | 50.0 | NMP | 28.9 |

(Amount of Dispersant Per Active Material Surface Area)

TABLE 125

| | Dispersant amount per active material surface area (mg/m$^2$) |
|---|---|
| Example C5-1, Example C5-10 | 10 |
| Example C5-2, Example C5-11 | 30 |
| Example C5-3, Example C5-12 | 50 |
| Example C5-4, Example C5-13 | 100 |
| Example C5-5, Example C5-14 | 150 |
| Example C5-6, Example C5-15 | 175 |
| Example C5-7, Example C5-16 | 200 |
| Example C5-8, Example C5-17 | 225 |
| Example C5-9, Example C5-18 | 250 |

<Evaluation Results>
Table 126 shows evaluation results of reaction resistance, room temperature rate characteristic, and low-temperature discharge characteristic of Examples C5-1 to C5-18.

TABLE 126

| | Dispersant | Polymer dispersant | Dispersant amount per active material surface area (mm/m$^2$) | $|Z|_{re}$ at 25° C. [Ω] | Room temperature rate characteristic [%] | Low-temperature discharge characteristic [%] |
|---|---|---|---|---|---|---|
| Example C5-1 | a | PVA-403 | 10 | 6.2 | 66.7 | 72.1 |
| Example C5-2 | a | PVA-403 | 30 | 6.1 | 66.5 | 72.5 |
| Example C5-3 | a | PVA-403 | 50 | 5.4 | 68.2 | 75.5 |
| Example C5-4 | a | PVA-403 | 100 | 5.4 | 68.1 | 75.8 |
| Example C5-5 | a | PVA-403 | 150 | 5.5 | 68.0 | 75.3 |
| Example C5-6 | a | PVA-403 | 175 | 6.2 | 66.8 | 71.9 |
| Example C5-7 | a | PVA-403 | 200 | 6.8 | 65.3 | 70.1 |
| Example C5-8 | a | PVA-403 | 225 | 7.6 | 63.6 | 67.4 |

TABLE 126-continued

| | Dispersant | Polymer dispersant | Dispersant amount per active material surface area (mm/m²) | $\|Z\|_{re}$ at 25° C. [Ω] | Room temperature rate characteristic [%] | Low-temperature discharge characteristic [%] |
|---|---|---|---|---|---|---|
| Example C5-9 | a | PVA-403 | 250 | 7.7 | 64.1 | 66.8 |
| Example C5-10 | a | SM-4 | 10 | 6.1 | 66.8 | 72.3 |
| Example C5-11 | a | SM-4 | 30 | 6.2 | 66.5 | 72.6 |
| Example C5-12 | a | SM-4 | 50 | 5.3 | 68.2 | 75.6 |
| Example C5-13 | a | SM-4 | 100 | 5.4 | 68.2 | 75.3 |
| Example C5-14 | a | SM-4 | 150 | 5.6 | 68.5 | 75.1 |
| Example C5-15 | a | SM-4 | 175 | 5.1 | 66.7 | 72.0 |
| Example C5-16 | a | SM-4 | 200 | 6.8 | 65.6 | 70.2 |
| Example C5-17 | a | SM-4 | 225 | 7.6 | 63.6 | 67.2 |
| Example C5-18 | a | SM-4 | 250 | 7.8 | 64.1 | 66.7 |

Based on Table 126, it was found that when a dispersant amount exceeded the dispersant amount in Examples C5-7 and C5-16, an effect of reducing reaction resistance was diminished. The reason for this was thought to be that, when a dispersant amount was in excess, the adverse effect of a resistance component becoming larger than an amount of reduction in desolvation energy.

Based on the above results, it was found that there is an optimum range of an amount of dispersant added to the active material surface area for obtaining an excellent effect of reducing reaction resistance.

[Examples C6-1 to C6-12] Comparison 1 of Amount of Dispersant with Respect to Amount of Electrolyte Solution A cell for cathode evaluation was assembled in the same manner as in Examples C4-2 and C4-8 except that the cathodes produced in Examples C4-2 and C4-8 were used, and an amount of electrolyte solution was changed to amounts shown in Table 127, and then ionic resistance, reaction resistance, room temperature rate characteristic, and low-temperature discharge characteristic were evaluated.

TABLE 127

| | Electrode used | Dispersant | Polymer dispersant | Electrolyte solution amount added in cell (ml) | Dispersant amount with respect to electrolyte solution amount (mg/ml) |
|---|---|---|---|---|---|
| Example C6-1 | Example C4-2 | a | PVA-403 | 0.05 | 0.12 |
| Example C4-2 | Example C4-2 | a | PVA-403 | 0.1 | 0.059 |
| Example C6-2 | Example C4-2 | a | PVA-403 | 0.2 | 0.023 |
| Example C6-3 | Example C4-2 | a | PVA-403 | 0.4 | 0.015 |
| Example C6-4 | Example C4-2 | a | PVA-403 | 0.6 | 0.010 |
| Example C6-5 | Example C4-2 | a | PVA-403 | 0.7 | 0.007 |
| Example C6-6 | Example C4-2 | a | PVA-403 | 1.2 | 0.005 |
| Example C6-7 | Example C4-8 | a | SM-4 | 0.05 | 0.12 |
| Example C4-8 | Example C4-8 | a | SM-4 | 0.1 | 0.059 |
| Example C6-8 | Example C4-8 | a | SM-4 | 0.2 | 0.023 |
| Example C6-9 | Example C4-8 | a | SM-4 | 0.4 | 0.015 |
| Example C6-10 | Example C4-8 | a | SM-4 | 0.6 | 0.010 |
| Example C6-11 | Example C4-8 | a | SM-4 | 0.7 | 0.007 |
| Example C6-12 | Example C4-8 | a | SM-4 | 1.2 | 0.005 |

[Examples C7-1 to C7-14] Comparison 2 of Amount of Dispersant with Respect to Amount of Electrolyte Solution A cathode was produced in the same manner as in Example C5-3 except that the cathode mixture pastes produced in Examples C5-3 and C5-12 were used, and a coating amount was changed to 28 mg/cm$^2$. In addition, a cell for cathode evaluation was assembled in the same manner as in Examples C5-3 and C5-12 except that an amount of electrolyte solution added to the cell for cathode evaluation was changed to an amount shown in Table 128, and then ionic resistance, reaction resistance, room temperature rate characteristic, and low-temperature discharge characteristic were evaluated.

In addition, ionic resistance at room temperature and low temperature greatly became lower in Examples C6-1 to C6-4 and C6-7 to C6-12 than that of Comparative Example C2-5, and the effects were poor in Examples C6-5, C6-6, C6-11, and C6-12 with Examples C6-4 and C6-10 as the lower limit. It was shown that there is a lower limit of an optimum amount of dispersant with respect to an amount of electrolyte solution for obtaining an excellent effect.

Because room temperature rate characteristic and low-temperature discharge characteristic are affected by both ionic resistance and reaction resistance, there is a need for a design in which both effects can be obtained, in order to obtain excellent characteristics in a battery.

TABLE 128

| | Cathode mixture paste used | Dispersant | Polymer dispersant | Electrolyte solution amount added in cell (ml) | Dispersant amount with respect to electrolyte solution amount (mg/ml) |
|---|---|---|---|---|---|
| Example C7-1 | Example C5-3 | a | PVA-403 | 0.03 | 99.1 |
| Example C7-2 | Example C5-3 | a | PVA-403 | 0.04 | 74.3 |
| Example C7-3 | Example C5-3 | a | PVA-403 | 0.05 | 59.4 |
| Example C7-4 | Example C5-3 | a | PVA-403 | 0.06 | 49.3 |
| Example C7-5 | Example C5-3 | a | PVA-403 | 0.08 | 37.2 |
| Example C7-6 | Example C5-3 | a | PVA-403 | 0.1 | 29.7 |
| Example C7-7 | Example C5-3 | a | PVA-403 | 0.2 | 14.9 |
| Example C7-8 | Example C5-12 | a | SM-4 | 0.03 | 99.1 |
| Example C7-9 | Example C5-12 | a | SM-4 | 0.04 | 74.3 |
| Example C7-10 | Example C5-12 | a | SM-4 | 0.05 | 59.4 |
| Example C7-11 | Example C5-12 | a | SM-4 | 0.06 | 49.3 |
| Example C7-12 | Example C5-12 | a | SM-4 | 0.08 | 37.2 |
| Example C7-13 | Example C5-12 | a | SM-4 | 0.1 | 29.7 |
| Example C7-14 | Example C5-12 | a | SM-4 | 0.2 | 14.9 |

<Evaluation Results>

Table 129 shows evaluation results of ionic resistance, reaction resistance, room temperature rate characteristic, and low-temperature discharge characteristic of Example C4-2, Examples C6-1 to C6-12, and Comparative Example C2-5. Table 130 shows evaluation results of ionic resistance, reaction resistance, room temperature rate characteristic, and low-temperature discharge characteristic of Examples C7-1 to C7-14.

The reaction resistances of Examples C4-2, C4-8, and C6-1 to C6-12 were all the same level. The reason for this is thought to be that amounts of dispersant with respect to the active material surface area were the same.

Meanwhile, from the comparison between Examples C7-1 to C7-14, it was found that the effect of reducing ionic resistance was diminished even when an amount of dispersant was too large with respect to an amount of electrolyte solution. The reason for this is thought to be that because the dispersant is an insulating compound, when an amount thereof is in excess, the dispersant becomes a resistance component itself.

Based on the above results, it was found that there is also an upper limit to an optimum amount of dispersant with respect to an amount of electrolyte solution.

TABLE 129

| | Dispersant | Polymer dispersant | Dispersant amount with respect to electrolyte solution amount (mg/ml) | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] |
|---|---|---|---|---|---|---|---|---|
| Example C6-1 | a | PVA-403 | 0.12 | 12 | 460 | 7.1 | 66.6 | 71.1 |
| Example C4-2 | a | PVA-403 | 0.059 | 12 | 462 | 7.2 | 64.9 | 69.3 |
| Example C6-2 | a | PVA-403 | 0.023 | 12 | 460 | 7.2 | 65.2 | 70.1 |
| Example C6-3 | a | PVA-403 | 0.015 | 12 | 458 | 7.2 | 65.3 | 70.3 |
| Example C6-4 | a | PVA-403 | 0.01 | 12 | 455 | 7.3 | 64.9 | 70.5 |

TABLE 129-continued

| | Dispersant | Polymer dispersant | Dispersant amount with respect to electrolyte solution amount (mg/ml) | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|---|---|
| Example C6-5 | a | PVA-403 | 0.007 | 13 | 482 | 7.3 | 64.5 | 67.5 |
| Example C6-6 | a | PVA-403 | 0.005 | 13 | 479 | 7.3 | 64.1 | 67.1 |
| Example C6-7 | a | SM-4 | 0.12 | 12 | 461 | 7.1 | 66.7 | 71.2 |
| Example C4-8 | a | SM-4 | 0.059 | 12 | 463 | 7.2 | 64.7 | 69.5 |
| Example C6-8 | a | SM-4 | 0.023 | 12 | 461 | 7.2 | 65.1 | 70.3 |
| Example C6-9 | a | SM-4 | 0.015 | 12 | 457 | 7.2 | 65.5 | 70.1 |
| Example C6-10 | a | SM-4 | 0.01 | 12 | 454 | 7.3 | 65.1 | 70.6 |
| Example C6-11 | a | SM-4 | 0.007 | 13 | 483 | 7.3 | 64.4 | 67.8 |
| Example C6-12 | a | SM-4 | 0.005 | 13 | 478 | 7.3 | 64.2 | 67.2 |
| Comparative Example C2-5 | — | — | 0 | 16 | 510 | 10.4 | 54.0 | 45.1 |

TABLE 130

| | Dispersant | Polymer dispersant | Dispersant amount with respect to electrolyte solution amount (mg/ml) | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] |
|---|---|---|---|---|---|---|---|---|
| Example C7-1 | a | PVA-403 | 99.1 | 13 | 482 | 7.2 | 63.8 | 66.3 |
| Example C7-2 | a | PVA-403 | 74.3 | 13 | 479 | 7.1 | 64.2 | 67.1 |
| Example C7-3 | a | PVA-403 | 59.4 | 10 | 426 | 7.1 | 68.0 | 75.2 |
| Example C7-4 | a | PVA-403 | 49.3 | 10 | 423 | 7.0 | 68.3 | 75.5 |
| Example C7-5 | a | PVA-403 | 37.2 | 10 | 425 | 7.0 | 68.6 | 75.0 |
| Example C7-6 | a | PVA-403 | 29.7 | 11 | 441 | 7.1 | 67.5 | 73.4 |
| Example C7-7 | a | PVA-403 | 14.9 | 11 | 444 | 7.2 | 66.9 | 72.8 |
| Example C7-8 | a | SM-4 | 99.1 | 13 | 481 | 7.2 | 64.1 | 66.4 |
| Example C7-9 | a | SM-4 | 74.3 | 13 | 480 | 7.1 | 64.0 | 67.2 |
| Example C7-10 | a | SM-4 | 59.4 | 10 | 421 | 7.1 | 68.1 | 75.2 |
| Example C7-11 | a | SM-4 | 49.3 | 10 | 422 | 7.0 | 68.4 | 75.4 |
| Example C7-12 | a | SM-4 | 37.2 | 10 | 426 | 7.0 | 68.6 | 74.9 |
| Example C7-13 | a | SM-4 | 29.7 | 11 | 443 | 7.1 | 67.3 | 73.3 |
| Example C7-14 | a | SM-4 | 14.9 | 11 | 446 | 7.2 | 66.8 | 72.6 |

[Example C8-1] Investigation of Influence of Electrolyte Solution

A cell for cathode evaluation was assembled in the same manner as in Example C2-2 except that a non-aqueous electrolyte solution, in which $LiPF_6$ was dissolved at a concentration of 1 M in a mixed solvent in which ethylene carbonate and diethyl carbonate were mixed at a volume ratio of 1:2, was used instead of the electrolyte solution used in Example C2-2 (a non-aqueous electrolyte solution in which $LiPF_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

Example C8-2

A cell for cathode evaluation was assembled in the same manner as in Example C2-2 except that a non-aqueous electrolyte solution, in which $LiPF_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Example C2-2 (a non-aqueous electrolyte solution in which LiPF$_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

[Example C8-3] Investigation 2 of Influence of Electrolyte Solution

A cell for cathode evaluation was assembled in the same manner as in Example C2-8 except that a non-aqueous electrolyte solution, in which LiPF$_6$ was dissolved at a concentration of 1 M in a mixed solvent in which ethylene carbonate and diethyl carbonate were mixed at a volume ratio of 1:2, was used instead of the electrolyte solution used in Example C2-8 (a non-aqueous electrolyte solution in which LiPF$_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

Example C8-4

A cell for cathode evaluation was assembled in the same manner as in Example C2-8 except that a non-aqueous electrolyte solution, in which LiPF$_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Example C2-8 (a non-aqueous electrolyte solution in which LiPF$_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

Comparative Example C8-1

A cell for cathode evaluation was assembled in the same manner as in Comparative Example C2-5 except that a non-aqueous electrolyte solution, in which LiPF$_6$ was dissolved at a concentration of 1 M in a mixed solvent in which ethylene carbonate and diethyl carbonate were mixed at a volume ratio of 1:2, was used instead of the electrolyte solution used in Comparative Example C2-5 (a non-aqueous electrolyte solution in which LiPF$_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

Comparative Example C8-2

A cell for cathode evaluation was assembled in the same manner as in Comparative Example C2-5 except that a non-aqueous electrolyte solution, in which LiPF$_6$ was dissolved at a concentration of 1 M in a mixed solvent in which ethylene carbonate, ethyl methyl carbonate, and dimethyl carbonate were mixed at a volume ratio of 1:1:1, was used instead of the electrolyte solution used in Comparative Example C2-5 (a non-aqueous electrolyte solution in which LiPF$_6$ was dissolved at a concentration of 1 M in a mixed solvent in which ethylene carbonate and diethyl carbonate were mixed at a volume ratio of 1:1), and then ionic resistance, reaction resistance, room temperature rate characteristic, low-temperature discharge characteristic, and cycle characteristic were evaluated.

<Evaluation Results>

Table 131 shows evaluation results of ionic resistance, reaction resistance, room temperature rate characteristic, low-temperature discharge characteristic, and cycle characteristic of Examples C2-2, C2-8, and C8-1 to C8-4, Comparative Examples C2-5, C8-1, and C8-2.

TABLE 131

|  | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C2-2 | a | PVA-403 | 10 | 418 | 4.9 | 69.2 | 76.0 | 84.7 |
| Example C8-1 | a | PVA-403 | 10 | 416 | 4.8 | 69.4 | 76.4 | 84.1 |
| Example C8-2 | a | PVA-403 | 10 | 407 | 4.7 | 69.9 | 76.8 | 85.6 |
| Example C2-8 | a | SM-4 | 10 | 420 | 4.9 | 69.2 | 76.3 | 82.5 |
| Example C8-3 | a | SM-4 | 10 | 419 | 5.0 | 69.1 | 76.4 | 80.6 |
| Example C8-4 | a | SM-4 | 10 | 419 | 4.8 | 69.1 | 76.0 | 83.5 |
| Comparative Example C2-5 | — | — | 16 | 510 | 10.4 | 54.0 | 45.1 | 58.6 |
| Comparative Example C8-1 | — | — | 17 | 601 | 10.0 | 55.1 | 45.5 | 59.3 |
| Comparative Example C8-2 | — | — | 17 | 598 | 9.8 | 55.7 | 45.9 | 58.1 |

From Examples C8-1 to C8-4, it was confirmed that all characteristics were improved regardless of the type of electrolyte solution, as compared to the comparative example. In addition to the electrolyte solutions shown in the present examples, the same effects are expected to be obtained regardless of the type of non-aqueous electrolyte solution as long as it is a non-aqueous electrolyte solution that is generally used.

Next, the type of active material was changed, and evaluation was performed in the same manner.

[Examples C9-1 to C9-3] Comparison of Active Material Species

A carbon material dispersion liquid, a carbon material dispersion varnish, a cathode mixture paste, and an electrode were produced in the same manner as in Example C2-2 according to the active material and composition shown in Table 132 using the carbon material dispersion varnish used in Example C1-2, and then the peeling strength test was conducted. In addition, a cell for evaluating a cathode of a lithium ion secondary battery was assembled in the same manner as in Example C2-2 by using, in Example C2-2, the electrodes instead of the electrode produced in Example C1-2, and then ionic resistance, reaction resistance, room temperature rate characteristic, low-temperature discharge characteristic, and cycle characteristic were evaluated.

[Examples C9-4 to C9-6] Comparison 2 of Active Material Species

A carbon material dispersion liquid, a carbon material dispersion varnish, a cathode mixture paste, and an electrode were produced in the same manner as in Example C2-8 according to the active material and composition shown in Table 132 using the carbon material dispersion varnish used in Example C1-8, and then the peeling strength test was conducted. In addition, a cell for evaluating a cathode of a lithium ion secondary battery was assembled in the same manner as in Example C2-8 by using, in Example C2-8, the electrodes instead of the electrode produced in Example C1-8, and then ionic resistance, reaction resistance, room temperature rate characteristic, low-temperature discharge characteristic, and cycle characteristic were evaluated.

Comparative Examples C9-1 to C9-3

A carbon material dispersion liquid, a carbon material dispersion varnish, a cathode mixture paste, and an electrode were produced in the same manner as in Comparative Example C1-2 according to the active material and composition shown in Table 132 using the carbon material dispersion varnish used in Comparative Example C1-2, and then the peeling strength test was conducted. In addition, a cell for evaluating a cathode of a lithium ion secondary battery was assembled in the same manner as in Comparative Example C2-1 by using, in Comparative Example C2-1, the electrodes instead of the electrode produced in Comparative Example C1-2, and then ionic resistance, reaction resistance, room temperature rate characteristic, low-temperature discharge characteristic, and cycle characteristic were evaluated.

TABLE 132

| | Composition of cathode mixture paste | | | | | | | | | | | |
|---|---|---|---|---|---|---|---|---|---|---|---|---|
| | Dispersant | | Polymer dispersant | | Carbon material | | Binder | | Active material | | Solvent | |
| | Type | Content (%) | Type | Content (%) | Type | Content (%) | Type | Content (%) | Type | Content (%) | Type | Content (%) |
| Example C9-1 | a | 0.02 | PVA-403 | 0.02 | HS100 | 2.0 | PVDF | 2.0 | LCO | 54.0 | NMP | 42.0 |
| Example C9-2 | a | 0.02 | PVA-403 | 0.02 | HS100 | 2.0 | PVDF | 2.0 | NCA | 54.0 | NMP | 42.0 |
| Example C9-3 | a | 0.02 | PVA-403 | 0.02 | HS100 | 2.0 | PVDF | 2.0 | LFP | 54.0 | NMP | 42.0 |
| Example C9-4 | a | 0.02 | SM-4 | 0.02 | HS100 | 2.0 | PVDF | 2.0 | LCO | 54.0 | NMP | 42.0 |
| Example C9-5 | a | 0.02 | SM-4 | 0.02 | HS100 | 2.0 | PVDF | 2.0 | NCA | 54.0 | NMP | 42.0 |
| Example C9-6 | a | 0.02 | SM-4 | 0.02 | HS100 | 2.0 | PVDF | 2.0 | LFP | 54.0 | NMP | 42.0 |
| Comparative Example C9-1 | ba | 0.02 | PVA-103 | 0.02 | HS100 | 2.0 | PVDF | 2.0 | LCO | 54.0 | NMP | 42.0 |
| Comparative Example C9-2 | ba | 0.02 | PVA-103 | 0.02 | HS100 | 2.0 | PVDF | 2.0 | NCA | 54.0 | NMP | 42.0 |
| Comparative Example C9-3 | ba | 0.02 | PVA-103 | 0.02 | HS100 | 2.0 | PVDF | 2.0 | LFP | 545 | NMP | 42.0 |

<Evaluation Results>

Table 133 shows evaluation results of ionic resistance, reaction resistance, room temperature rate characteristic, low-temperature discharge characteristic, peeling strength test, and cycle characteristic of Examples C9-1 to C9-6, and Comparative Examples C9-1 to C9-3.

TABLE 133

| | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] | Peeling strength |
|---|---|---|---|---|---|---|---|---|---|
| Example C9-1 | a | PVA-403 | 10 | 425 | 5.0 | 68.0 | 75.2 | 85.9 | A |
| Example C9-2 | a | PVA-403 | 10 | 420 | 5.0 | 68.7 | 74.1 | 84.7 | A |
| Example C9-3 | a | PVA-403 | 10 | 418 | 5.7 | 69.0 | 75.8 | 82.0 | A |
| Example C9-4 | a | SM-4 | 10 | 427 | 5.0 | 68.1 | 75.3 | 81.9 | A |
| Example C9-5 | a | SM-4 | 10 | 422 | 5.0 | 68.5 | 74.3 | 85.0 | A |

TABLE 133-continued

| | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] | Peeling strength |
|---|---|---|---|---|---|---|---|---|---|
| Example C9-6 | a | SM-4 | 10 | 415 | 5.7 | 69.1 | 75.9 | 85.4 | A |
| Comparative Example C9-1 | ba | PVA-103 | 17 | 620 | 10.5 | 53.5 | 42.3 | 59.5 | B to C |
| Comparative Example C9-2 | ba | PVA-103 | 17 | 613 | 10.3 | 53.1 | 41.7 | 60.1 | B to C |
| Comparative Example C9-3 | ba | PVA-103 | 18 | 646 | 11.1 | 53.9 | 43.4 | 58.7 | B to C |

Although there were differences depending on a performance of the active material, when comparing the examples and the comparative examples with the same active materials, it was confirmed that a battery characteristic, peeling strength, and cycle characteristic were improved in all Examples C9-1 to C9-6.

Subsequently, a case of using the composition for batteries of the present invention in the anode was evaluated.

Example C10-1

<Preparation of Carbon Material Dispersion Varnish>

According to the composition shown in Table 134, the carbon material dispersion liquid which contains the dispersant a and the polymer dispersant PVA-103 and was produced in Example C1-1 was mixed with a binder and N-methyl-2-pyrrolidone with a disper. Thereby, a carbon material dispersion varnish was obtained.

<Preparation of Anode Mixture Paste>

According to the composition shown in Table 134, the prepared carbon material dispersion varnish containing the dispersant a and the polymer dispersant PVA-103 was mixed with an active material and N-methyl-2-pyrrolidone with a disper. Thereby, an anode mixture paste was obtained.

<Production of Electrode>

The prepared anode mixture paste containing the dispersant a and the polymer dispersant PVA-103 was applied onto a copper foil having a thickness of 20 μm using a doctor blade, and then dried at 120° C. for 30 minutes under reduced pressure. Thereafter, the copper foil was rolled with a roller pressing machine. Thereby, an electrode having an application amount of 15 mg/cm$^2$ and a density of 1.8 g/cm$^3$ was produced. An electrode having a uniform thickness and density was obtained.

Examples C10-2 to C10-10

A carbon material dispersion liquid, a carbon material dispersion varnish, an anode mixture paste, and an electrode were produced in the same manner as in Example C10-1, except that PVA-103 used in Example C10-1 was replaced with the polymer dispersant shown in Table 135.

TABLE 135

| | Polymer dispersant |
|---|---|
| Example C10-2 | PVA-403 |
| Example C10-3 | KL-506 |

TABLE 134

| | Dispersant | | Polymer dispersant | | Carbon material | | Binder | | Active material | | Solvent | |
|---|---|---|---|---|---|---|---|---|---|---|---|---|
| | Type | Content (%) | Type | Content (%) | Type | Content (%) | Type | Content (%) | Type | Content (%) | Type | Content (%) |
| Composition of carbon material dispersion liquid | a | 0.1 | PVA-103 | 0.1 | HS100 | 10.0 | | | | | NMP | 89.8 |
| Composition of carbon material dispersion varnish | | 0.04 | | 0.04 | | 4.0 | PVDF | 8.0 | | | | 87.9 |
| Composition of anode mixture paste | | 0.015 | | 0.015 | | 1.5 | | 3.0 | Spheroidal graphite | 45.0 | | 50.5 |

TABLE 135-continued

| | Polymer dispersant |
|---|---|
| Example C10-4 | AP-17 |
| Example C10-5 | L-3266 |
| Example C10-6 | K-434 |
| Example C10-7 | PVB-A |
| Example C10-8 | SM-4 |
| Example C10-9 | SM-15 |
| Example C10-10 | ETHOCEL-10 |

[Example C10-1a] Dispersant a Only

A carbon material dispersion liquid, a carbon material dispersion varnish, an anode mixture paste, and an electrode were produced in the same manner as in Example C10-1, except that the polymer dispersant PVA-103 used in Example C10-1 was replaced with the dispersant a as shown in Table 136, so that the dispersant is formed of only the dispersant a.

[Comparative Example C10-1] Comparison 1 of Dispersant Types

A carbon material dispersion liquid, a carbon material dispersion varnish, an anode mixture paste, and an electrode were produced in the same manner as in Example C10-1a, except that the dispersant a used in Reference Example C10-1 was replaced with the dispersant ba as shown in Table 136.

[Comparative Example C10-2] Comparison 2 of Dispersant Types

A carbon material dispersion liquid, a carbon material dispersion varnish, an anode mixture paste, and an electrode were produced in the same manner as in Example C10-1a, except that the dispersant a used in Example C10-1 was replaced with the dispersant ba as shown in Table 136.

[Comparative Examples C10-3 and C10-4] Comparison 3 of Dispersant Types

A carbon material dispersion liquid, a carbon material dispersion varnish, an anode mixture paste, and an electrode were produced in the same manner as in Comparative Example C10-2, except that the polymer dispersants shown in Table 136 were respectively used instead of PVA-103 used in Comparative Example C10-2.

TABLE 136

| | Dispersant | Polymer dispersant |
|---|---|---|
| Example C10- 1a | a | — |
| Comparative Example C10-1 | ba | — |
| Comparative Example C10-2 | ba | PVA-103 |
| Comparative Example C10-3 | ba | L-3266 |
| Comparative Example C10-4 | ba | SM-4 |

<Evaluation Results>

All of the carbon material dispersion liquids, carbon material dispersion varnishes, and anode mixture pastes prepared in Examples C10-1 to C10-10, Example C10-1a, and Comparative Examples C10-1 to C10-4 were in a favorably dispersed state, and sedimentation or thickening did not occur even after the elapse of one month.

The peeling strength test was conducted on the electrodes produced in Examples C10-1 to C10-10, Example C10-1a, and Comparative Examples C10-1 to C10-4. The results thereof are shown in Table 137. The results of the peeling strength test are as follows: A: 200% or more, A to B: less than 200% and 175% or more, B: less than 175% and 150% or more, B to C: less than 150% and 120% or more, C: less than 120% and 80% or more, when Reference Example C10-1 is 100%. In the following, the results of peeling strength test of an anode mixture material follows the above standard. Compared to Comparative Example C10-1 in which only the dispersant ba was used, peeling strength was slightly improved in all Comparative Examples C10-1 to C10-4 in which various polymer dispersants were used in combination. The reason why the peeling strength was improved although an increased amount was slight is thought to be that polymer components that can participate in film formation was contained instead of the low molecular weight dispersant ba which has no film forming ability.

TABLE 137

| | Dispersant | Polymer dispersant | Peeling strength |
|---|---|---|---|
| Example C10-1a | a | — | C |
| Example C10-1 | a | PVA-103 | A |
| Example C10-2 | a | PVA-403 | A |
| Example C10-3 | a | KL-506 | A |
| Example C10-4 | a | AP-17 | A |
| Example C10-5 | a | L-3266 | A to B |
| Example C10-6 | a | K-434 | A |
| Example C10-7 | a | PVB-A | A |
| Example C10-8 | a | SM-4 | A |
| Example C10-9 | a | SM-15 | A |
| Example C10-10 | a | ETHOCEL-10 | B |
| Comparative Example C10-1 | ba | — | C |
| Comparative Example C10-2 | ba | PVA-103 | B to C |
| Comparative Example C10-3 | ba | L-3266 | B to C |
| Comparative Example C10-4 | ba | SM-4 | B to C |

Examples C10-11 to C10-188

In order to confirm whether the peeling strength improvement effect can be obtained with other triazine derivatives represented by General Formula (1), a test was conducted in the same manner. A carbon material dispersion liquid, a carbon material dispersion varnish, an anode mixture paste, and an electrode were produced in the same manner as in Example C10-1, except that the dispersant and polymer dispersant used in Example C10-1 were replaced with the dispersant and polymer dispersant shown in Table 138, respectively, and then the peeling strength test was conducted.

TABLE 138

| | Dispersant | Polymer dispersant |
|---|---|---|
| Example C10-11 | b | PVA-103 |
| Example C10-12 | | KL-506 |
| Example C10-13 | | AP-17 |
| Example C10-14 | | SM-4 |
| Example C10-15 | | SM-15 |
| Example C10-16 | c | PVA-403 |
| Example C10-17 | | KL-506 |
| Example C10-18 | | AP-17 |
| Example C10-19 | | SM-4 |
| Example C10-20 | | SM-15 |
| Example C10-21 | d | KL-506 |
| Example C10-22 | | SM-4 |

TABLE 138-continued

| | Dispersant | Polymer dispersant |
|---|---|---|
| Example C10-23 | e | PVA-103 |
| Example C10-24 | | SM-15 |
| Example C10-25 | f | AP-17 |
| Example C10-26 | | SM-15 |
| Example C10-27 | g | AP-17 |
| Example C10-28 | | SM-4 |
| Example C10-29 | h | PVA-103 |
| Example C10-30 | | AP-17 |
| Example C10-31 | | SM-4 |
| Example C10-32 | | SM-15 |
| Example C10-33 | i | PVA-403 |
| Example C10-34 | | SM-15 |
| Example C10-35 | j | PVA-403 |
| Example C10-36 | | KL-506 |
| Example C10-37 | | AP-17 |
| Example C10-38 | | SM-4 |
| Example C10-39 | | SM-15 |
| Example C10-40 | k | KL-506 |
| Example C10-41 | | SM-4 |
| Example C10-42 | l | PVA-103 |
| Example C10-43 | | SM-15 |
| Example C10-44 | m | AP-17 |
| Example C10-45 | | SM-4 |
| Example C10-46 | n | PVA-403 |
| Example C10-47 | | SM-4 |
| Example C10-48 | o | KL-506 |
| Example C10-49 | | SM-15 |
| Example C10-50 | p | PVA-103 |
| Example C10-51 | | SM-15 |
| Example C10-52 | q | AP-17 |
| Example C10-53 | | SM-15 |
| Example C10-54 | r | PVA-103 |
| Example C10-55 | | SM-4 |
| Example C10-56 | s | KL-506 |
| Example C10-57 | | SM-15 |
| Example C10-58 | t | PVA-103 |
| Example C10-59 | | SM-15 |
| Example C10-60 | u | PVA-103 |
| Example C10-61 | | AP-17 |
| Example C10-62 | | SM-4 |
| Example C10-63 | | SM-15 |
| Example C10-64 | v | PVA-103 |
| Example C10-65 | | KL-506 |
| Example C10-66 | | AP-17 |
| Example C10-67 | | SM-4 |
| Example C10-68 | | SM-15 |
| Example C10-69 | w | PVA-103 |
| Example C10-70 | | SM-15 |
| Example C10-71 | x | KL-506 |
| Example C10-72 | | SM-4 |
| Example C10-73 | y | KL-506 |
| Example C10-74 | | SM-4 |
| Example C10-75 | z | AP-17 |
| Example C10-76 | | SM-15 |
| Example C10-77 | aa | PVA-103 |
| Example C10-78 | | KL-506 |
| Example C10-79 | | SM-4 |
| Example C10-80 | | SM-15 |
| Example C10-81 | ab | PVA-403 |
| Example C10-82 | | KL-506 |
| Example C10-83 | | AP-17 |
| Example C10-84 | | SM-4 |
| Example C10-85 | | SM-15 |
| Example C10-86 | ac | PVA-103 |
| Example C10-87 | | SM-4 |
| Example C10-88 | ad | PVA-103 |
| Example C10-89 | | KL-506 |
| Example C10-90 | | AP-17 |
| Example C10-91 | | SM-4 |
| Example C10-92 | | SM-15 |
| Example C10-93 | ae | PVA-403 |
| Example C10-94 | | SM-15 |
| Example C10-95 | af | KL-506 |
| Example C10-96 | | SM-4 |
| Example C10-97 | ag | PVA-103 |
| Example C10-98 | | SM-15 |
| Example C10-99 | ah | AP-17 |
| Example C10-100 | | SM-4 |
| Example C10-101 | ai | KL-506 |
| Example C10-102 | | SM-15 |
| Example C10-103 | aj | PVA-103 |
| Example C10-104 | | SM-15 |
| Example C10-105 | ca | PVA-403 |
| Example C10-106 | | KL-506 |
| Example C10-107 | | AP-17 |
| Example C10-108 | | SM-4 |
| Example C10-109 | | SM-15 |
| Example C10-110 | cb | PVA-103 |
| Example C10-111 | | KL-506 |
| Example C10-112 | | AP-17 |
| Example C10-113 | | SM-4 |
| Example C10-114 | | SM-15 |
| Example C10-115 | cc | PVA-103 |
| Example C10-116 | | KL-506 |
| Example C10-117 | | AP-17 |
| Example C10-118 | | SM-4 |
| Example C10-119 | | SM-15 |
| Example C10-120 | cd | KL-506 |
| Example C10-121 | | SM-4 |
| Example C10-122 | ce | PVA-403 |
| Example C10-123 | | SM-15 |
| Example C10-124 | cf | AP-17 |
| Example C10-125 | | SM-15 |
| Example C10-126 | cg | AP-17 |
| Example C10-127 | | SM-4 |
| Example C10-128 | ch | PVA-403 |
| Example C10-129 | | AP-17 |
| Example C10-130 | | SM-4 |
| Example C10-131 | | SM-15 |
| Example C10-132 | ci | PVA-103 |
| Example C10-133 | | SM-15 |
| Example C10-134 | cj | PVA-103 |
| Example C10-135 | | KL-506 |
| Example C10-136 | | AP-17 |
| Example C10-137 | | SM-4 |
| Example C10-138 | | SM-15 |
| Example C10-139 | ck | PVA-403 |
| Example C10-140 | | SM-15 |
| Example C10-141 | cl | PVA-103 |
| Example C10-142 | | SM-15 |
| Example C10-143 | cm | PVA-103 |
| Example C10-144 | | SM-15 |
| Example C10-145 | cn | PVA-403 |
| Example C10-146 | | SM-4 |
| Example C10-147 | co | KL-506 |
| Example C10-148 | | SM-15 |
| Example C10-149 | cp | PVA-103 |
| Example C10-150 | | SM-15 |
| Example C10-151 | cq | AP-17 |
| Example C10-152 | | SM-15 |
| Example C10-153 | cr | KL-506 |
| Example C10-154 | | SM-4 |
| Example C10-155 | cs | PVA-403 |
| Example C10-156 | | SM-4 |
| Example C10-157 | ct | PVA-103 |
| Example C10-158 | | SM-15 |
| Example C10-159 | cu | PVA-103 |
| Example C10-160 | | KL-506 |
| Example C10-161 | | AP-17 |
| Example C10-162 | | SM-4 |
| Example C10-163 | | SM-15 |
| Example C10-164 | cv | PVA-403 |
| Example C10-165 | | KL-506 |
| Example C10-166 | | SM-4 |
| Example C10-167 | | SM-15 |
| Example C10-168 | cw | PVA-103 |
| Example C10-169 | | KL-506 |
| Example C10-170 | | AP-17 |
| Example C10-171 | | SM-4 |
| Example C10-172 | | SM-15 |
| Example C10-173 | cx | AP-17 |
| Example C10-174 | | SM-4 |
| Example C10-175 | cy | PVA-103 |
| Example C10-176 | | SM-15 |
| Example C10-177 | cz | KL-506 |
| Example C10-178 | | SM-4 |

TABLE 138-continued

|  | Dispersant | Polymer dispersant |
|---|---|---|
| Example C10-179 | da | KL-506 |
| Example C10-180 |  | SM-4 |
| Example C10-181 | db | AP-17 |
| Example C10-182 |  | SM-15 |
| Example C10-183 | dc | PVA-403 |
| Example C10-184 |  | SM-15 |
| Example C10-185 | dd | KL-506 |
| Example C10-186 |  | SM-4 |
| Example C10-187 | de | PVA-103 |
| Example C10-188 |  | SM-15 |

[Reference Example C10-189] Combination Use of Triazine Derivative and Polymer Dispersant A carbon material dispersion liquid, a carbon material dispersion varnish, an anode mixture paste, and an electrode were produced in the same manner as in Example C10-1, except that the dispersant a used in Example C10-1 was replaced with the triazine derivative A as shown in Table 139, and then peeling strength test was conducted.

[Reference Examples C10-190 to C10-193] Combination Use 2 of Triazine Derivative and Polymer Dispersant A carbon material dispersion liquid, a carbon material dispersion varnish, an anode mixture paste, and an electrode were produced in the same manner as in Reference Example C10-189, except that each of the polymer dispersants shown in Table 139 was used instead of PVA-103 used in Reference Example C10-189, and each of the triazine derivatives shown in Table 139 was used instead of the triazine derivative A, and then the peeling strength test was conducted.

TABLE 139

|  | Triazine derivative | Polymer dispersant |
|---|---|---|
| Reference Example C10-189 | A | PVA-103 |
| Reference Example C10-190 |  | SM-4 |
| Reference Example C10-191 | E | AP-17 |
| Reference Example C10-192 | H | PVA-403 |
| Reference Example C10-193 | J | SM-15 |

[Example C10-194] Combination Use of Polymer Dispersant

A carbon material dispersion liquid, a carbon material dispersion varnish, an anode mixture paste, and an electrode were produced in the same manner as in Example C10-1, except that another half amount of PVA-103 used in Example C10-1 was replaced with SM-15 as shown in Table 140, and the then peeling strength test was conducted.

[Examples C10-195 and C10-196] Combination Use 2 of Polymer Dispersant

A carbon material dispersion liquid, a carbon material dispersion varnish, an anode mixture paste, and an electrode were produced in the same manner as in Example C10-194, except that the polymer dispersants shown in Table 140 were respectively used instead of PVA-103 used in Example C10-194, then the peeling strength test was conducted.

[Reference Examples C10-197 to C10-199] Combination Use 3 of Polymer Dispersant

A carbon material dispersion liquid, a carbon material dispersion varnish, an anode mixture paste, and an electrode were produced in the same manner as in Example C10-194, except that the polymer dispersants shown in Table 140 were respectively used instead of PVA-103 used in Example C10-194, and the triazine derivative A was used instead of the dispersant a, and then the peeling strength test was conducted.

TABLE 140

|  | Dispersant | Polymer dispersant 1 | Polymer dispersant 2 |
|---|---|---|---|
| Example C10-194 | a | PVA-103 | SM-15 |
| Example C10-195 |  | KL-506 |  |
| Example C10-196 |  | AP-17 |  |
| Reference Example C10-197 | A | PVA-103 |  |
| Reference Example C10-198 |  | KL-506 |  |
| Reference Example C10-199 |  | AP-17 |  |

Comparative Examples C10-5 to C10-7

A carbon material dispersion liquid, a carbon material dispersion varnish, an anode mixture paste, and an electrode were produced in the same manner as in Example C10-1a, except that the dispersant a used in Example C10-1a was replaced with the dispersant shown in Table 141, and then the peeling strength test was conducted.

TABLE 141

|  | Dispersant |
|---|---|
| Comparative Example C10-5 | bb |
| Comparative Example C10-6 | ea |
| Comparative Example C10-7 | ed |

Comparative Examples C10-8 to C10-13

A carbon material dispersion liquid, a carbon material dispersion varnish, an anode mixture paste, and an electrode were produced in the same manner as in Example C10-1, except that the dispersant a and the polymer dispersant PVA-103 used in Example C10-1 were respectively replaced with the dispersant and the polymer dispersant shown in Table 142, and then the peeling strength test was conducted.

TABLE 142

|  | Dispersant | Polymer dispersant |
|---|---|---|
| Comparative Example C10-8 | bb | PVA-103 |
| Comparative Example C10-9 |  | SM-4 |
| Comparative Example C10-10 | ea | PVA-103 |
| Comparative Example C10-11 |  | SM-4 |
| Comparative Example C10-12 | ed | PVA-103 |
| Comparative Example C10-13 |  | SM-4 |

<Evaluation Results>

Table 143 shows the results of the peeling strength test of the electrodes produced in Examples C10-11 to C10-188, Reference Examples C10-189 to C10-193, Examples C10-194 to C10-196, Reference Examples C10-197 to C10-199, Example C10-1a, and Comparative Examples C10-5 to C10-13. As in the case of the dispersant ba, only a low degree of peeling strength was improved even when the dispersants bb, ea, and eb, and various polymer dispersants were used in combination, whereas as in the case of the dispersant a, a significant improvement in peeling strength was confirmed by using the dispersants b to aj and ca to de and the triazine derivatives A, E, H, and J in combination with one or two types of various polymer dispersants.

The reason for this is thought to be that, because this effect is unique to the triazine derivatives represented by the general formula (1), by the structure in which an arylene group having an acidic functional group and two phenolic hydroxyl groups are directly connected to one triazine ring, strong intermolecular force such as hydrogen bonding acted between the dispersant and the polymer dispersant.

TABLE 143

| | Dispersant or triazine derivative | Polymer dispersant | Peeling strength |
|---|---|---|---|
| Example C10-1a | a | — | C |
| Examples C10-11 to C10-188 | b to aj, ca to de A, E, H, J | PVA-103 or PVA-403 or KL-506 or AP-17 or SM-4 or SM-15 | A |
| Reference Examples C10-189 to C10-193 | | | |
| Examples C10-194 to C10-196 | a, A | PVA-103 and SM-15 or KL-506 and SM-15 or AP-17 and SM-15 | A |
| Reference Examples C10-197 to C10-199 | | | |
| Comparative Examples C10-5 to C10-7 | bb, ea, eb | — | C |
| Comparative Examples C10-8 to C10-13 | bb, ea, eb | PVA-103 or SM-4 | B to C |

Subsequently, a cell for evaluating an anode of a lithium ion secondary battery was assembled, and ionic resistance, reaction resistance, room temperature rate characteristic, low-temperature discharge characteristic, and cycle characteristic were evaluated.

Example C11-1

<Assembly of Cell for Evaluation Anode of Lithium Ion Secondary Battery>

The electrode which contains the dispersant and was produced in Example C10-1 a was punched out to a diameter of 18 mm to be used as an anode, and a metallic lithium foil (a thickness of 0.15 mm) was used as a cathode. A separator made of a porous polypropylene film (a thickness of 20 μm, and a porosity of 50%) was inserted and laminated between the anode and the cathode, and was filled with 0.1 ml of an electrolyte solution (a non-aqueous electrolyte solution in which $LiPF_6$ was dissolved at a concentration of 1 M in a mixed solvent in which ethylene carbonate and diethyl carbonate was mixed at a volume ratio of 1:1). Thereby, a closed bipolar metal cell (HS Flat Cell manufactured by Hohsen Corp.) was assembled. The cell was assembled in a glove box purged with argon gas.

<Evaluation of Ionic Resistance>

Impedance was measured under the same conditions as in Example C2-1, and an ionic resistance $|Z|_{ion}$ at −20° C. and room temperature (25° C.) was obtained.

<Evaluation of Reaction Resistance>

Following the evaluation of ionic resistance, using a charge and discharge measuring device, a total of 5 cycles were carried out, with one cycle being charging and discharging in which full charging was performed with 0.1C constant current-constant voltage charging (a lower limit voltage of 0.0V) at room temperature, and discharging was performed with a constant current of 0.1C to a discharge upper limit voltage of 2.0V. 0.1C discharge capacity at the fifth cycle was recorded. Next, the cell for anode evaluation discharged to 2.0V was connected to an impedance analyzer, and AC impedance measurement was performed at 2.0V, amplitude 10 mV, and frequency from 0.1 Hz to 1 MHz. When the results were plotted on the complex plane by a Cole-Cole plot method, a semicircular curve was obtained. A diameter of an arc was defined as a reaction resistance $|Z|_{re}$ of the active material.

<Evaluation of Room Temperature Rate Characteristic and Low-Temperature Discharge Characteristic>

Next, after full charging with 0.1C at room temperature in the same manner, discharging was performed with a constant current of 0.5C to a discharge upper limit voltage of 2.0V, full charging was performed again with 0.1C, and then discharging was performed with a constant current of 5C to 2.0V. A ratio of a 5C discharge capacity to a 0.1C discharge capacity at the fifth cycle recorded in a test of reaction resistance evaluation was defined as a room temperature rate characteristic (%). In addition, a 0.5C discharge capacity at room temperature was recorded. Subsequently, full charging was performed with 0.1C at room temperature in the same manner. Thereafter, the battery was transferred to a −20° C. constant-temperature tank, left for 12 hours, and discharged with a constant current of 0.5C. A ratio of 0.5C discharge capacity at −20° C. to 0.5C discharge capacity at room temperature was defined as a low-temperature discharge characteristic (%).

<Cycle Characteristic Evaluation>

Next, the battery was left at room temperature for 12 hours, fully charged with 1C constant current-constant voltage charge (a lower limit voltage of 0.0V), and discharged with a constant current of 1C to 2.0V. This full charging and discharging were defined as one cycle, and it was repeated 500 cycles. A ratio of a discharge capacity at the 500th cycle to a discharge capacity at the 1st cycle was defined as cycle characteristic (%). As the cycle characteristic evaluation becomes closer to 100%, the characteristic becomes favorable.

[Examples C11-2 to C11-188, Reference Examples C11-189 to C11-193, Examples C11-194 to C11-196, and Reference Examples C11-197 to C11-199]

A cell for evaluating an anode of a lithium ion secondary battery was assembled in the same manner as in Example C11-1 except that, in Example C11-1, the electrodes shown in Table 144 were used instead of the electrode produced in Example C10-1, and then ionic resistance, reaction resistance, room temperature rate characteristic, low-temperature discharge characteristic, and cycle characteristic were evaluated.

TABLE 144

| | Electrode used | Dispersant or triazine derivative | Polymer dispersant |
|---|---|---|---|
| Example C11-2 | Example C10-2 | a | PVA-403 |
| Example C11-3 | Example C10-3 | | KL-506 |
| Example C11-4 | Example C10-4 | | AP-17 |
| Example C11-5 | Example C10-5 | | L-3266 |
| Example C11-6 | Example C10-6 | | K-434 |
| Example C11-7 | Example C10-7 | | PVB-A |
| Example C11-8 | Example C10-8 | | SM-4 |
| Example C11-9 | Example C10-9 | | SM-15 |
| Example C11-10 | Example C10-10 | | ETHOCEL-10 |
| Example C11-11 | Example C10-11 | b | PVA-103 |
| Example C11-12 | Example C10-12 | | KL-506 |
| Example C11-13 | Example C10-13 | | AP-17 |
| Example C11-14 | Example C10-14 | | SM-4 |
| Example C11-15 | Example C10-15 | | SM-15 |
| Example C11-16 | Example C10-16 | c | PVA-403 |
| Example C11-17 | Example C10-17 | | KL-506 |
| Example C11-18 | Example C10-18 | | AP-17 |
| Example C11-19 | Example C10-19 | | SM-4 |
| Example C11-20 | Example C10-20 | | SM-15 |
| Example C11-21 | Example C10-21 | d | KL-506 |
| Example C11-22 | Example C10-22 | | SM-4 |
| Example C11-23 | Example C10-23 | e | PVA-103 |
| Example C11-24 | Example C10-24 | | SM-15 |
| Example C11-25 | Example C10-25 | f | AP-17 |
| Example C11-26 | Example C10-26 | | SM-15 |
| Example C11-27 | Example C10-27 | g | AP-17 |
| Example C11-28 | Example C10-28 | | SM-4 |
| Example C11-29 | Example C10-29 | h | PVA-103 |
| Example C11-30 | Example C10-30 | | AP-17 |
| Example C11-31 | Example C10-31 | | SM-4 |
| Example C11-32 | Example C10-32 | | SM-15 |
| Example C11-33 | Example C10-33 | i | PVA-403 |
| Example C11-34 | Example C10-34 | | SM-15 |
| Example C11-35 | Example C10-35 | j | PVA-403 |
| Example C11-36 | Example C10-36 | | KL-506 |
| Example C11-37 | Example C10-37 | | AP-17 |
| Example C11-38 | Example C10-38 | | SM-4 |
| Example C11-39 | Example C10-39 | | SM-15 |
| Example C11-40 | Example C10-40 | k | KL-506 |
| Example C11-41 | Example C10-41 | | SM-4 |
| Example C11-42 | Example C10-42 | l | PVA-103 |
| Example C11-43 | Example C10-43 | | SM-15 |
| Example C11-44 | Example C10-44 | m | AP-17 |
| Example C11-45 | Example C10-45 | | SM-4 |
| Example C11-46 | Example C10-46 | n | PVA-403 |
| Example C11-47 | Example C10-47 | | SM-4 |
| Example C11-48 | Example C10-48 | o | KL-506 |
| Example C11-49 | Example C10-49 | | SM-15 |
| Example C11-50 | Example C10-50 | p | PVA-103 |
| Example C11-51 | Example C10-51 | | SM-15 |
| Example C11-52 | Example C10-52 | q | AP-17 |
| Example C11-53 | Example C10-53 | | SM-15 |
| Example C11-54 | Example C10-54 | r | PVA-103 |
| Example C11-55 | Example C10-55 | | SM-4 |
| Example C11-56 | Example C10-56 | s | KL-506 |
| Example C11-57 | Example C10-57 | | SM-15 |
| Example C11-58 | Example C10-58 | t | PVA-103 |
| Example C11-59 | Example C10-59 | | SM-15 |
| Example C11-60 | Example C10-60 | u | PVA-103 |
| Example C11-61 | Example C10-61 | | AP-17 |
| Example C11-62 | Example C10-62 | | SM-4 |
| Example C11-63 | Example C10-63 | | SM-15 |
| Example C11-64 | Example C10-64 | v | PVA-103 |
| Example C11-65 | Example C10-65 | | KL-506 |
| Example C11-66 | Example C10-66 | | AP-17 |
| Example C11-67 | Example C10-67 | | SM-4 |
| Example C11-68 | Example C10-68 | | SM-15 |
| Example C11-69 | Example C10-69 | w | PVA-103 |
| Example C11-70 | Example C10-70 | | SM-15 |
| Example C11-71 | Example C10-71 | x | KL-506 |
| Example C11-72 | Example C10-72 | | SM-4 |
| Example C11-73 | Example C10-73 | y | KL-506 |
| Example C11-74 | Example C10-74 | | SM-4 |
| Example C11-75 | Example C10-75 | z | AP-17 |
| Example C11-76 | Example C10-76 | | SM-15 |
| Example C11-77 | Example C10-77 | aa | PVA-103 |
| Example C11-78 | Example C10-78 | | KL-506 |
| Example C11-79 | Example C10-79 | | SM-4 |
| Example C11-80 | Example C10-80 | | SM-15 |
| Example C11-81 | Example C10-81 | ab | PVA-403 |
| Example C11-82 | Example C10-82 | | KL-506 |
| Example C11-83 | Example C10-83 | | AP-17 |
| Example C11-84 | Example C10-84 | | SM-4 |
| Example C11-85 | Example C10-85 | | SM-15 |
| Example C11-86 | Example C10-86 | ac | PVA-103 |
| Example C11-87 | Example C10-87 | | SM-4 |
| Example C11-88 | Example C10-88 | ad | PVA-103 |
| Example C11-89 | Example C10-89 | | KL-506 |
| Example C11-90 | Example C10-90 | | AP-17 |
| Example C11-91 | Example C10-91 | | SM-4 |
| Example C11-92 | Example C10-92 | | SM-15 |
| Example C11-93 | Example C10-93 | ae | PVA-403 |
| Example C11-94 | Example C10-94 | | SM-15 |
| Example C11-95 | Example C10-95 | af | KL-506 |
| Example C11-96 | Example C10-96 | | SM-4 |
| Example C11-97 | Example C10-97 | ag | PVA-103 |
| Example C11-98 | Example C10-98 | | SM-15 |
| Example C11-99 | Example C10-99 | ah | AP-17 |
| Example C11-100 | Example C10-100 | | SM-4 |
| Example C11-101 | Example C10-101 | ai | KL-506 |
| Example C11-102 | Example C10-102 | | SM-15 |
| Example C11-103 | Example C10-103 | aj | PVA-103 |
| Example C11-104 | Example C10-104 | | SM-15 |
| Example C11-105 | Example C10-105 | ca | PVA-403 |
| Example C11-106 | Example C10-106 | | KL-506 |
| Example C11-107 | Example C10-107 | | AP-17 |
| Example C11-108 | Example C10-108 | | SM-4 |
| Example C11-109 | Example C10-109 | | SM-15 |
| Example C11-110 | Example C10-110 | cb | PVA-103 |
| Example C11-111 | Example C10-111 | | KL-506 |
| Example C11-112 | Example C10-112 | | AP-17 |
| Example C11-113 | Example C10-113 | | SM-4 |
| Example C11-114 | Example C10-114 | | SM-15 |
| Example C11-115 | Example C10-115 | cc | PVA-103 |
| Example C11-116 | Example C10-116 | | KL-506 |
| Example C11-117 | Example C10-117 | | AP-17 |
| Example C11-118 | Example C10-118 | | SM-4 |
| Example C11-119 | Example C10-119 | | SM-15 |
| Example C11-120 | Example C10-120 | cd | KL-506 |
| Example C11-121 | Example C10-121 | | SM-4 |
| Example C11-122 | Example C10-122 | ce | PVA-403 |
| Example C11-123 | Example C10-123 | | SM-15 |
| Example C11-124 | Example C10-124 | cf | AP-17 |
| Example C11-125 | Example C10-125 | | SM-15 |
| Example C11-126 | Example C10-126 | cg | AP-17 |
| Example C11-127 | Example C10-127 | | SM-4 |
| Example C11-128 | Example C10-128 | ch | PVA-403 |
| Example C11-129 | Example C10-129 | | AP-17 |
| Example C11-130 | Example C10-130 | | SM-4 |
| Example C11-131 | Example C10-131 | | SM-15 |
| Example C11-132 | Example C10-132 | ci | PVA-103 |
| Example C11-133 | Example C10-133 | | SM-15 |
| Example C11-134 | Example C10-134 | cj | PVA-103 |
| Example C11-135 | Example C10-135 | | KL-506 |
| Example C11-136 | Example C10-136 | | AP-17 |
| Example C11-137 | Example C10-137 | | SM-4 |
| Example C11-138 | Example C10-138 | | SM-15 |
| Example C11-139 | Example C10-139 | ck | PVA-403 |
| Example C11-140 | Example C10-140 | | SM-15 |
| Example C11-141 | Example C10-141 | cl | PVA-103 |
| Example C11-142 | Example C10-142 | | SM-15 |
| Example C11-143 | Example C10-143 | cm | PVA-403 |
| Example C11-144 | Example C10-144 | | SM-15 |
| Example C11-145 | Example C10-145 | cn | PVA-403 |
| Example C11-146 | Example C10-146 | | SM-4 |
| Example C11-147 | Example C10-147 | co | KL-506 |
| Example C11-148 | Example C10-148 | | SM-15 |
| Example C11-149 | Example C10-149 | cp | PVA-103 |
| Example C11-150 | Example C10-150 | | SM-15 |
| Example C11-151 | Example C10-151 | cq | AP-17 |
| Example C11-152 | Example C10-152 | | SM-15 |
| Example C11-153 | Example C10-153 | cr | KL-506 |

TABLE 144-continued

| | Electrode used | Dispersant or triazine derivative | Polymer dispersant |
|---|---|---|---|
| Example C11-154 | Example C10-154 | | SM-4 |
| Example C11-155 | Example C10-155 | cs | PVA-403 |
| Example C11-156 | Example C10-156 | | SM-4 |
| Example C11-157 | Example C10-157 | ct | PVA-103 |
| Example C11-158 | Example C10-158 | | SM-15 |
| Example C11-159 | Example C10-159 | cu | PVA-103 |
| Example C11-160 | Example C10-160 | | KL-506 |
| Example C11-161 | Example C10-161 | | AP-17 |
| Example C11-162 | Example C10-162 | | SM-4 |
| Example C11-163 | Example C10-163 | | SM-15 |
| Example C11-164 | Example C10-164 | cv | PVA-403 |
| Example C11-165 | Example C10-165 | | KL-506 |
| Example C11-166 | Example C10-166 | | SM-4 |
| Example C11-167 | Example C10-167 | | SM-15 |
| Example C11-168 | Example C10-168 | cw | PVA-103 |
| Example C11-169 | Example C10-169 | | KL-506 |
| Example C11-170 | Example C10-170 | | AP-17 |
| Example C11-171 | Example C10-171 | | SM-4 |
| Example C11-172 | Example C10-172 | | SM-15 |
| Example C11-173 | Example C10-173 | cx | AP-17 |
| Example C11-174 | Example C10-174 | | SM-4 |
| Example C11-175 | Example C10-175 | cy | PVA-103 |
| Example C11-176 | Example C10-176 | | SM-15 |
| Example C11-177 | Example C10-177 | cz | KL-506 |
| Example C11-178 | Example C10-178 | | SM-4 |
| Example C11-179 | Example C10-179 | da | KL-506 |
| Example C11-180 | Example C10-180 | | SM-4 |
| Example C11-181 | Example C10-181 | db | AP-17 |
| Example C11-182 | Example C10-182 | | SM-15 |
| Example C11-183 | Example C10-183 | dc | PVA-403 |
| Example C11-184 | Example C10-184 | | SM-15 |
| Example C11-185 | Example C10-185 | dd | KL-506 |
| Example C11-186 | Example C10-186 | | SM-4 |
| Example C11-187 | Example C10-187 | de | PVA-103 |
| Example C11-188 | Example C10-188 | | SM-15 |
| Reference Example C11-189 | Reference Example C10-189 | A | PVA-103 |
| Reference Example C11-190 | Reference Example C10-190 | | SM-4 |
| Reference Example C11-191 | Reference Example C10-191 | E | AP-17 |
| Reference Example C11-192 | Reference Example C10-192 | H | PVA-403 |
| Reference Example C11-193 | Reference Example C10-193 | J | SM-15 |
| Example C11-194 | Example C10-194 | a | PVA-103/SM-15 |
| Example C11-195 | Example C10-195 | | KL-506/SM-15 |
| Example C11-196 | Example C10-196 | | AP-17/SM-15 |
| Reference Example C11-197 | Reference Example C10-197 | A | PVA-103/SM-15 |
| Reference Example C11-198 | Reference Example C10-198 | | KL-506/SM-15 |
| Reference Example C11-199 | Reference Example C10-199 | | AP-17/SM-15 |

[Comparative Examples C11-1 to C11-4] [Example C11-1a]

A cell for evaluating an anode of a lithium ion secondary battery was assembled in the same manner as in Example C11-1 except that, in Example C11-1, the electrodes shown in Table 145 were used instead of the electrode produced in Example C10-1, and then ionic resistance, reaction resistance, room temperature rate characteristic, low-temperature discharge characteristic, and cycle characteristic were evaluated.

TABLE 145

| | Electrode used | Dispersant | Polymer dispersant |
|---|---|---|---|
| Comparative Example C11-1 | Comparative Example C10-2 | ba | PVA-103 |
| Comparative Example C11-2 | Comparative Example C10-9 | bb | SM-4 |
| Comparative Example C11-3 | Comparative Example C10-11 | ea | SM-4 |
| Comparative Example C11-4 | Comparative Example C10-12 | eb | PVA-103 |
| Comparative Example C11-1a | Example C10-1a | a | — |

Comparative Example C11-5

A carbon material dispersion liquid, a carbon material dispersion varnish, an anode mixture paste, and an electrode were produced in the same manner as in Example C10-1, except that the dispersant a and the polymer dispersant PVA-103 used in Example C10-1 was replaced with a solvent. A cell for evaluating an anode of a lithium ion secondary battery was assembled in the same manner as in Example C11-1 except that the electrode was used instead of the electrode produced in Example C10-1, and then ionic resistance, reaction resistance, room temperature rate characteristic, low-temperature discharge characteristic, and cycle characteristic were evaluated.

<Evaluation Results>

Table 146 shows the evaluation results of ionic resistance, reaction resistance, room temperature rate characteristic, low-temperature discharge characteristic, and cycle characteristics of Examples C11-1 to C11-104. Table 147 shows the evaluation results of ionic resistance, reaction resistance, room temperature rate characteristic, low-temperature discharge characteristic, and cycle characteristics of Examples C11-105 to C11-188, Reference Examples C11-189 to C11-193, Examples C11-194 to C11-196, and Reference Examples C11-197 to C11-199. Table 148 shows the results of ionic resistance, reaction resistance, room temperature rate characteristic, low-temperature discharge characteristic, and cycle characteristics of Comparative Examples C11-1 to C11-5 and Example C11-1a.

TABLE 146

| | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-1 | a | PVA-103 | 10 | 417 | 4.9 | 69.5 | 76.0 | 81.9 |
| Example C11-2 | | PVA-403 | 10 | 420 | 4.8 | 69.4 | 76.2 | 81.8 |
| Example C11-3 | | KL-506 | 10 | 420 | 4.9 | 69.5 | 76.1 | 84.4 |
| Example C11-4 | | AP-17 | 10 | 418 | 4.9 | 69.3 | 76.1 | 85.9 |

TABLE 146-continued

| | Dispersant or triazine derivative | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-5 | | L-3266 | 10 | 418 | 4.9 | 69.4 | 76.5 | 73.4 |
| Example C11-6 | | K-434 | 10 | 419 | 4.8 | 69.3 | 76.1 | 84.7 |
| Example C11-7 | | PVB-A | 10 | 419 | 4.9 | 69.2 | 76.1 | 82.7 |
| Example C11-8 | | SM-4 | 10 | 417 | 4.8 | 69.5 | 76.2 | 83.9 |
| Example C11-9 | | SM-15 | 10 | 417 | 4.9 | 69.3 | 76.3 | 83.5 |
| Example C11-10 | | ETHOCEL-10 | 10 | 417 | 4.8 | 69.5 | 76.3 | 71.0 |
| Example C11-11 | b | PVA-103 | 10 | 422 | 5.4 | 68.3 | 74.6 | 81.5 |
| Example C11-12 | | KL-506 | 10 | 424 | 5.2 | 68.4 | 75.4 | 86.0 |
| Example C11-13 | | AP-17 | 10 | 428 | 5.1 | 68.7 | 75.7 | 84.2 |
| Example C11-14 | | SM-4 | 10 | 426 | 5.4 | 68.2 | 74.8 | 82.5 |
| Example C11-15 | | SM-15 | 10 | 421 | 5.1 | 68.2 | 75.1 | 83.3 |
| Example C11-16 | c | PVA-403 | 10 | 422 | 5.3 | 68.4 | 75.8 | 81.6 |
| Example C11-17 | | KL-506 | 10 | 425 | 5.3 | 68.5 | 74.9 | 84.4 |
| Example C11-18 | | AP-17 | 10 | 425 | 5.3 | 68.7 | 75.0 | 80.7 |
| Example C11-19 | | SM-4 | 10 | 422 | 5.3 | 68.2 | 75.2 | 80-6 |
| Example C11-20 | | SM-15 | 10 | 423 | 5.1 | 68.2 | 74.7 | 84.0 |
| Example C11-21 | d | KL-506 | 13 | 476 | 7.8 | 64.4 | 67.1 | 83.0 |
| Example C11-22 | | SM-4 | 13 | 481 | 7.8 | 64.2 | 66.4 | 83.9 |
| Example C11-23 | e | PVA-103 | 12 | 467 | 7.4 | 65.7 | 69.3 | 80.9 |
| Example C11-24 | | SM-15 | 12 | 466 | 7.1 | 65.2 | 69.1 | 84.6 |
| Example C11-25 | f | AP-17 | 12 | 462 | 7.1 | 65.6 | 68.7 | 81.9 |
| Example C11-26 | | SM-15 | 12 | 467 | 7.4 | 65.4 | 69.7 | 82.4 |
| Example C11-27 | g | AP-17 | 12 | 463 | 7.1 | 65.1 | 68.9 | 85.7 |
| Example C11-28 | | SM-4 | 12 | 465 | 7.3 | 65.8 | 68.8 | 81.9 |
| Example C11-29 | h | PVA-103 | 11 | 441 | 6.3 | 66.7 | 72.2 | 80.6 |
| Example C11-30 | | AP-17 | 11 | 443 | 6.4 | 66.9 | 72.6 | 80.6 |
| Example C11-31 | | SM-4 | 11 | 444 | 6.2 | 67.5 | 72.5 | 81.6 |
| Example C11-32 | | SM-15 | 11 | 445 | 6.4 | 67.2 | 73.2 | 84.9 |
| Example C11-33 | i | PVA-403 | 12 | 462 | 7.1 | 65.8 | 70.2 | 82.2 |
| Example C11-34 | | SM-15 | 12 | 460 | 7.1 | 65.1 | 68.6 | 82.0 |
| Example C11-35 | j | PVA-403 | 11 | 442 | 6.3 | 67.1 | 73.0 | 86.0 |
| Example C11-36 | | KL-506 | 11 | 445 | 6.1 | 66.9 | 72.7 | 80.6 |
| Example C11-37 | | AP-17 | 11 | 444 | 6.1 | 67.4 | 73.2 | 81.8 |
| Example C11-38 | | SM-4 | 11 | 441 | 6.3 | 66.7 | 73.1 | 80.5 |
| Example C11-39 | | SM-15 | 11 | 442 | 6.3 | 67.1 | 72.4 | 81.8 |
| Example C11-40 | k | KL-506 | 12 | 462 | 7.2 | 65.1 | 69.4 | 81.9 |
| Example C11-41 | | SM-4 | 12 | 458 | 7.1 | 65.0 | 68.7 | 82.8 |
| Example C11-42 | l | PVA-103 | 12 | 459 | 7.4 | 65.8 | 68.6 | 84.8 |
| Example C11-43 | | SM-15 | 12 | 465 | 7.4 | 65.1 | 69.6 | 82.5 |

TABLE 146-continued

| | Dispersant or triazine derivative | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-44 | m | AP-17 | 14 | 487 | 8.3 | 63.1 | 63.7 | 82.0 |
| Example C11-45 | | SM-4 | 14 | 487 | 8.3 | 62.8 | 63.6 | 85.3 |
| Example C11-46 | n | PVA-403 | 13 | 471 | 7.6 | 65.0 | 68.1 | 80.6 |
| Example C11-47 | | SM-4 | 13 | 469 | 7.6 | 64.7 | 67.9 | 83.8 |
| Example C11-48 | o | KL-506 | 13 | 478 | 7.8 | 64.4 | 67.3 | 83.6 |
| Example C11-49 | | SM-15 | 13 | 476 | 7.8 | 64.2 | 66.8 | 81.3 |
| Example C11-50 | p | PVA-103 | 15 | 495 | 8.8 | 62.5 | 63.4 | 83.4 |
| Example C11-51 | | SM-15 | 15 | 496 | 8.9 | 62.2 | 62.9 | 81.3 |
| Example C11-52 | q | AP-17 | 14 | 489 | 8.3 | 63.0 | 63.7 | 81.2 |
| Example C11-53 | | SM-15 | 14 | 488 | 8.1 | 62.8 | 64.7 | 81.5 |
| Example C11-54 | r | PVA-103 | 14 | 483 | 8.1 | 62.6 | 63.8 | 81.0 |
| Example C11-55 | | SM-4 | 14 | 437 | 8.3 | 62.6 | 64.3 | 81.8 |
| Example C11-56 | s | KL-506 | 13 | 478 | 7.7 | 64.3 | 66.6 | 83.5 |
| Example C11-57 | | SM-15 | 13 | 479 | 7.7 | 64.3 | 67.3 | 81.2 |
| Example C11-58 | t | PVA-103 | 13 | 480 | 7.7 | 64.0 | 66.4 | 85.2 |
| Example C11-59 | | SM-15 | 13 | 480 | 7.8 | 64.5 | 67.0 | 83.8 |
| Example C11-60 | u | PVA-103 | 11 | 442 | 6.2 | 66.7 | 72.9 | 84.9 |
| Example C11-61 | | AP-17 | 11 | 444 | 6.4 | 66.9 | 72.8 | 84.3 |
| Example C11-62 | | SM-4 | 11 | 444 | 6.3 | 67.2 | 73.4 | 81.4 |
| Example C11-63 | | SM-15 | 11 | 444 | 6.2 | 66.7 | 71.8 | 85.3 |
| Example C11-64 | v | PVA-103 | 10 | 426 | 5.2 | 68.7 | 75.7 | 83.6 |
| Example C11-65 | | KL-506 | 10 | 425 | 5.1 | 68.1 | 75.8 | 85.3 |
| Example C11-66 | | AP-17 | 10 | 423 | 5.0 | 68.4 | 75.3 | 85.9 |
| Example C11-67 | | SM-4 | 10 | 426 | 5.4 | 68.3 | 75.0 | 82.8 |
| Example C11-68 | | SM-15 | 10 | 422 | 5.3 | 68.5 | 74.9 | 81.5 |
| Example C11-69 | w | PVA-103 | 12 | 457 | 7.4 | 65.0 | 70.0 | 82.2 |
| Example C11-70 | | SM-15 | 12 | 465 | 7.1 | 65.3 | 69.3 | 83.4 |
| Example C11-71 | x | KL-506 | 12 | 460 | 7.3 | 65.2 | 70.1 | 82.1 |
| Example C11-72 | | SM-4 | 12 | 457 | 7.1 | 65.6 | 69.5 | 83.9 |
| Example C11-73 | y | KL-506 | 13 | 480 | 7.7 | 64.2 | 67.3 | 81.7 |
| Example C11-74 | | SM-4 | 13 | 481 | 7.8 | 64.0 | 67.1 | 84.1 |
| Example C11-75 | z | AP-17 | 13 | 477 | 7.8 | 64.4 | 66.5 | 84.0 |
| Example C11-76 | | SM-15 | 13 | 480 | 7.8 | 64.0 | 66.8 | 84.5 |
| Example C11-77 | aa | PVA-103 | 11 | 443 | 6.2 | 67.2 | 72.1 | 844 |
| Example C11-78 | | KL-506 | 11 | 444 | 6.2 | 67.0 | 72.2 | 82.7 |
| Example C11-79 | | SM-4 | 11 | 443 | 6.3 | 67.1 | 72.3 | 83.9 |
| Example C11-80 | | SM-15 | 11 | 441 | 6.4 | 67.4 | 73.4 | 84.8 |

TABLE 146-continued

|  | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-81 | ab | PVA-403 | 10 | 429 | 5.1 | 68.3 | 74.7 | 83.0 |
| Example C11-82 |  | KL-506 | 10 | 427 | 5.1 | 68.4 | 75.1 | 84.9 |
| Example C11-83 |  | AP-17 | 10 | 421 | 5.0 | 68.5 | 75.5 | 84.1 |
| Example C11-84 |  | SM-4 | 10 | 422 | 5.3 | 68.6 | 75.6 | 81.8 |
| Example C11-85 |  | SM-15 | 10 | 429 | 5.3 | 68.3 | 75.6 | 81.5 |
| Example C11-86 | ac | PVA-103 | 13 | 480 | 7.7 | 64.3 | 67.4 | 83.5 |
| Example C11-87 |  | SM-4 | 13 | 479 | 7.8 | 64.4 | 67.2 | 81.6 |
| Example C11-88 | ad | PVA-103 | 11 | 443 | 6.2 | 67.5 | 72.3 | 80.5 |
| Example C11-89 |  | KL-506 | 11 | 442 | 6.1 | 67.4 | 72.5 | 80.6 |
| Example C11-90 |  | AP-17 | 11 | 445 | 6.4 | 67.4 | 73.1 | 82.0 |
| Example C11-91 |  | SM-4 | 11 | 444 | 6.4 | 67.0 | 73.2 | 80.8 |
| Example C11-92 |  | SM-15 | 11 | 441 | 6.3 | 67.3 | 71.7 | 81.5 |
| Example C11-93 | ae | PVA-403 | 12 | 466 | 7.3 | 65.3 | 70.2 | 81.0 |
| Example C11-94 |  | SM-15 | 12 | 456 | 7.3 | 65.1 | 69.7 | 85.0 |
| Example C11-95 | af | KL-506 | 12 | 467 | 7.4 | 65.5 | 69.5 | 84.3 |
| Example C11-96 |  | SM-4 | 12 | 461 | 7.1 | 65.9 | 69.8 | 85.4 |
| Example C11-97 | ag | PVA-103 | 10 | 432 | 5.5 | 68.0 | 74.2 | 84.3 |
| Example C11-98 |  | SM-15 | 10 | 433 | 5.6 | 67.9 | 74.3 | 85.5 |
| Example C11-99 | ah | AP-17 | 10 | 426 | 5.3 | 68.3 | 75.4 | 84.7 |
| Example C11-100 |  | SM-4 | 10 | 427 | 5.3 | 68.4 | 75.8 | 84.4 |
| Example C11-101 | ai | KL-506 | 11 | 443 | 6.2 | 67.3 | 72.2 | 80.7 |
| Example C11-102 |  | SM-15 | 11 | 442 | 6.3 | 66.9 | 73.0 | 82.5 |
| Example C11-103 | aj | PVA-103 | 12 | 459 | 7.3 | 65.1 | 69.0 | 81.4 |
| Example C11-104 |  | SM-15 | 12 | 461 | 7.1 | 65.0 | 69.6 | 81.7 |

TABLE 147

|  | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-105 | ca | PVA-403 | 10 | 419 | 4.9 | 69.3 | 76.4 | 83.4 |
| Example C11-106 |  | KL-506 | 10 | 417 | 4.9 | 69.4 | 76.1 | 81.7 |
| Example C11-107 |  | AP-17 | 10 | 417 | 4.8 | 69.2 | 76.3 | 83.6 |
| Example C11-108 |  | SM-4 | 10 | 418 | 4.9 | 69.4 | 76.1 | 85.6 |
| Example C11-109 |  | SM-15 | 10 | 419 | 4.9 | 69.5 | 76.1 | 84.9 |
| Example C11-110 | cb | PVA-103 | 10 | 421 | 5.2 | 68.3 | 75.8 | 84.4 |
| Example C11-111 |  | KL-506 | 10 | 426 | 5.1 | 68.6 | 75.1 | 81.2 |
| Example C11-112 |  | AP-17 | 10 | 425 | 5.3 | 68.6 | 75.6 | 83.3 |
| Example C11-113 |  | SM-4 | 10 | 425 | 5.0 | 68.4 | 75.3 | 80.6 |
| Example C11-114 |  | SM-15 | 10 | 424 | 5.3 | 68.2 | 75.5 | 82.5 |
| Example C11-115 | cc | PVA-103 | 10 | 426 | 5.4 | 68.9 | 75.0 | 83.7 |
| Example C11-116 |  | KL-506 | 10 | 429 | 5.2 | 68.8 | 75.4 | 80.5 |
| Example C11-117 |  | AP-17 | 10 | 422 | 5.2 | 68.4 | 75.7 | 84.3 |
| Example C11-118 |  | SM-4 | 10 | 425 | 5.3 | 68.9 | 74.7 | 83.0 |

TABLE 147-continued

| | Dispersant or triazine derivative | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-119 | | SM-15 | 10 | 426 | 5.4 | 68.1 | 75.8 | 81.2 |
| Example C11-120 | cd | KL-506 | 13 | 479 | 7.7 | 64.0 | 66.1 | 84.3 |
| Example C11-121 | | SM-4 | 13 | 479 | 7.8 | 64.0 | 66.6 | 84.1 |
| Example C11-122 | ce | PVA-403 | 12 | 467 | 7.4 | 65.5 | 69.5 | 85.2 |
| Example C11-123 | | SM-15 | 12 | 462 | 7.1 | 65.5 | 70.4 | 85.6 |
| Example C11-124 | cf | AP-17 | 12 | 463 | 7.2 | 65.1 | 69.0 | 81.2 |
| Example C11-125 | | SM-15 | 12 | 463 | 7.1 | 65.2 | 69.8 | 85.0 |
| Example C11-126 | cg | AP-17 | 12 | 457 | 7.2 | 66.0 | 69.8 | 81.2 |
| Example C11-127 | | SM-4 | 12 | 457 | 7.2 | 65.0 | 69.2 | 80.8 |
| Example C11-128 | ch | PVA-403 | 11 | 441 | 6.4 | 66.9 | 72.3 | 85.4 |
| Example C11-129 | | AP-17 | 11 | 441 | 9.2 | 66.6 | 72.8 | 83.6 |
| Example C11-130 | | SM-4 | 11 | 445 | 6.2 | 66.7 | 71.9 | 83.5 |
| Example C11-131 | | SM-15 | 11 | 443 | 6.4 | 67.0 | 72.7 | 81.3 |
| Example C11-132 | ci | PVA-103 | 12 | 456 | 7.3 | 65.1 | 69.4 | 82.1 |
| Example C11-133 | | SM-15 | 12 | 467 | 7.4 | 65.5 | 70.4 | 83.0 |
| Example C11-134 | cj | PVA-103 | 11 | 441 | 6.2 | 67.2 | 72-1 | 85.2 |
| Example C11-135 | | KL-506 | 11 | 441 | 6.1 | 67.5 | 73.2 | 84.3 |
| Example C11-136 | | AP-17 | 11 | 444 | 6.2 | 67.1 | 71.7 | 81.6 |
| Example C11-137 | | SM-4 | 11 | 445 | 6.4 | 67.5 | 71.7 | 82.5 |
| Example C11-138 | | SM-15 | 11 | 444 | 6.4 | 66.6 | 71.6 | 80.5 |
| Example C11-139 | ck | PVA-403 | 12 | 464 | 7.4 | 65.9 | 69.0 | 81.9 |
| Example C11-140 | | SM-15 | 12 | 458 | 7.1 | 65.0 | 68.7 | 85.4 |
| Example C11-141 | cl | PVA-103 | 12 | 463 | 7.2 | 65.4 | 69.0 | 85.2 |
| Example C11-142 | | SM-15 | 12 | 463 | 7.1 | 65.2 | 68.6 | 81.6 |
| Example C11-143 | cm | PVA-103 | 14 | 490 | 8.3 | 62.6 | 64.8 | 84.8 |
| Example C11-144 | | SM-15 | 14 | 492 | 8.2 | 63.0 | 64.3 | 84.5 |
| Example C11-145 | cn | PVA-403 | 13 | 475 | 7.6 | 64.6 | 67.4 | 81.9 |
| Example C11-146 | | SM-4 | 13 | 474 | 7.6 | 64.5 | 67.5 | 85.7 |
| Example C11-147 | co | KL-506 | 13 | 476 | 7.7 | 64.2 | 66.5 | 80.9 |
| Example C11-148 | | SM-15 | 13 | 478 | 7.8 | 63.9 | 67.3 | 81.8 |
| Example C11-149 | cp | PVA-103 | 15 | 494 | 8.8 | 62.8 | 63.6 | 81.5 |
| Example C11-150 | | SM-15 | 15 | 495 | 8.7 | 62.2 | 63.3 | 85.3 |
| Example C11-151 | cq | AP-17 | 14 | 490 | 8.1 | 62.5 | 63.9 | 85.7 |
| Example C11-152 | | SM-15 | 14 | 487 | 8.1 | 62.7 | 64.4 | 81.9 |
| Example C11-153 | cr | KL-506 | 14 | 489 | 8.4 | 62.4 | 63.9 | 84.8 |
| Example C11-154 | | SM-4 | 14 | 489 | 8.4 | 63.0 | 64.6 | 81.9 |
| Example C11-155 | cs | PVA-403 | 13 | 481 | 7.7 | 63.9 | 66.6 | 82.2 |
| Example C11-156 | | SM-4 | 13 | 481 | 7.7 | 64.0 | 67.4 | 86.0 |
| Example C11-157 | ct | PVA-103 | 13 | 479 | 7.8 | 64.0 | 66.4 | 80.9 |
| Example C11-158 | | SM-15 | 13 | 479 | 7.8 | 63.7 | 67.0 | 81.6 |
| Example C11-159 | cu | PVA-103 | 10 | 422 | 5.3 | 68.7 | 75.3 | 85.1 |
| Example C11-160 | | KL-506 | 10 | 426 | 5.1 | 68.7 | 74.8 | 82.5 |
| Example C11-161 | | AP-17 | 10 | 425 | 5.0 | 68.9 | 74.8 | 85.6 |
| Example C11-162 | | SM-4 | 10 | 422 | 5.3 | 68.3 | 74.7 | 86.0 |
| Example C11-163 | | SM-15 | 10 | 427 | 5.1 | 68.1 | 75.7 | 81.7 |
| Example C11-164 | cv | PVA-403 | 11 | 446 | 6.2 | 67.3 | 72.5 | 80.8 |
| Example C11-165 | | KL-506 | 11 | 446 | 6.3 | 66.8 | 72.0 | 81.6 |
| Example C11-166 | | SM-4 | 11 | 443 | 6.3 | 67.0 | 71.7 | 81.3 |
| Example C11-167 | | SM-15 | 11 | 441 | 6.1 | 67.1 | 72.9 | 83.4 |
| Example C11-168 | cw | PVA-103 | 11 | 442 | 6.1 | 66.7 | 72.1 | 85.6 |
| Example C11-169 | | KL-506 | 11 | 441 | 6.3 | 67.2 | 72.9 | 85.5 |
| Example C11-170 | | AP-17 | 11 | 442 | 6.1 | 66.6 | 72.3 | 83.1 |
| Example C11-171 | | SM-4 | 11 | 444 | 6.4 | 67.1 | 72.9 | 84.4 |
| Example C11-172 | | SM-15 | 11 | 441 | 6.2 | 67.5 | 72.7 | 84.4 |
| Example C11-173 | cx | AP-17 | 12 | 462 | 7.1 | 66.0 | 69.0 | 80.5 |
| Example C11-174 | | SM-4 | 12 | 461 | 7.4 | 65.9 | 70.2 | 83.2 |
| Example C11-175 | cy | PVA-103 | 12 | 467 | 7.1 | 65.1 | 69.6 | 80.9 |
| Example C11-176 | | SM-15 | 12 | 467 | 7.4 | 65.4 | 69.6 | 81.4 |
| Example C11-177 | cz | KL-506 | 13 | 476 | 7.7 | 64.2 | 66.5 | 81.3 |
| Example C11-178 | | SM-4 | 13 | 479 | 7.8 | 64.3 | 66.2 | 85.1 |
| Example C11-179 | da | KL-506 | 13 | 481 | 7.7 | 64.5 | 66.6 | 83.4 |
| Example C11-180 | | SM-4 | 13 | 479 | 7.8 | 63.7 | 67.0 | 81.7 |
| Example C11-181 | db | AP-17 | 12 | 456 | 7.2 | 65.5 | 68.9 | 85.5 |
| Example C11-182 | | SM-15 | 12 | 460 | 7.3 | 65.3 | 68.7 | 81.2 |
| Example C11-183 | dc | PVA-403 | 10 | 422 | 5.4 | 68.1 | 75.1 | 84.5 |
| Example C11-184 | | SM-15 | 10 | 423 | 5.2 | 68.8 | 74.6 | 81.0 |
| Example C11-185 | dd | KL-506 | 10 | 424 | 5.4 | 68.3 | 75.6 | 81.4 |
| Example C11-186 | | SM-4 | 10 | 424 | 5.0 | 68.5 | 74.9 | 82.9 |
| Example C11-187 | de | PVA-103 | 12 | 467 | 7.1 | 65.2 | 68.7 | 84.6 |
| Example C11-188 | | SM-15 | 12 | 466 | 7.1 | 65.2 | 69.2 | 81.7 |

TABLE 147-continued

| | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C11-189 | A | PVA-103 | 15 | 496 | 8.8 | 62.6 | 63.0 | 81.1 |
| Example C11-190 | | SM-4 | 15 | 494 | 8.8 | 62.5 | 63.0 | 83.5 |
| Reference Example C11-191 | E | AP-17 | 15 | 496 | 8.7 | 62.0 | 62.9 | 81.5 |
| Reference Example C11-192 | H | SM-4 | 15 | 496 | 8.8 | 62.3 | 62.9 | 82.4 |
| Reference Example C11-193 | J | SM-15 | 15 | 494 | 8.9 | 62.0 | 63.3 | 81.8 |
| Example C11-194 | a | PVA-103/SM-15 | 10 | 418 | 4.8 | 69.3 | 76.2 | 84.7 |
| Example C11-195 | | KL-506/SM-15 | 10 | 418 | 4.9 | 69.5 | 76.5 | 83.0 |
| Example C11-196 | | AP-17/SM-15 | 10 | 418 | 4.9 | 69.6 | 76.1 | 80.7 |
| Reference Example C11-197 | A | PVA-103/SM-15 | 15 | 494 | 8.8 | 61.9 | 63.8 | 81.7 |
| Reference Example C11-198 | | KL-506/SM-15 | 15 | 495 | 8.7 | 62.6 | 63.8 | 84.8 |
| Reference Example C11-199 | | AP-17/SM-15 | 15 | 496 | 8.8 | 62.6 | 63.3 | 81.7 |

TABLE 148

| | Dispersant or triazine derivative | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Comparative Example C11-1 | ba | PVA-103 | 18 | 540 | 11.1 | 49.3 | 38.6 | 64.2 |
| Comparative Example C11-2 | bb | SM-4 | 17 | 514 | 10.9 | 50.3 | 42.1 | 63.2 |
| Comparative Example C11-3 | ea | SM-4 | 18 | 547 | 11.1 | 50.1 | 37.6 | 66.0 |
| Comparative Example C11-4 | eb | PVA-103 | 17 | 523 | 10.8 | 52.1 | 41.0 | 65.4 |
| Comparative Example C11-5 | — | — | 16 | 510 | 10.5 | 53.8 | 45.0 | 59.8 |
| Example C11-1a | a | — | 10 | 420 | 4.9 | 69.1 | 76.0 | 60.9 |

As can be seen from Table 146, Table 147, and Table 148, the anodes of Examples C11-1 to C11-188, Reference Examples C11-189 to C11-193, Examples C11-194 to C11-196, Reference Examples C11-197 to C11-199, and Reference Example C11-1, in which the dispersants a to aj and ca to de, the triazine derivatives A, E, H, and J were used, were significantly excellent in all of the ionic resistance, reaction resistance, room temperature rate characteristic, and low-temperature discharge characteristic at room temperature and −20° C., as compared to the anodes of Comparative Examples C11-1 to C11-4 in which the dispersants ba, bb, ea, and eb and polymer dispersant were used, and Comparative Example C11-5 in which a dispersant was not used.

In addition, in the anodes of Examples C11-1 to C11-188, Reference Examples C11-189 to C11-193, Examples C11-194 to C11-196, and Reference Examples C11-197 to C11-199, in which the dispersants a to aj and ca to de and the polymer dispersant were used, the cycle characteristic was significantly improved as compared with the anodes of Comparative Examples C11-1 to C11-4 in which the dispersants ba, bb, ea, and eb and the polymer dispersant were used, and Comparative Example C11-5 in which a dispersant was not used.

Based on the above results, it could be confirmed that, also in the case of using the composition for batteries of the present invention for the anode, the same effect as in the case of using the cathode is obtained.

Example C12-1

<Preparation of Carbon Material Dispersion Liquid>

According to the composition shown in Table 149, water, the dispersant ca, and the polymer dispersant PVA-103 were added to a glass bottle and mixed. Thereafter, a carbon material was added thereto and dispersed with a paint conditioner for 2 hours using zirconia beads as media. Thereby, a carbon material dispersion liquid was obtained.

<Preparation of Carbon Material Dispersion Varnish>

According to the composition shown in Table 149, the prepared carbon material dispersion liquid, a binder, and water were mixed with a disper. Thereby, a carbon material dispersion varnish was obtained.

<Preparation of Mixture Paste>

According to the composition shown in Table 149, the prepared carbon material dispersion varnish, an active material, and water were mixed with a disper. Thereby, a cathode mixture paste was obtained.

<Creation of Electrode>

The prepared cathode mixture paste containing the dispersant ca and the polymer dispersant PVA-103 was applied onto an aluminum foil having a thickness of 20 μm using a doctor blade, and then dried at 120° C. for 30 minutes under reduced pressure. Thereafter, the aluminum foil was rolled with a roller pressing machine. Thereby, an electrode having an application amount of 17 mg/cm$^2$ and a density of 3.0 g/cm$^3$ was produced. An electrode having a uniform thickness and density was obtained.

TABLE 149

|  | Dispersant | | Polymer dispersant | | Carbon material | | Binder | | Active material | | Solvent | |
|---|---|---|---|---|---|---|---|---|---|---|---|---|
|  | Type | Content (%) | Type | Content (%) | Type | Content (%) | Type | Content (%) | Type | Content (%) | Type | Content (%) |
| Composition of carbon material dispersion liquid | ca | 0.5 | PVA-103 | 0.5 | HS100 | 10.0 |  |  |  |  | Water | 89.0 |
| Composition of carbon material dispersion varnish |  | 0.3 |  | 0.3 |  | 6.0 | PTFE | 3.0 |  |  |  | 89.2 |
| Composition of cathode mixture paste |  | 01 |  | 01 |  | 2.0 |  | 1.0 | LFP | 54.0 |  | 42.4 |

Examples C12-2 to C12-9

A carbon material dispersion liquid, a carbon material dispersion varnish, a cathode mixture paste, and an electrode were produced in the same manner as in Example C12-1, except that PVA-103 used in Example C12-1 was replaced with the polymer dispersant shown in Table 150.

TABLE 150

|  | Polymer dispersant |
|---|---|
| Example C12-2 | PVA-403 |
| Example C12-3 | KL-506 |
| Example C12-4 | AP-17 |
| Example C12-5 | L-3266 |
| Example C12-6 | K-434 |
| Example C12-7 | PVB-A |
| Example C12-8 | SM-4 |
| Example C12-9 | SM-15 |

[Example C12-1a] Dispersant ca Only

A carbon material dispersion liquid, a carbon material dispersion varnish, a cathode mixture paste, and an electrode were produced in the same manner as in Example C12-1a, except that the polymer dispersant PVA-103 used in Example C12-1 was replaced with the dispersant ca as shown in Table 151, so that the dispersant is formed of only the dispersant ca.

[Comparative Example C12-1] Comparison 1 of Dispersant Types

A carbon material dispersion liquid, a carbon material dispersion varnish, a cathode mixture paste, and an electrode were produced in the same manner as in Example C12-1a, except that the dispersant ca used in Example C12-1a was replaced with the dispersant ea as shown in Table 151.

[Comparative Example C12-2] Comparison 2 of Dispersant Types

A carbon material dispersion liquid, a carbon material dispersion varnish, a cathode mixture paste, and an electrode were produced in the same manner as in Example C12-1, except that the dispersant ca used in Example C12-1 was replaced with the dispersant ea as shown in Table 151.

[Comparative Examples C12-3 and C12-4] Comparison 3 of Dispersant Types

A carbon material dispersion liquid, a carbon material dispersion varnish, a cathode mixture paste, and an electrode were produced in the same manner as in Comparative Example C12-2, except that the polymer dispersants shown in Table 151 were respectively used instead of PVA-103 used in Comparative Example C12-2.

TABLE 151

|  | Dispersant | Polymer dispersant |
|---|---|---|
| Example C12-1a | ca | — |
| Comparative Example C12-1 | ea | — |
| Comparative Example C12-2 | ea | PVA-103 |
| Comparative Example C12-3 | ea | L-3266 |
| Comparative Example C12-4 | ea | SM-4 |

<Evaluation Results>

All of the carbon material dispersion liquids, carbon material dispersion varnishes, and cathode mixture pastes prepared in Examples C12-1 to C12-9, Example C12-1a, and Comparative Examples C12-1 to C12-4 were in a favorably dispersed state, and sedimentation or thickening did not occur even after the elapse of one month.

The peeling strength test was conducted on the electrodes produced in Examples C12-1 to C12-9, Example C12-1a, and Comparative Examples C12-1 to C12-4. The results of the peeling strength test are as follows: A: 200% or more, A to B: less than 200% and 175% or more, B: less than 175% and 150% or more, B to C: less than 150% and 120% or more, C: less than 120% and 80% or more, when Example C12-1a is 100%. In the following, the results of peeling strength test, in which a solvent is water, of a cathode mixture material follows the above standard. The results thereof are shown in Table 152. Compared to Comparative Example C12-1 in which only the dispersant ea was used, peeling strength was slightly improved in all Comparative Examples C12-2 to C12-4 in which various polymer dispersants were used in combination. The reason why the peeling strength was improved although an increased amount was slight is thought to be that polymer components that can participate in film formation was contained instead of the low molecular weight dispersant ea which has no film forming ability. Meanwhile, by comparison, a significant improvement was observed in all Examples C12-1 to C12-9 in which various polymer dispersants were used in combination.

TABLE 152

|  | Dispersant | Polymer dispersant | Peeling strength |
|---|---|---|---|
| Example C12-1a | ca | — | C |
| Example C12-1 | ca | PVA-103 | A |
| Example C12-2 | ca | PVA-403 | A |
| Example C12-3 | ca | KL-506 | A |
| Example C12-4 | ca | AP-17 | A |
| Example C12-5 | ca | L-3266 | A to B |
| Example C12-6 | ca | K-434 | A |
| Example C12-7 | ca | PVB-A | A |
| Example C12-8 | ca | SM-4 | A |
| Example C12-9 | ca | SM-15 | A |
| Comparative Example C12-1 | ea | — | C |
| Comparative Example C12-2 | ea | PVA-103 | B to C |
| Comparative Example C12-3 | ea | L-3266 | B to C |
| Comparative Example C12-4 | ea | SM-4 | B to C |

Examples C12-10 to C12-88

In order to confirm whether the peeling strength improvement effect can be obtained with other triazine derivatives represented by General Formula (1), a test was conducted in the same manner. A carbon material dispersion liquid, a carbon material dispersion varnish, a cathode mixture paste, and an electrode were produced in the same manner as in Example C12-1, except that the dispersant and the polymer dispersant used in Example C12-1 were respectively replaced with the dispersant and the polymer dispersant shown in Table 153, and then the peeling strength test was conducted.

TABLE 153

|  | Dispersant | Polymer dispersant |
|---|---|---|
| Example C12-10 | cb | PVA-103 |
| Example C12-11 |  | KL-506 |
| Example C12-12 |  | AP-17 |
| Example C12-13 |  | SM-4 |
| Example C12-14 |  | SM-15 |
| Example C12-15 | cc | PVA-103 |
| Example C12-16 |  | KL-506 |
| Example C12-17 |  | AP-17 |
| Example C12-18 |  | SM-4 |
| Example C12-19 |  | SM-15 |
| Example C12-20 | cd | KL-506 |
| Example C12-21 |  | SM-4 |
| Example C12-22 | ce | PVA-403 |
| Example C12-23 |  | SM-15 |
| Example C12-24 | cf | AP-17 |
| Example C12-25 |  | SM-15 |
| Example C12-26 | cg | AP-17 |
| Example C12-27 |  | SM-4 |
| Example C12-28 | ch | PVA-403 |
| Example C12-29 |  | AP-17 |
| Example C12-30 |  | SM-4 |
| Example C12-31 |  | SM-15 |
| Example C12-32 | ci | PVA-103 |
| Example C12-33 |  | SM-15 |
| Example C12-34 | cj | PVA-103 |
| Example C12-35 |  | KL-506 |
| Example C12-36 |  | AP-17 |
| Example C12-37 |  | SM-4 |
| Example C12-38 |  | SM-15 |
| Example C12-39 | ck | PVA-403 |
| Example C12-40 |  | SM-15 |
| Example C12-41 | cl | PVA-103 |
| Example C12-42 |  | SM-15 |
| Example C12-43 | cm | PVA-103 |
| Example C12-44 |  | SM-15 |
| Example C12-45 | cn | PVA-403 |
| Example C12-46 |  | SM-4 |
| Example C12-47 | co | KL-506 |
| Example C12-48 |  | SM-15 |
| Example C12-49 | cp | PVA-103 |
| Example C12-50 |  | SM-15 |
| Example C12-51 | cq | AP-17 |
| Example C12-52 |  | SM-15 |
| Example C12-53 | cr | KL-506 |
| Example C12-54 |  | SM-4 |
| Example C12-55 | cs | PVA-403 |
| Example C12-56 |  | SM-4 |
| Example C12-57 | ct | PVA-103 |
| Example C12-58 |  | SM-15 |
| Example C12-59 | cu | PVA-103 |
| Example C12-60 |  | KL-506 |
| Example C12-61 |  | AP-17 |
| Example C12-62 |  | SM-4 |
| Example C12-63 |  | SM-15 |
| Example C12-64 | cv | PVA-403 |
| Example C12-65 |  | KL-506 |
| Example C12-66 |  | SM-4 |
| Example C12-67 |  | SM-15 |
| Example C12-68 | cw | PVA-103 |
| Example C12-69 |  | KL-506 |
| Example C12-70 |  | AP-17 |
| Example C12-71 |  | SM-4 |
| Example C12-72 |  | SM-15 |
| Example C12-73 | cx | AP-17 |
| Example C12-74 |  | SM-4 |
| Example C12-75 | cy | PVA-103 |
| Example C12-76 |  | SM-15 |
| Example C12-77 | cz | KL-506 |
| Example C12-78 |  | SM-4 |
| Example C12-79 | da | KL-506 |
| Example C12-80 |  | SM-4 |
| Example C12-81 | db | AP-17 |
| Example C12-82 |  | SM-15 |
| Example C12-83 | dc | PVA-403 |
| Example C12-84 |  | SM-15 |
| Example C12-85 | dd | KL-506 |
| Example C12-86 |  | SM-4 |
| Example C12-87 | de | PVA-103 |
| Example C12-88 |  | SM-15 |

[Example C12-89] Combination Use of Polymer Dispersant

A carbon material dispersion liquid, a carbon material dispersion varnish, a cathode mixture paste, and an electrode were produced in the same manner as in Example C12-1, except that another half amount of PVA-103 used in Example C12-1 was replaced with SM-15 as shown in Table 154, and the then peeling strength test was conducted.

[Examples C12-90 and C12-91] Combination Use 2 of Polymer Dispersant

A carbon material dispersion liquid, a carbon material dispersion varnish, a cathode mixture paste, and an electrode were produced in the same manner as in Example C12-89, except that the polymer dispersants shown in Table 154 were respectively used instead of PVA-103 used in Example C12-89, then the peeling strength test was conducted.

TABLE 154

|  | Dispersant | Polymer dispersant 1 | Polymer dispersant 2 |
|---|---|---|---|
| Example C12-89 | ca | PVA-103 | SM-15 |
| Example C12-90 |  | KL-506 |  |
| Example C12-91 |  | AP-17 |  |

Comparative Example C12-5

A carbon material dispersion liquid, a carbon material dispersion varnish, a cathode mixture paste, and an electrode were produced in the same manner as in Example C12-1a, except that the dispersant ca used in Example C12-1a was replaced with the dispersant eb as shown in Table 155, and then peeling strength test was conducted.

Comparative Examples C12-6 and C12-7

A carbon material dispersion liquid, a carbon material dispersion varnish, a cathode mixture paste, and an electrode were produced in the same manner as in Example C12-1, except that the dispersant ca and the polymer dispersant PVA-103 used in Example C12-1 were respectively replaced with the dispersant and the polymer dispersant shown in Table 155, and then the peeling strength test was conducted.

TABLE 155

|  | Dispersant | Polymer dispersant |
|---|---|---|
| Comparative Example C12-5 | eb | — |
| Comparative Example C12-6 | eb | PVA-103 |
| Comparative Example C12-7 |  | SM-4 |

<Evaluation Results>

Table 156 shows the results of the peeling strength test of the electrodes produced in Examples C12-10 to C12-91, Example C12-1a, and Comparative Examples C12-5 to C12-7. As in the case of the dispersant ea, only a low degree of peeling strength was improved when the dispersant eb, and various polymer dispersants were used in combination, whereas as in the case of the dispersant ca, a significant improvement in peeling strength was confirmed by using the dispersants cb to de in combination with various polymer dispersants.

The reason for this is thought to be that, because this effect is unique to the triazine derivatives represented by the general formula (1), by the structure in which an arylene group having an acidic functional group and two phenolic hydroxyl groups are directly connected to one triazine ring, strong intermolecular force such as hydrogen bonding acted between the dispersant and the polymer dispersant.

TABLE 156

|  | Dispersant | Polymer dispersant | Peeling strength |
|---|---|---|---|
| Example C12-1a | ca | — | C |
| Examples C12-10 to C12-88 | cb to de | PVA-103 or PVA-403 or KL-506 or AP-17 or SM-4 or SM-15 | A |
| Examples C12-89 to C12-9 | ca | PVA-103 and SM-15 or KL-506 and SM-15 or AP-17 and SM-15 | A |
| Comparative Example C12-5 | eb | — | C |
| Comparative Examples C12-6 and C12-7 | eb | PVA-103 or SM-4 | B to C |

Subsequently, a cell for evaluating a cathode of a lithium ion secondary battery was assembled, and ionic resistance, reaction resistance, room temperature rate characteristic, low-temperature discharge characteristic, and cycle characteristic were evaluated.

<Assembly of Cell for Evaluation Cathode of Lithium Ion Secondary Battery>

[Examples C13-1 to C13-91] [Comparative Examples C13-1 and C13-2] [Example C13-1a]

A cell for evaluating a cathode of a lithium ion secondary battery was assembled in the same manner as in Example C2-1 except that, in Example C2-1, the electrodes shown in Table 157 were used instead of the electrode produced in Example C1-1, and then ionic resistance, reaction resistance, room temperature rate characteristic, low-temperature discharge characteristic, and cycle characteristic were evaluated.

TABLE 157

|  | Electrode used | Dispersant or triazine derivative | Polymer dispersant |
|---|---|---|---|
| Example C13-1 | Example C12-1 | a | PVA-103 |
| Example C13-2 | Example C12-2 |  | PVA-403 |
| Example C13-3 | Example C12-3 |  | KL-506 |
| Example C13-4 | Example C12-4 |  | AP-17 |
| Example C13-5 | Example C12-5 |  | L-3266 |
| Example C13-6 | Example C12-6 |  | K-434 |
| Example C13-7 | Example C12-7 |  | PVB-A |
| Example C13-8 | Example C12-8 |  | SM-4 |
| Example C13-9 | Example C12-9 |  | SM-15 |
| Example C13-10 | Example C12-10 | cb | PVA-103 |
| Example C13-11 | Example C12-11 |  | KL-506 |
| Example C13-12 | Example C12-12 |  | AP-17 |
| Example C13-13 | Example C12-13 |  | SM-4 |
| Example C13-14 | Example C12-14 |  | SM-15 |
| Example C13-15 | Example C12-15 | cc | PVA-103 |
| Example C13-16 | Example C12-16 |  | KL-506 |
| Example C13-17 | Example C12-17 |  | AP-17 |
| Example C13-18 | Example C12-18 |  | SM-4 |
| Example C13-19 | Example C12-19 |  | SM-15 |
| Example C13-20 | Example C12-20 | cd | KL-506 |
| Example C13-21 | Example C12-21 |  | SM-4 |
| Example C13-22 | Example C12-22 | ce | PVA-403 |
| Example C13-23 | Example C12-23 |  | SM-15 |
| Example C13-24 | Example C12-24 | cf | AP-17 |
| Example C13-25 | Example C12-25 |  | SM-15 |
| Example C13-26 | Example C12-26 | cg | AP-17 |
| Example C13-27 | Example C12-27 |  | SM-4 |
| Example C13-28 | Example C12-28 | ch | PVA-403 |
| Example C13-29 | Example C12-29 |  | AP-17 |
| Example C13-30 | Example C12-30 |  | SM-4 |
| Example C13-31 | Example C12-31 |  | SM-15 |
| Example C13-32 | Example C12-32 | ci | PVA-103 |

TABLE 157-continued

| Electrode used | Example used | Dispersant or triazine derivative | Polymer dispersant |
|---|---|---|---|
| Example C13-33 | Example C12-33 |  | SM-15 |
| Example C13-34 | Example C12-34 | cj | PVA-103 |
| Example C13-35 | Example C12-35 |  | KL-506 |
| Example C13-36 | Example C12-36 |  | AP-17 |
| Example C13-37 | Example C12-37 |  | SM-4 |
| Example C13-38 | Example C12-38 |  | SM-15 |
| Example C13-39 | Example C12-39 | ck | PVA-403 |
| Example C13-40 | Example C12-40 |  | SM-15 |
| Example C13-41 | Example C12-41 | cl | PVA-103 |
| Example C13-42 | Example C12-42 |  | SM-15 |
| Example C13-43 | Example C12-43 | cm | PVA-103 |
| Example C13-44 | Example C12-44 |  | SM-15 |
| Example C13-45 | Example C12-45 | cn | PVA-403 |
| Example C13-46 | Example C12-46 |  | SM-4 |
| Example C13-47 | Example C12-47 | co | KL-506 |
| Example C13-48 | Example C12-48 |  | SM-15 |
| Example C13-49 | Example C12-49 | cp | PVA-103 |
| Example C13-50 | Example C12-50 |  | SM-15 |
| Example C13-51 | Example C12-51 | cq | AP-17 |
| Example C13-52 | Example C12-52 |  | SM-15 |
| Example C13-53 | Example C12-53 | cr | KL-506 |
| Example C13-54 | Example C12-54 |  | SM-4 |
| Example C13-55 | Example C12-55 | cs | PVA-403 |
| Example C13-56 | Example C12-56 |  | SM-4 |
| Example C13-57 | Example C12-57 | ct | PVA-103 |
| Example C13-58 | Example C12-58 |  | SM-15 |
| Example C13-59 | Example C12-59 | cu | PVA-103 |
| Example C13-60 | Example C12-60 |  | KL-506 |
| Example C13-61 | Example C12-61 |  | AP-17 |
| Example C13-62 | Example C12-62 |  | SM-4 |
| Example C13-63 | Example C12-63 |  | SM-15 |
| Example C13-64 | Example C12-64 | cv | PVA-403 |
| Example C13-65 | Example C12-65 |  | KL-506 |
| Example C13-66 | Example C12-66 |  | SM-4 |
| Example C13-67 | Example C12-67 |  | SM-15 |
| Example C13-68 | Example C12-68 | cw | PVA-103 |
| Example C13-69 | Example C12-69 |  | KL-506 |
| Example C13-70 | Example C12-70 |  | AP-17 |
| Example C13-71 | Example C12-71 |  | SM-4 |
| Example C13-72 | Example C12-72 |  | SM-15 |
| Example C13-73 | Example C12-73 | cx | AP-17 |
| Example C13-74 | Example C12-74 |  | SM-4 |
| Example C13-75 | Example C12-75 | cy | PVA-103 |
| Example C13-76 | Example C12-76 |  | SM-15 |
| Example C13-77 | Example C12-77 | cz | KL-506 |
| Example C13-78 | Example C12-78 |  | SM-4 |
| Example C13-79 | Example C12-79 | da | KL-506 |
| Example C13-80 | Example C12-80 |  | SM-4 |
| Example C13-81 | Example C12-81 | db | AP-17 |
| Example C13-82 | Example C12-82 |  | SM-15 |
| Example C13-83 | Example C12-83 | dc | PVA-403 |
| Example C13-84 | Example C12-84 |  | SM-15 |
| Example C13-85 | Example C12-85 | dd | KL-506 |
| Example C13-86 | Example C12-86 |  | SM-4 |
| Example C13-87 | Example C12-87 | de | PVA-103 |
| Example C13-88 | Example C12-88 |  | SM-15 |
| Example C13-89 | Example C12-89 | ca | PVA-103/SM-15 |
| Example C13-90 | Example C12-90 |  | KL-506/SM-15 |
| Example C13-91 | Example C12-91 |  | AP-17/SM-15 |
| Example C13-1a | Example C12-1a | ca | — |
| Comparative Example C13-1 | Comparative Example C12-2 | ea | PVA-103 |
| Comparative Example C13-2 | Comparative Example C12-7 | eb | SM-4 |

Comparative Example C13-3

A carbon material dispersion liquid, a carbon material dispersion varnish, a cathode mixture paste, and an electrode were produced in the same manner as in Example C12-1, except that the dispersant ca and the polymer dispersant PVA-103 used in Example C12-1 was replaced with water. A cell for evaluating a cathode of a lithium ion secondary battery was assembled in the same manner as in Example C13-1 by using, in Example C13-1, the electrode instead of the electrode produced in Example C12-1, and then ionic resistance, reaction resistance, room temperature rate characteristic, low-temperature discharge characteristic, and cycle characteristic were evaluated.

<Evaluation Results>

Table 158 shows evaluation results of ionic resistance, reaction resistance, room temperature rate characteristic, low-temperature discharge characteristic, and cycle characteristic of Examples C13-1 to C13-91, Comparative Examples C13-1 to C13-3, and Example C13-1a.

TABLE 158

|  | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C13-1 | ca | PVA-103 | 10 | 419 | 4.9 | 69.3 | 76.0 | 83.1 |
| Example C13-2 |  | PVA-403 | 10 | 419 | 4.9 | 69.2 | 76.4 | 81.3 |
| Example C13-3 |  | KL-506 | 10 | 417 | 4.9 | 69.2 | 76.4 | 85.5 |
| Example C13-4 |  | AP-17 | 10 | 417 | 4.9 | 69.1 | 76.5 | 83.7 |
| Example C13-5 |  | L-3266 | 10 | 418 | 4.8 | 69.1 | 76.5 | 73.5 |
| Example C13-6 |  | K-434 | 10 | 419 | 4.8 | 69.5 | 76.4 | 82.3 |
| Example C13-7 |  | PVB-A | 10 | 418 | 4.9 | 69.5 | 76.2 | 84.8 |
| Example C13-8 |  | SM-4 | 10 | 420 | 4.8 | 69.4 | 76.2 | 85.4 |
| Example C13-9 |  | SM-15 | 10 | 418 | 4.8 | 69.1 | 76.4 | 83.4 |
| Example C13-10 | cb | PVA-103 | 10 | 421 | 5.1 | 68.5 | 75.0 | 84.0 |

TABLE 158-continued

| | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C13-11 | | KL-506 | 10 | 423 | 5.1 | 68-1 | 75.1 | 82.8 |
| Example C13-12 | | AP-17 | 10 | 422 | 5.4 | 68.9 | 75.8 | 81.0 |
| Example C13-13 | | SM-4 | 10 | 426 | 5.1 | 68.8 | 74.8 | 84.7 |
| Example C13-14 | | SM-15 | 10 | 422 | 5.4 | 68.6 | 74.9 | 84.5 |
| Example C13-15 | cc | PVA-103 | 10 | 428 | 5.0 | 68.8 | 74.6 | 82.2 |
| Example C13-16 | | KL-506 | 10 | 425 | 5.0 | 68.5 | 75.1 | 82.9 |
| Example C13-17 | | AP-17 | 10 | 429 | 5.4 | 68.9 | 74.6 | 82.6 |
| Example C13-18 | | SM-4 | 10 | 429 | 5.4 | 68.4 | 75.7 | 82.0 |
| Example C13-19 | | SM-15 | 10 | 426 | 5.1 | 68.4 | 75.4 | 82.7 |
| Example C13-20 | cd | KL-506 | 13 | 479 | 7.7 | 64.2 | 67.3 | 84.9 |
| Example C13-21 | | SM-4 | 13 | 476 | 7.7 | 64.3 | 66.4 | 84.4 |
| Example C13-22 | ce | PVA-403 | 12 | 459 | 7.1 | 65.6 | 69.1 | 84.9 |
| Example C13-23 | | SM-15 | 12 | 458 | 7.3 | 65.2 | 70.0 | 84.8 |
| Example C13-24 | cf | AP-17 | 12 | 464 | 7.4 | 65.0 | 69.8 | 84.7 |
| Example C13-25 | | SM-15 | 12 | 464 | 7.4 | 65.9 | 69.0 | 82.6 |
| Example C13-26 | cg | AP-17 | 12 | 466 | 7.4 | 65.9 | 70.2 | 84.9 |
| Example C13-27 | | SM-4 | 12 | 457 | 7.1 | 65.4 | 70.1 | 85.3 |
| Example C13-28 | ch | PVA-403 | 11 | 441 | 6.4 | 67.0 | 72.1 | 81.0 |
| Example C13-29 | | AP-17 | 11 | 442 | 6.2 | 67.3 | 73.4 | 80.5 |
| Example C13-30 | | SM-4 | 11 | 443 | 6.2 | 67.0 | 72.7 | 85.6 |
| Example C13-31 | | SM-15 | 11 | 443 | 6.3 | 66.8 | 72.8 | 85.7 |
| Example C13-32 | ci | PVA-103 | 12 | 462 | 7.2 | 65.3 | 69.8 | 85.9 |
| Example C13-33 | | SM-15 | 12 | 463 | 7.1 | 65.0 | 69.8 | 80.5 |
| Example C13-34 | cj | PVA-103 | 11 | 445 | 6.1 | 66.7 | 72.1 | 82.0 |
| Example C13-35 | | KL-506 | 11 | 441 | 6.4 | 67.4 | 71.9 | 81.4 |
| Example C13-36 | | AP-17 | 11 | 441 | 6.2 | 67.4 | 73.1 | 81.7 |
| Example C13-37 | | SM-4 | 11 | 446 | 6.3 | 66.9 | 72.1 | 80.8 |
| Example C13-38 | | SM-15 | 11 | 442 | 6.1 | 67.4 | 73.0 | 83.4 |
| Example C13-39 | ck | PVA-403 | 12 | 461 | 7.4 | 65.3 | 70.3 | 84.4 |
| Example C13-40 | | SM-15 | 12 | 461 | 7.2 | 65.0 | 68.6 | 85.9 |
| Example C13-41 | cl | PVA-103 | 12 | 459 | 7.3 | 65.3 | 69.1 | 82.1 |
| Example C13-42 | | SM-15 | 12 | 463 | 7.1 | 65.6 | 69.4 | 84.5 |
| Example C13-43 | cm | PVA-103 | 14 | 489 | 8.4 | 63.2 | 64.8 | 83.9 |
| Example C13-44 | | SM-15 | 14 | 487 | 8.1 | 62.8 | 64.2 | 83.8 |
| Example C13-45 | cn | PVA-403 | 13 | 475 | 7.6 | 64.8 | 67.6 | 84.9 |
| Example C13-46 | | SM-4 | 13 | 475 | 7.6 | 64.5 | 67.4 | 83.3 |
| Example C13-47 | co | KL-506 | 13 | 478 | 7.8 | 64.1 | 67.0 | 84.2 |

TABLE 158-continued

| | Dispersant | Polymer dispersant | $|Z|_{ion}$ at 25° C. [Ω] | $|Z|_{ion}$ at −20° C. [Ω] | $|Z|_{re}$ at 25° C. [Ω] | Room temperature rate characteristic [%] | Low-temperature discharge characteristic [%] | Cycle characteristic [%] |
|---|---|---|---|---|---|---|---|---|
| Example C13-48 | | SM-15 | 13 | 481 | 7.7 | 63.9 | 66.4 | 85.3 |
| Example C13-49 | cp | PVA-103 | 15 | 495 | 8.7 | 62.0 | 63.2 | 84.2 |
| Example C13-50 | | SM-15 | 15 | 495 | 8.8 | 62.6 | 63.0 | 81.3 |
| Example C13-51 | cq | AP-17 | 14 | 487 | 8.3 | 63.0 | 63.7 | 86.0 |
| Example C13-52 | | SM-15 | 14 | 492 | 8.3 | 62.6 | 64.0 | 84.7 |
| Example C13-53 | cr | KL-506 | 14 | 487 | 8.4 | 62.5 | 64.7 | 82.3 |
| Example C13-54 | | SM-4 | 14 | 490 | 8.3 | 62.9 | 64.6 | 82.1 |
| Example C13-55 | cs | PVA-403 | 13 | 476 | 7.7 | 64.1 | 66.9 | 85.6 |
| Example C13-56 | | SM-4 | 13 | 478 | 7.7 | 64.1 | 66.8 | 83.1 |
| Example C13-57 | ct | PVA-103 | 13 | 477 | 7.7 | 64.1 | 67.4 | 85.9 |
| Example C13-58 | | SM-15 | 13 | 478 | 7.8 | 63.7 | 66.6 | 81.2 |
| Example C13-59 | cu | PVA-103 | 10 | 429 | 5.3 | 68.2 | 75.2 | 81.4 |
| Example C13-60 | | KL-506 | 10 | 427 | 5.2 | 68.7 | 74.8 | 80.8 |
| Example C13-61 | | AP-17 | 10 | 425 | 5.4 | 68.7 | 75.3 | 80.9 |
| Example C13-62 | | SM-4 | 10 | 428 | 5.2 | 68.1 | 75.2 | 84.0 |
| Example C13-63 | | SM-15 | 10 | 424 | 5.0 | 68.1 | 75.4 | 85.1 |
| Example C13-64 | cv | PVA-403 | 11 | 445 | 6.4 | 67.2 | 71.6 | 85.3 |
| Example C13-65 | | KL-506 | 11 | 444 | 6.1 | 67.2 | 72.8 | 84.4 |
| Example C13-66 | | SM-4 | 11 | 441 | 6.2 | 67.5 | 71.7 | 83.9 |
| Example C13-67 | | SM-15 | 11 | 445 | 6.4 | 66.8 | 72.2 | 83.0 |
| Example C13-68 | cw | PVA-103 | 11 | 443 | 6.2 | 66.8 | 73.4 | 80.7 |
| Example C13-69 | | KL-506 | 11 | 443 | 6.1 | 67.5 | 72.0 | 81.4 |
| Example C13-70 | | AP-17 | 11 | 445 | 6.2 | 66.7 | 72.2 | 82.8 |
| Example C13-71 | | SM-4 | 11 | 446 | 6.3 | 66.6 | 72.5 | 85.9 |
| Example C13-72 | | SM-15 | 11 | 442 | 6.3 | 67.2 | 73.1 | 83.1 |
| Example C13-73 | cx | AP-17 | 12 | 467 | 7.4 | 65.9 | 69.8 | 81.6 |
| Example C13-74 | | SM-4 | 12 | 464 | 7.4 | 65.6 | 68.9 | 85.7 |
| Example C13-75 | cy | PVA-103 | 12 | 461 | 7.4 | 66.0 | 69.6 | 83.3 |
| Example C13-76 | | SM-15 | 12 | 465 | 7.2 | 65.6 | 70.2 | 84.7 |
| Example C13-77 | cz | KL-506 | 13 | 479 | 7.8 | 64.5 | 66.8 | 83.2 |
| Example C13-78 | | SM-4 | 13 | 481 | 7.7 | 64.1 | 66.9 | 81.7 |
| Example C13-79 | da | KL-506 | 13 | 481 | 7.7 | 63.8 | 66.9 | 84.7 |
| Example C13-80 | | SM-4 | 13 | 478 | 7.8 | 63.9 | 67.2 | 84.3 |
| Example C13-81 | db | AP-17 | 12 | 461 | 7.3 | 65.3 | 68.9 | 81.3 |
| Example C13-82 | | SM-15 | 12 | 462 | 7.2 | 65.0 | 70.2 | 84.3 |
| Example C13-83 | dc | PVA-403 | 10 | 428 | 5.0 | 68.8 | 75.3 | 82.1 |
| Example C13-84 | | SM-15 | 10 | 424 | 5.1 | 68.6 | 75.0 | 83.8 |

TABLE 158-continued

| | Dispersant | Polymer dispersant | $\|Z\|_{ion}$ at 25° C. [Ω] | $\|Z\|_{ion}$ at −20° C. [Ω] | $\|Z\|_{re}$ at 25° C. [Ω] | Room temperature rate characteristic [%] | Low-temperature discharge characteristic [%] | Cycle characteristic [%] |
|---|---|---|---|---|---|---|---|---|
| Example C13-85 | dd | KL-506 | 10 | 421 | 5.1 | 68.4 | 75.0 | 81.4 |
| Example C13-86 | | SM-4 | 10 | 428 | 5.4 | 68.8 | 75.4 | 83.7 |
| Example C13-87 | de | PVA-103 | 12 | 466 | 7.1 | 65.4 | 70.1 | 83.8 |
| Example C13-88 | | SM-15 | 12 | 464 | 7.2 | 65.9 | 69.3 | 83.7 |
| Example C13-89 | ca | PVA-103/SM-15 | 10 | 420 | 4.9 | 69.2 | 76.3 | 84.0 |
| Example C13-90 | | KL-506/SM-15 | 10 | 418 | 4.9 | 69.1 | 76.2 | 82.9 |
| Example C13-91 | | AP-17/SM-15 | 10 | 419 | 4.9 | 69.6 | 76.2 | 82.9 |
| Example C13-1a | ca | — | 10 | 420 | 4.9 | 69.1 | 75.9 | 60.1 |
| Comparative Example C13-1 | ea | PVA-103 | 18 | 543 | 10.2 | 50.1 | 38.9 | 62.4 |
| Comparative Example C13-2 | eb | SM-4 | 17 | 521 | 10.6 | 51.4 | 42.2 | 65.3 |
| Comparative Example C13-3 | — | — | 16 | 511 | 9.9 | 52.3 | 44.5 | 58.7 |

As can be seen from Table 158, the cathodes of Examples C13-1 to C13-91 and Example C13-1a, in which the dispersants ca to de were used were extremely excellent in the all ionic resistance, reaction resistance, room temperature rate characteristic, and low-temperature discharge characteristic at room temperature and −20° C., as compared to the cathodes of Comparative Examples C13-1 and C13-2 in which the dispersants ea and eb and the polymer dispersant were used, and Comparative Example C13-3 in which a dispersant was not used.

In addition, in the cathodes of Examples C13-1 to 13-91 in which the dispersants ca to de and the polymer dispersant were used, the cycle characteristic was significantly improved as compared with the cathodes of Comparative Examples C13-1 and 13-2 in which the dispersants ea and eb and the polymer dispersant were used, and Comparative Example C13-3 in which a dispersant was not used.

Based on the above results, it was confirmed that the same effect was obtained even in a case where a solvent was water.

Priority is claimed on Japanese Patent Application No. 2017-95486, filed on May 12, 2017, Japanese Patent Application No. 2017-211690, filed on Nov. 1, 2017, and Japanese Patent Application No. 2017-250110, filed on Dec. 26, 2017, the contents of which are incorporated herein by reference.

What is claimed is:

1. A dispersant, comprising:
a triazine derivative represented by General Formula (1):

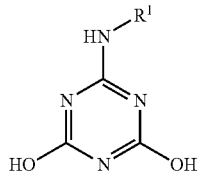

General Formula (1)

in General Formula (1), $R^1$ is a group represented by —$X^1$—$Y^1$, where $X^1$ is an arylene group which may have a substituent, and $Y^1$ is a sulfo group or a carboxyl group; or $R^1$ is a phenyl group having a substituent containing at least —NHC(=O)—, a benzimidazole group, an indole group which may have a substituent, or a pyrazole group which may have a substituent; and an inorganic base;

wherein a content of the inorganic base with respect to the triazine derivative is 0.1 to 1 molar equivalent.

2. A dispersant composition, comprising:
the dispersant according to claim 1; and
a polymer dispersant.

3. The dispersant composition according to claim 2, wherein the polymer dispersant has a hydroxyl group.

4. The dispersant composition according to claim 2, wherein the polymer dispersant is a polyvinyl alcohol resin and/or a cellulose resin.

5. A dispersion composition, comprising:
the dispersant according to claim 1;
a carbon material; and
a solvent.

6. A dispersion composition, comprising:
the dispersant composition according to claim 2;
a carbon material; and
a solvent.

7. The dispersion composition according to claim 5, further comprising a binder.

8. A dispersion composition for batteries, comprising the dispersion composition according to claim 5; and
further comprising an active material.

9. A dispersion composition for batteries, comprising:
a dispersant;
a carbon material;
a solvent; and
an active material, wherein the dispersant comprises:
  a triazine derivative represented by General Formula (1):

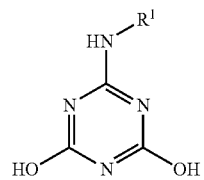

General Formula (1)

in General Formula (1), $R^1$ is a group represented by —$X^1$—$Y^1$, where $X^1$ is an arylene group which may have a substituent, and $Y^1$ is a sulfo group or a carboxyl group; or $R^1$ is a phenyl group having a substituent containing at least —NHC(=O)—, a benzimidazole group, an indole group which may have a substituent, or a pyrazole group which may have a substituent; and an amine or an inorganic base, wherein a content of the dispersant is 0.1 to 200 mg with respect to a 1 m² surface area of the active material.

10. An electrode comprising a mixture layer formed from a dispersion composition for batteries on a current collector;
  wherein the dispersion composition for batteries comprises:
  a dispersant;
  a carbon material;
  a solvent; and
  an active material,
  wherein the dispersant comprises:
    a triazine derivative represented by General Formula (1):

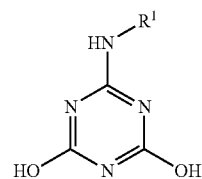

General Formula (1)

in General Formula (1), $R^1$ is a group represented by —$X^1$—$Y^1$, where $X^1$ is an arylene group which may have a substituent, and $Y^1$ is a sulfo group or a carboxyl group; or $R^1$ is a phenyl group having a substituent containing at least —NHC(=O)—, a benzimidazole group, an indole group which may have a substituent, or a pyrazole group which may have a substituent; and an amine or an inorganic base.

11. A battery, comprising:
  the electrode according to claim 10; and
  a non-aqueous electrolyte solution.

12. The battery according to claim 11, wherein a content of the dispersant is 10 μg to 60 mg with respect to 1 ml of the non-aqueous electrolyte solution.

* * * * *